US008270724B2

(12) United States Patent
Iwamoto et al.

(10) Patent No.: US 8,270,724 B2

(45) Date of Patent: Sep. 18, 2012

(54) IMAGE SIGNATURE MATCHING DEVICE

(75) Inventors: Kota Iwamoto, Tokyo (JP); Ryoma Oami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/131,798

(22) PCT Filed: Mar. 12, 2010

(86) PCT No.: PCT/JP2010/001768

§ 371 (c)(1), (2), (4) Date: May 27, 2011

(87) PCT Pub. No.: WO2010/103848

PCT Pub. Date: Sep. 16, 2010

(65) Prior Publication Data

US 2011/0235920 A1 Sep. 29, 2011

(30) Foreign Application Priority Data

Mar. 13, 2009 (JP) ................................. 2009-061021
Apr. 14, 2009 (JP) ................................. 2009-097863

(51) Int. Cl.
*G06K 9/46* (2006.01)
*G06K 9/68* (2006.01)

(52) U.S. Cl. ........................................ 382/190; 382/218

(58) Field of Classification Search ........... 382/181–231
See application file for complete search history.

(56) References Cited

U.S. PATENT DOCUMENTS 5,157,743 A * 10/1992 Maeda et al. ................. 382/248
7,379,627 B2 * 5/2008 Li et al. ......................... 382/305
7,643,684 B2 * 1/2010 Lee et al. ....................... 382/190
7,805,011 B2 * 9/2010 Klamer et al. ................ 382/232

(Continued)

FOREIGN PATENT DOCUMENTS

JP 08-500471 T 1/1996

(Continued)

OTHER PUBLICATIONS

Daniel Mohr et al., Continuous Edge Gradient-Based Template Matching for Articulated Objects, Ifl Technical Report Series, Department of Informatics, Clausthal University of Technology, International Conference on Computer Vision Theory and Applications (VISAPP), Feb. 5, 2009.

(Continued)

*Primary Examiner* — Manav Seth

(74) *Attorney, Agent, or Firm* — Sughrue Mion, PLLC

(57) ABSTRACT

An image signature to be used for matching is generated by the following generation method. First, region features are extracted from respective sub-regions of a plurality of pairs of sub-regions in an image, and for each of the pairs of sub-regions, a difference value between the region features of two sub-regions forming a pair is quantized. When performing the quantization, the difference value is quantized to a particular quantization value if an absolute value of the difference value is smaller than a predetermined value. Then, a collection of elements which are quantization values calculated for the respective pairs of sub-regions is used as an image signature to be used for discriminating the image. An image signature matching device matches an image signature of a first image and an image signature of a second image, generated by the above-described generation method, in such a manner that a weight of an element having the particular quantization value is reduced.

23 Claims, 63 Drawing Sheets

U.S. PATENT DOCUMENTS

| | | | | |
|---|---|---|---|---|
| 2004/0179743 | A1 * | 9/2004 | Shibata et al. | 382/239 |
| 2006/0193520 | A1 * | 8/2006 | Mita et al. | 382/190 |
| 2006/0204103 | A1 | 9/2006 | Mita et al. | |
| 2007/0110319 | A1 | 5/2007 | Wyatt et al. | |

FOREIGN PATENT DOCUMENTS

| | | | |
|---|---|---|---|
| JP | 2006-268825 | A | 10/2006 |
| JP | 2007-140684 | A | 6/2007 |

OTHER PUBLICATIONS

Tieniu Tan et al., Ordinal Representations for Biometrics Recognition, 15th European Signal Processing Conference (EUSIPCO 2007).

Sinha, Perceiving and Recognizing Three-dimensional Forms, Nov. 2, 1995.

Anderson et al., Robust real-time face tracker for cluttered environments, Computer Vision and Image Understanding 95 (2004), pp. 184-200.

Pratt, Digital Image Processing, Piks functional overview, Chapter 19, Image detection and registration,, Jan. 1, 2001, DIgitial Image Processing: Piks inside, New York: John Wiley & Sons, US, pp. 613-639 (XP002583741).

Pratt, "Digital Image Processing, PASSAGE", Jan. 1, 2001, DIgitial Image Processing: Piks inside, New York: John Wiley & Sons, US, pp. 29-33, 443 (XP002375498).

Extended European Search Report issued in corresponding EP Patent Application No. 10750604.0, mailed Mar. 30, 2012.

* cited by examiner

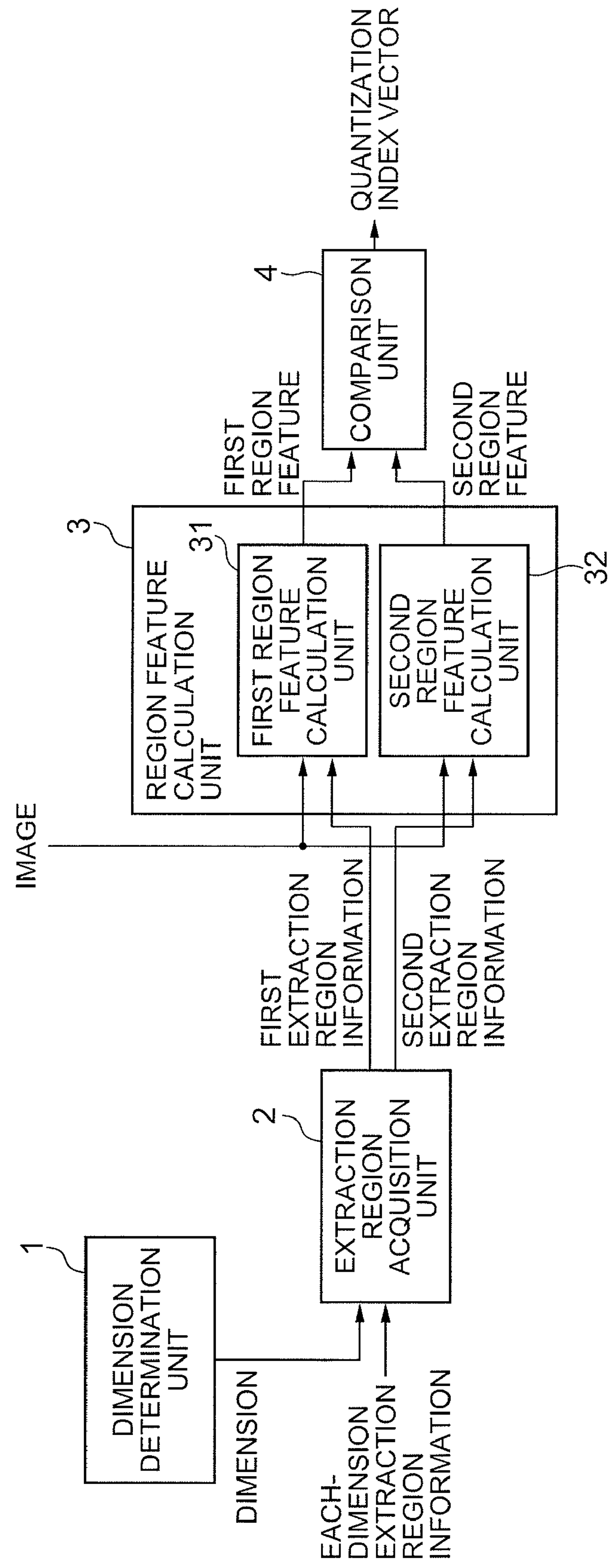
FIG. 1
DIMENSION DETERMINATION UNIT
1
DIMENSION
EACH-DIMENSION EXTRACTION REGION INFORMATION
EXTRACTION REGION ACQUISITION UNIT
2
FIRST EXTRACTION REGION INFORMATION
SECOND EXTRACTION REGION INFORMATION
IMAGE
REGION FEATURE CALCULATION UNIT
3
FIRST REGION FEATURE CALCULATION UNIT
31
SECOND REGION FEATURE CALCULATION UNIT
32
FIRST REGION FEATURE
SECOND REGION FEATURE
COMPARISON UNIT
4
QUANTIZATION INDEX VECTOR FIRST EXTRACTION REGION
SECOND EXTRACTION REGION
1ST DIMENSION
2ND DIMENSION
3RD DIMENSION
4TH DIMENSION
5TH DIMENSION
6TH DIMENSION
7TH DIMENSION
8TH DIMENSION
9TH DIMENSION
10TH DIMENSION
11TH DIMENSION
12TH DIMENSION
SECOND EXTRACTION REGION
FIRST EXTRACTION REGION

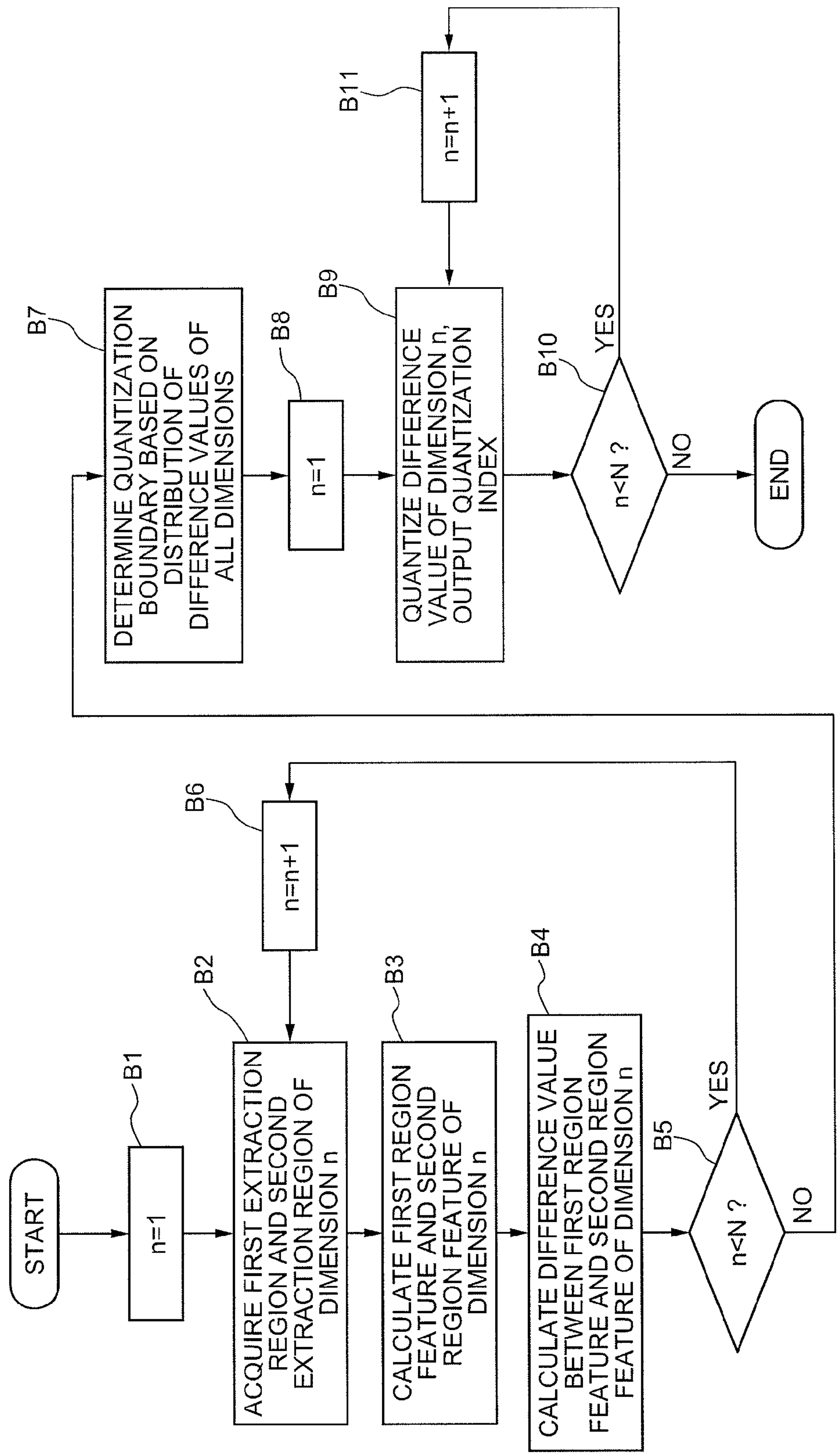
FIG. 7
START
n=1
B1
ACQUIRE FIRST EXTRACTION REGION AND SECOND EXTRACTION REGION OF DIMENSION n
B2
CALCULATE FIRST REGION FEATURE AND SECOND REGION FEATURE OF DIMENSION n
B3
CALCULATE DIFFERENCE VALUE BETWEEN FIRST REGION FEATURE AND SECOND REGION FEATURE OF DIMENSION n
B4
n<N ?
B5
YES
NO
n=n+1
B6
DETERMINE QUANTIZATION BOUNDARY BASED ON DISTRIBUTION OF DIFFERENCE VALUES OF ALL DIMENSIONS
B7
n=1
B8
QUANTIZE DIFFERENCE VALUE OF DIMENSION n, OUTPUT QUANTIZATION INDEX
B9
n<N ?
B10
YES
NO
END
n=n+1
B11

FIG. 9

| DIMENSION | REGION FEATURE CALCULATION METHOD |
|---|---|
| 1ST DIMENSION | MEAN VALUE OF LUMINANCE VALUES |
| 2ND DIMENSION | MEAN VECTOR OF RGB COMPONENTS |
| 3RD DIMENSION | LUMINANCE VALUE AT POSITION OF 30% FROM TOP OF ORDER OF SORTED LUMINANCE VALUES |
| 4TH DIMENSION | HYSTGRAM OF 5 BIN INDICATING EDGE DIRECTION DISTRIBUTION (4 DIRECTIONS + NO EDGE) |
| 5TH DIMENSION | MEAN VALUE OF LUMINANCE VALUES |
| 6TH DIMENSION | MAX. VALUE OF LUMINANCE VALUES |
| 7TH DIMENSION | COLOR LAYOUT |
| 8TH DIMENSION | MEDIAN VALUE OF LUMINANCE VALUES |
| 9TH DIMENSION | MAX. VALUE OF LUMINANCE VALUES |
| 10TH DIMENSION | MODE VALUE OF LUMINANCE VALUES |
| 11TH DIMENSION | MEAN VECTOR OF RGB COMPONENTS |
| 12TH DIMENSION | MEAN VALUE OF LUMINANCE VALUES |

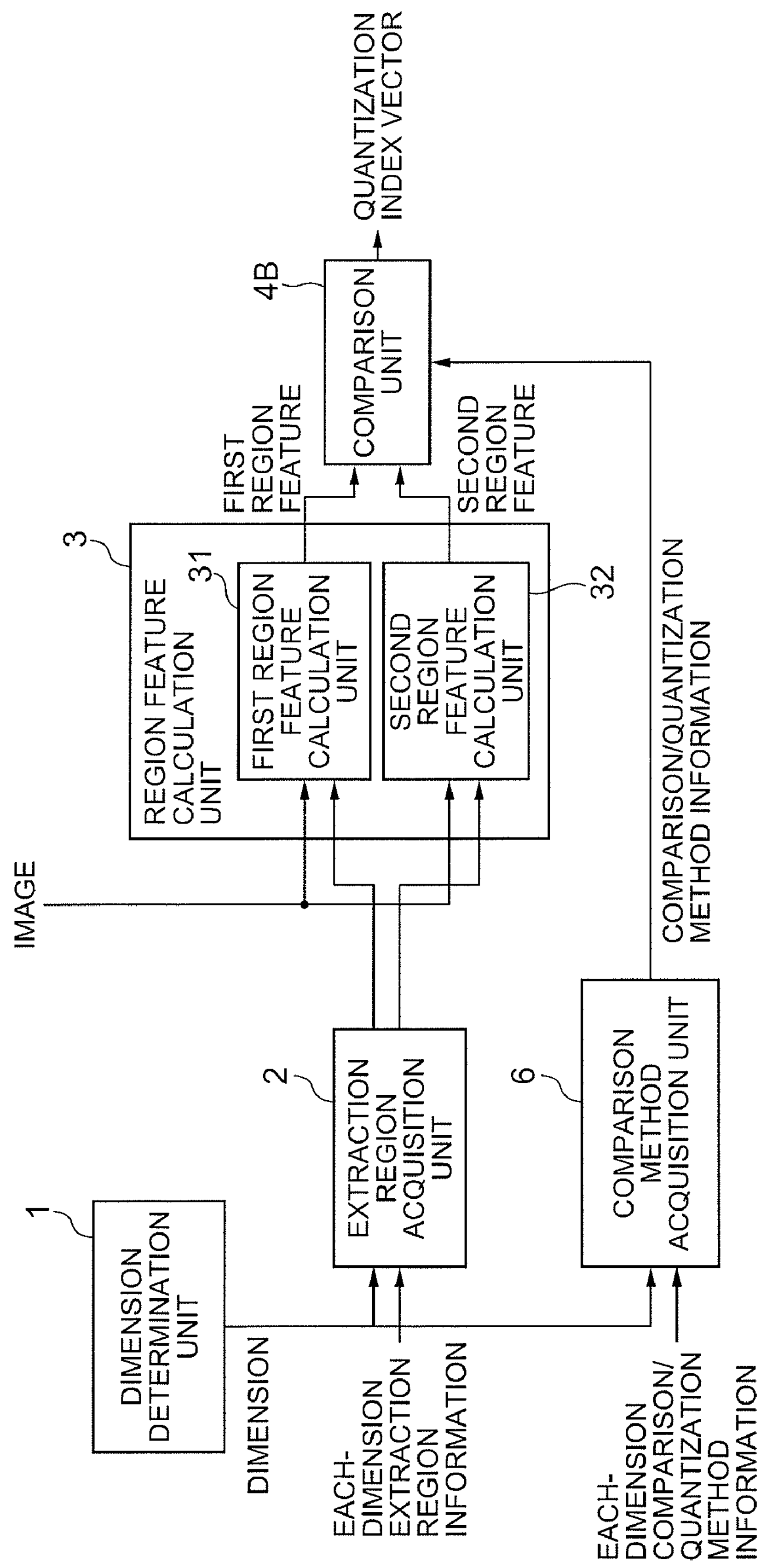
FIG. 11
1
DIMENSION DETERMINATION UNIT
DIMENSION
EACH-DIMENSION EXTRACTION REGION INFORMATION
2
EXTRACTION REGION ACQUISITION UNIT
EACH-DIMENSION COMPARISON/QUANTIZATION METHOD INFORMATION
6
COMPARISON METHOD ACQUISITION UNIT
IMAGE
3
REGION FEATURE CALCULATION UNIT
31
FIRST REGION FEATURE CALCULATION UNIT
32
SECOND REGION FEATURE CALCULATION UNIT
FIRST REGION FEATURE
SECOND REGION FEATURE
COMPARISON/QUANTIZATION METHOD INFORMATION
4B
COMPARISON UNIT
QUANTIZATION INDEX VECTOR

FIG. 12

| DIMENSION | COMPARISON/QUANTIZATION METHOD |
|---|---|
| 1ST DIMENSION | COMPARISON/QUANTIZATION METHOD A |
| 2ND DIMENSION | COMPARISON/QUANTIZATION METHOD E, REPRESENTATIVE VECTORS ARE {200, 50, 50}, {50, 200, 50}, {50, 50, 200} |
| 3RD DIMENSION | COMPARISON/QUANTIZATION METHOD B, th=3 |
| 4TH DIMENSION | COMPARISON/QUANTIZATION METHOD F, M=2 |
| 5TH DIMENSION | COMPARISON/QUANTIZATION METHOD B, th=5 |
| 6TH DIMENSION | COMPARISON/QUANTIZATION METHOD A |
| 7TH DIMENSION | COMPARISON/QUANTIZATION METHOD F, M=3 |
| 8TH DIMENSION | COMPARISON/QUANTIZATION METHOD G, th IS POINT AT 30% FROM BOTTOM OF ORDER OF SORTED ABSOLUTE VALUES OF DIFFERENCE VALUES |
| 9TH DIMENSION | COMPARISON/QUANTIZATION METHOD C, QUANTIZED IN 5 LEVELS |
| 10TH DIMENSION | COMPARISON/QUANTIZATION METHOD H, th IS DETERMIED THAT PROPORTIONS OF QUANTIZATION INDEXES BECOME EQUAL |
| 11TH DIMENSION | COMPARISON/QUANTIZATION METHOD F, M=5 |
| 12TH DIMENSION | COMPARISON/QUANTIZATION METHOD B, th=10 |

FIG. 14-a

| | | | | | |
|---|---|---|---|---|---|
| 1ST DIMENSION | FIRST EXTRACTION REGION | (262.000,163.000) | (178.068,230.967) | (184.594,67.411) | (100.662,135.378) |
| | SECOND EXTRACTION REGION | (161.000,133.000) | (156.027,132.477) | (164.240,102.170) | (159.268,101.647) |
| 2ND DIMENSION | FIRST EXTRACTION REGION | (186.000,114.000) | (188.072,130.873) | (125.455,121.434) | (127.526,138.307) |
| | SECOND EXTRACTION REGION | (142.000,84.000) | (174.889,72.029) | (161.153,136.623) | (194.042,124.652) |
| 3RD DIMENSION | FIRST EXTRACTION REGION | (296.000,138.000) | (172.473,221.320) | (241.199,56.754) | (117.672,140.074) |
| | SECOND EXTRACTION REGION | (149.000,138.000) | (85.959,187.253) | (75.736,44.227) | (12.695,93.480) |
| 4TH DIMENSION | FIRST EXTRACTION REGION | (101.000,195.000) | (189.434,115.373) | (186.649,290.123) | (275.083,210.496) |
| | SECOND EXTRACTION REGION | (241.000,154.000) | (198.519,99.627) | (327.681,86.277) | (285.201,31.904) |
| 5TH DIMENSION | FIRST EXTRACTION REGION | (111.000,177.000) | (-12.528,187.807) | (102.633,81.365) | (-20.895,92.173) |
| | SECOND EXTRACTION REGION | (94.000,84.000) | (-15.578,-4.734) | (127.983,42.034) | (18.406,-46.700) |
| 6TH DIMENSION | FIRST EXTRACTION REGION | (151.000,163.000) | (151.000,90.000) | (179.000,163.000) | (179.000,90.000) |
| | SECOND EXTRACTION REGION | (200.000,145.000) | (158.160,141.339) | (203.138,109.137) | (161.297,105.476) |
| 7TH DIMENSION | FIRST EXTRACTION REGION | (106.000,151.000) | (110.144,117.253) | (134.784,154.534) | (138.927,120.788) |
| | SECOND EXTRACTION REGION | (167.000,115.000) | (195.211,147.453) | (136.812,141.242) | (165.022,173.695) |
| 8TH DIMENSION | FIRST EXTRACTION REGION | (214.000,171.000) | (225.375,158.367) | (260.075,212.486) | (271.450,199.853) |
| | SECOND EXTRACTION REGION | (140.000,177.000) | (170.188,150.758) | (174.115,216.245) | (204.303,190.003) |
| 9TH DIMENSION | FIRST EXTRACTION REGION | (216.000,106.000) | (177.006,106.681) | (215.372,70.005) | (176.378,70.686) |
| | SECOND EXTRACTION REGION | (193.000,27.000) | (185.345,81.465) | (178.146,24.912) | (170.491,79.377) |
| 10TH DIMENSION | FIRST EXTRACTION REGION | (119.000,145.000) | (144.605,149.515) | (115.527,164.696) | (141.132,169.211) |
| | SECOND EXTRACTION REGION | (23.000,202.000) | (86.035,173.935) | (30.728,219.357) | (93.763,191.293) |
| 11TH DIMENSION | FIRST EXTRACTION REGION | (168.000,97.000) | (154.002,97.244) | (166.709,23.011) | (152.711,23.256) |
| | SECOND EXTRACTION REGION | (99.000,105.000) | (70.227,73.045) | (143.589,64.852) | (114.816,32.897) |
| 12TH DIMENSION | FIRST EXTRACTION REGION | (122.000,90.000) | (129.993,62.123) | (164.296,102.128) | (172.289,74.251) |
| | SECOND EXTRACTION REGION | (290.000,36.000) | (212.223,128.691) | (270.849,19.930) | (193.072,112.622) |
| 13TH DIMENSION | FIRST EXTRACTION REGION | (204.000,118.000) | (222.376,186.581) | (166.329,128.094) | (184.705,196.675) |
| | SECOND EXTRACTION REGION | (147.000,162.000) | (106.366,214.009) | (126.512,145.993) | (85.878,198.002) |
| 14TH DIMENSION | FIRST EXTRACTION REGION | (224.000,80.000) | (231.258,109.109) | (171.604,93.064) | (178.862,122.173) |
| | SECOND EXTRACTION REGION | (258.000,132.000) | (250.127,166.103) | (194.666,117.378) | (186.793,151.481) |
| 15TH DIMENSION | FIRST EXTRACTION REGION | (262.000,97.000) | (271.761,208.574) | (183.301,103.885) | (193.062,215.459) |
| | SECOND EXTRACTION REGION | (166.000,118.000) | (278.366,168.029) | (157.459,137.184) | (269.825,187.213) |
| 16TH DIMENSION | FIRST EXTRACTION REGION | (20.000,53.000) | (88.000,53.000) | (20.000,104.000) | (88.000,104.000) |
| | SECOND EXTRACTION REGION | (111.000,49.000) | (147.000,49.000) | (111.000,95.000) | (147.000,95.000) |
| 17TH DIMENSION | FIRST EXTRACTION REGION | (37.000,172.000) | (67.284,78.796) | (102.623,193.322) | (132.907,100.119) |
| | SECOND EXTRACTION REGION | (39.000,112.000) | (142.225,99.326) | (43.022,144.754) | (146.246,132.080) |
| 18TH DIMENSION | FIRST EXTRACTION REGION | (191.000,62.000) | (235.829,58.078) | (196.839,128.745) | (241.668,124.823) |
| | SECOND EXTRACTION REGION | (278.000,79.000) | (278.000,116.000) | (185.000,79.000) | (185.000,116.000) |
| 19TH DIMENSION | FIRST EXTRACTION REGION | (104.000,222.000) | (104.890,171.008) | (153.992,222.873) | (154.882,171.880) |
| | SECOND EXTRACTION REGION | (61.000,163.000) | (119.775,157.858) | (63.005,185.912) | (121.780,180.770) |
| 20TH DIMENSION | FIRST EXTRACTION REGION | (168.000,19.000) | (177.647,52.644) | (107.441,36.365) | (117.088,70.009) |
| | SECOND EXTRACTION REGION | (147.000,54.000) | (179.076,37.656) | (162.890,85.185) | (194.966,68.842) |
| 21TH DIMENSION | FIRST EXTRACTION REGION | (142.000,95.000) | (168.000,95.000) | (142.000,143.000) | (168.000,143.000) |
| | SECOND EXTRACTION REGION | (165.000,99.000) | (190.000,99.000) | (165.000,129.000) | (190.000,129.000) |
| 22TH DIMENSION | FIRST EXTRACTION REGION | (198.000,58.000) | (223.966,99.554) | (173.407,73.368) | (199.373,114.922) |
| | SECOND EXTRACTION REGION | (176.000,96.000) | (192.604,110.433) | (153.694,121.660) | (170.298,136.093) |
| 23TH DIMENSION | FIRST EXTRACTION REGION | (101.000,0.000) | (144.990,13.449) | (82.581,60.247) | (126.571,73.696) |
| | SECOND EXTRACTION REGION | (225.000,66.000) | (203.883,30.856) | (282.430,31.492) | (261.314,-3.651) |
| 24TH DIMENSION | FIRST EXTRACTION REGION | (238.000,163.000) | (291.000,163.000) | (238.000,224.000) | (291.000,224.000) |
| | SECOND EXTRACTION REGION | (239.000,122.000) | (291.000,122.000) | (239.000,161.000) | (291.000,161.000) |
| 25TH DIMENSION | FIRST EXTRACTION REGION | (34.000,168.000) | (27.226,140.832) | (98.040,152.033) | (91.266,124.865) |
| | SECOND EXTRACTION REGION | (118.000,139.000) | (123.006,170.606) | (64.665,147.447) | (69.671,179.053) |
| 26TH DIMENSION | FIRST EXTRACTION REGION | (119.000,107.000) | (131.712,131.948) | (21.880,156.485) | (34.592,181.433) |
| | SECOND EXTRACTION REGION | (118.000,113.000) | (53.565,140.351) | (109.795,93.669) | (45.359,121.021) |
| 27TH DIMENSION | FIRST EXTRACTION REGION | (210.000,128.000) | (225.987,183.753) | (172.511,138.750) | (188.498,194.503) |
| | SECOND EXTRACTION REGION | (289.000,146.000) | (297.269,174.838) | (248.627,157.577) | (256.896,186.415) |
| 28TH DIMENSION | FIRST EXTRACTION REGION | (128.000,89.000) | (157.944,112.395) | (115.687,104.760) | (145.631,128.155) |
| | SECOND EXTRACTION REGION | (100.000,150.000) | (66.038,120.477) | (111.809,136.415) | (77.847,106.893) |
| 29TH DIMENSION | FIRST EXTRACTION REGION | (236.000,83.000) | (198.761,61.500) | (265.500,31.905) | (228.261,10.405) |
| | SECOND EXTRACTION REGION | (257.000,26.000) | (278.809,58.332) | (206.429,60.111) | (228.237,92.443) |
| 30TH DIMENSION | FIRST EXTRACTION REGION | (114.000,80.000) | (144.000,80.000) | (114.000,113.000) | (144.000,113.000) |
| | SECOND EXTRACTION REGION | (140.000,61.000) | (165.000,61.000) | (140.000,87.000) | (165.000,87.000) |

FIG. 14-b

| | | | | | |
|---|---|---|---|---|---|
| 31TH DIMENSION | FIRST EXTRACTION REGION | (204.000,234.000) | (294.441,193.733) | (248.334,333.576) | (338.775,293.310) |
| | SECOND EXTRACTION REGION | (141.000,200.000) | (181.754,235.427) | (77.362,273.207) | (118.117,308.634) |
| 32TH DIMENSION | FIRST EXTRACTION REGION | (166.000,124.000) | (212.543,130.541) | (162.381,149.747) | (208.924,156.288) |
| | SECOND EXTRACTION REGION | (215.000,177.000) | (185.566,202.586) | (183.509,140.774) | (154.075,166.360) |
| 33TH DIMENSION | FIRST EXTRACTION REGION | (135.000,128.000) | (133.538,132.782) | (68.059,107.534) | (66.597,112.316) |
| | SECOND EXTRACTION REGION | (94.000,130.000) | (82.148,88.666) | (128.605,120.077) | (116.753,78.743) |
| 34TH DIMENSION | FIRST EXTRACTION REGION | (220.000,73.000) | (240.000,73.000) | (220.000,134.000) | (240.000,134.000) |
| | SECOND EXTRACTION REGION | (253.000,46.000) | (297.000,46.000) | (253.000,90.000) | (297.000,90.000) |
| 35TH DIMENSION | FIRST EXTRACTION REGION | (76.000,9.000) | (104.000,9.000) | (76.000,74.000) | (104.000,74.000) |
| | SECOND EXTRACTION REGION | (14.000,47.000) | (82.000,47.000) | (14.000,73.000) | (82.000,73.000) |
| 36TH DIMENSION | FIRST EXTRACTION REGION | (198.000,167.000) | (226.000,167.000) | (198.000,192.000) | (226.000,192.000) |
| | SECOND EXTRACTION REGION | (160.000,200.000) | (224.000,200.000) | (160.000,223.000) | (224.000,223.000) |
| 37TH DIMENSION | FIRST EXTRACTION REGION | (36.000,215.000) | (-100.479,203.060) | (45.151,110.400) | (-91.327,98.459) |
| | SECOND EXTRACTION REGION | (0.000,237.000) | (35.871,192.703) | (112.686,328.251) | (148.557,283.954) |
| 38TH DIMENSION | FIRST EXTRACTION REGION | (196.000,121.000) | (226.871,181.588) | (134.521,152.325) | (165.392,212.914) |
| | SECOND EXTRACTION REGION | (175.000,177.000) | (156.590,184.815) | (158.980,139.259) | (140.570,147.074) |
| 39TH DIMENSION | FIRST EXTRACTION REGION | (168.000,49.000) | (181.499,32.913) | (191.747,68.926) | (205.246,52.839) |
| | SECOND EXTRACTION REGION | (140.000,37.000) | (171.995,36.442) | (140.471,63.996) | (172.466,63.437) |
| 40TH DIMENSION | FIRST EXTRACTION REGION | (198.000,215.000) | (171.698,268.928) | (180.923,206.671) | (154.621,260.599) |
| | SECOND EXTRACTION REGION | (81.000,181.000) | (78.732,245.960) | (-2.949,178.068) | (-5.217,243.029) |
| 41TH DIMENSION | FIRST EXTRACTION REGION | (48.000,78.000) | (28.678,95.397) | (1.161,25.980) | (-18.161,43.377) |
| | SECOND EXTRACTION REGION | (24.000,73.000) | (51.721,141.612) | (-30.704,95.102) | (-2.983,163.713) |
| 42TH DIMENSION | FIRST EXTRACTION REGION | (216.000,175.000) | (178.241,128.371) | (245.532,151.086) | (207.772,104.457) |
| | SECOND EXTRACTION REGION | (233.000,110.000) | (245.313,143.829) | (210.447,118.208) | (222.760,152.037) |
| 43TH DIMENSION | FIRST EXTRACTION REGION | (291.000,38.000) | (261.363,81.939) | (247.890,8.922) | (218.253,52.861) |
| | SECOND EXTRACTION REGION | (291.000,29.000) | (292.465,49.949) | (271.049,30.395) | (272.514,51.344) |
| 44TH DIMENSION | FIRST EXTRACTION REGION | (261.000,214.000) | (393.568,264.888) | (217.637,326.963) | (350.206,377.851) |
| | SECOND EXTRACTION REGION | (225.000,215.000) | (294.209,306.843) | (143.539,276.385) | (212.748,368.228) |
| 45TH DIMENSION | FIRST EXTRACTION REGION | (132.000,76.000) | (133.325,94.954) | (116.039,77.116) | (117.364,96.070) |
| | SECOND EXTRACTION REGION | (182.000,84.000) | (161.540,105.941) | (171.761,74.452) | (151.301,96.393) |
| 46TH DIMENSION | FIRST EXTRACTION REGION | (69.000,116.000) | (72.619,90.253) | (97.718,120.036) | (101.336,94.289) |
| | SECOND EXTRACTION REGION | (49.000,90.000) | (64.588,81.000) | (64.000,115.981) | (79.588,106.981) |
| 47TH DIMENSION | FIRST EXTRACTION REGION | (226.000,100.000) | (259.552,82.160) | (232.103,111.478) | (265.655,93.638) |
| | SECOND EXTRACTION REGION | (277.000,108.000) | (273.327,143.803) | (257.110,105.909) | (253.347,141.712) |
| 48TH DIMENSION | FIRST EXTRACTION REGION | (126.000,176.000) | (179.967,177.885) | (124.953,205.982) | (178.920,207.866) |
| | SECOND EXTRACTION REGION | (172.000,205.000) | (145.711,188.573) | (186.838,181.255) | (160.548,164.827) |
| 49TH DIMENSION | FIRST EXTRACTION REGION | (37.000,17.000) | (23.192,22.861) | (21.371,-19.820) | (7.563,-13.959) |
| | SECOND EXTRACTION REGION | (95.000,26.000) | (76.840,-9.640) | (127.967,9.202) | (109.808,-26.438) |
| 50TH DIMENSION | FIRST EXTRACTION REGION | (47.000,207.000) | (21.034,165.446) | (129.261,155.598) | (103.295,114.043) |
| | SECOND EXTRACTION REGION | (124.000,160.000) | (47.293,166.711) | (122.867,147.049) | (46.160,153.760) |
| 51TH DIMENSION | FIRST EXTRACTION REGION | (222.000,53.000) | (230.409,121.486) | (161.455,60.434) | (169.864,128.920) |
| | SECOND EXTRACTION REGION | (175.000,97.000) | (198.755,80.366) | (188.192,115.840) | (211.948,99.207) |
| 52TH DIMENSION | FIRST EXTRACTION REGION | (120.000,89.000) | (125.972,137.635) | (63.425,95.947) | (69.396,144.581) |
| | SECOND EXTRACTION REGION | (91.000,120.000) | (121.597,107.638) | (95.495,131.126) | (126.092,118.764) |
| 53TH DIMENSION | FIRST EXTRACTION REGION | (293.000,175.000) | (396.354,147.306) | (312.929,249.376) | (416.283,221.683) |
| | SECOND EXTRACTION REGION | (313.000,197.000) | (395.731,279.731) | (226.026,283.974) | (308.757,366.706) |
| 54TH DIMENSION | FIRST EXTRACTION REGION | (137.000,40.000) | (120.518,75.346) | (121.593,32.815) | (105.111,68.161) |
| | SECOND EXTRACTION REGION | (138.000,34.000) | (128.461,49.265) | (106.622,14.393) | (97.084,29.658) |
| 55TH DIMENSION | FIRST EXTRACTION REGION | (179.000,132.000) | (186.251,169.302) | (113.231,144.784) | (120.482,182.086) |
| | SECOND EXTRACTION REGION | (150.000,147.000) | (162.955,192.179) | (126.930,153.615) | (139.885,198.795) |
| 56TH DIMENSION | FIRST EXTRACTION REGION | (213.000,96.000) | (241.000,96.000) | (213.000,154.000) | (241.000,154.000) |
| | SECOND EXTRACTION REGION | (235.000,109.000) | (257.000,109.000) | (235.000,129.000) | (257.000,129.000) |
| 57TH DIMENSION | FIRST EXTRACTION REGION | (83.000,141.000) | (11.303,78.674) | (128.924,88.170) | (57.227,25.845) |
| | SECOND EXTRACTION REGION | (74.000,92.000) | (59.446,64.629) | (95.191,80.733) | (80.637,53.361) |
| 58TH DIMENSION | FIRST EXTRACTION REGION | (204.000,91.000) | (194.152,92.736) | (201.743,78.197) | (191.864,79.934) |
| | SECOND EXTRACTION REGION | (153.000,88.000) | (159.140,67.918) | (201.772,102.911) | (207.911,82.829) |
| 59TH DIMENSION | FIRST EXTRACTION REGION | (52.000,156.000) | (87.000,156.000) | (52.000,215.000) | (87.000,215.000) |
| | SECOND EXTRACTION REGION | (21.000,161.000) | (41.000,161.000) | (21.000,200.000) | (41.000,200.000) |
| 60TH DIMENSION | FIRST EXTRACTION REGION | (239.000,140.000) | (289.000,140.000) | (239.000,198.000) | (289.000,198.000) |
| | SECOND EXTRACTION REGION | (232.000,155.000) | (293.000,155.000) | (232.000,186.000) | (293.000,186.000) |

FIG. 14-c

| | | | | | |
|---|---|---|---|---|---|
| 61TH DIMENSION | FIRST EXTRACTION REGION | (91.000,87.000) | (85.920,75.033) | (101.126,82.702) | (96.046,70.735) |
| | SECOND EXTRACTION REGION | (121.000,69.000) | (108.713,60.396) | (133.619,50.979) | (121.331,42.375) |
| 62TH DIMENSION | FIRST EXTRACTION REGION | (94.000,120.000) | (77.419,131.184) | (76.106,93.471) | (59.525,104.655) |
| | SECOND EXTRACTION REGION | (82.000,126.000) | (45.748,142.905) | (73.970,108.780) | (37.718,125.685) |
| 63TH DIMENSION | FIRST EXTRACTION REGION | (77.000,193.000) | (119.000,193.000) | (77.000,218.000) | (119.000,218.000) |
| | SECOND EXTRACTION REGION | (112.000,181.000) | (176.000,181.000) | (112.000,202.000) | (176.000,202.000) |
| 64TH DIMENSION | FIRST EXTRACTION REGION | (273.000,183.000) | (240.675,131.269) | (293.353,170.282) | (261.028,118.551) |
| | SECOND EXTRACTION REGION | (296.000,169.000) | (269.860,179.034) | (276.648,118.587) | (250.508,128.621) |
| 65TH DIMENSION | FIRST EXTRACTION REGION | (219.000,4.000) | (250.378,23.607) | (196.213,40.466) | (227.591,60.073) |
| | SECOND EXTRACTION REGION | (250.000,33.000) | (238.532,62.875) | (191.184,10.423) | (179.717,40.297) |
| 66TH DIMENSION | FIRST EXTRACTION REGION | (182.000,53.000) | (228.923,87.092) | (150.260,96.687) | (197.183,130.778) |
| | SECOND EXTRACTION REGION | (178.000,113.000) | (220.582,107.016) | (179.809,125.873) | (222.391,119.889) |
| 67TH DIMENSION | FIRST EXTRACTION REGION | (184.000,152.000) | (200.968,121.388) | (230.355,177.695) | (247.323,147.083) |
| | SECOND EXTRACTION REGION | (158.000,132.000) | (204.136,123.032) | (166.586,176.173) | (212.723,167.205) |
| 68TH DIMENSION | FIRST EXTRACTION REGION | (202.000,164.000) | (117.438,106.962) | (222.690,133.326) | (138.128,76.288) |
| | SECOND EXTRACTION REGION | (132.000,141.000) | (193.560,72.631) | (172.130,177.133) | (233.690,108.764) |
| 69TH DIMENSION | FIRST EXTRACTION REGION | (67.000,48.000) | (32.227,57.317) | (51.471,-9.956) | (16.698,-0.638) |
| | SECOND EXTRACTION REGION | (257.000,40.000) | (303.045,23.241) | (277.179,95.442) | (323.224,78.683) |
| 70TH DIMENSION | FIRST EXTRACTION REGION | (187.000,50.000) | (243.573,16.007) | (207.086,83.430) | (263.660,49.437) |
| | SECOND EXTRACTION REGION | (251.000,79.000) | (228.530,89.959) | (220.752,16.983) | (198.283,27.942) |
| 71TH DIMENSION | FIRST EXTRACTION REGION | (108.000,203.000) | (10.748,102.292) | (138.932,173.130) | (41.679,72.422) |
| | SECOND EXTRACTION REGION | (110.000,135.000) | (113.629,149.554) | (10.060,159.918) | (13.688,174.472) |
| 72TH DIMENSION | FIRST EXTRACTION REGION | (165.000,163.000) | (167.092,186.909) | (104.232,168.317) | (106.324,192.225) |
| | SECOND EXTRACTION REGION | (140.000,223.000) | (143.088,164.081) | (171.956,224.675) | (175.044,165.756) |
| 73TH DIMENSION | FIRST EXTRACTION REGION | (202.000,19.000) | (230.147,74.242) | (140.521,50.325) | (168.668,105.568) |
| | SECOND EXTRACTION REGION | (219.000,76.000) | (197.791,95.778) | (175.352,29.193) | (154.143,48.971) |
| 74TH DIMENSION | FIRST EXTRACTION REGION | (243.000,225.000) | (243.506,196.004) | (271.996,225.506) | (272.502,196.511) |
| | SECOND EXTRACTION REGION | (305.000,210.000) | (290.655,214.386) | (298.860,189.918) | (284.516,194.303) |
| 75TH DIMENSION | FIRST EXTRACTION REGION | (304.000,77.000) | (255.087,109.992) | (271.567,28.916) | (222.654,61.908) |
| | SECOND EXTRACTION REGION | (278.000,67.000) | (246.480,91.626) | (260.146,44.148) | (228.625,68.774) |
| 76TH DIMENSION | FIRST EXTRACTION REGION | (180.000,16.000) | (203.287,10.194) | (185.806,36.287) | (209.093,33.481) |
| | SECOND EXTRACTION REGION | (159.000,56.000) | (117.893,33.214) | (167.727,40.257) | (126.619,17.471) |
| 77TH DIMENSION | FIRST EXTRACTION REGION | (264.000,117.000) | (256.453,110.439) | (270.561,109.453) | (263.013,102.892) |
| | SECOND EXTRACTION REGION | (256.000,139.000) | (232.057,93.970) | (263.947,134.775) | (240.003,89.744) |
| 78TH DIMENSION | FIRST EXTRACTION REGION | (31.000,62.000) | (67.981,29.853) | (43.465,76.339) | (80.446,44.193) |
| | SECOND EXTRACTION REGION | (49.000,29.000) | (44.326,95.837) | (20.071,26.977) | (15.397,93.814) |
| 79TH DIMENSION | FIRST EXTRACTION REGION | (242.000,189.000) | (248.761,187.188) | (243.812,195.761) | (250.573,193.950) |
| | SECOND EXTRACTION REGION | (256.000,173.000) | (260.950,177.950) | (225.594,203.406) | (230.544,208.355) |
| 80TH DIMENSION | FIRST EXTRACTION REGION | (232.000,141.000) | (282.000,141.000) | (232.000,180.000) | (282.000,180.000) |
| | SECOND EXTRACTION REGION | (216.000,126.000) | (274.000,126.000) | (216.000,188.000) | (274.000,188.000) |
| 81TH DIMENSION | FIRST EXTRACTION REGION | (247.000,46.000) | (279.990,37.775) | (252.806,69.287) | (285.796,61.062) |
| | SECOND EXTRACTION REGION | (271.000,86.000) | (243.012,70.486) | (291.847,48.391) | (263.859,32.877) |
| 82TH DIMENSION | FIRST EXTRACTION REGION | (91.000,207.000) | (31.922,122.627) | (205.681,126.699) | (146.603,42.327) |
| | SECOND EXTRACTION REGION | (34.000,86.000) | (155.707,53.389) | (63.764,197.081) | (185.471,164.470) |
| 83TH DIMENSION | FIRST EXTRACTION REGION | (62.000,206.000) | (72.963,201.119) | (75.016,235.233) | (85.978,230.353) |
| | SECOND EXTRACTION REGION | (93.000,230.000) | (82.007,230.384) | (91.604,190.024) | (80.611,190.408) |
| 84TH DIMENSION | FIRST EXTRACTION REGION | (89.000,86.000) | (96.017,63.049) | (113.864,93.602) | (120.881,70.650) |
| | SECOND EXTRACTION REGION | (95.000,50.000) | (142.286,69.105) | (73.273,103.777) | (120.559,122.882) |
| 85TH DIMENSION | FIRST EXTRACTION REGION | (99.000,159.000) | (90.910,153.122) | (103.702,152.528) | (95.612,146.650) |
| | SECOND EXTRACTION REGION | (78.000,137.000) | (78.524,166.995) | (66.002,137.209) | (66.525,167.205) |
| 86TH DIMENSION | FIRST EXTRACTION REGION | (49.000,52.000) | (17.588,45.894) | (56.251,14.698) | (24.839,8.592) |
| | SECOND EXTRACTION REGION | (48.000,58.000) | (38.645,79.012) | (21.507,46.205) | (12.152,67.216) |
| 87TH DIMENSION | FIRST EXTRACTION REGION | (182.000,125.000) | (168.834,150.839) | (171.308,119.552) | (158.142,145.391) |
| | SECOND EXTRACTION REGION | (172.000,101.000) | (179.388,91.544) | (200.368,123.164) | (207.756,113.708) |
| 88TH DIMENSION | FIRST EXTRACTION REGION | (127.000,128.000) | (140.244,120.958) | (135.920,144.776) | (149.164,137.734) |
| | SECOND EXTRACTION REGION | (152.000,173.000) | (100.158,184.019) | (142.020,126.049) | (90.178,137.068) |
| 89TH DIMENSION | FIRST EXTRACTION REGION | (91.000,53.000) | (71.049,51.605) | (91.628,44.022) | (71.677,42.627) |
| | SECOND EXTRACTION REGION | (130.000,58.000) | (125.774,48.937) | (151.751,47.857) | (147.525,38.794) |
| 90TH DIMENSION | FIRST EXTRACTION REGION | (37.000,203.000) | (79.794,150.154) | (54.874,217.474) | (97.668,164.628) |
| | SECOND EXTRACTION REGION | (69.000,174.000) | (73.592,179.283) | (47.113,193.026) | (51.706,198.309) |

FIG. 14-d

| | | | | | |
|---|---|---|---|---|---|
| 91TH DIMENSION | FIRST EXTRACTION REGION | (95.000,113.000) | (91.931,119.292) | (89.607,110.370) | (86.539,116.661) |
| | SECOND EXTRACTION REGION | (11.000,145.000) | (22.334,52.693) | (142.016,161.087) | (153.350,68.780) |
| 92TH DIMENSION | FIRST EXTRACTION REGION | (230.000,72.000) | (237.660,78.428) | (209.431,96.513) | (217.091,102.941) |
| | SECOND EXTRACTION REGION | (247.000,115.000) | (243.965,57.079) | (261.979,114.215) | (258.944,56.294) |
| 93TH DIMENSION | FIRST EXTRACTION REGION | (183.000,178.000) | (195.605,155.260) | (235.477,207.089) | (248.082,184.348) |
| | SECOND EXTRACTION REGION | (240.000,164.000) | (198.006,164.733) | (239.407,130.005) | (197.413,130.738) |
| 94TH DIMENSION | FIRST EXTRACTION REGION | (193.000,149.000) | (135.547,100.791) | (249.565,81.588) | (192.112,33.379) |
| | SECOND EXTRACTION REGION | (123.000,67.000) | (134.658,48.343) | (217.133,125.821) | (228.792,107.164) |
| 95TH DIMENSION | FIRST EXTRACTION REGION | (161.000,232.000) | (173.404,188.743) | (174.458,235.859) | (186.861,192.602) |
| | SECOND EXTRACTION REGION | (202.000,219.000) | (182.974,240.887) | (173.321,194.070) | (154.295,215.956) |
| 96TH DIMENSION | FIRST EXTRACTION REGION | (29.000,142.000) | (63.641,162.000) | (23.000,152.392) | (57.641,172.392) |
| | SECOND EXTRACTION REGION | (48.000,212.000) | (13.962,176.752) | (51.597,208.527) | (17.558,173.279) |
| 97TH DIMENSION | FIRST EXTRACTION REGION | (266.000,170.000) | (237.249,191.665) | (233.502,126.874) | (204.751,148.539) |
| | SECOND EXTRACTION REGION | (183.000,132.000) | (238.285,106.220) | (210.893,191.816) | (266.178,166.037) |
| 98TH DIMENSION | FIRST EXTRACTION REGION | (77.000,201.000) | (66.906,163.329) | (111.773,191.683) | (101.679,154.011) |
| | SECOND EXTRACTION REGION | (129.000,156.000) | (139.649,163.456) | (111.219,181.394) | (121.868,188.850) |
| 99TH DIMENSION | FIRST EXTRACTION REGION | (202.000,164.000) | (183.761,151.698) | (211.506,149.906) | (193.267,137.604) |
| | SECOND EXTRACTION REGION | (132.000,141.000) | (153.412,117.219) | (149.835,157.059) | (171.248,133.279) |
| 100TH DIMENSION | FIRST EXTRACTION REGION | (183.000,13.000) | (208.000,13.000) | (183.000,39.000) | (208.000,39.000) |
| | SECOND EXTRACTION REGION | (213.000,8.000) | (235.000,8.000) | (213.000,54.000) | (235.000,54.000) |
| 101TH DIMENSION | FIRST EXTRACTION REGION | (79.000,15.000) | (115.043,40.237) | (52.615,52.681) | (88.658,77.918) |
| | SECOND EXTRACTION REGION | (91.000,6.000) | (123.967,22.798) | (65.577,55.896) | (98.544,72.694) |
| 102TH DIMENSION | FIRST EXTRACTION REGION | (307.000,183.000) | (277.128,232.716) | (205.854,122.226) | (175.982,171.941) |
| | SECOND EXTRACTION REGION | (295.000,151.000) | (242.995,228.100) | (231.164,107.942) | (179.159,185.043) |
| 103TH DIMENSION | FIRST EXTRACTION REGION | (281.000,139.000) | (296.977,122.455) | (304.019,161.229) | (319.996,144.684) |
| | SECOND EXTRACTION REGION | (317.000,140.000) | (317.000,165.000) | (284.000,140.000) | (284.000,165.000) |
| 104TH DIMENSION | FIRST EXTRACTION REGION | (227.000,216.000) | (222.082,197.647) | (242.455,211.859) | (237.537,193.506) |
| | SECOND EXTRACTION REGION | (125.000,221.000) | (112.713,212.396) | (131.309,211.989) | (119.022,203.386) |
| 105TH DIMENSION | FIRST EXTRACTION REGION | (130.000,28.000) | (161.000,28.000) | (130.000,88.000) | (161.000,88.000) |
| | SECOND EXTRACTION REGION | (120.000,34.000) | (142.000,34.000) | (120.000,70.000) | (142.000,70.000) |
| 106TH DIMENSION | FIRST EXTRACTION REGION | (278.000,51.000) | (371.182,9.513) | (307.285,116.775) | (400.467,75.288) |
| | SECOND EXTRACTION REGION | (318.000,137.000) | (267.031,138.780) | (313.463,7.079) | (262.494,8.859) |
| 107TH DIMENSION | FIRST EXTRACTION REGION | (49.000,99.000) | (22.935,86.287) | (77.932,39.680) | (51.867,26.967) |
| | SECOND EXTRACTION REGION | (31.000,40.000) | (45.554,43.629) | (23.017,72.020) | (37.571,75.649) |
| 108TH DIMENSION | FIRST EXTRACTION REGION | (248.000,54.000) | (262.784,71.619) | (215.826,80.997) | (230.610,98.616) |
| | SECOND EXTRACTION REGION | (274.000,90.000) | (294.186,84.212) | (280.064,111.148) | (300.251,105.359) |
| 109TH DIMENSION | FIRST EXTRACTION REGION | (91.000,211.000) | (109.579,227.728) | (65.573,239.240) | (84.152,255.968) |
| | SECOND EXTRACTION REGION | (116.000,195.000) | (93.714,208.391) | (105.699,177.857) | (83.413,191.248) |
| 110TH DIMENSION | FIRST EXTRACTION REGION | (27.000,112.000) | (21.851,75.360) | (60.669,107.268) | (55.520,70.628) |
| | SECOND EXTRACTION REGION | (48.000,89.000) | (100.308,72.004) | (52.635,103.266) | (104.943,86.270) |
| 111TH DIMENSION | FIRST EXTRACTION REGION | (168.000,194.000) | (136.214,177.099) | (186.309,159.565) | (154.523,142.664) |
| | SECOND EXTRACTION REGION | (102.000,142.000) | (147.937,139.593) | (102.576,152.985) | (148.513,150.577) |
| 112TH DIMENSION | FIRST EXTRACTION REGION | (224.000,193.000) | (243.450,213.142) | (212.491,204.115) | (231.941,224.256) |
| | SECOND EXTRACTION REGION | (233.000,152.000) | (246.449,195.990) | (207.180,159.894) | (220.629,203.884) |
| 113TH DIMENSION | FIRST EXTRACTION REGION | (194.000,136.000) | (200.425,99.562) | (260.967,147.808) | (267.392,111.370) |
| | SECOND EXTRACTION REGION | (235.000,65.000) | (283.929,146.431) | (195.570,88.962) | (244.499,170.123) |
| 114TH DIMENSION | FIRST EXTRACTION REGION | (314.000,112.000) | (290.092,119.309) | (304.939,82.355) | (281.029,89.664) |
| | SECOND EXTRACTION REGION | (308.000,116.000) | (315.742,142.049) | (289.564,120.597) | (297.306,151.646) |
| 115TH DIMENSION | FIRST EXTRACTION REGION | (244.000,55.000) | (226.186,181.754) | (118.236,37.325) | (100.422,164.079) |
| | SECOND EXTRACTION REGION | (148.000,99.000) | (142.245,93.443) | (154.252,92.526) | (148.497,86.969) |
| 116TH DIMENSION | FIRST EXTRACTION REGION | (171.000,29.000) | (198.168,22.226) | (184.064,81.396) | (211.232,74.622) |
| | SECOND EXTRACTION REGION | (164.000,12.000) | (189.529,20.790) | (154.233,40.366) | (179.762,49.156) |
| 117TH DIMENSION | FIRST EXTRACTION REGION | (44.000,131.000) | (56.638,114.229) | (91.119,166.507) | (103.758,149.736) |
| | SECOND EXTRACTION REGION | (40.000,161.000) | (59.734,153.818) | (47.866,182.613) | (67.600,175.431) |
| 118TH DIMENSION | FIRST EXTRACTION REGION | (53.000,24.000) | (51.118,6.099) | (91.786,19.923) | (89.905,2.022) |
| | SECOND EXTRACTION REGION | (33.000,32.000) | (37.474,21.951) | (58.579,43.389) | (63.053,33.340) |
| 119TH DIMENSION | FIRST EXTRACTION REGION | (128.000,81.000) | (185.000,81.000) | (128.000,125.000) | (185.000,125.000) |
| | SECOND EXTRACTION REGION | (134.000,80.000) | (169.000,80.000) | (134.000,146.000) | (169.000,146.000) |
| 120TH DIMENSION | FIRST EXTRACTION REGION | (223.000,25.000) | (242.468,84.917) | (186.860,36.743) | (206.328,96.659) |
| | SECOND EXTRACTION REGION | (234.000,51.000) | (252.579,67.728) | (209.242,78.496) | (227.821,95.225) |

FIG. 14-e

| | | | | | |
|---|---|---|---|---|---|
| 121TH DIMENSION | FIRST EXTRACTION REGION | (34.000,211.000) | (40.653,242.301) | (-22.733,223.059) | (-16.079,254.360) |
| | SECOND EXTRACTION REGION | (57.000,153.000) | (138.634,243.664) | (-46.297,246.009) | (35.337,336.673) |
| 122TH DIMENSION | FIRST EXTRACTION REGION | (153.000,189.000) | (107.712,218.411) | (129.036,152.098) | (83.748,181.509) |
| | SECOND EXTRACTION REGION | (139.000,184.000) | (131.818,203.734) | (90.136,166.215) | (82.954,185.948) |
| 123TH DIMENSION | FIRST EXTRACTION REGION | (289.000,140.000) | (326.314,163.316) | (259.325,187.491) | (296.639,210.807) |
| | SECOND EXTRACTION REGION | (51.000,148.000) | (9.066,175.232) | (40.107,131.227) | (-1.826,158.459) |
| 124TH DIMENSION | FIRST EXTRACTION REGION | (180.000,239.000) | (160.463,192.975) | (194.728,232.748) | (175.192,186.723) |
| | SECOND EXTRACTION REGION | (130.000,210.000) | (116.000,234.249) | (108.349,197.500) | (94.349,221.749) |
| 125TH DIMENSION | FIRST EXTRACTION REGION | (154.000,112.000) | (137.008,91.017) | (201.406,73.611) | (184.414,52.629) |
| | SECOND EXTRACTION REGION | (204.000,109.000) | (135.095,105.389) | (207.507,42.092) | (138.601,38.481) |
| 126TH DIMENSION | FIRST EXTRACTION REGION | (279.000,187.000) | (315.531,205.614) | (266.742,211.057) | (303.274,229.671) |
| | SECOND EXTRACTION REGION | (291.000,202.000) | (231.113,218.047) | (277.283,150.806) | (217.395,166.853) |
| 127TH DIMENSION | FIRST EXTRACTION REGION | (96.000,128.000) | (138.347,120.533) | (99.647,148.681) | (141.993,141.214) |
| | SECOND EXTRACTION REGION | (95.000,121.000) | (92.387,145.863) | (81.077,119.537) | (78.463,144.400) |
| 128TH DIMENSION | FIRST EXTRACTION REGION | (112.000,89.000) | (150.527,103.023) | (99.345,123.769) | (137.873,137.791) |
| | SECOND EXTRACTION REGION | (205.000,110.000) | (188.043,137.138) | (149.029,75.025) | (132.071,102.163) |
| 129TH DIMENSION | FIRST EXTRACTION REGION | (298.000,6.000) | (260.693,31.164) | (279.547,-21.358) | (242.240,3.805) |
| | SECOND EXTRACTION REGION | (307.000,65.000) | (263.858,43.958) | (327.165,23.655) | (284.023,2.614) |
| 130TH DIMENSION | FIRST EXTRACTION REGION | (6.000,126.000) | (70.000,126.000) | (6.000,163.000) | (70.000,163.000) |
| | SECOND EXTRACTION REGION | (12.000,104.000) | (42.000,104.000) | (12.000,132.000) | (42.000,132.000) |
| 131TH DIMENSION | FIRST EXTRACTION REGION | (157.000,7.000) | (147.841,54.118) | (141.294,3.947) | (132.135,51.065) |
| | SECOND EXTRACTION REGION | (86.000,5.000) | (78.749,42.302) | (62.441,0.421) | (55.190,37.722) |
| 132TH DIMENSION | FIRST EXTRACTION REGION | (184.000,176.000) | (218.000,176.000) | (184.000,211.000) | (218.000,211.000) |
| | SECOND EXTRACTION REGION | (201.000,178.000) | (227.000,178.000) | (201.000,198.000) | (227.000,198.000) |
| 133TH DIMENSION | FIRST EXTRACTION REGION | (276.000,93.000) | (226.147,120.634) | (242.548,32.651) | (192.695,60.285) |
| | SECOND EXTRACTION REGION | (182.000,49.000) | (205.914,78.532) | (161.017,65.992) | (184.931,95.523) |
| 134TH DIMENSION | FIRST EXTRACTION REGION | (309.000,112.000) | (270.167,83.786) | (320.168,96.629) | (281.335,68.415) |
| | SECOND EXTRACTION REGION | (319.000,86.000) | (308.770,96.970) | (293.403,62.130) | (283.173,73.100) |
| 135TH DIMENSION | FIRST EXTRACTION REGION | (204.000,181.000) | (121.013,182.449) | (202.586,100.012) | (119.599,101.461) |
| | SECOND EXTRACTION REGION | (136.000,189.000) | (152.410,104.580) | (179.192,197.396) | (195.601,112.976) |
| 136TH DIMENSION | FIRST EXTRACTION REGION | (271.000,215.000) | (226.684,222.814) | (266.311,188.410) | (221.995,196.224) |
| | SECOND EXTRACTION REGION | (241.000,180.000) | (251.988,156.436) | (294.472,204.934) | (305.460,181.370) |
| 137TH DIMENSION | FIRST EXTRACTION REGION | (262.000,82.000) | (255.053,74.807) | (296.528,48.656) | (289.582,41.463) |
| | SECOND EXTRACTION REGION | (298.000,9.000) | (301.629,23.554) | (280.535,13.355) | (284.164,27.909) |
| 138TH DIMENSION | FIRST EXTRACTION REGION | (87.000,71.000) | (110.766,74.340) | (84.912,85.854) | (108.679,89.194) |
| | SECOND EXTRACTION REGION | (121.000,55.000) | (139.017,83.834) | (87.078,76.197) | (105.095,105.030) |
| 139TH DIMENSION | FIRST EXTRACTION REGION | (56.000,121.000) | (1.663,107.452) | (63.983,88.980) | (9.647,75.433) |
| | SECOND EXTRACTION REGION | (49.000,137.000) | (24.679,152.795) | (26.670,102.615) | (2.348,118.409) |
| 140TH DIMENSION | FIRST EXTRACTION REGION | (82.000,201.000) | (67.165,206.994) | (65.143,159.277) | (50.308,165.270) |
| | SECOND EXTRACTION REGION | (92.000,175.000) | (136.665,180.484) | (87.856,208.747) | (132.521,214.231) |
| 141TH DIMENSION | FIRST EXTRACTION REGION | (278.000,99.000) | (236.890,117.303) | (272.306,86.210) | (231.196,104.514) |
| | SECOND EXTRACTION REGION | (241.000,137.000) | (262.563,120.751) | (252.434,152.174) | (273.998,135.925) |
| 142TH DIMENSION | FIRST EXTRACTION REGION | (184.000,11.000) | (214.000,11.000) | (184.000,30.000) | (214.000,30.000) |
| | SECOND EXTRACTION REGION | (258.000,5.000) | (285.000,5.000) | (258.000,55.000) | (285.000,55.000) |
| 143TH DIMENSION | FIRST EXTRACTION REGION | (134.000,116.000) | (147.506,68.898) | (152.264,121.237) | (165.770,74.135) |
| | SECOND EXTRACTION REGION | (166.000,116.000) | (155.715,128.257) | (146.849,99.930) | (136.564,112.187) |
| 144TH DIMENSION | FIRST EXTRACTION REGION | (103.000,182.000) | (86.008,161.017) | (134.086,156.827) | (117.094,135.844) |
| | SECOND EXTRACTION REGION | (194.000,153.000) | (186.340,159.428) | (182.430,139.211) | (174.769,145.639) |
| 145TH DIMENSION | FIRST EXTRACTION REGION | (279.000,122.000) | (273.920,110.033) | (304.774,111.060) | (299.695,99.093) |
| | SECOND EXTRACTION REGION | (282.000,76.000) | (282.000,129.000) | (223.000,76.000) | (223.000,129.000) |
| 146TH DIMENSION | FIRST EXTRACTION REGION | (50.000,231.000) | (6.337,220.114) | (64.757,171.812) | (21.094,160.925) |
| | SECOND EXTRACTION REGION | (95.000,225.000) | (86.368,233.336) | (65.130,194.068) | (56.498,202.404) |
| 147TH DIMENSION | FIRST EXTRACTION REGION | (201.000,135.000) | (220.000,135.000) | (201.000,176.000) | (220.000,176.000) |
| | SECOND EXTRACTION REGION | (173.000,150.000) | (225.000,150.000) | (173.000,174.000) | (225.000,174.000) |
| 148TH DIMENSION | FIRST EXTRACTION REGION | (48.000,78.000) | (21.247,102.089) | (21.235,48.274) | (-5.518,72.363) |
| | SECOND EXTRACTION REGION | (24.000,73.000) | (32.991,95.252) | (-2.888,83.864) | (6.102,106.116) |
| 149TH DIMENSION | FIRST EXTRACTION REGION | (125.000,176.000) | (152.000,176.000) | (125.000,221.000) | (152.000,221.000) |
| | SECOND EXTRACTION REGION | (157.000,184.000) | (214.000,184.000) | (157.000,233.000) | (214.000,233.000) |
| 150TH DIMENSION | FIRST EXTRACTION REGION | (70.000,18.000) | (160.633,126.012) | (47.019,37.284) | (137.652,145.296) |
| | SECOND EXTRACTION REGION | (107.000,14.000) | (160.043,122.754) | (22.513,55.207) | (75.556,163.961) |

FIG. 14-f

| | | | | | |
|---|---|---|---|---|---|
| 151TH DIMENSION | FIRST EXTRACTION REGION | (246.000,168.000) | (266.000,168.000) | (246.000,194.000) | (266.000,194.000) |
| | SECOND EXTRACTION REGION | (243.000,136.000) | (288.000,136.000) | (243.000,175.000) | (288.000,175.000) |
| 152TH DIMENSION | FIRST EXTRACTION REGION | (44.000,37.000) | (104.666,43.376) | (40.969,65.841) | (101.635,72.217) |
| | SECOND EXTRACTION REGION | (49.000,25.000) | (44.506,22.808) | (52.945,16.911) | (48.451,14.719) |
| 153TH DIMENSION | FIRST EXTRACTION REGION | (270.000,53.000) | (290.000,53.000) | (270.000,74.000) | (290.000,74.000) |
| | SECOND EXTRACTION REGION | (222.000,44.000) | (254.000,44.000) | (222.000,68.000) | (254.000,68.000) |
| 154TH DIMENSION | FIRST EXTRACTION REGION | (225.000,133.000) | (239.722,141.500) | (211.000,157.249) | (225.722,165.749) |
| | SECOND EXTRACTION REGION | (190.000,131.000) | (215.000,87.699) | (226.373,152.000) | (251.373,108.699) |
| 155TH DIMENSION | FIRST EXTRACTION REGION | (114.000,205.000) | (151.082,90.873) | (174.868,224.777) | (211.950,110.650) |
| | SECOND EXTRACTION REGION | (74.000,202.000) | (110.773,88.824) | (175.763,235.065) | (212.536,121.889) |
| 156TH DIMENSION | FIRST EXTRACTION REGION | (209.000,164.000) | (256.924,146.557) | (214.130,178.095) | (262.055,160.652) |
| | SECOND EXTRACTION REGION | (222.000,130.000) | (245.618,157.170) | (183.510,163.459) | (207.128,190.629) |
| 157TH DIMENSION | FIRST EXTRACTION REGION | (7.000,175.000) | (20.808,169.139) | (12.861,188.808) | (26.669,182.947) |
| | SECOND EXTRACTION REGION | (20.000,147.000) | (-18.000,147.000) | (20.000,120.000) | (-18.000,120.000) |
| 158TH DIMENSION | FIRST EXTRACTION REGION | (164.000,62.000) | (188.000,62.000) | (164.000,94.000) | (188.000,94.000) |
| | SECOND EXTRACTION REGION | (189.000,34.000) | (213.000,34.000) | (189.000,91.000) | (213.000,91.000) |
| 159TH DIMENSION | FIRST EXTRACTION REGION | (149.000,210.000) | (138.000,229.053) | (117.823,192.000) | (106.823,211.053) |
| | SECOND EXTRACTION REGION | (106.000,162.000) | (131.364,176.059) | (90.001,190.862) | (115.365,204.922) |
| 160TH DIMENSION | FIRST EXTRACTION REGION | (87.000,84.000) | (91.045,81.061) | (111.687,117.979) | (115.732,115.040) |
| | SECOND EXTRACTION REGION | (89.000,69.000) | (94.472,84.035) | (37.317,87.811) | (42.789,102.846) |
| 161TH DIMENSION | FIRST EXTRACTION REGION | (37.000,17.000) | (-50.448,54.119) | (13.556,-38.230) | (-73.892,-1.111) |
| | SECOND EXTRACTION REGION | (95.000,26.000) | (40.521,-80.921) | (217.068,-36.197) | (162.589,-143.117) |
| 162TH DIMENSION | FIRST EXTRACTION REGION | (193.000,83.000) | (194.117,19.010) | (223.995,83.541) | (225.112,19.551) |
| | SECOND EXTRACTION REGION | (204.000,19.000) | (224.768,44.646) | (172.137,44.802) | (192.905,70.448) |
| 163TH DIMENSION | FIRST EXTRACTION REGION | (285.000,178.000) | (314.072,98.126) | (380.849,212.886) | (409.920,133.012) |
| | SECOND EXTRACTION REGION | (283.000,161.000) | (279.701,179.711) | (269.213,158.569) | (265.913,177.280) |
| 164TH DIMENSION | FIRST EXTRACTION REGION | (251.000,182.000) | (251.419,176.015) | (297.886,185.279) | (298.304,179.293) |
| | SECOND EXTRACTION REGION | (225.000,209.000) | (209.314,192.179) | (264.493,172.172) | (248.807,155.351) |
| 165TH DIMENSION | FIRST EXTRACTION REGION | (35.000,194.000) | (6.634,184.233) | (56.162,132.541) | (27.796,122.774) |
| | SECOND EXTRACTION REGION | (51.000,127.000) | (93.381,149.535) | (24.240,177.328) | (66.622,199.863) |
| 166TH DIMENSION | FIRST EXTRACTION REGION | (95.000,29.000) | (133.000,29.000) | (95.000,73.000) | (133.000,73.000) |
| | SECOND EXTRACTION REGION | (75.000,25.000) | (96.000,25.000) | (75.000,69.000) | (96.000,69.000) |
| 167TH DIMENSION | FIRST EXTRACTION REGION | (211.000,95.000) | (246.000,95.000) | (211.000,116.000) | (246.000,116.000) |
| | SECOND EXTRACTION REGION | (230.000,61.000) | (250.000,61.000) | (230.000,86.000) | (250.000,86.000) |
| 168TH DIMENSION | FIRST EXTRACTION REGION | (224.000,23.000) | (250.080,16.012) | (231.765,51.978) | (257.845,44.990) |
| | SECOND EXTRACTION REGION | (253.000,31.000) | (233.163,85.502) | (210.714,15.609) | (190.877,70.111) |
| 169TH DIMENSION | FIRST EXTRACTION REGION | (161.000,223.000) | (94.800,135.150) | (172.181,214.575) | (105.981,126.725) |
| | SECOND EXTRACTION REGION | (173.000,160.000) | (137.207,240.392) | (129.150.140,477) | (93.357,220.869) |
| 170TH DIMENSION | FIRST EXTRACTION REGION | (223.000,146.000) | (197.931,116.124) | (250.578,122.860) | (225.509,92.984) |
| | SECOND EXTRACTION REGION | (214.000,139.000) | (161.164,104.688) | (228.161,117.195) | (175.324,82.882) |
| 171TH DIMENSION | FIRST EXTRACTION REGION | (89.000,125.000) | (126.466,180.546) | (59.984,144.572) | (97.450,200.117) |
| | SECOND EXTRACTION REGION | (82.000,196.000) | (79.697,130.040) | (144.962,193.801) | (142.658,127.842) |
| 172TH DIMENSION | FIRST EXTRACTION REGION | (133.000,106.000) | (169.000,106.000) | (133.000,141.000) | (169.000,141.000) |
| | SECOND EXTRACTION REGION | (138.000,116.000) | (185.000,116.000) | (138.000,163.000) | (185.000,163.000) |
| 173TH DIMENSION | FIRST EXTRACTION REGION | (77.000,83.000) | (48.000,32.771) | (98.651,70.500) | (69.651,20.271) |
| | SECOND EXTRACTION REGION | (42.000,57.000) | (63.039,50.568) | (46.970,73.257) | (68.009,66.825) |
| 174TH DIMENSION | FIRST EXTRACTION REGION | (93.000,226.000) | (48.110,229.139) | (89.861,181.110) | (44.971,184.249) |
| | SECOND EXTRACTION REGION | (204.000,221.000) | (219.436,190.706) | (228.057,233.258) | (243.493,202.964) |
| 175TH DIMENSION | FIRST EXTRACTION REGION | (264.000,22.000) | (270.014,-46.737) | (283.924,23.743) | (289.938,-44.994) |
| | SECOND EXTRACTION REGION | (127.000,10.000) | (80.636,22.423) | (109.659,-54.717) | (63.295,-42.294) |
| 176TH DIMENSION | FIRST EXTRACTION REGION | (63.000,105.000) | (45.000,136.177) | (22.297,81.500) | (4.297,112.677) |
| | SECOND EXTRACTION REGION | (74.000,119.000) | (64.356,138.773) | (25.465,95.328) | (15.821,115.101) |
| 177TH DIMENSION | FIRST EXTRACTION REGION | (261.000,214.000) | (281.539,221.884) | (253.474,233.605) | (274.013,241.489) |
| | SECOND EXTRACTION REGION | (225.000,215.000) | (246.064,242.952) | (191.457,240.276) | (212.521,268.228) |
| 178TH DIMENSION | FIRST EXTRACTION REGION | (238.000,171.000) | (226.164,195.267) | (183.174,144.259) | (171.338,168.527) |
| | SECOND EXTRACTION REGION | (164.000,147.000) | (165.584,134.097) | (190.799,150.290) | (192.383,137.387) |
| 179TH DIMENSION | FIRST EXTRACTION REGION | (14.000,190.000) | (72.000,190.000) | (14.000,224.000) | (72.000,224.000) |
| | SECOND EXTRACTION REGION | (23.000,164.000) | (49.000,164.000) | (23.000,200.000) | (49.000,200.000) |
| 180TH DIMENSION | FIRST EXTRACTION REGION | (145.000,54.000) | (139.702,51.183) | (151.573,41.639) | (146.275,38.822) |
| | SECOND EXTRACTION REGION | (159.000,37.000) | (219.916,33.808) | (160.622,67.958) | (221.539,64.765) |

FIG. 14-g

| | | | | | |
|---|---|---|---|---|---|
| 181TH DIMENSION | FIRST EXTRACTION REGION | (141.000,221.000) | (139.081,166.034) | (179.976,219.639) | (178.057,164.672) |
| | SECOND EXTRACTION REGION | (139.000,160.000) | (169.858,141.459) | (168.872,209.716) | (199.730,191.174) |
| 182TH DIMENSION | FIRST EXTRACTION REGION | (282.000,106.000) | (282.000,145.000) | (245.000,106.000) | (245.000,145.000) |
| | SECOND EXTRACTION REGION | (229.000,147.000) | (229.000,101.000) | (283.000,147.000) | (283.000,101.000) |
| 183TH DIMENSION | FIRST EXTRACTION REGION | (220.000,130.000) | (236.484,100.263) | (240.116,141.151) | (256.600,111.414) |
| | SECOND EXTRACTION REGION | (192.000,152.000) | (200.732,110.918) | (226.235,159.277) | (234.967,118.195) |
| 184TH DIMENSION | FIRST EXTRACTION REGION | (223.000,172.000) | (219.710,198.799) | (202.157,169.441) | (198.866,196.239) |
| | SECOND EXTRACTION REGION | (246.000,149.000) | (234.305,187.252) | (224.005,142.275) | (212.310,180.528) |
| 185TH DIMENSION | FIRST EXTRACTION REGION | (95.000,46.000) | (128.871,48.963) | (91.688,83.855) | (125.559,86.819) |
| | SECOND EXTRACTION REGION | (193.000,56.000) | (170.694,81.660) | (168.849,35.006) | (146.543,60.666) |
| 186TH DIMENSION | FIRST EXTRACTION REGION | (87.000,71.000) | (150.377,79.907) | (70.995,184.881) | (134.372,193.788) |
| | SECOND EXTRACTION REGION | (121.000,55.000) | (170.812,134.717) | (36.195,107.992) | (86.008,187.708) |
| 187TH DIMENSION | FIRST EXTRACTION REGION | (49.000,52.000) | (32.199,12.418) | (65.569,44.967) | (48.768,5.385) |
| | SECOND EXTRACTION REGION | (43.000,28.000) | (43.000,61.000) | (14.000,28.000) | (14.000,61.000) |
| 188TH DIMENSION | FIRST EXTRACTION REGION | (88.000,142.000) | (136.857,180.171) | (61.527,175.884) | (110.383,214.055) |
| | SECOND EXTRACTION REGION | (136.000,205.000) | (79.618,225.521) | (114.111,144.860) | (57.729,165.381) |
| 189TH DIMENSION | FIRST EXTRACTION REGION | (305.000,205.000) | (340.859,185.123) | (316.635,225.991) | (352.495,206.114) |
| | SECOND EXTRACTION REGION | (20.000,215.000) | (0.758,225.666) | (1.092,180.890) | (-18.149,191.556) |
| 190TH DIMENSION | FIRST EXTRACTION REGION | (286.000,72.000) | (310.524,49.919) | (294.699,81.661) | (319.222,59.580) |
| | SECOND EXTRACTION REGION | (239.000,55.000) | (264.115,69.500) | (229.500,71.454) | (254.615,85.954) |
| 191TH DIMENSION | FIRST EXTRACTION REGION | (111.000,189.000) | (138.000,189.000) | (111.000,228.000) | (138.000,228.000) |
| | SECOND EXTRACTION REGION | (121.000,196.000) | (162.000,196.000) | (121.000,235.000) | (162.000,235.000) |
| 192TH DIMENSION | FIRST EXTRACTION REGION | (57.000,77.000) | (60.244,93.688) | (19.698,84.251) | (22.942,100.938) |
| | SECOND EXTRACTION REGION | (45.000,96.000) | (34.107,94.469) | (53.211,37.574) | (42.318,36.043) |
| 193TH DIMENSION | FIRST EXTRACTION REGION | (240.000,100.000) | (272.990,91.775) | (243.387,113.584) | (276.377,105.359) |
| | SECOND EXTRACTION REGION | (238.000,128.000) | (201.266,107.638) | (249.151,107.884) | (212.417,87.522) |
| 194TH DIMENSION | FIRST EXTRACTION REGION | (145.000,124.000) | (135.741,138.257) | (107.260,99.491) | (98.001,113.749) |
| | SECOND EXTRACTION REGION | (153.000,164.000) | (152.269,158.045) | (160.940,163.025) | (160.209,157.070) |
| 195TH DIMENSION | FIRST EXTRACTION REGION | (26.000,107.000) | (80.000,107.000) | (26.000,166.000) | (80.000,166.000) |
| | SECOND EXTRACTION REGION | (51.000,105.000) | (100.000,105.000) | (51.000,156.000) | (100.000,156.000) |
| 196TH DIMENSION | FIRST EXTRACTION REGION | (300.000,153.000) | (271.282,157.036) | (299.304,148.049) | (270.586,152.085) |
| | SECOND EXTRACTION REGION | (298.000,76.000) | (286.043,90.766) | (282.457,63.414) | (270.500,78.179) |
| 197TH DIMENSION | FIRST EXTRACTION REGION | (21.000,32.000) | (-25.946,12.073) | (37.411,-6.661) | (-9.535,-26.588) |
| | SECOND EXTRACTION REGION | (266.000,18.000) | (253.880,39.865) | (237.138,2.001) | (225.017,23.867) |
| 198TH DIMENSION | FIRST EXTRACTION REGION | (82.000,51.000) | (84.227,35.156) | (139.436,59.072) | (141.662,43.228) |
| | SECOND EXTRACTION REGION | (80.000,22.000) | (126.971,23.640) | (78.918,52.981) | (125.889,54.621) |
| 199TH DIMENSION | FIRST EXTRACTION REGION | (193.000,179.000) | (252.918,175.860) | (194.151,200.970) | (254.069,197.830) |
| | SECOND EXTRACTION REGION | (219.000,178.000) | (182.432,212.100) | (197.858,155.328) | (161.290,189.428) |
| 200TH DIMENSION | FIRST EXTRACTION REGION | (136.000,177.000) | (100.834,94.155) | (233.574,135.583) | (198.408,52.737) |
| | SECOND EXTRACTION REGION | (251.000,113.000) | (192.000,215.191) | (151.407,55.500) | (92.407,157.691) |
| 201TH DIMENSION | FIRST EXTRACTION REGION | (293.000,175.000) | (377.036,152.483) | (319.400,273.524) | (403.435,251.007) |
| | SECOND EXTRACTION REGION | (313.000,197.000) | (317.950,201.950) | (268.452,241.548) | (273.402,246.497) |
| 202TH DIMENSION | FIRST EXTRACTION REGION | (184.000,125.000) | (180.551,92.181) | (242.677,118.833) | (239.227,86.014) |
| | SECOND EXTRACTION REGION | (183.000,94.000) | (191.541,74.816) | (226.850,113.523) | (235.392,94.339) |
| 203TH DIMENSION | FIRST EXTRACTION REGION | (18.000,56.000) | (8.052,49.290) | (24.151,46.881) | (14.203,40.170) |
| | SECOND EXTRACTION REGION | (94.000,30.000) | (121.358,48.453) | (90.086,35.803) | (117.444,54.257) |
| 204TH DIMENSION | FIRST EXTRACTION REGION | (6.000,171.000) | (47.000,171.000) | (6.000,198.000) | (47.000,198.000) |
| | SECOND EXTRACTION REGION | (28.000,130.000) | (75.000,130.000) | (28.000,198.000) | (75.000,198.000) |
| 205TH DIMENSION | FIRST EXTRACTION REGION | (178.000,164.000) | (173.116,149.817) | (205.420,154.559) | (200.537,140.376) |
| | SECOND EXTRACTION REGION | (180.000,154.000) | (145.815,184.780) | (161.933,133.935) | (127.749,164.715) |
| 206TH DIMENSION | FIRST EXTRACTION REGION | (298.000,41.000) | (317.000,41.000) | (298.000,63.000) | (317.000,63.000) |
| | SECOND EXTRACTION REGION | (294.000,74.000) | (316.000,74.000) | (294.000,107.000) | (316.000,107.000) |
| 207TH DIMENSION | FIRST EXTRACTION REGION | (147.000,99.000) | (124.631,130.947) | (134.713,90.396) | (112.343,122.343) |
| | SECOND EXTRACTION REGION | (88.000,87.000) | (116.936,124.037) | (70.664,100.545) | (99.600,137.581) |
| 208TH DIMENSION | FIRST EXTRACTION REGION | (79.000,58.000) | (97.954,56.675) | (80.465,78.949) | (99.419,77.623) |
| | SECOND EXTRACTION REGION | (219.000,73.000) | (226.715,68.365) | (221.575,77.286) | (229.290,72.650) |
| 209TH DIMENSION | FIRST EXTRACTION REGION | (10.000,136.000) | (23.620,109.270) | (53.659,158.246) | (67.279,131.515) |
| | SECOND EXTRACTION REGION | (76.000,170.000) | (68.474,189.605) | (24.653,150.290) | (17.127,169.895) |
| 210TH DIMENSION | FIRST EXTRACTION REGION | (242.000,144.000) | (301.000,144.000) | (242.000,173.000) | (301.000,173.000) |
| | SECOND EXTRACTION REGION | (270.000,150.000) | (306.000,150.000) | (270.000,181.000) | (306.000,181.000) |

FIG. 14-h

| | | | | | |
|---|---|---|---|---|---|
| 211TH DIMENSION | FIRST EXTRACTION REGION | (278.000,55.000) | (281.399,93.852) | (210.259,60.927) | (213.658,99.778) |
| | SECOND EXTRACTION REGION | (235.000,76.000) | (227.205,77.800) | (227.127,41.897) | (219.332,43.697) |
| 212TH DIMENSION | FIRST EXTRACTION REGION | (159.000,200.000) | (164.663,195.886) | (172.519,218.607) | (178.182,214.493) |
| | SECOND EXTRACTION REGION | (110.000,189.000) | (143.207,160.133) | (149.364,234.283) | (182.571,205.416) |
| 213TH DIMENSION | FIRST EXTRACTION REGION | (206.000,60.000) | (171.212,34.725) | (212.466,51.101) | (177.678,25.826) |
| | SECOND EXTRACTION REGION | (139.000,32.000) | (118.009,20.365) | (149.181,13.633) | (128.190,1.998) |
| 214TH DIMENSION | FIRST EXTRACTION REGION | (125.000,179.000) | (62.902,144.579) | (185.601,69.673) | (123.503,35.251) |
| | SECOND EXTRACTION REGION | (182.000,104.000) | (48.734,118.007) | (179.596,81.126) | (46.330,95.133) |
| 215TH DIMENSION | FIRST EXTRACTION REGION | (141.000,11.000) | (194.000,11.000) | (141.000,78.000) | (194.000,78.000) |
| | SECOND EXTRACTION REGION | (153.000,13.000) | (201.000,13.000) | (153.000,57.000) | (201.000,57.000) |
| 216TH DIMENSION | FIRST EXTRACTION REGION | (69.000,97.000) | (61.838,76.199) | (80.346,93.093) | (73.184,72.292) |
| | SECOND EXTRACTION REGION | (46.000,107.000) | (57.988,107.209) | (45.511,134.996) | (57.510,135.205) |
| 217TH DIMENSION | FIRST EXTRACTION REGION | (285.000,83.000) | (280.802,61.404) | (348.806,70.597) | (344.608,49.002) |
| | SECOND EXTRACTION REGION | (11.000,47.000) | (-71.520,106.954) | (-8.397,20.302) | (-90.917,80.257) |
| 218TH DIMENSION | FIRST EXTRACTION REGION | (222.000,177.000) | (225.534,205.784) | (180.313,182.119) | (183.847,210.902) |
| | SECOND EXTRACTION REGION | (199.000,222.000) | (224.961,211.511) | (209.114,247.034) | (235.076,236.545) |
| 219TH DIMENSION | FIRST EXTRACTION REGION | (133.000,189.000) | (155.411,194.174) | (123.777,228.949) | (146.188,234.133) |
| | SECOND EXTRACTION REGION | (128.000,202.000) | (106.204,233,128) | (98.511,181.351) | (76.715,212.479) |
| 220TH DIMENSION | FIRST EXTRACTION REGION | (177.000,100.000) | (167.436,144.995) | (148.634,93.971) | (139.070,138.965) |
| | SECOND EXTRACTION REGION | (108.000,108.000) | (102.408,99.710) | (137.845,87.869) | (132.253,79.579) |
| 221TH DIMENSION | FIRST EXTRACTION REGION | (298.000,6.000) | (219.241,59.123) | (257.179,-54.520) | (178.420,-1.396) |
| | SECOND EXTRACTION REGION | (307.000,65.000) | (218.918,22.040) | (353.467,-30.272) | (265.386,-73.233) |
| 222TH DIMENSION | FIRST EXTRACTION REGION | (291.000,121.000) | (310.000,121.000) | (291.000,146.000) | (310.000,146.000) |
| | SECOND EXTRACTION REGION | (277.000,97.000) | (298.000,97.000) | (277.000,133.000) | (298.000,133.000) |
| 223TH DIMENSION | FIRST EXTRACTION REGION | (27.000,206.000) | (36.877,204.436) | (29.503,221.803) | (39.380,220.239) |
| | SECOND EXTRACTION REGION | (118.000,172.000) | (107.450,196.854) | (93.146,161.450) | (82.597,186.304) |
| 224TH DIMENSION | FIRST EXTRACTION REGION | (214.000,120.000) | (243.000,120.000) | (214.000,162.000) | (243.000,162.000) |
| | SECOND EXTRACTION REGION | (210.000,143.000) | (235.000,143.000) | (210.000,180.000) | (235.000,180.000) |
| 225TH DIMENSION | FIRST EXTRACTION REGION | (239.000,152.000) | (201.906,92.637) | (312.780,105.897) | (275.686,46.534) |
| | SECOND EXTRACTION REGION | (244.000,50.000) | (249.942,50.835) | (230.083,149.027) | (236.024,149.862) |
| 226TH DIMENSION | FIRST EXTRACTION REGION | (7.000,232.000) | (22.522,299.232) | (-34.898,241.673) | (-19.376,308.904) |
| | SECOND EXTRACTION REGION | (293.000,216.000) | (243.566,240.110) | (283.794,197.125) | (234.361,221.236) |
| 227TH DIMENSION | FIRST EXTRACTION REGION | (6.000,53.000) | (63.000,53.000) | (6.000,93.000) | (63.000,93.000) |
| | SECOND EXTRACTION REGION | (17.000,56.000) | (76.000,56.000) | (17.000,121.000) | (76.000,121.000) |
| 228TH DIMENSION | FIRST EXTRACTION REGION | (155.000,106.000) | (198.000,106.000) | (155.000,128.000) | (198.000,128.000) |
| | SECOND EXTRACTION REGION | (148.000,137.000) | (175.000,137.000) | (148.000,160.000) | (175.000,160.000) |
| 229TH DIMENSION | FIRST EXTRACTION REGION | (84.000,111.000) | (103.701,85.754) | (115.520,135.626) | (135.222,110.410) |
| | SECOND EXTRACTION REGION | (56.000,132.000) | (76.185,73.378) | (111.786,151.209) | (131.971,92.586) |
| 230TH DIMENSION | FIRST EXTRACTION REGION | (0.000,42.000) | (28.644,11.283) | (26.329,66.552) | (54.973,35.835) |
| | SECOND EXTRACTION REGION | (34.000,75.000) | (14.985,92.732) | (3.992,42.820) | (-15.023,60.552) |
| 231TH DIMENSION | FIRST EXTRACTION REGION | (125.000,5.000) | (133.426,12.071) | (114.715,17.257) | (123.142,24.327) |
| | SECOND EXTRACTION REGION | (118.000,26.000) | (24.970,59.860) | (105.345,-8.769) | (12.316,25.091) |
| 232TH DIMENSION | FIRST EXTRACTION REGION | (209.000,225.000) | (169.298,220.125) | (213.144,191.253) | (173.442,186.379) |
| | SECOND EXTRACTION REGION | (221.000,180.000) | (288.232,195.522) | (214.701,207.282) | (281.933,222.804) |
| 233TH DIMENSION | FIRST EXTRACTION REGION | (130.000,46.000) | (157.280,16.746) | (172.419,85.556) | (199.698,56.302) |
| | SECOND EXTRACTION REGION | (126.000,52.000) | (130.446,39.784) | (140.095,57.130) | (144.542,44.914) |
| 234TH DIMENSION | FIRST EXTRACTION REGION | (181.000,41.000) | (286.315,139.208) | (142.808,81.956) | (248.123,180.164) |
| | SECOND EXTRACTION REGION | (252.000,89.000) | (224.317,125.737) | (246.410,84.787) | (218.726,121.525) |
| 235TH DIMENSION | FIRST EXTRACTION REGION | (210.000,208.000) | (176.331,212.732) | (208.608,198.097) | (174.939,202.829) |
| | SECOND EXTRACTION REGION | (194.000,147.000) | (185.190,157.880) | (186.229,140.707) | (177.418,151.587) |
| 236TH DIMENSION | FIRST EXTRACTION REGION | (124.000,48.000) | (113.182,83.383) | (100.092,40.691) | (89.275,76.074) |
| | SECOND EXTRACTION REGION | (123.000,44.000) | (169.222,65.554) | (110.744,70.283) | (156.966,91.836) |
| 237TH DIMENSION | FIRST EXTRACTION REGION | (71.000,151.000) | (97.267,194.716) | (51.285,162.846) | (77.552,206.561) |
| | SECOND EXTRACTION REGION | (66.000,223.000) | (61.590,207.620) | (108.296,210.872) | (103.885,195.492) |
| 238TH DIMENSION | FIRST EXTRACTION REGION | (260.000,51.000) | (191.850,61.794) | (257.653,36.185) | (189.503,49.979) |
| | SECOND EXTRACTION REGION | (207.000,75.000) | (218.449,16.102) | (257.063,84.731) | (268.512,25.834) |
| 239TH DIMENSION | FIRST EXTRACTION REGION | (147.000,58.000) | (183.000,58.000) | (147.000,125.000) | (183.000,125.000) |
| | SECOND EXTRACTION REGION | (172.000,69.000) | (223.000,69.000) | (172.000,125.000) | (223.000,125.000) |
| 240TH DIMENSION | FIRST EXTRACTION REGION | (73.000,151.000) | (61.278,123.385) | (87.728,144.748) | (76.006,117.133) |
| | SECOND EXTRACTION REGION | (90.000,90.000) | (61.000,140.229) | (51.029,67.500) | (22.029,117.729) |

FIG. 14-i

| | | | | | |
|---|---|---|---|---|---|
| 241TH DIMENSION | FIRST EXTRACTION REGION | (243.000,158.000) | (286.250,185.026) | (184.179,252.133) | (227.429,279.159) |
| | SECOND EXTRACTION REGION | (288.000,218.000) | (308.321,299.505) | (256.951,225.742) | (277.272,307.246) |
| 242TH DIMENSION | FIRST EXTRACTION REGION | (239.000,63.000) | (280.107,40.214) | (258.877,98.859) | (299.984,76.073) |
| | SECOND EXTRACTION REGION | (307.000,91.000) | (256.587,71.648) | (314.884,70.461) | (264.471,51.109) |
| 243TH DIMENSION | FIRST EXTRACTION REGION | (260.000,45.000) | (286.000,45.000) | (260.000,108.000) | (286.000,108.000) |
| | SECOND EXTRACTION REGION | (239.000,107.000) | (302.000,107.000) | (239.000,136.000) | (302.000,136.000) |
| 244TH DIMENSION | FIRST EXTRACTION REGION | (125.000,5.000) | (152.578,28.140) | (108.288,24.917) | (135.865,48.058) |
| | SECOND EXTRACTION REGION | (118.000,26.000) | (86.050,37.629) | (105.345,-8.769) | (73.396,2.860) |
| 245TH DIMENSION | FIRST EXTRACTION REGION | (96.000,157.000) | (51.554,164.040) | (88.960,112.554) | (44.514,119.594) |
| | SECOND EXTRACTION REGION | (100.000,110.000) | (116.263,126.263) | (62.523,147.477) | (78.787,163.740) |
| 246TH DIMENSION | FIRST EXTRACTION REGION | (205.000,49.000) | (231.473,82.884) | (168.752,77.320) | (195.225,111.205) |
| | SECOND EXTRACTION REGION | (179.000,6.000) | (283.188,61.398) | (134.870,88.997) | (239.057,144.395) |
| 247TH DIMENSION | FIRST EXTRACTION REGION | (136.000,205.000) | (124.598,167.704) | (165.645,195.936) | (154.243,158.641) |
| | SECOND EXTRACTION REGION | (139.000,155.000) | (156.835,138.941) | (168.442,187.698) | (186.277,171.639) |
| 248TH DIMENSION | FIRST EXTRACTION REGION | (279.000,166.000) | (298.000,166.000) | (279.000,192.000) | (298.000,192.000) |
| | SECOND EXTRACTION REGION | (239.000,201.000) | (305.000,201.000) | (239.000,225.000) | (305.000,225.000) |
| 249TH DIMENSION | FIRST EXTRACTION REGION | (64.000,52.000) | (17.000,52.000) | (64.000,16.000) | (17.000,16.000) |
| | SECOND EXTRACTION REGION | (61.000,9.000) | (110.986,23.333) | (52.180,39.760) | (102.165,54.094) |
| 250TH DIMENSION | FIRST EXTRACTION REGION | (224.000,80.000) | (268.297,115.871) | (217.077,88.549) | (261.375,124.420) |
| | SECOND EXTRACTION REGION | (199.000,117.000) | (183.718,138.034) | (187.674,108.771) | (172.391,129.805) |
| 251TH DIMENSION | FIRST EXTRACTION REGION | (148.000,21.000) | (175.170,44.618) | (142.095,27.792) | (169.265,51.411) |
| | SECOND EXTRACTION REGION | (103.000,49.000) | (168.338,83.741) | (98.775,56.947) | (164.113,91.687) |
| 252TH DIMENSION | FIRST EXTRACTION REGION | (88.000,124.000) | (105.619,138.784) | (48.790,170.729) | (66.409,185.513) |
| | SECOND EXTRACTION REGION | (54.000,118.000) | (105.992,118.908) | (53.511,145.996) | (105.503,146.903) |
| 253TH DIMENSION | FIRST EXTRACTION REGION | (111.000,63.000) | (130.997,62.651) | (111.401,85.996) | (131.398,85.647) |
| | SECOND EXTRACTION REGION | (106.000,136.000) | (62.898,97.190) | (134.103,104.788) | (91.001,65.978) |
| 254TH DIMENSION | FIRST EXTRACTION REGION | (130.000,183.000) | (165.000,183.000) | (130.000,237.000) | (165.000,237.000) |
| | SECOND EXTRACTION REGION | (134.000,166.000) | (159.000,166.000) | (134.000,205.000) | (159.000,205.000) |
| 255TH DIMENSION | FIRST EXTRACTION REGION | (117.000,213.000) | (102.328,209.881) | (119.287,202.240) | (104.615,199.122) |
| | SECOND EXTRACTION REGION | (14.000,203.000) | (34.488,186.993) | (74.950,281.013) | (95.439,265.006) |
| 256TH DIMENSION | FIRST EXTRACTION REGION | (85.000,157.000) | (108.000,157.000) | (85.000,220.000) | (108.000,220.000) |
| | SECOND EXTRACTION REGION | (214.000,169.000) | (237.000,169.000) | (214.000,202.000) | (237.000,202.000) |
| 257TH DIMENSION | FIRST EXTRACTION REGION | (284.000,94.000) | (233.888,111.255) | (277.814,76.035) | (227.702,93.290) |
| | SECOND EXTRACTION REGION | (282.000,101.000) | (287.619,87.092) | (288.490,103.622) | (294.109,89.714) |
| 258TH DIMENSION | FIRST EXTRACTION REGION | (158.000,122.000) | (105.641,27.541) | (174.618,112.789) | (122.258,18.330) |
| | SECOND EXTRACTION REGION | (127.000,18.000) | (139.918,123.210) | (106.157,20.559) | (119.075,125.769) |
| 259TH DIMENSION | FIRST EXTRACTION REGION | (216.000,142.000) | (259.773,180.051) | (178.605,185.018) | (222.378,223.070) |
| | SECOND EXTRACTION REGION | (226.000,161.000) | (231.878,152.910) | (257.552,183.924) | (263.430,175.833) |
| 260TH DIMENSION | FIRST EXTRACTION REGION | (222.000,0.000) | (279.000,0.000) | (222.000,68.000) | (279.000,68.000) |
| | SECOND EXTRACTION REGION | (276.000,0.000) | (317.000,0.000) | (276.000,56.000) | (317.000,56.000) |
| 261TH DIMENSION | FIRST EXTRACTION REGION | (90.000,152.000) | (61.681,117.028) | (177.040,81.516) | (148.721,46.545) |
| | SECOND EXTRACTION REGION | (124.000,27.000) | (175.696,154.951) | (78.568,45.356) | (130.264,173.307) |
| 262TH DIMENSION | FIRST EXTRACTION REGION | (116.000,59.000) | (95.386,63.007) | (108.940,22.680) | (88.326,26.687) |
| | SECOND EXTRACTION REGION | (231.000,17.000) | (231.942,-9.984) | (250.988,17.698) | (251.930,-9.286) |
| 263TH DIMENSION | FIRST EXTRACTION REGION | (265.000,156.000) | (252.564,164.388) | (246.547,128.642) | (234.111,137.030) |
| | SECOND EXTRACTION REGION | (263.000,197.000) | (237.834,184.726) | (274.398,173.631) | (249.231,161.357) |
| 264TH DIMENSION | FIRST EXTRACTION REGION | (74.000,93.000) | (50.253,73.074) | (96.498,66.188) | (72.750,46.262) |
| | SECOND EXTRACTION REGION | (129.000,94.000) | (133.274,75.487) | (138.744,96.250) | (143.018,77.736) |
| 265TH DIMENSION | FIRST EXTRACTION REGION | (24.000,223.000) | (46.257,187.382) | (37.569,231.479) | (59.825,195.861) |
| | SECOND EXTRACTION REGION | (54.000,161.000) | (36.904,196.053) | (16.251,142.588) | (-0.846,177.641) |
| 266TH DIMENSION | FIRST EXTRACTION REGION | (300.000,90.000) | (261.985,105.359) | (292.508,71.456) | (254.493,86.815) |
| | SECOND EXTRACTION REGION | (266.000,151.000) | (275.925,152.219) | (264.903,159.933) | (274.829,161.152) |
| 267TH DIMENSION | FIRST EXTRACTION REGION | (63.000,34.000) | (55.802,65.180) | (34.743,27.476) | (27.545,58.656) |
| | SECOND EXTRACTION REGION | (63.000,57.000) | (68.080,77.376) | (19.337,67.886) | (24.417,88.263) |
| 268TH DIMENSION | FIRST EXTRACTION REGION | (103.000,133.000) | (141.000,133.000) | (103.000,157.000) | (141.000,157.000) |
| | SECOND EXTRACTION REGION | (207.000,117.000) | (234.000,117.000) | (207.000,165.000) | (234.000,165.000) |
| 269TH DIMENSION | FIRST EXTRACTION REGION | (261.000,214.000) | (360.893,252.345) | (258.850,219.601) | (358.743,257.947) |
| | SECOND EXTRACTION REGION | (225.000,215.000) | (237.036,230.973) | (159.512,264.349) | (171.548,280.322) |
| 270TH DIMENSION | FIRST EXTRACTION REGION | (315.000,130.000) | (302.170,118.847) | (362.236,75.661) | (349.406,64.508) |
| | SECOND EXTRACTION REGION | (22.000,136.000) | (-14.568,170.100) | (-53.702,54.820) | (-90.270,88.920) |

FIG. 14-j

| | | | | | |
|---|---|---|---|---|---|
| 271TH DIMENSION | FIRST EXTRACTION REGION | (94.000,35.000) | (120.847,50.500) | (71.500,73.971) | (98.347,89.471) |
| | SECOND EXTRACTION REGION | (26.000,84.000) | (16.650,35.900) | (47.596,79.802) | (38.246,31.702) |
| 272TH DIMENSION | FIRST EXTRACTION REGION | (198.000,215.000) | (191.424,228.482) | (185.417,208.863) | (178.841,222.345) |
| | SECOND EXTRACTION REGION | (81.000,181.000) | (80.302,200.988) | (62.012,180.337) | (61.314,200.325) |
| 273TH DIMENSION | FIRST EXTRACTION REGION | (5.000,99.000) | (59.000,99.000) | (5.000,133.000) | (59.000,133.000) |
| | SECOND EXTRACTION REGION | (9.000,123.000) | (61.000,123.000) | (9.000,145.000) | (61.000,145.000) |
| 274TH DIMENSION | FIRST EXTRACTION REGION | (271.000,159.000) | (305.000,159.000) | (271.000,199.000) | (305.000,199.000) |
| | SECOND EXTRACTION REGION | (240.000,165.000) | (304.000,165.000) | (240.000,192.000) | (304.000,192.000) |
| 275TH DIMENSION | FIRST EXTRACTION REGION | (141.000,187.000) | (110.441,172.095) | (154.590,159.137) | (124.031,144.233) |
| | SECOND EXTRACTION REGION | (151.000,116.000) | (184.960,124.467) | (143.017,148.020) | (176.977,156.487) |
| 276TH DIMENSION | FIRST EXTRACTION REGION | (266.000,46.000) | (232.225,65.500) | (254.000,25.215) | (220.225,44.715) |
| | SECOND EXTRACTION REGION | (196.000,38.000) | (193.519,46.651) | (148.898,24.494) | (146.417,33.145) |
| 277TH DIMENSION | FIRST EXTRACTION REGION | (245.000,22.000) | (264.151,38.070) | (220.574,51.110) | (239.725,67.179) |
| | SECOND EXTRACTION REGION | (257.000,62.000) | (275.711,65.299) | (251.791,91.544) | (270.502,94.844) |
| 278TH DIMENSION | FIRST EXTRACTION REGION | (150.000,239.000) | (155.847,219.874) | (176.777,247.186) | (182.624,228.060) |
| | SECOND EXTRACTION REGION | (267.000,204.000) | (272.953,181.784) | (286.319,209.176) | (292.271,186.960) |
| 279TH DIMENSION | FIRST EXTRACTION REGION | (140.000,149.000) | (136.170,145.786) | (174.068,108.400) | (170.238,105.186) |
| | SECOND EXTRACTION REGION | (150.000,110.000) | (169.607,78.622) | (159.329,115.829) | (178.936,84.451) |
| 280TH DIMENSION | FIRST EXTRACTION REGION | (116.000,65.000) | (157.110,46.697) | (131.456,99.715) | (172.566,81.412) |
| | SECOND EXTRACTION REGION | (210.000,66.000) | (171.895,88.000) | (204.500,56.474) | (166.395,78.474) |
| 281TH DIMENSION | FIRST EXTRACTION REGION | (198.000,76.000) | (230.640,102.431) | (183.526,93.874) | (216.166,120.306) |
| | SECOND EXTRACTION REGION | (254.000,107.000) | (211.236,111.495) | (248.595,55.285) | (205.800,59.780) |
| 282TH DIMENSION | FIRST EXTRACTION REGION | (106.000,150.000) | (155.645,111.213) | (118.929,166.548) | (168.574,127.762) |
| | SECOND EXTRACTION REGION | (86.000,171.000) | (73.321,143.811) | (122.252,154.095) | (109.574,126.906) |
| 283TH DIMENSION | FIRST EXTRACTION REGION | (61.000,221.000) | (27.191,253.649) | (33.214,192.226) | (-0.595,224.875) |
| | SECOND EXTRACTION REGION | (8.000,33.000) | (-14.912,35.005) | (5.560,5.107) | (-17.353,7.111) |
| 284TH DIMENSION | FIRST EXTRACTION REGION | (236.000,203.000) | (214.273,149.223) | (247.126,198.505) | (225.399,144.728) |
| | SECOND EXTRACTION REGION | (243.000,179.000) | (217.885,193.500) | (215.000,130.503) | (189.885,145.003) |
| 285TH DIMENSION | FIRST EXTRACTION REGION | (225.000,106.000) | (211.760,88.430) | (249.758,87.344) | (236.518,69.774) |
| | SECOND EXTRACTION REGION | (220.000,108.000) | (247.297,62.570) | (268.859,137.357) | (296.156,91.927) |
| 286TH DIMENSION | FIRST EXTRACTION REGION | (198.000,197.000) | (201.697,144.129) | (311.722,204.952) | (315.419,152.081) |
| | SECOND EXTRACTION REGION | (271.000,121.000) | (278.045,221.754) | (208.153,125.395) | (215.199,226.149) |
| 287TH DIMENSION | FIRST EXTRACTION REGION | (175.000,188.000) | (149.947,226.579) | (159.904,178.196) | (134.851,216.775) |
| | SECOND EXTRACTION REGION | (91.000,204.000) | (104.164,216.276) | (86.908,208.388) | (100.072,220.664) |
| 288TH DIMENSION | FIRST EXTRACTION REGION | (51.000,32.000) | (86.618,54.257) | (39.342,50.657) | (74.960,72.914) |
| | SECOND EXTRACTION REGION | (129.000,28.000) | (109.550,7.858) | (162.809,-4.649) | (143.359,-24.790) |
| 289TH DIMENSION | FIRST EXTRACTION REGION | (173.000,163.000) | (197.985,162.128) | (173.349,172.994) | (198.334,172.121) |
| | SECOND EXTRACTION REGION | (115.000,69.000) | (187.676,123.765) | (65.049,135.287) | (137.725,190.052) |
| 290TH DIMENSION | FIRST EXTRACTION REGION | (236.000,94.000) | (284.000,94.000) | (236.000,133.000) | (284.000,133.000) |
| | SECOND EXTRACTION REGION | (239.000,95.000) | (305.000,95.000) | (239.000,143.000) | (305.000,143.000) |
| 291TH DIMENSION | FIRST EXTRACTION REGION | (236.000,215.000) | (250.266,210.365) | (257.013,279.672) | (271.279,275.037) |
| | SECOND EXTRACTION REGION | (38.000,189.000) | (19.873,238.804) | (22.025,183.186) | (3.898,232.989) |
| 292TH DIMENSION | FIRST EXTRACTION REGION | (133.000,170.000) | (145.164,124.601) | (181.296,182.941) | (193.461,137.542) |
| | SECOND EXTRACTION REGION | (198.000,143.000) | (172.063,141.186) | (199.325,124.046) | (173.389,122.233) |
| 293TH DIMENSION | FIRST EXTRACTION REGION | (238.000,178.000) | (274.000,178.000) | (238.000,213.000) | (274.000,213.000) |
| | SECOND EXTRACTION REGION | (204.000,172.000) | (244.000,172.000) | (204.000,201.000) | (244.000,201.000) |
| 294TH DIMENSION | FIRST EXTRACTION REGION | (110.000,85.000) | (59.888,67.745) | (125.627,39.615) | (75.515,22.360) |
| | SECOND EXTRACTION REGION | (80.000,42.000) | (64.088,40.328) | (82.404,19.126) | (66.492,17.454) |
| 295TH DIMENSION | FIRST EXTRACTION REGION | (4.000,173.000) | (-4.426,165.929) | (20.070,153.849) | (11.643,146.778) |
| | SECOND EXTRACTION REGION | (119.000,195.000) | (123.274,176.487) | (128.744,197.250) | (133.018,178.736) |
| 296TH DIMENSION | FIRST EXTRACTION REGION | (223.000,127.000) | (184.356,92.205) | (253.111,93.558) | (214.467,58.764) |
| | SECOND EXTRACTION REGION | (100.000,96.000) | (157.779,90.945) | (101.133,108.951) | (158.912,103.895) |
| 297TH DIMENSION | FIRST EXTRACTION REGION | (273.000,173.000) | (286.620,140.270) | (297.948,185.712) | (311.568,158.982) |
| | SECOND EXTRACTION REGION | (310.000,133.000) | (282.846,112.538) | (325.647,112.235) | (298.494,91.774) |
| 298TH DIMENSION | FIRST EXTRACTION REGION | (69.000,61.000) | (95.590,56.311) | (76.120,101.377) | (102.709,96.689) |
| | SECOND EXTRACTION REGION | (83.000,115.000) | (70.788,52.176) | (134.045,105.078) | (121.833,42.254) |
| 299TH DIMENSION | FIRST EXTRACTION REGION | (79.000,173.000) | (125.000,173.000) | (79.000,231.000) | (125.000,231.000) |
| | SECOND EXTRACTION REGION | (79.000,146.000) | (141.959,168.915) | (61.899,192.985) | (124.858,215.900) |
| 300TH DIMENSION | FIRST EXTRACTION REGION | (26.000,28.000) | (59.522,10.160) | (32.103,39.478) | (65.655,21.638) |
| | SECOND EXTRACTION REGION | (225.000,8.000) | (223.328,23.912) | (215.055,6.955) | (213.882,22.867) |

FIG. 15-a

| | |
|---|---|
| 1ST DIMENSION | MEANS VALUE OF LUMINANCE VALUES OF PIXELS INCLUDED IN EXTRACTION REGION |
| 2ND DIMENSION | MEANS VALUE OF LUMINANCE VALUES OF PIXELS INCLUDED IN EXTRACTION REGION |
| 3RD DIMENSION | MEANS VALUE OF LUMINANCE VALUES OF PIXELS INCLUDED IN EXTRACTION REGION |
| 4TH DIMENSION | MEANS VALUE OF LUMINANCE VALUES OF PIXELS INCLUDED IN EXTRACTION REGION |
| 5TH DIMENSION | MEANS VALUE OF LUMINANCE VALUES OF PIXELS INCLUDED IN EXTRACTION REGION |
| 6TH DIMENSION | MEANS VALUE OF LUMINANCE VALUES OF PIXELS INCLUDED IN EXTRACTION REGION |
| 7TH DIMENSION | MEANS VALUE OF LUMINANCE VALUES OF PIXELS INCLUDED IN EXTRACTION REGION |
| 8TH DIMENSION | MEANS VALUE OF LUMINANCE VALUES OF PIXELS INCLUDED IN EXTRACTION REGION |
| 9TH DIMENSION | MEANS VALUE OF LUMINANCE VALUES OF PIXELS INCLUDED IN EXTRACTION REGION |
| 10TH DIMENSION | MEANS VALUE OF LUMINANCE VALUES OF PIXELS INCLUDED IN EXTRACTION REGION |
| 11TH DIMENSION | MEANS VALUE OF LUMINANCE VALUES OF PIXELS INCLUDED IN EXTRACTION REGION |
| 12TH DIMENSION | MEANS VALUE OF LUMINANCE VALUES OF PIXELS INCLUDED IN EXTRACTION REGION |
| 13TH DIMENSION | MEANS VALUE OF LUMINANCE VALUES OF PIXELS INCLUDED IN EXTRACTION REGION |
| 14TH DIMENSION | MEANS VALUE OF LUMINANCE VALUES OF PIXELS INCLUDED IN EXTRACTION REGION |
| 15TH DIMENSION | MEANS VALUE OF LUMINANCE VALUES OF PIXELS INCLUDED IN EXTRACTION REGION |
| 16TH DIMENSION | MEANS VALUE OF LUMINANCE VALUES OF PIXELS INCLUDED IN EXTRACTION REGION |
| 17TH DIMENSION | MEANS VALUE OF LUMINANCE VALUES OF PIXELS INCLUDED IN EXTRACTION REGION |
| 18TH DIMENSION | MEANS VALUE OF LUMINANCE VALUES OF PIXELS INCLUDED IN EXTRACTION REGION |
| 19TH DIMENSION | MEANS VALUE OF LUMINANCE VALUES OF PIXELS INCLUDED IN EXTRACTION REGION |
| 20TH DIMENSION | MEANS VALUE OF LUMINANCE VALUES OF PIXELS INCLUDED IN EXTRACTION REGION |
| 21TH DIMENSION | MEANS VALUE OF LUMINANCE VALUES OF PIXELS INCLUDED IN EXTRACTION REGION |
| 22TH DIMENSION | MEANS VALUE OF LUMINANCE VALUES OF PIXELS INCLUDED IN EXTRACTION REGION |
| 23TH DIMENSION | MEANS VALUE OF LUMINANCE VALUES OF PIXELS INCLUDED IN EXTRACTION REGION |
| 24TH DIMENSION | MEANS VALUE OF LUMINANCE VALUES OF PIXELS INCLUDED IN EXTRACTION REGION |
| 25TH DIMENSION | MEANS VALUE OF LUMINANCE VALUES OF PIXELS INCLUDED IN EXTRACTION REGION |
| 26TH DIMENSION | MEANS VALUE OF LUMINANCE VALUES OF PIXELS INCLUDED IN EXTRACTION REGION |
| 27TH DIMENSION | MEANS VALUE OF LUMINANCE VALUES OF PIXELS INCLUDED IN EXTRACTION REGION |
| 28TH DIMENSION | MEANS VALUE OF LUMINANCE VALUES OF PIXELS INCLUDED IN EXTRACTION REGION |
| 29TH DIMENSION | MEANS VALUE OF LUMINANCE VALUES OF PIXELS INCLUDED IN EXTRACTION REGION |
| 30TH DIMENSION | MEANS VALUE OF LUMINANCE VALUES OF PIXELS INCLUDED IN EXTRACTION REGION |
| 31TH DIMENSION | MEANS VALUE OF LUMINANCE VALUES OF PIXELS INCLUDED IN EXTRACTION REGION |
| 32TH DIMENSION | MEANS VALUE OF LUMINANCE VALUES OF PIXELS INCLUDED IN EXTRACTION REGION |
| 33TH DIMENSION | MEANS VALUE OF LUMINANCE VALUES OF PIXELS INCLUDED IN EXTRACTION REGION |
| 34TH DIMENSION | MEANS VALUE OF LUMINANCE VALUES OF PIXELS INCLUDED IN EXTRACTION REGION |
| 35TH DIMENSION | MEANS VALUE OF LUMINANCE VALUES OF PIXELS INCLUDED IN EXTRACTION REGION |
| 36TH DIMENSION | MEANS VALUE OF LUMINANCE VALUES OF PIXELS INCLUDED IN EXTRACTION REGION |
| 37TH DIMENSION | MEANS VALUE OF LUMINANCE VALUES OF PIXELS INCLUDED IN EXTRACTION REGION |
| 38TH DIMENSION | MEANS VALUE OF LUMINANCE VALUES OF PIXELS INCLUDED IN EXTRACTION REGION |
| 39TH DIMENSION | MEANS VALUE OF LUMINANCE VALUES OF PIXELS INCLUDED IN EXTRACTION REGION |
| 40TH DIMENSION | MEANS VALUE OF LUMINANCE VALUES OF PIXELS INCLUDED IN EXTRACTION REGION |
| 41TH DIMENSION | MEANS VALUE OF LUMINANCE VALUES OF PIXELS INCLUDED IN EXTRACTION REGION |
| 42TH DIMENSION | MEANS VALUE OF LUMINANCE VALUES OF PIXELS INCLUDED IN EXTRACTION REGION |
| 43TH DIMENSION | MEANS VALUE OF LUMINANCE VALUES OF PIXELS INCLUDED IN EXTRACTION REGION |
| 44TH DIMENSION | MEANS VALUE OF LUMINANCE VALUES OF PIXELS INCLUDED IN EXTRACTION REGION |
| 45TH DIMENSION | MEANS VALUE OF LUMINANCE VALUES OF PIXELS INCLUDED IN EXTRACTION REGION |
| 46TH DIMENSION | MEANS VALUE OF LUMINANCE VALUES OF PIXELS INCLUDED IN EXTRACTION REGION |
| 47TH DIMENSION | MEANS VALUE OF LUMINANCE VALUES OF PIXELS INCLUDED IN EXTRACTION REGION |
| 48TH DIMENSION | MEANS VALUE OF LUMINANCE VALUES OF PIXELS INCLUDED IN EXTRACTION REGION |
| 49TH DIMENSION | MEANS VALUE OF LUMINANCE VALUES OF PIXELS INCLUDED IN EXTRACTION REGION |
| 50TH DIMENSION | MEANS VALUE OF LUMINANCE VALUES OF PIXELS INCLUDED IN EXTRACTION REGION |
| 51TH DIMENSION | MEANS VALUE OF LUMINANCE VALUES OF PIXELS INCLUDED IN EXTRACTION REGION |
| 52TH DIMENSION | MEANS VALUE OF LUMINANCE VALUES OF PIXELS INCLUDED IN EXTRACTION REGION |
| 53TH DIMENSION | MEANS VALUE OF LUMINANCE VALUES OF PIXELS INCLUDED IN EXTRACTION REGION |
| 54TH DIMENSION | MEANS VALUE OF LUMINANCE VALUES OF PIXELS INCLUDED IN EXTRACTION REGION |
| 55TH DIMENSION | MEANS VALUE OF LUMINANCE VALUES OF PIXELS INCLUDED IN EXTRACTION REGION |
| 56TH DIMENSION | MEANS VALUE OF LUMINANCE VALUES OF PIXELS INCLUDED IN EXTRACTION REGION |
| 57TH DIMENSION | MEANS VALUE OF LUMINANCE VALUES OF PIXELS INCLUDED IN EXTRACTION REGION |
| 58TH DIMENSION | MEANS VALUE OF LUMINANCE VALUES OF PIXELS INCLUDED IN EXTRACTION REGION |
| 59TH DIMENSION | MEANS VALUE OF LUMINANCE VALUES OF PIXELS INCLUDED IN EXTRACTION REGION |
| 60TH DIMENSION | MEANS VALUE OF LUMINANCE VALUES OF PIXELS INCLUDED IN EXTRACTION REGION |

FIG. 15-b

| | |
|---|---|
| 61TH DIMENSION | MEANS VALUE OF LUMINANCE VALUES OF PIXELS INCLUDED IN EXTRACTION REGION |
| 62TH DIMENSION | MEANS VALUE OF LUMINANCE VALUES OF PIXELS INCLUDED IN EXTRACTION REGION |
| 63TH DIMENSION | MEANS VALUE OF LUMINANCE VALUES OF PIXELS INCLUDED IN EXTRACTION REGION |
| 64TH DIMENSION | MEANS VALUE OF LUMINANCE VALUES OF PIXELS INCLUDED IN EXTRACTION REGION |
| 65TH DIMENSION | MEANS VALUE OF LUMINANCE VALUES OF PIXELS INCLUDED IN EXTRACTION REGION |
| 66TH DIMENSION | MEANS VALUE OF LUMINANCE VALUES OF PIXELS INCLUDED IN EXTRACTION REGION |
| 67TH DIMENSION | MEANS VALUE OF LUMINANCE VALUES OF PIXELS INCLUDED IN EXTRACTION REGION |
| 68TH DIMENSION | MEANS VALUE OF LUMINANCE VALUES OF PIXELS INCLUDED IN EXTRACTION REGION |
| 69TH DIMENSION | MEANS VALUE OF LUMINANCE VALUES OF PIXELS INCLUDED IN EXTRACTION REGION |
| 70TH DIMENSION | MEANS VALUE OF LUMINANCE VALUES OF PIXELS INCLUDED IN EXTRACTION REGION |
| 71TH DIMENSION | MEANS VALUE OF LUMINANCE VALUES OF PIXELS INCLUDED IN EXTRACTION REGION |
| 72TH DIMENSION | MEANS VALUE OF LUMINANCE VALUES OF PIXELS INCLUDED IN EXTRACTION REGION |
| 73TH DIMENSION | MEANS VALUE OF LUMINANCE VALUES OF PIXELS INCLUDED IN EXTRACTION REGION |
| 74TH DIMENSION | MEANS VALUE OF LUMINANCE VALUES OF PIXELS INCLUDED IN EXTRACTION REGION |
| 75TH DIMENSION | MEANS VALUE OF LUMINANCE VALUES OF PIXELS INCLUDED IN EXTRACTION REGION |
| 76TH DIMENSION | MEANS VALUE OF LUMINANCE VALUES OF PIXELS INCLUDED IN EXTRACTION REGION |
| 77TH DIMENSION | MEANS VALUE OF LUMINANCE VALUES OF PIXELS INCLUDED IN EXTRACTION REGION |
| 78TH DIMENSION | MEANS VALUE OF LUMINANCE VALUES OF PIXELS INCLUDED IN EXTRACTION REGION |
| 79TH DIMENSION | MEANS VALUE OF LUMINANCE VALUES OF PIXELS INCLUDED IN EXTRACTION REGION |
| 80TH DIMENSION | MEANS VALUE OF LUMINANCE VALUES OF PIXELS INCLUDED IN EXTRACTION REGION |
| 81TH DIMENSION | MEANS VALUE OF LUMINANCE VALUES OF PIXELS INCLUDED IN EXTRACTION REGION |
| 82TH DIMENSION | MEANS VALUE OF LUMINANCE VALUES OF PIXELS INCLUDED IN EXTRACTION REGION |
| 83TH DIMENSION | MEANS VALUE OF LUMINANCE VALUES OF PIXELS INCLUDED IN EXTRACTION REGION |
| 84TH DIMENSION | MEANS VALUE OF LUMINANCE VALUES OF PIXELS INCLUDED IN EXTRACTION REGION |
| 85TH DIMENSION | MEANS VALUE OF LUMINANCE VALUES OF PIXELS INCLUDED IN EXTRACTION REGION |
| 86TH DIMENSION | MEANS VALUE OF LUMINANCE VALUES OF PIXELS INCLUDED IN EXTRACTION REGION |
| 87TH DIMENSION | MEANS VALUE OF LUMINANCE VALUES OF PIXELS INCLUDED IN EXTRACTION REGION |
| 88TH DIMENSION | MEANS VALUE OF LUMINANCE VALUES OF PIXELS INCLUDED IN EXTRACTION REGION |
| 89TH DIMENSION | MEANS VALUE OF LUMINANCE VALUES OF PIXELS INCLUDED IN EXTRACTION REGION |
| 90TH DIMENSION | MEANS VALUE OF LUMINANCE VALUES OF PIXELS INCLUDED IN EXTRACTION REGION |
| 91TH DIMENSION | MEANS VALUE OF LUMINANCE VALUES OF PIXELS INCLUDED IN EXTRACTION REGION |
| 92TH DIMENSION | MEANS VALUE OF LUMINANCE VALUES OF PIXELS INCLUDED IN EXTRACTION REGION |
| 93TH DIMENSION | MEANS VALUE OF LUMINANCE VALUES OF PIXELS INCLUDED IN EXTRACTION REGION |
| 94TH DIMENSION | MEANS VALUE OF LUMINANCE VALUES OF PIXELS INCLUDED IN EXTRACTION REGION |
| 95TH DIMENSION | MEANS VALUE OF LUMINANCE VALUES OF PIXELS INCLUDED IN EXTRACTION REGION |
| 96TH DIMENSION | MEANS VALUE OF LUMINANCE VALUES OF PIXELS INCLUDED IN EXTRACTION REGION |
| 97TH DIMENSION | MEANS VALUE OF LUMINANCE VALUES OF PIXELS INCLUDED IN EXTRACTION REGION |
| 98TH DIMENSION | MEANS VALUE OF LUMINANCE VALUES OF PIXELS INCLUDED IN EXTRACTION REGION |
| 99TH DIMENSION | MEANS VALUE OF LUMINANCE VALUES OF PIXELS INCLUDED IN EXTRACTION REGION |
| 100TH DIMENSION | MEANS VALUE OF LUMINANCE VALUES OF PIXELS INCLUDED IN EXTRACTION REGION |
| 101TH DIMENSION | MEANS VALUE OF LUMINANCE VALUES OF PIXELS INCLUDED IN EXTRACTION REGION |
| 102TH DIMENSION | MEANS VALUE OF LUMINANCE VALUES OF PIXELS INCLUDED IN EXTRACTION REGION |
| 103TH DIMENSION | MEANS VALUE OF LUMINANCE VALUES OF PIXELS INCLUDED IN EXTRACTION REGION |
| 104TH DIMENSION | MEANS VALUE OF LUMINANCE VALUES OF PIXELS INCLUDED IN EXTRACTION REGION |
| 105TH DIMENSION | MEANS VALUE OF LUMINANCE VALUES OF PIXELS INCLUDED IN EXTRACTION REGION |
| 106TH DIMENSION | MEANS VALUE OF LUMINANCE VALUES OF PIXELS INCLUDED IN EXTRACTION REGION |
| 107TH DIMENSION | MEANS VALUE OF LUMINANCE VALUES OF PIXELS INCLUDED IN EXTRACTION REGION |
| 108TH DIMENSION | MEANS VALUE OF LUMINANCE VALUES OF PIXELS INCLUDED IN EXTRACTION REGION |
| 109TH DIMENSION | MEANS VALUE OF LUMINANCE VALUES OF PIXELS INCLUDED IN EXTRACTION REGION |
| 110TH DIMENSION | MEANS VALUE OF LUMINANCE VALUES OF PIXELS INCLUDED IN EXTRACTION REGION |
| 111TH DIMENSION | MEANS VALUE OF LUMINANCE VALUES OF PIXELS INCLUDED IN EXTRACTION REGION |
| 112TH DIMENSION | MEANS VALUE OF LUMINANCE VALUES OF PIXELS INCLUDED IN EXTRACTION REGION |
| 113TH DIMENSION | MEANS VALUE OF LUMINANCE VALUES OF PIXELS INCLUDED IN EXTRACTION REGION |
| 114TH DIMENSION | MEANS VALUE OF LUMINANCE VALUES OF PIXELS INCLUDED IN EXTRACTION REGION |
| 115TH DIMENSION | MEANS VALUE OF LUMINANCE VALUES OF PIXELS INCLUDED IN EXTRACTION REGION |
| 116TH DIMENSION | MEANS VALUE OF LUMINANCE VALUES OF PIXELS INCLUDED IN EXTRACTION REGION |
| 117TH DIMENSION | MEANS VALUE OF LUMINANCE VALUES OF PIXELS INCLUDED IN EXTRACTION REGION |
| 118TH DIMENSION | MEANS VALUE OF LUMINANCE VALUES OF PIXELS INCLUDED IN EXTRACTION REGION |
| 119TH DIMENSION | MEANS VALUE OF LUMINANCE VALUES OF PIXELS INCLUDED IN EXTRACTION REGION |
| 120TH DIMENSION | MEANS VALUE OF LUMINANCE VALUES OF PIXELS INCLUDED IN EXTRACTION REGION |

FIG. 15-c

| | |
|---|---|
| 121TH DIMENSION | MEANS VALUE OF LUMINANCE VALUES OF PIXELS INCLUDED IN EXTRACTION REGION |
| 122TH DIMENSION | MEANS VALUE OF LUMINANCE VALUES OF PIXELS INCLUDED IN EXTRACTION REGION |
| 123TH DIMENSION | MEANS VALUE OF LUMINANCE VALUES OF PIXELS INCLUDED IN EXTRACTION REGION |
| 124TH DIMENSION | MEANS VALUE OF LUMINANCE VALUES OF PIXELS INCLUDED IN EXTRACTION REGION |
| 125TH DIMENSION | MEANS VALUE OF LUMINANCE VALUES OF PIXELS INCLUDED IN EXTRACTION REGION |
| 126TH DIMENSION | MEANS VALUE OF LUMINANCE VALUES OF PIXELS INCLUDED IN EXTRACTION REGION |
| 127TH DIMENSION | MEANS VALUE OF LUMINANCE VALUES OF PIXELS INCLUDED IN EXTRACTION REGION |
| 128TH DIMENSION | MEANS VALUE OF LUMINANCE VALUES OF PIXELS INCLUDED IN EXTRACTION REGION |
| 129TH DIMENSION | MEANS VALUE OF LUMINANCE VALUES OF PIXELS INCLUDED IN EXTRACTION REGION |
| 130TH DIMENSION | MEANS VALUE OF LUMINANCE VALUES OF PIXELS INCLUDED IN EXTRACTION REGION |
| 131TH DIMENSION | MEANS VALUE OF LUMINANCE VALUES OF PIXELS INCLUDED IN EXTRACTION REGION |
| 132TH DIMENSION | MEANS VALUE OF LUMINANCE VALUES OF PIXELS INCLUDED IN EXTRACTION REGION |
| 133TH DIMENSION | MEANS VALUE OF LUMINANCE VALUES OF PIXELS INCLUDED IN EXTRACTION REGION |
| 134TH DIMENSION | MEANS VALUE OF LUMINANCE VALUES OF PIXELS INCLUDED IN EXTRACTION REGION |
| 135TH DIMENSION | MEANS VALUE OF LUMINANCE VALUES OF PIXELS INCLUDED IN EXTRACTION REGION |
| 136TH DIMENSION | MEANS VALUE OF LUMINANCE VALUES OF PIXELS INCLUDED IN EXTRACTION REGION |
| 137TH DIMENSION | MEANS VALUE OF LUMINANCE VALUES OF PIXELS INCLUDED IN EXTRACTION REGION |
| 138TH DIMENSION | MEANS VALUE OF LUMINANCE VALUES OF PIXELS INCLUDED IN EXTRACTION REGION |
| 139TH DIMENSION | MEANS VALUE OF LUMINANCE VALUES OF PIXELS INCLUDED IN EXTRACTION REGION |
| 140TH DIMENSION | MEANS VALUE OF LUMINANCE VALUES OF PIXELS INCLUDED IN EXTRACTION REGION |
| 141TH DIMENSION | MEANS VALUE OF LUMINANCE VALUES OF PIXELS INCLUDED IN EXTRACTION REGION |
| 142TH DIMENSION | MEANS VALUE OF LUMINANCE VALUES OF PIXELS INCLUDED IN EXTRACTION REGION |
| 143TH DIMENSION | MEANS VALUE OF LUMINANCE VALUES OF PIXELS INCLUDED IN EXTRACTION REGION |
| 144TH DIMENSION | MEANS VALUE OF LUMINANCE VALUES OF PIXELS INCLUDED IN EXTRACTION REGION |
| 145TH DIMENSION | MEANS VALUE OF LUMINANCE VALUES OF PIXELS INCLUDED IN EXTRACTION REGION |
| 146TH DIMENSION | MEANS VALUE OF LUMINANCE VALUES OF PIXELS INCLUDED IN EXTRACTION REGION |
| 147TH DIMENSION | MEANS VALUE OF LUMINANCE VALUES OF PIXELS INCLUDED IN EXTRACTION REGION |
| 148TH DIMENSION | MEANS VALUE OF LUMINANCE VALUES OF PIXELS INCLUDED IN EXTRACTION REGION |
| 149TH DIMENSION | MEANS VALUE OF LUMINANCE VALUES OF PIXELS INCLUDED IN EXTRACTION REGION |
| 150TH DIMENSION | MEANS VALUE OF LUMINANCE VALUES OF PIXELS INCLUDED IN EXTRACTION REGION |
| 151TH DIMENSION | MEANS VALUE OF LUMINANCE VALUES OF PIXELS INCLUDED IN EXTRACTION REGION |
| 152TH DIMENSION | MEANS VALUE OF LUMINANCE VALUES OF PIXELS INCLUDED IN EXTRACTION REGION |
| 153TH DIMENSION | MEANS VALUE OF LUMINANCE VALUES OF PIXELS INCLUDED IN EXTRACTION REGION |
| 154TH DIMENSION | MEANS VALUE OF LUMINANCE VALUES OF PIXELS INCLUDED IN EXTRACTION REGION |
| 155TH DIMENSION | MEANS VALUE OF LUMINANCE VALUES OF PIXELS INCLUDED IN EXTRACTION REGION |
| 156TH DIMENSION | MEANS VALUE OF LUMINANCE VALUES OF PIXELS INCLUDED IN EXTRACTION REGION |
| 157TH DIMENSION | MEANS VALUE OF LUMINANCE VALUES OF PIXELS INCLUDED IN EXTRACTION REGION |
| 158TH DIMENSION | MEANS VALUE OF LUMINANCE VALUES OF PIXELS INCLUDED IN EXTRACTION REGION |
| 159TH DIMENSION | MEANS VALUE OF LUMINANCE VALUES OF PIXELS INCLUDED IN EXTRACTION REGION |
| 160TH DIMENSION | MEANS VALUE OF LUMINANCE VALUES OF PIXELS INCLUDED IN EXTRACTION REGION |
| 161TH DIMENSION | MEANS VALUE OF LUMINANCE VALUES OF PIXELS INCLUDED IN EXTRACTION REGION |
| 162TH DIMENSION | MEANS VALUE OF LUMINANCE VALUES OF PIXELS INCLUDED IN EXTRACTION REGION |
| 163TH DIMENSION | MEANS VALUE OF LUMINANCE VALUES OF PIXELS INCLUDED IN EXTRACTION REGION |
| 164TH DIMENSION | MEANS VALUE OF LUMINANCE VALUES OF PIXELS INCLUDED IN EXTRACTION REGION |
| 165TH DIMENSION | MEANS VALUE OF LUMINANCE VALUES OF PIXELS INCLUDED IN EXTRACTION REGION |
| 166TH DIMENSION | MEANS VALUE OF LUMINANCE VALUES OF PIXELS INCLUDED IN EXTRACTION REGION |
| 167TH DIMENSION | MEANS VALUE OF LUMINANCE VALUES OF PIXELS INCLUDED IN EXTRACTION REGION |
| 168TH DIMENSION | MEANS VALUE OF LUMINANCE VALUES OF PIXELS INCLUDED IN EXTRACTION REGION |
| 169TH DIMENSION | MEANS VALUE OF LUMINANCE VALUES OF PIXELS INCLUDED IN EXTRACTION REGION |
| 170TH DIMENSION | MEANS VALUE OF LUMINANCE VALUES OF PIXELS INCLUDED IN EXTRACTION REGION |
| 171TH DIMENSION | MEANS VALUE OF LUMINANCE VALUES OF PIXELS INCLUDED IN EXTRACTION REGION |
| 172TH DIMENSION | MEANS VALUE OF LUMINANCE VALUES OF PIXELS INCLUDED IN EXTRACTION REGION |
| 173TH DIMENSION | MEANS VALUE OF LUMINANCE VALUES OF PIXELS INCLUDED IN EXTRACTION REGION |
| 174TH DIMENSION | MEANS VALUE OF LUMINANCE VALUES OF PIXELS INCLUDED IN EXTRACTION REGION |
| 175TH DIMENSION | MEANS VALUE OF LUMINANCE VALUES OF PIXELS INCLUDED IN EXTRACTION REGION |
| 176TH DIMENSION | MEANS VALUE OF LUMINANCE VALUES OF PIXELS INCLUDED IN EXTRACTION REGION |
| 177TH DIMENSION | MEANS VALUE OF LUMINANCE VALUES OF PIXELS INCLUDED IN EXTRACTION REGION |
| 178TH DIMENSION | MEANS VALUE OF LUMINANCE VALUES OF PIXELS INCLUDED IN EXTRACTION REGION |
| 179TH DIMENSION | MEANS VALUE OF LUMINANCE VALUES OF PIXELS INCLUDED IN EXTRACTION REGION |
| 180TH DIMENSION | MEANS VALUE OF LUMINANCE VALUES OF PIXELS INCLUDED IN EXTRACTION REGION |

FIG. 15-d

| | |
|---|---|
| 181TH DIMENSION | MEANS VALUE OF LUMINANCE VALUES OF PIXELS INCLUDED IN EXTRACTION REGION |
| 182TH DIMENSION | MEANS VALUE OF LUMINANCE VALUES OF PIXELS INCLUDED IN EXTRACTION REGION |
| 183TH DIMENSION | MEANS VALUE OF LUMINANCE VALUES OF PIXELS INCLUDED IN EXTRACTION REGION |
| 184TH DIMENSION | MEANS VALUE OF LUMINANCE VALUES OF PIXELS INCLUDED IN EXTRACTION REGION |
| 185TH DIMENSION | MEANS VALUE OF LUMINANCE VALUES OF PIXELS INCLUDED IN EXTRACTION REGION |
| 186TH DIMENSION | MEANS VALUE OF LUMINANCE VALUES OF PIXELS INCLUDED IN EXTRACTION REGION |
| 187TH DIMENSION | MEANS VALUE OF LUMINANCE VALUES OF PIXELS INCLUDED IN EXTRACTION REGION |
| 188TH DIMENSION | MEANS VALUE OF LUMINANCE VALUES OF PIXELS INCLUDED IN EXTRACTION REGION |
| 189TH DIMENSION | MEANS VALUE OF LUMINANCE VALUES OF PIXELS INCLUDED IN EXTRACTION REGION |
| 190TH DIMENSION | MEANS VALUE OF LUMINANCE VALUES OF PIXELS INCLUDED IN EXTRACTION REGION |
| 191TH DIMENSION | MEANS VALUE OF LUMINANCE VALUES OF PIXELS INCLUDED IN EXTRACTION REGION |
| 192TH DIMENSION | MEANS VALUE OF LUMINANCE VALUES OF PIXELS INCLUDED IN EXTRACTION REGION |
| 193TH DIMENSION | MEANS VALUE OF LUMINANCE VALUES OF PIXELS INCLUDED IN EXTRACTION REGION |
| 194TH DIMENSION | MEANS VALUE OF LUMINANCE VALUES OF PIXELS INCLUDED IN EXTRACTION REGION |
| 195TH DIMENSION | MEANS VALUE OF LUMINANCE VALUES OF PIXELS INCLUDED IN EXTRACTION REGION |
| 196TH DIMENSION | MEANS VALUE OF LUMINANCE VALUES OF PIXELS INCLUDED IN EXTRACTION REGION |
| 197TH DIMENSION | MEANS VALUE OF LUMINANCE VALUES OF PIXELS INCLUDED IN EXTRACTION REGION |
| 198TH DIMENSION | MEANS VALUE OF LUMINANCE VALUES OF PIXELS INCLUDED IN EXTRACTION REGION |
| 199TH DIMENSION | MEANS VALUE OF LUMINANCE VALUES OF PIXELS INCLUDED IN EXTRACTION REGION |
| 200TH DIMENSION | MEANS VALUE OF LUMINANCE VALUES OF PIXELS INCLUDED IN EXTRACTION REGION |
| 201TH DIMENSION | MEANS VALUE OF LUMINANCE VALUES OF PIXELS INCLUDED IN EXTRACTION REGION |
| 202TH DIMENSION | MEANS VALUE OF LUMINANCE VALUES OF PIXELS INCLUDED IN EXTRACTION REGION |
| 203TH DIMENSION | MEANS VALUE OF LUMINANCE VALUES OF PIXELS INCLUDED IN EXTRACTION REGION |
| 204TH DIMENSION | MEANS VALUE OF LUMINANCE VALUES OF PIXELS INCLUDED IN EXTRACTION REGION |
| 205TH DIMENSION | MEANS VALUE OF LUMINANCE VALUES OF PIXELS INCLUDED IN EXTRACTION REGION |
| 206TH DIMENSION | MEANS VALUE OF LUMINANCE VALUES OF PIXELS INCLUDED IN EXTRACTION REGION |
| 207TH DIMENSION | MEANS VALUE OF LUMINANCE VALUES OF PIXELS INCLUDED IN EXTRACTION REGION |
| 208TH DIMENSION | MEANS VALUE OF LUMINANCE VALUES OF PIXELS INCLUDED IN EXTRACTION REGION |
| 209TH DIMENSION | MEANS VALUE OF LUMINANCE VALUES OF PIXELS INCLUDED IN EXTRACTION REGION |
| 210TH DIMENSION | MEANS VALUE OF LUMINANCE VALUES OF PIXELS INCLUDED IN EXTRACTION REGION |
| 211TH DIMENSION | MEANS VALUE OF LUMINANCE VALUES OF PIXELS INCLUDED IN EXTRACTION REGION |
| 212TH DIMENSION | MEANS VALUE OF LUMINANCE VALUES OF PIXELS INCLUDED IN EXTRACTION REGION |
| 213TH DIMENSION | MEANS VALUE OF LUMINANCE VALUES OF PIXELS INCLUDED IN EXTRACTION REGION |
| 214TH DIMENSION | MEANS VALUE OF LUMINANCE VALUES OF PIXELS INCLUDED IN EXTRACTION REGION |
| 215TH DIMENSION | MEANS VALUE OF LUMINANCE VALUES OF PIXELS INCLUDED IN EXTRACTION REGION |
| 216TH DIMENSION | MEANS VALUE OF LUMINANCE VALUES OF PIXELS INCLUDED IN EXTRACTION REGION |
| 217TH DIMENSION | MEANS VALUE OF LUMINANCE VALUES OF PIXELS INCLUDED IN EXTRACTION REGION |
| 218TH DIMENSION | MEANS VALUE OF LUMINANCE VALUES OF PIXELS INCLUDED IN EXTRACTION REGION |
| 219TH DIMENSION | MEANS VALUE OF LUMINANCE VALUES OF PIXELS INCLUDED IN EXTRACTION REGION |
| 220TH DIMENSION | MEANS VALUE OF LUMINANCE VALUES OF PIXELS INCLUDED IN EXTRACTION REGION |
| 221TH DIMENSION | MEANS VALUE OF LUMINANCE VALUES OF PIXELS INCLUDED IN EXTRACTION REGION |
| 222TH DIMENSION | MEANS VALUE OF LUMINANCE VALUES OF PIXELS INCLUDED IN EXTRACTION REGION |
| 223TH DIMENSION | MEANS VALUE OF LUMINANCE VALUES OF PIXELS INCLUDED IN EXTRACTION REGION |
| 224TH DIMENSION | MEANS VALUE OF LUMINANCE VALUES OF PIXELS INCLUDED IN EXTRACTION REGION |
| 225TH DIMENSION | MEANS VALUE OF LUMINANCE VALUES OF PIXELS INCLUDED IN EXTRACTION REGION |
| 226TH DIMENSION | MEANS VALUE OF LUMINANCE VALUES OF PIXELS INCLUDED IN EXTRACTION REGION |
| 227TH DIMENSION | MEANS VALUE OF LUMINANCE VALUES OF PIXELS INCLUDED IN EXTRACTION REGION |
| 228TH DIMENSION | MEANS VALUE OF LUMINANCE VALUES OF PIXELS INCLUDED IN EXTRACTION REGION |
| 229TH DIMENSION | MEANS VALUE OF LUMINANCE VALUES OF PIXELS INCLUDED IN EXTRACTION REGION |
| 230TH DIMENSION | MEANS VALUE OF LUMINANCE VALUES OF PIXELS INCLUDED IN EXTRACTION REGION |
| 231TH DIMENSION | MEANS VALUE OF LUMINANCE VALUES OF PIXELS INCLUDED IN EXTRACTION REGION |
| 232TH DIMENSION | MEANS VALUE OF LUMINANCE VALUES OF PIXELS INCLUDED IN EXTRACTION REGION |
| 233TH DIMENSION | MEANS VALUE OF LUMINANCE VALUES OF PIXELS INCLUDED IN EXTRACTION REGION |
| 234TH DIMENSION | MEANS VALUE OF LUMINANCE VALUES OF PIXELS INCLUDED IN EXTRACTION REGION |
| 235TH DIMENSION | MEANS VALUE OF LUMINANCE VALUES OF PIXELS INCLUDED IN EXTRACTION REGION |
| 236TH DIMENSION | MEANS VALUE OF LUMINANCE VALUES OF PIXELS INCLUDED IN EXTRACTION REGION |
| 237TH DIMENSION | MEANS VALUE OF LUMINANCE VALUES OF PIXELS INCLUDED IN EXTRACTION REGION |
| 238TH DIMENSION | MEANS VALUE OF LUMINANCE VALUES OF PIXELS INCLUDED IN EXTRACTION REGION |
| 239TH DIMENSION | MEANS VALUE OF LUMINANCE VALUES OF PIXELS INCLUDED IN EXTRACTION REGION |
| 240TH DIMENSION | MEANS VALUE OF LUMINANCE VALUES OF PIXELS INCLUDED IN EXTRACTION REGION |

FIG. 15-e

| | |
|---|---|
| 241TH DIMENSION | MEANS VALUE OF LUMINANCE VALUES OF PIXELS INCLUDED IN EXTRACTION REGION |
| 242TH DIMENSION | MEANS VALUE OF LUMINANCE VALUES OF PIXELS INCLUDED IN EXTRACTION REGION |
| 243TH DIMENSION | MEANS VALUE OF LUMINANCE VALUES OF PIXELS INCLUDED IN EXTRACTION REGION |
| 244TH DIMENSION | MEANS VALUE OF LUMINANCE VALUES OF PIXELS INCLUDED IN EXTRACTION REGION |
| 245TH DIMENSION | MEANS VALUE OF LUMINANCE VALUES OF PIXELS INCLUDED IN EXTRACTION REGION |
| 246TH DIMENSION | MEANS VALUE OF LUMINANCE VALUES OF PIXELS INCLUDED IN EXTRACTION REGION |
| 247TH DIMENSION | MEANS VALUE OF LUMINANCE VALUES OF PIXELS INCLUDED IN EXTRACTION REGION |
| 248TH DIMENSION | MEANS VALUE OF LUMINANCE VALUES OF PIXELS INCLUDED IN EXTRACTION REGION |
| 249TH DIMENSION | MEANS VALUE OF LUMINANCE VALUES OF PIXELS INCLUDED IN EXTRACTION REGION |
| 250TH DIMENSION | MEANS VALUE OF LUMINANCE VALUES OF PIXELS INCLUDED IN EXTRACTION REGION |
| 251TH DIMENSION | MEANS VALUE OF LUMINANCE VALUES OF PIXELS INCLUDED IN EXTRACTION REGION |
| 252TH DIMENSION | MEANS VALUE OF LUMINANCE VALUES OF PIXELS INCLUDED IN EXTRACTION REGION |
| 253TH DIMENSION | MEANS VALUE OF LUMINANCE VALUES OF PIXELS INCLUDED IN EXTRACTION REGION |
| 254TH DIMENSION | MEANS VALUE OF LUMINANCE VALUES OF PIXELS INCLUDED IN EXTRACTION REGION |
| 255TH DIMENSION | MEANS VALUE OF LUMINANCE VALUES OF PIXELS INCLUDED IN EXTRACTION REGION |
| 256TH DIMENSION | MEANS VALUE OF LUMINANCE VALUES OF PIXELS INCLUDED IN EXTRACTION REGION |
| 257TH DIMENSION | MEANS VALUE OF LUMINANCE VALUES OF PIXELS INCLUDED IN EXTRACTION REGION |
| 258TH DIMENSION | MEANS VALUE OF LUMINANCE VALUES OF PIXELS INCLUDED IN EXTRACTION REGION |
| 259TH DIMENSION | MEANS VALUE OF LUMINANCE VALUES OF PIXELS INCLUDED IN EXTRACTION REGION |
| 260TH DIMENSION | MEANS VALUE OF LUMINANCE VALUES OF PIXELS INCLUDED IN EXTRACTION REGION |
| 261TH DIMENSION | MEANS VALUE OF LUMINANCE VALUES OF PIXELS INCLUDED IN EXTRACTION REGION |
| 262TH DIMENSION | MEANS VALUE OF LUMINANCE VALUES OF PIXELS INCLUDED IN EXTRACTION REGION |
| 263TH DIMENSION | MEANS VALUE OF LUMINANCE VALUES OF PIXELS INCLUDED IN EXTRACTION REGION |
| 264TH DIMENSION | MEANS VALUE OF LUMINANCE VALUES OF PIXELS INCLUDED IN EXTRACTION REGION |
| 265TH DIMENSION | MEANS VALUE OF LUMINANCE VALUES OF PIXELS INCLUDED IN EXTRACTION REGION |
| 266TH DIMENSION | MEANS VALUE OF LUMINANCE VALUES OF PIXELS INCLUDED IN EXTRACTION REGION |
| 267TH DIMENSION | MEANS VALUE OF LUMINANCE VALUES OF PIXELS INCLUDED IN EXTRACTION REGION |
| 268TH DIMENSION | MEANS VALUE OF LUMINANCE VALUES OF PIXELS INCLUDED IN EXTRACTION REGION |
| 269TH DIMENSION | MEANS VALUE OF LUMINANCE VALUES OF PIXELS INCLUDED IN EXTRACTION REGION |
| 270TH DIMENSION | MEANS VALUE OF LUMINANCE VALUES OF PIXELS INCLUDED IN EXTRACTION REGION |
| 271TH DIMENSION | MEANS VALUE OF LUMINANCE VALUES OF PIXELS INCLUDED IN EXTRACTION REGION |
| 272TH DIMENSION | MEANS VALUE OF LUMINANCE VALUES OF PIXELS INCLUDED IN EXTRACTION REGION |
| 273TH DIMENSION | MEANS VALUE OF LUMINANCE VALUES OF PIXELS INCLUDED IN EXTRACTION REGION |
| 274TH DIMENSION | MEANS VALUE OF LUMINANCE VALUES OF PIXELS INCLUDED IN EXTRACTION REGION |
| 275TH DIMENSION | MEANS VALUE OF LUMINANCE VALUES OF PIXELS INCLUDED IN EXTRACTION REGION |
| 276TH DIMENSION | MEANS VALUE OF LUMINANCE VALUES OF PIXELS INCLUDED IN EXTRACTION REGION |
| 277TH DIMENSION | MEANS VALUE OF LUMINANCE VALUES OF PIXELS INCLUDED IN EXTRACTION REGION |
| 278TH DIMENSION | MEANS VALUE OF LUMINANCE VALUES OF PIXELS INCLUDED IN EXTRACTION REGION |
| 279TH DIMENSION | MEANS VALUE OF LUMINANCE VALUES OF PIXELS INCLUDED IN EXTRACTION REGION |
| 280TH DIMENSION | MEANS VALUE OF LUMINANCE VALUES OF PIXELS INCLUDED IN EXTRACTION REGION |
| 281TH DIMENSION | MEANS VALUE OF LUMINANCE VALUES OF PIXELS INCLUDED IN EXTRACTION REGION |
| 282TH DIMENSION | MEANS VALUE OF LUMINANCE VALUES OF PIXELS INCLUDED IN EXTRACTION REGION |
| 283TH DIMENSION | MEANS VALUE OF LUMINANCE VALUES OF PIXELS INCLUDED IN EXTRACTION REGION |
| 284TH DIMENSION | MEANS VALUE OF LUMINANCE VALUES OF PIXELS INCLUDED IN EXTRACTION REGION |
| 285TH DIMENSION | MEANS VALUE OF LUMINANCE VALUES OF PIXELS INCLUDED IN EXTRACTION REGION |
| 286TH DIMENSION | MEANS VALUE OF LUMINANCE VALUES OF PIXELS INCLUDED IN EXTRACTION REGION |
| 287TH DIMENSION | MEANS VALUE OF LUMINANCE VALUES OF PIXELS INCLUDED IN EXTRACTION REGION |
| 288TH DIMENSION | MEANS VALUE OF LUMINANCE VALUES OF PIXELS INCLUDED IN EXTRACTION REGION |
| 289TH DIMENSION | MEANS VALUE OF LUMINANCE VALUES OF PIXELS INCLUDED IN EXTRACTION REGION |
| 290TH DIMENSION | MEANS VALUE OF LUMINANCE VALUES OF PIXELS INCLUDED IN EXTRACTION REGION |
| 291TH DIMENSION | MEANS VALUE OF LUMINANCE VALUES OF PIXELS INCLUDED IN EXTRACTION REGION |
| 292TH DIMENSION | MEANS VALUE OF LUMINANCE VALUES OF PIXELS INCLUDED IN EXTRACTION REGION |
| 293TH DIMENSION | MEANS VALUE OF LUMINANCE VALUES OF PIXELS INCLUDED IN EXTRACTION REGION |
| 294TH DIMENSION | MEANS VALUE OF LUMINANCE VALUES OF PIXELS INCLUDED IN EXTRACTION REGION |
| 295TH DIMENSION | MEANS VALUE OF LUMINANCE VALUES OF PIXELS INCLUDED IN EXTRACTION REGION |
| 296TH DIMENSION | MEANS VALUE OF LUMINANCE VALUES OF PIXELS INCLUDED IN EXTRACTION REGION |
| 297TH DIMENSION | MEANS VALUE OF LUMINANCE VALUES OF PIXELS INCLUDED IN EXTRACTION REGION |
| 298TH DIMENSION | MEANS VALUE OF LUMINANCE VALUES OF PIXELS INCLUDED IN EXTRACTION REGION |
| 299TH DIMENSION | MEANS VALUE OF LUMINANCE VALUES OF PIXELS INCLUDED IN EXTRACTION REGION |
| 300TH DIMENSION | MEANS VALUE OF LUMINANCE VALUES OF PIXELS INCLUDED IN EXTRACTION REGION |

FIG. 16-a

| | |
|---|---|
| 1ST DIMENSION | MEANS VALUE OF LUMINANCE VALUES OF PIXELS INCLUDED IN EXTRACTION REGION |
| 2ND DIMENSION | MEANS VALUE OF LUMINANCE VALUES OF PIXELS INCLUDED IN EXTRACTION REGION |
| 3RD DIMENSION | MEANS VALUE OF LUMINANCE VALUES OF PIXELS INCLUDED IN EXTRACTION REGION |
| 4TH DIMENSION | PERCENTILE LUMINANCE VALUE FEATURE, Y(floor(N × 20.0/100)) |
| 5TH DIMENSION | MEANS VALUE OF LUMINANCE VALUES OF PIXELS INCLUDED IN EXTRACTION REGION |
| 6TH DIMENSION | MEANS VALUE OF LUMINANCE VALUES OF PIXELS INCLUDED IN EXTRACTION REGION |
| 7TH DIMENSION | MEANS VALUE OF LUMINANCE VALUES OF PIXELS INCLUDED IN EXTRACTION REGION |
| 8TH DIMENSION | PERCENTILE LUMINANCE VALUE FEATURE, Y(floor(N × 80.0/100)) |
| 9TH DIMENSION | MEANS VALUE OF LUMINANCE VALUES OF PIXELS INCLUDED IN EXTRACTION REGION |
| 10TH DIMENSION | MEANS VALUE OF LUMINANCE VALUES OF PIXELS INCLUDED IN EXTRACTION REGION |
| 11TH DIMENSION | MEANS VALUE OF LUMINANCE VALUES OF PIXELS INCLUDED IN EXTRACTION REGION |
| 12TH DIMENSION | PERCENTILE LUMINANCE VALUE FEATURE, Y(floor(N × 20.0/100)) |
| 13TH DIMENSION | MEANS VALUE OF LUMINANCE VALUES OF PIXELS INCLUDED IN EXTRACTION REGION |
| 14TH DIMENSION | MEANS VALUE OF LUMINANCE VALUES OF PIXELS INCLUDED IN EXTRACTION REGION |
| 15TH DIMENSION | MEANS VALUE OF LUMINANCE VALUES OF PIXELS INCLUDED IN EXTRACTION REGION |
| 16TH DIMENSION | PERCENTILE LUMINANCE VALUE FEATURE, Y(floor(N × 80.0/100)) |
| 17TH DIMENSION | MEANS VALUE OF LUMINANCE VALUES OF PIXELS INCLUDED IN EXTRACTION REGION |
| 18TH DIMENSION | MEANS VALUE OF LUMINANCE VALUES OF PIXELS INCLUDED IN EXTRACTION REGION |
| 19TH DIMENSION | MEANS VALUE OF LUMINANCE VALUES OF PIXELS INCLUDED IN EXTRACTION REGION |
| 20TH DIMENSION | PERCENTILE LUMINANCE VALUE FEATURE, Y(floor(N × 20.0/100)) |
| 21TH DIMENSION | MEANS VALUE OF LUMINANCE VALUES OF PIXELS INCLUDED IN EXTRACTION REGION |
| 22TH DIMENSION | MEANS VALUE OF LUMINANCE VALUES OF PIXELS INCLUDED IN EXTRACTION REGION |
| 23TH DIMENSION | MEANS VALUE OF LUMINANCE VALUES OF PIXELS INCLUDED IN EXTRACTION REGION |
| 24TH DIMENSION | PERCENTILE LUMINANCE VALUE FEATURE, Y(floor(N × 80.0/100)) |
| 25TH DIMENSION | MEANS VALUE OF LUMINANCE VALUES OF PIXELS INCLUDED IN EXTRACTION REGION |
| 26TH DIMENSION | MEANS VALUE OF LUMINANCE VALUES OF PIXELS INCLUDED IN EXTRACTION REGION |
| 27TH DIMENSION | MEANS VALUE OF LUMINANCE VALUES OF PIXELS INCLUDED IN EXTRACTION REGION |
| 28TH DIMENSION | PERCENTILE LUMINANCE VALUE FEATURE, Y(floor(N × 20.0/100)) |
| 29TH DIMENSION | MEANS VALUE OF LUMINANCE VALUES OF PIXELS INCLUDED IN EXTRACTION REGION |
| 30TH DIMENSION | MEANS VALUE OF LUMINANCE VALUES OF PIXELS INCLUDED IN EXTRACTION REGION |
| 31TH DIMENSION | MEANS VALUE OF LUMINANCE VALUES OF PIXELS INCLUDED IN EXTRACTION REGION |
| 32TH DIMENSION | PERCENTILE LUMINANCE VALUE FEATURE, Y(floor(N × 80.0/100)) |
| 33TH DIMENSION | MEANS VALUE OF LUMINANCE VALUES OF PIXELS INCLUDED IN EXTRACTION REGION |
| 34TH DIMENSION | MEANS VALUE OF LUMINANCE VALUES OF PIXELS INCLUDED IN EXTRACTION REGION |
| 35TH DIMENSION | MEANS VALUE OF LUMINANCE VALUES OF PIXELS INCLUDED IN EXTRACTION REGION |
| 36TH DIMENSION | PERCENTILE LUMINANCE VALUE FEATURE, Y(floor(N × 20.0/100)) |
| 37TH DIMENSION | MEANS VALUE OF LUMINANCE VALUES OF PIXELS INCLUDED IN EXTRACTION REGION |
| 38TH DIMENSION | MEANS VALUE OF LUMINANCE VALUES OF PIXELS INCLUDED IN EXTRACTION REGION |
| 39TH DIMENSION | MEANS VALUE OF LUMINANCE VALUES OF PIXELS INCLUDED IN EXTRACTION REGION |
| 40TH DIMENSION | PERCENTILE LUMINANCE VALUE FEATURE, Y(floor(N × 80.0/100)) |
| 41TH DIMENSION | MEANS VALUE OF LUMINANCE VALUES OF PIXELS INCLUDED IN EXTRACTION REGION |
| 42TH DIMENSION | MEANS VALUE OF LUMINANCE VALUES OF PIXELS INCLUDED IN EXTRACTION REGION |
| 43TH DIMENSION | MEANS VALUE OF LUMINANCE VALUES OF PIXELS INCLUDED IN EXTRACTION REGION |
| 44TH DIMENSION | PERCENTILE LUMINANCE VALUE FEATURE, Y(floor(N × 20.0/100)) |
| 45TH DIMENSION | MEANS VALUE OF LUMINANCE VALUES OF PIXELS INCLUDED IN EXTRACTION REGION |
| 46TH DIMENSION | MEANS VALUE OF LUMINANCE VALUES OF PIXELS INCLUDED IN EXTRACTION REGION |
| 47TH DIMENSION | MEANS VALUE OF LUMINANCE VALUES OF PIXELS INCLUDED IN EXTRACTION REGION |
| 48TH DIMENSION | PERCENTILE LUMINANCE VALUE FEATURE, Y(floor(N × 80.0/100)) |
| 49TH DIMENSION | MEANS VALUE OF LUMINANCE VALUES OF PIXELS INCLUDED IN EXTRACTION REGION |
| 50TH DIMENSION | MEANS VALUE OF LUMINANCE VALUES OF PIXELS INCLUDED IN EXTRACTION REGION |
| 51TH DIMENSION | MEANS VALUE OF LUMINANCE VALUES OF PIXELS INCLUDED IN EXTRACTION REGION |
| 52TH DIMENSION | PERCENTILE LUMINANCE VALUE FEATURE, Y(floor(N × 20.0/100)) |
| 53TH DIMENSION | MEANS VALUE OF LUMINANCE VALUES OF PIXELS INCLUDED IN EXTRACTION REGION |
| 54TH DIMENSION | MEANS VALUE OF LUMINANCE VALUES OF PIXELS INCLUDED IN EXTRACTION REGION |
| 55TH DIMENSION | MEANS VALUE OF LUMINANCE VALUES OF PIXELS INCLUDED IN EXTRACTION REGION |
| 56TH DIMENSION | PERCENTILE LUMINANCE VALUE FEATURE, Y(floor(N × 80.0/100)) |
| 57TH DIMENSION | MEANS VALUE OF LUMINANCE VALUES OF PIXELS INCLUDED IN EXTRACTION REGION |
| 58TH DIMENSION | MEANS VALUE OF LUMINANCE VALUES OF PIXELS INCLUDED IN EXTRACTION REGION |
| 59TH DIMENSION | MEANS VALUE OF LUMINANCE VALUES OF PIXELS INCLUDED IN EXTRACTION REGION |
| 60TH DIMENSION | PERCENTILE LUMINANCE VALUE FEATURE, Y(floor(N × 20.0/100)) |

FIG. 16-b

| | |
|---|---|
| 61TH DIMENSION | MEANS VALUE OF LUMINANCE VALUES OF PIXELS INCLUDED IN EXTRACTION REGION |
| 62TH DIMENSION | MEANS VALUE OF LUMINANCE VALUES OF PIXELS INCLUDED IN EXTRACTION REGION |
| 63TH DIMENSION | MEANS VALUE OF LUMINANCE VALUES OF PIXELS INCLUDED IN EXTRACTION REGION |
| 64TH DIMENSION | PERCENTILE LUMINANCE VALUE FEATURE, Y(floor(N × 80.0/100)) |
| 65TH DIMENSION | MEANS VALUE OF LUMINANCE VALUES OF PIXELS INCLUDED IN EXTRACTION REGION |
| 66TH DIMENSION | MEANS VALUE OF LUMINANCE VALUES OF PIXELS INCLUDED IN EXTRACTION REGION |
| 67TH DIMENSION | MEANS VALUE OF LUMINANCE VALUES OF PIXELS INCLUDED IN EXTRACTION REGION |
| 68TH DIMENSION | PERCENTILE LUMINANCE VALUE FEATURE, Y(floor(N × 20.0/100)) |
| 69TH DIMENSION | MEANS VALUE OF LUMINANCE VALUES OF PIXELS INCLUDED IN EXTRACTION REGION |
| 70TH DIMENSION | MEANS VALUE OF LUMINANCE VALUES OF PIXELS INCLUDED IN EXTRACTION REGION |
| 71TH DIMENSION | MEANS VALUE OF LUMINANCE VALUES OF PIXELS INCLUDED IN EXTRACTION REGION |
| 72TH DIMENSION | PERCENTILE LUMINANCE VALUE FEATURE, Y(floor(N × 80.0/100)) |
| 73TH DIMENSION | MEANS VALUE OF LUMINANCE VALUES OF PIXELS INCLUDED IN EXTRACTION REGION |
| 74TH DIMENSION | MEANS VALUE OF LUMINANCE VALUES OF PIXELS INCLUDED IN EXTRACTION REGION |
| 75TH DIMENSION | MEANS VALUE OF LUMINANCE VALUES OF PIXELS INCLUDED IN EXTRACTION REGION |
| 76TH DIMENSION | PERCENTILE LUMINANCE VALUE FEATURE, Y(floor(N × 20.0/100)) |
| 77TH DIMENSION | MEANS VALUE OF LUMINANCE VALUES OF PIXELS INCLUDED IN EXTRACTION REGION |
| 78TH DIMENSION | MEANS VALUE OF LUMINANCE VALUES OF PIXELS INCLUDED IN EXTRACTION REGION |
| 79TH DIMENSION | MEANS VALUE OF LUMINANCE VALUES OF PIXELS INCLUDED IN EXTRACTION REGION |
| 80TH DIMENSION | PERCENTILE LUMINANCE VALUE FEATURE, Y(floor(N × 80.0/100)) |
| 81TH DIMENSION | MEANS VALUE OF LUMINANCE VALUES OF PIXELS INCLUDED IN EXTRACTION REGION |
| 82TH DIMENSION | MEANS VALUE OF LUMINANCE VALUES OF PIXELS INCLUDED IN EXTRACTION REGION |
| 83TH DIMENSION | MEANS VALUE OF LUMINANCE VALUES OF PIXELS INCLUDED IN EXTRACTION REGION |
| 84TH DIMENSION | PERCENTILE LUMINANCE VALUE FEATURE, Y(floor(N × 20.0/100)) |
| 85TH DIMENSION | MEANS VALUE OF LUMINANCE VALUES OF PIXELS INCLUDED IN EXTRACTION REGION |
| 86TH DIMENSION | MEANS VALUE OF LUMINANCE VALUES OF PIXELS INCLUDED IN EXTRACTION REGION |
| 87TH DIMENSION | MEANS VALUE OF LUMINANCE VALUES OF PIXELS INCLUDED IN EXTRACTION REGION |
| 88TH DIMENSION | PERCENTILE LUMINANCE VALUE FEATURE, Y(floor(N × 80.0/100)) |
| 89TH DIMENSION | MEANS VALUE OF LUMINANCE VALUES OF PIXELS INCLUDED IN EXTRACTION REGION |
| 90TH DIMENSION | MEANS VALUE OF LUMINANCE VALUES OF PIXELS INCLUDED IN EXTRACTION REGION |
| 91TH DIMENSION | MEANS VALUE OF LUMINANCE VALUES OF PIXELS INCLUDED IN EXTRACTION REGION |
| 92TH DIMENSION | PERCENTILE LUMINANCE VALUE FEATURE, Y(floor(N × 20.0/100)) |
| 93TH DIMENSION | MEANS VALUE OF LUMINANCE VALUES OF PIXELS INCLUDED IN EXTRACTION REGION |
| 94TH DIMENSION | MEANS VALUE OF LUMINANCE VALUES OF PIXELS INCLUDED IN EXTRACTION REGION |
| 95TH DIMENSION | MEANS VALUE OF LUMINANCE VALUES OF PIXELS INCLUDED IN EXTRACTION REGION |
| 96TH DIMENSION | PERCENTILE LUMINANCE VALUE FEATURE, Y(floor(N × 80.0/100)) |
| 97TH DIMENSION | MEANS VALUE OF LUMINANCE VALUES OF PIXELS INCLUDED IN EXTRACTION REGION |
| 98TH DIMENSION | MEANS VALUE OF LUMINANCE VALUES OF PIXELS INCLUDED IN EXTRACTION REGION |
| 99TH DIMENSION | MEANS VALUE OF LUMINANCE VALUES OF PIXELS INCLUDED IN EXTRACTION REGION |
| 100TH DIMENSION | PERCENTILE LUMINANCE VALUE FEATURE, Y(floor(N × 20.0/100)) |
| 101TH DIMENSION | MEANS VALUE OF LUMINANCE VALUES OF PIXELS INCLUDED IN EXTRACTION REGION |
| 102TH DIMENSION | MEANS VALUE OF LUMINANCE VALUES OF PIXELS INCLUDED IN EXTRACTION REGION |
| 103TH DIMENSION | MEANS VALUE OF LUMINANCE VALUES OF PIXELS INCLUDED IN EXTRACTION REGION |
| 104TH DIMENSION | PERCENTILE LUMINANCE VALUE FEATURE, Y(floor(N × 80.0/100)) |
| 105TH DIMENSION | MEANS VALUE OF LUMINANCE VALUES OF PIXELS INCLUDED IN EXTRACTION REGION |
| 106TH DIMENSION | MEANS VALUE OF LUMINANCE VALUES OF PIXELS INCLUDED IN EXTRACTION REGION |
| 107TH DIMENSION | MEANS VALUE OF LUMINANCE VALUES OF PIXELS INCLUDED IN EXTRACTION REGION |
| 108TH DIMENSION | PERCENTILE LUMINANCE VALUE FEATURE, Y(floor(N × 20.0/100)) |
| 109TH DIMENSION | MEANS VALUE OF LUMINANCE VALUES OF PIXELS INCLUDED IN EXTRACTION REGION |
| 110TH DIMENSION | MEANS VALUE OF LUMINANCE VALUES OF PIXELS INCLUDED IN EXTRACTION REGION |
| 111TH DIMENSION | MEANS VALUE OF LUMINANCE VALUES OF PIXELS INCLUDED IN EXTRACTION REGION |
| 112TH DIMENSION | PERCENTILE LUMINANCE VALUE FEATURE, Y(floor(N × 80.0/100)) |
| 113TH DIMENSION | MEANS VALUE OF LUMINANCE VALUES OF PIXELS INCLUDED IN EXTRACTION REGION |
| 114TH DIMENSION | MEANS VALUE OF LUMINANCE VALUES OF PIXELS INCLUDED IN EXTRACTION REGION |
| 115TH DIMENSION | MEANS VALUE OF LUMINANCE VALUES OF PIXELS INCLUDED IN EXTRACTION REGION |
| 116TH DIMENSION | PERCENTILE LUMINANCE VALUE FEATURE, Y(floor(N × 20.0/100)) |
| 117TH DIMENSION | MEANS VALUE OF LUMINANCE VALUES OF PIXELS INCLUDED IN EXTRACTION REGION |
| 118TH DIMENSION | MEANS VALUE OF LUMINANCE VALUES OF PIXELS INCLUDED IN EXTRACTION REGION |
| 119TH DIMENSION | MEANS VALUE OF LUMINANCE VALUES OF PIXELS INCLUDED IN EXTRACTION REGION |
| 120TH DIMENSION | PERCENTILE LUMINANCE VALUE FEATURE, Y(floor(N × 80.0/100)) |

FIG. 16-c

| | |
|---|---|
| 121TH DIMENSION | MEANS VALUE OF LUMINANCE VALUES OF PIXELS INCLUDED IN EXTRACTION REGION |
| 122TH DIMENSION | MEANS VALUE OF LUMINANCE VALUES OF PIXELS INCLUDED IN EXTRACTION REGION |
| 123TH DIMENSION | MEANS VALUE OF LUMINANCE VALUES OF PIXELS INCLUDED IN EXTRACTION REGION |
| 124TH DIMENSION | PERCENTILE LUMINANCE VALUE FEATURE, Y(floor(N × 20.0/100)) |
| 125TH DIMENSION | MEANS VALUE OF LUMINANCE VALUES OF PIXELS INCLUDED IN EXTRACTION REGION |
| 126TH DIMENSION | MEANS VALUE OF LUMINANCE VALUES OF PIXELS INCLUDED IN EXTRACTION REGION |
| 127TH DIMENSION | MEANS VALUE OF LUMINANCE VALUES OF PIXELS INCLUDED IN EXTRACTION REGION |
| 128TH DIMENSION | PERCENTILE LUMINANCE VALUE FEATURE, Y(floor(N × 80.0/100)) |
| 129TH DIMENSION | MEANS VALUE OF LUMINANCE VALUES OF PIXELS INCLUDED IN EXTRACTION REGION |
| 130TH DIMENSION | MEANS VALUE OF LUMINANCE VALUES OF PIXELS INCLUDED IN EXTRACTION REGION |
| 131TH DIMENSION | MEANS VALUE OF LUMINANCE VALUES OF PIXELS INCLUDED IN EXTRACTION REGION |
| 132TH DIMENSION | PERCENTILE LUMINANCE VALUE FEATURE, Y(floor(N × 20.0/100)) |
| 133TH DIMENSION | MEANS VALUE OF LUMINANCE VALUES OF PIXELS INCLUDED IN EXTRACTION REGION |
| 134TH DIMENSION | MEANS VALUE OF LUMINANCE VALUES OF PIXELS INCLUDED IN EXTRACTION REGION |
| 135TH DIMENSION | MEANS VALUE OF LUMINANCE VALUES OF PIXELS INCLUDED IN EXTRACTION REGION |
| 136TH DIMENSION | PERCENTILE LUMINANCE VALUE FEATURE, Y(floor(N × 80.0/100)) |
| 137TH DIMENSION | MEANS VALUE OF LUMINANCE VALUES OF PIXELS INCLUDED IN EXTRACTION REGION |
| 138TH DIMENSION | MEANS VALUE OF LUMINANCE VALUES OF PIXELS INCLUDED IN EXTRACTION REGION |
| 139TH DIMENSION | MEANS VALUE OF LUMINANCE VALUES OF PIXELS INCLUDED IN EXTRACTION REGION |
| 140TH DIMENSION | PERCENTILE LUMINANCE VALUE FEATURE, Y(floor(N × 20.0/100)) |
| 141TH DIMENSION | MEANS VALUE OF LUMINANCE VALUES OF PIXELS INCLUDED IN EXTRACTION REGION |
| 142TH DIMENSION | MEANS VALUE OF LUMINANCE VALUES OF PIXELS INCLUDED IN EXTRACTION REGION |
| 143TH DIMENSION | MEANS VALUE OF LUMINANCE VALUES OF PIXELS INCLUDED IN EXTRACTION REGION |
| 144TH DIMENSION | PERCENTILE LUMINANCE VALUE FEATURE, Y(floor(N × 80.0/100)) |
| 145TH DIMENSION | MEANS VALUE OF LUMINANCE VALUES OF PIXELS INCLUDED IN EXTRACTION REGION |
| 146TH DIMENSION | MEANS VALUE OF LUMINANCE VALUES OF PIXELS INCLUDED IN EXTRACTION REGION |
| 147TH DIMENSION | MEANS VALUE OF LUMINANCE VALUES OF PIXELS INCLUDED IN EXTRACTION REGION |
| 148TH DIMENSION | PERCENTILE LUMINANCE VALUE FEATURE, Y(floor(N × 20.0/100)) |
| 149TH DIMENSION | MEANS VALUE OF LUMINANCE VALUES OF PIXELS INCLUDED IN EXTRACTION REGION |
| 150TH DIMENSION | MEANS VALUE OF LUMINANCE VALUES OF PIXELS INCLUDED IN EXTRACTION REGION |
| 151TH DIMENSION | MEANS VALUE OF LUMINANCE VALUES OF PIXELS INCLUDED IN EXTRACTION REGION |
| 152TH DIMENSION | PERCENTILE LUMINANCE VALUE FEATURE, Y(floor(N × 80.0/100)) |
| 153TH DIMENSION | MEANS VALUE OF LUMINANCE VALUES OF PIXELS INCLUDED IN EXTRACTION REGION |
| 154TH DIMENSION | MEANS VALUE OF LUMINANCE VALUES OF PIXELS INCLUDED IN EXTRACTION REGION |
| 155TH DIMENSION | MEANS VALUE OF LUMINANCE VALUES OF PIXELS INCLUDED IN EXTRACTION REGION |
| 156TH DIMENSION | PERCENTILE LUMINANCE VALUE FEATURE, Y(floor(N × 20.0/100)) |
| 157TH DIMENSION | MEANS VALUE OF LUMINANCE VALUES OF PIXELS INCLUDED IN EXTRACTION REGION |
| 158TH DIMENSION | MEANS VALUE OF LUMINANCE VALUES OF PIXELS INCLUDED IN EXTRACTION REGION |
| 159TH DIMENSION | MEANS VALUE OF LUMINANCE VALUES OF PIXELS INCLUDED IN EXTRACTION REGION |
| 160TH DIMENSION | PERCENTILE LUMINANCE VALUE FEATURE, Y(floor(N × 80.0/100)) |
| 161TH DIMENSION | MEANS VALUE OF LUMINANCE VALUES OF PIXELS INCLUDED IN EXTRACTION REGION |
| 162TH DIMENSION | MEANS VALUE OF LUMINANCE VALUES OF PIXELS INCLUDED IN EXTRACTION REGION |
| 163TH DIMENSION | MEANS VALUE OF LUMINANCE VALUES OF PIXELS INCLUDED IN EXTRACTION REGION |
| 164TH DIMENSION | PERCENTILE LUMINANCE VALUE FEATURE, Y(floor(N × 20.0/100)) |
| 165TH DIMENSION | MEANS VALUE OF LUMINANCE VALUES OF PIXELS INCLUDED IN EXTRACTION REGION |
| 166TH DIMENSION | MEANS VALUE OF LUMINANCE VALUES OF PIXELS INCLUDED IN EXTRACTION REGION |
| 167TH DIMENSION | MEANS VALUE OF LUMINANCE VALUES OF PIXELS INCLUDED IN EXTRACTION REGION |
| 168TH DIMENSION | PERCENTILE LUMINANCE VALUE FEATURE, Y(floor(N × 80.0/100)) |
| 169TH DIMENSION | MEANS VALUE OF LUMINANCE VALUES OF PIXELS INCLUDED IN EXTRACTION REGION |
| 170TH DIMENSION | MEANS VALUE OF LUMINANCE VALUES OF PIXELS INCLUDED IN EXTRACTION REGION |
| 171TH DIMENSION | MEANS VALUE OF LUMINANCE VALUES OF PIXELS INCLUDED IN EXTRACTION REGION |
| 172TH DIMENSION | PERCENTILE LUMINANCE VALUE FEATURE, Y(floor(N × 20.0/100)) |
| 173TH DIMENSION | MEANS VALUE OF LUMINANCE VALUES OF PIXELS INCLUDED IN EXTRACTION REGION |
| 174TH DIMENSION | MEANS VALUE OF LUMINANCE VALUES OF PIXELS INCLUDED IN EXTRACTION REGION |
| 175TH DIMENSION | MEANS VALUE OF LUMINANCE VALUES OF PIXELS INCLUDED IN EXTRACTION REGION |
| 176TH DIMENSION | PERCENTILE LUMINANCE VALUE FEATURE, Y(floor(N × 80.0/100)) |
| 177TH DIMENSION | MEANS VALUE OF LUMINANCE VALUES OF PIXELS INCLUDED IN EXTRACTION REGION |
| 178TH DIMENSION | MEANS VALUE OF LUMINANCE VALUES OF PIXELS INCLUDED IN EXTRACTION REGION |
| 179TH DIMENSION | MEANS VALUE OF LUMINANCE VALUES OF PIXELS INCLUDED IN EXTRACTION REGION |
| 180TH DIMENSION | PERCENTILE LUMINANCE VALUE FEATURE, Y(floor(N × 20.0/100)) |

FIG. 16-d

| | |
|---|---|
| 181TH DIMENSION | MEANS VALUE OF LUMINANCE VALUES OF PIXELS INCLUDED IN EXTRACTION REGION |
| 182TH DIMENSION | MEANS VALUE OF LUMINANCE VALUES OF PIXELS INCLUDED IN EXTRACTION REGION |
| 183TH DIMENSION | MEANS VALUE OF LUMINANCE VALUES OF PIXELS INCLUDED IN EXTRACTION REGION |
| 184TH DIMENSION | PERCENTILE LUMINANCE VALUE FEATURE, Y(floor(N × 80.0/100)) |
| 185TH DIMENSION | MEANS VALUE OF LUMINANCE VALUES OF PIXELS INCLUDED IN EXTRACTION REGION |
| 186TH DIMENSION | MEANS VALUE OF LUMINANCE VALUES OF PIXELS INCLUDED IN EXTRACTION REGION |
| 187TH DIMENSION | MEANS VALUE OF LUMINANCE VALUES OF PIXELS INCLUDED IN EXTRACTION REGION |
| 188TH DIMENSION | PERCENTILE LUMINANCE VALUE FEATURE, Y(floor(N × 20.0/100)) |
| 189TH DIMENSION | MEANS VALUE OF LUMINANCE VALUES OF PIXELS INCLUDED IN EXTRACTION REGION |
| 190TH DIMENSION | MEANS VALUE OF LUMINANCE VALUES OF PIXELS INCLUDED IN EXTRACTION REGION |
| 191TH DIMENSION | MEANS VALUE OF LUMINANCE VALUES OF PIXELS INCLUDED IN EXTRACTION REGION |
| 192TH DIMENSION | PERCENTILE LUMINANCE VALUE FEATURE, Y(floor(N × 80.0/100)) |
| 193TH DIMENSION | MEANS VALUE OF LUMINANCE VALUES OF PIXELS INCLUDED IN EXTRACTION REGION |
| 194TH DIMENSION | MEANS VALUE OF LUMINANCE VALUES OF PIXELS INCLUDED IN EXTRACTION REGION |
| 195TH DIMENSION | MEANS VALUE OF LUMINANCE VALUES OF PIXELS INCLUDED IN EXTRACTION REGION |
| 196TH DIMENSION | PERCENTILE LUMINANCE VALUE FEATURE, Y(floor(N × 20.0/100)) |
| 197TH DIMENSION | MEANS VALUE OF LUMINANCE VALUES OF PIXELS INCLUDED IN EXTRACTION REGION |
| 198TH DIMENSION | MEANS VALUE OF LUMINANCE VALUES OF PIXELS INCLUDED IN EXTRACTION REGION |
| 199TH DIMENSION | MEANS VALUE OF LUMINANCE VALUES OF PIXELS INCLUDED IN EXTRACTION REGION |
| 200TH DIMENSION | PERCENTILE LUMINANCE VALUE FEATURE, Y(floor(N × 80.0/100)) |
| 201TH DIMENSION | MEANS VALUE OF LUMINANCE VALUES OF PIXELS INCLUDED IN EXTRACTION REGION |
| 202TH DIMENSION | MEANS VALUE OF LUMINANCE VALUES OF PIXELS INCLUDED IN EXTRACTION REGION |
| 203TH DIMENSION | MEANS VALUE OF LUMINANCE VALUES OF PIXELS INCLUDED IN EXTRACTION REGION |
| 204TH DIMENSION | PERCENTILE LUMINANCE VALUE FEATURE, Y(floor(N × 20.0/100)) |
| 205TH DIMENSION | MEANS VALUE OF LUMINANCE VALUES OF PIXELS INCLUDED IN EXTRACTION REGION |
| 206TH DIMENSION | MEANS VALUE OF LUMINANCE VALUES OF PIXELS INCLUDED IN EXTRACTION REGION |
| 207TH DIMENSION | MEANS VALUE OF LUMINANCE VALUES OF PIXELS INCLUDED IN EXTRACTION REGION |
| 208TH DIMENSION | PERCENTILE LUMINANCE VALUE FEATURE, Y(floor(N × 80.0/100)) |
| 209TH DIMENSION | MEANS VALUE OF LUMINANCE VALUES OF PIXELS INCLUDED IN EXTRACTION REGION |
| 210TH DIMENSION | MEANS VALUE OF LUMINANCE VALUES OF PIXELS INCLUDED IN EXTRACTION REGION |
| 211TH DIMENSION | MEANS VALUE OF LUMINANCE VALUES OF PIXELS INCLUDED IN EXTRACTION REGION |
| 212TH DIMENSION | PERCENTILE LUMINANCE VALUE FEATURE, Y(floor(N × 20.0/100)) |
| 213TH DIMENSION | MEANS VALUE OF LUMINANCE VALUES OF PIXELS INCLUDED IN EXTRACTION REGION |
| 214TH DIMENSION | MEANS VALUE OF LUMINANCE VALUES OF PIXELS INCLUDED IN EXTRACTION REGION |
| 215TH DIMENSION | MEANS VALUE OF LUMINANCE VALUES OF PIXELS INCLUDED IN EXTRACTION REGION |
| 216TH DIMENSION | PERCENTILE LUMINANCE VALUE FEATURE, Y(floor(N × 80.0/100)) |
| 217TH DIMENSION | MEANS VALUE OF LUMINANCE VALUES OF PIXELS INCLUDED IN EXTRACTION REGION |
| 218TH DIMENSION | MEANS VALUE OF LUMINANCE VALUES OF PIXELS INCLUDED IN EXTRACTION REGION |
| 219TH DIMENSION | MEANS VALUE OF LUMINANCE VALUES OF PIXELS INCLUDED IN EXTRACTION REGION |
| 220TH DIMENSION | PERCENTILE LUMINANCE VALUE FEATURE, Y(floor(N × 20.0/100)) |
| 221TH DIMENSION | MEANS VALUE OF LUMINANCE VALUES OF PIXELS INCLUDED IN EXTRACTION REGION |
| 222TH DIMENSION | MEANS VALUE OF LUMINANCE VALUES OF PIXELS INCLUDED IN EXTRACTION REGION |
| 223TH DIMENSION | MEANS VALUE OF LUMINANCE VALUES OF PIXELS INCLUDED IN EXTRACTION REGION |
| 224TH DIMENSION | PERCENTILE LUMINANCE VALUE FEATURE, Y(floor(N × 80.0/100)) |
| 225TH DIMENSION | MEANS VALUE OF LUMINANCE VALUES OF PIXELS INCLUDED IN EXTRACTION REGION |
| 226TH DIMENSION | MEANS VALUE OF LUMINANCE VALUES OF PIXELS INCLUDED IN EXTRACTION REGION |
| 227TH DIMENSION | MEANS VALUE OF LUMINANCE VALUES OF PIXELS INCLUDED IN EXTRACTION REGION |
| 228TH DIMENSION | PERCENTILE LUMINANCE VALUE FEATURE, Y(floor(N × 20.0/100)) |
| 229TH DIMENSION | MEANS VALUE OF LUMINANCE VALUES OF PIXELS INCLUDED IN EXTRACTION REGION |
| 230TH DIMENSION | MEANS VALUE OF LUMINANCE VALUES OF PIXELS INCLUDED IN EXTRACTION REGION |
| 231TH DIMENSION | MEANS VALUE OF LUMINANCE VALUES OF PIXELS INCLUDED IN EXTRACTION REGION |
| 232TH DIMENSION | PERCENTILE LUMINANCE VALUE FEATURE, Y(floor(N × 80.0/100)) |
| 233TH DIMENSION | MEANS VALUE OF LUMINANCE VALUES OF PIXELS INCLUDED IN EXTRACTION REGION |
| 234TH DIMENSION | MEANS VALUE OF LUMINANCE VALUES OF PIXELS INCLUDED IN EXTRACTION REGION |
| 235TH DIMENSION | MEANS VALUE OF LUMINANCE VALUES OF PIXELS INCLUDED IN EXTRACTION REGION |
| 236TH DIMENSION | PERCENTILE LUMINANCE VALUE FEATURE, Y(floor(N × 20.0/100)) |
| 237TH DIMENSION | MEANS VALUE OF LUMINANCE VALUES OF PIXELS INCLUDED IN EXTRACTION REGION |
| 238TH DIMENSION | MEANS VALUE OF LUMINANCE VALUES OF PIXELS INCLUDED IN EXTRACTION REGION |
| 239TH DIMENSION | MEANS VALUE OF LUMINANCE VALUES OF PIXELS INCLUDED IN EXTRACTION REGION |
| 240TH DIMENSION | PERCENTILE LUMINANCE VALUE FEATURE, Y(floor(N × 80.0/100)) |

FIG. 16-e

| | |
|---|---|
| 241TH DIMENSION | MEANS VALUE OF LUMINANCE VALUES OF PIXELS INCLUDED IN EXTRACTION REGION |
| 242TH DIMENSION | MEANS VALUE OF LUMINANCE VALUES OF PIXELS INCLUDED IN EXTRACTION REGION |
| 243TH DIMENSION | MEANS VALUE OF LUMINANCE VALUES OF PIXELS INCLUDED IN EXTRACTION REGION |
| 244TH DIMENSION | PERCENTILE LUMINANCE VALUE FEATURE, Y(floor(N × 20.0/100)) |
| 245TH DIMENSION | MEANS VALUE OF LUMINANCE VALUES OF PIXELS INCLUDED IN EXTRACTION REGION |
| 246TH DIMENSION | MEANS VALUE OF LUMINANCE VALUES OF PIXELS INCLUDED IN EXTRACTION REGION |
| 247TH DIMENSION | MEANS VALUE OF LUMINANCE VALUES OF PIXELS INCLUDED IN EXTRACTION REGION |
| 248TH DIMENSION | PERCENTILE LUMINANCE VALUE FEATURE, Y(floor(N × 80.0/100)) |
| 249TH DIMENSION | MEANS VALUE OF LUMINANCE VALUES OF PIXELS INCLUDED IN EXTRACTION REGION |
| 250TH DIMENSION | MEANS VALUE OF LUMINANCE VALUES OF PIXELS INCLUDED IN EXTRACTION REGION |
| 251TH DIMENSION | MEANS VALUE OF LUMINANCE VALUES OF PIXELS INCLUDED IN EXTRACTION REGION |
| 252TH DIMENSION | PERCENTILE LUMINANCE VALUE FEATURE, Y(floor(N × 20.0/100)) |
| 253TH DIMENSION | MEANS VALUE OF LUMINANCE VALUES OF PIXELS INCLUDED IN EXTRACTION REGION |
| 254TH DIMENSION | MEANS VALUE OF LUMINANCE VALUES OF PIXELS INCLUDED IN EXTRACTION REGION |
| 255TH DIMENSION | MEANS VALUE OF LUMINANCE VALUES OF PIXELS INCLUDED IN EXTRACTION REGION |
| 256TH DIMENSION | PERCENTILE LUMINANCE VALUE FEATURE, Y(floor(N × 80.0/100)) |
| 257TH DIMENSION | MEANS VALUE OF LUMINANCE VALUES OF PIXELS INCLUDED IN EXTRACTION REGION |
| 258TH DIMENSION | MEANS VALUE OF LUMINANCE VALUES OF PIXELS INCLUDED IN EXTRACTION REGION |
| 259TH DIMENSION | MEANS VALUE OF LUMINANCE VALUES OF PIXELS INCLUDED IN EXTRACTION REGION |
| 260TH DIMENSION | PERCENTILE LUMINANCE VALUE FEATURE, Y(floor(N × 20.0/100)) |
| 261TH DIMENSION | MEANS VALUE OF LUMINANCE VALUES OF PIXELS INCLUDED IN EXTRACTION REGION |
| 262TH DIMENSION | MEANS VALUE OF LUMINANCE VALUES OF PIXELS INCLUDED IN EXTRACTION REGION |
| 263TH DIMENSION | MEANS VALUE OF LUMINANCE VALUES OF PIXELS INCLUDED IN EXTRACTION REGION |
| 264TH DIMENSION | PERCENTILE LUMINANCE VALUE FEATURE, Y(floor(N × 80.0/100)) |
| 265TH DIMENSION | MEANS VALUE OF LUMINANCE VALUES OF PIXELS INCLUDED IN EXTRACTION REGION |
| 266TH DIMENSION | MEANS VALUE OF LUMINANCE VALUES OF PIXELS INCLUDED IN EXTRACTION REGION |
| 267TH DIMENSION | MEANS VALUE OF LUMINANCE VALUES OF PIXELS INCLUDED IN EXTRACTION REGION |
| 268TH DIMENSION | PERCENTILE LUMINANCE VALUE FEATURE, Y(floor(N × 20.0/100)) |
| 269TH DIMENSION | MEANS VALUE OF LUMINANCE VALUES OF PIXELS INCLUDED IN EXTRACTION REGION |
| 270TH DIMENSION | MEANS VALUE OF LUMINANCE VALUES OF PIXELS INCLUDED IN EXTRACTION REGION |
| 271TH DIMENSION | MEANS VALUE OF LUMINANCE VALUES OF PIXELS INCLUDED IN EXTRACTION REGION |
| 272TH DIMENSION | PERCENTILE LUMINANCE VALUE FEATURE, Y(floor(N × 80.0/100)) |
| 273TH DIMENSION | MEANS VALUE OF LUMINANCE VALUES OF PIXELS INCLUDED IN EXTRACTION REGION |
| 274TH DIMENSION | MEANS VALUE OF LUMINANCE VALUES OF PIXELS INCLUDED IN EXTRACTION REGION |
| 275TH DIMENSION | MEANS VALUE OF LUMINANCE VALUES OF PIXELS INCLUDED IN EXTRACTION REGION |
| 276TH DIMENSION | PERCENTILE LUMINANCE VALUE FEATURE, Y(floor(N × 20.0/100)) |
| 277TH DIMENSION | MEANS VALUE OF LUMINANCE VALUES OF PIXELS INCLUDED IN EXTRACTION REGION |
| 278TH DIMENSION | MEANS VALUE OF LUMINANCE VALUES OF PIXELS INCLUDED IN EXTRACTION REGION |
| 279TH DIMENSION | MEANS VALUE OF LUMINANCE VALUES OF PIXELS INCLUDED IN EXTRACTION REGION |
| 280TH DIMENSION | PERCENTILE LUMINANCE VALUE FEATURE, Y(floor(N × 80.0/100)) |
| 281TH DIMENSION | MEANS VALUE OF LUMINANCE VALUES OF PIXELS INCLUDED IN EXTRACTION REGION |
| 282TH DIMENSION | MEANS VALUE OF LUMINANCE VALUES OF PIXELS INCLUDED IN EXTRACTION REGION |
| 283TH DIMENSION | MEANS VALUE OF LUMINANCE VALUES OF PIXELS INCLUDED IN EXTRACTION REGION |
| 284TH DIMENSION | PERCENTILE LUMINANCE VALUE FEATURE, Y(floor(N × 20.0/100)) |
| 285TH DIMENSION | MEANS VALUE OF LUMINANCE VALUES OF PIXELS INCLUDED IN EXTRACTION REGION |
| 286TH DIMENSION | MEANS VALUE OF LUMINANCE VALUES OF PIXELS INCLUDED IN EXTRACTION REGION |
| 287TH DIMENSION | MEANS VALUE OF LUMINANCE VALUES OF PIXELS INCLUDED IN EXTRACTION REGION |
| 288TH DIMENSION | PERCENTILE LUMINANCE VALUE FEATURE, Y(floor(N × 80.0/100)) |
| 289TH DIMENSION | MEANS VALUE OF LUMINANCE VALUES OF PIXELS INCLUDED IN EXTRACTION REGION |
| 290TH DIMENSION | MEANS VALUE OF LUMINANCE VALUES OF PIXELS INCLUDED IN EXTRACTION REGION |
| 291TH DIMENSION | MEANS VALUE OF LUMINANCE VALUES OF PIXELS INCLUDED IN EXTRACTION REGION |
| 292TH DIMENSION | PERCENTILE LUMINANCE VALUE FEATURE, Y(floor(N × 20.0/100)) |
| 293TH DIMENSION | MEANS VALUE OF LUMINANCE VALUES OF PIXELS INCLUDED IN EXTRACTION REGION |
| 294TH DIMENSION | MEANS VALUE OF LUMINANCE VALUES OF PIXELS INCLUDED IN EXTRACTION REGION |
| 295TH DIMENSION | MEANS VALUE OF LUMINANCE VALUES OF PIXELS INCLUDED IN EXTRACTION REGION |
| 296TH DIMENSION | PERCENTILE LUMINANCE VALUE FEATURE, Y(floor(N × 80.0/100)) |
| 297TH DIMENSION | MEANS VALUE OF LUMINANCE VALUES OF PIXELS INCLUDED IN EXTRACTION REGION |
| 298TH DIMENSION | MEANS VALUE OF LUMINANCE VALUES OF PIXELS INCLUDED IN EXTRACTION REGION |
| 299TH DIMENSION | MEANS VALUE OF LUMINANCE VALUES OF PIXELS INCLUDED IN EXTRACTION REGION |
| 300TH DIMENSION | PERCENTILE LUMINANCE VALUE FEATURE, Y(floor(N × 20.0/100)) |

FIG. 17-a

| | |
|---|---|
| 1ST DIMENSION | COMPARISON/QUANTIZATION METHOD G, th=D(floor(300 × 5.0/100)) |
| 2ND DIMENSION | COMPARISON/QUANTIZATION METHOD G, th=D(floor(300 × 10.0/100)) |
| 3RD DIMENSION | COMPARISON/QUANTIZATION METHOD G, th=D(floor(300 × 15.0/100)) |
| 4TH DIMENSION | COMPARISON/QUANTIZATION METHOD G, th=D(floor(300 × 20.0/100)) |
| 5TH DIMENSION | COMPARISON/QUANTIZATION METHOD G, th=D(floor(300 × 25.0/100)) |
| 6TH DIMENSION | COMPARISON/QUANTIZATION METHOD G, th=D(floor(300 × 30.0/100)) |
| 7TH DIMENSION | COMPARISON/QUANTIZATION METHOD G, th=D(floor(300 × 35.0/100)) |
| 8TH DIMENSION | COMPARISON/QUANTIZATION METHOD G, th=D(floor(300 × 40.0/100)) |
| 9TH DIMENSION | COMPARISON/QUANTIZATION METHOD B, th=3.0 |
| 10TH DIMENSION | COMPARISON/QUANTIZATION METHOD B, th=5.0 |
| 11TH DIMENSION | COMPARISON/QUANTIZATION METHOD B, th=7.0 |
| 12TH DIMENSION | COMPARISON/QUANTIZATION METHOD B, th=10.0 |
| 13TH DIMENSION | COMPARISON/QUANTIZATION METHOD G, th=D(floor(300 × 5.0/100)) |
| 14TH DIMENSION | COMPARISON/QUANTIZATION METHOD G, th=D(floor(300 × 10.0/100)) |
| 15TH DIMENSION | COMPARISON/QUANTIZATION METHOD G, th=D(floor(300 × 15.0/100)) |
| 16TH DIMENSION | COMPARISON/QUANTIZATION METHOD G, th=D(floor(300 × 20.0/100)) |
| 17TH DIMENSION | COMPARISON/QUANTIZATION METHOD G, th=D(floor(300 × 25.0/100)) |
| 18TH DIMENSION | COMPARISON/QUANTIZATION METHOD G, th=D(floor(300 × 30.0/100)) |
| 19TH DIMENSION | COMPARISON/QUANTIZATION METHOD G, th=D(floor(300 × 35.0/100)) |
| 20TH DIMENSION | COMPARISON/QUANTIZATION METHOD G, th=D(floor(300 × 40.0/100)) |
| 21TH DIMENSION | COMPARISON/QUANTIZATION METHOD B, th=3.0 |
| 22TH DIMENSION | COMPARISON/QUANTIZATION METHOD B, th=5.0 |
| 23TH DIMENSION | COMPARISON/QUANTIZATION METHOD B, th=7.0 |
| 24TH DIMENSION | COMPARISON/QUANTIZATION METHOD B, th=10.0 |
| 25TH DIMENSION | COMPARISON/QUANTIZATION METHOD G, th=D(floor(300 × 5.0/100)) |
| 26TH DIMENSION | COMPARISON/QUANTIZATION METHOD G, th=D(floor(300 × 10.0/100)) |
| 27TH DIMENSION | COMPARISON/QUANTIZATION METHOD G, th=D(floor(300 × 15.0/100)) |
| 28TH DIMENSION | COMPARISON/QUANTIZATION METHOD G, th=D(floor(300 × 20.0/100)) |
| 29TH DIMENSION | COMPARISON/QUANTIZATION METHOD G, th=D(floor(300 × 25.0/100)) |
| 30TH DIMENSION | COMPARISON/QUANTIZATION METHOD G, th=D(floor(300 × 30.0/100)) |
| 31TH DIMENSION | COMPARISON/QUANTIZATION METHOD G, th=D(floor(300 × 35.0/100)) |
| 32TH DIMENSION | COMPARISON/QUANTIZATION METHOD G, th=D(floor(300 × 40.0/100)) |
| 33TH DIMENSION | COMPARISON/QUANTIZATION METHOD B, th=3.0 |
| 34TH DIMENSION | COMPARISON/QUANTIZATION METHOD B, th=5.0 |
| 35TH DIMENSION | COMPARISON/QUANTIZATION METHOD B, th=7.0 |
| 36TH DIMENSION | COMPARISON/QUANTIZATION METHOD B, th=10.0 |
| 37TH DIMENSION | COMPARISON/QUANTIZATION METHOD G, th=D(floor(300 × 5.0/100)) |
| 38TH DIMENSION | COMPARISON/QUANTIZATION METHOD G, th=D(floor(300 × 10.0/100)) |
| 39TH DIMENSION | COMPARISON/QUANTIZATION METHOD G, th=D(floor(300 × 15.0/100)) |
| 40TH DIMENSION | COMPARISON/QUANTIZATION METHOD G, th=D(floor(300 × 20.0/100)) |
| 41TH DIMENSION | COMPARISON/QUANTIZATION METHOD G, th=D(floor(300 × 25.0/100)) |
| 42TH DIMENSION | COMPARISON/QUANTIZATION METHOD G, th=D(floor(300 × 30.0/100)) |
| 43TH DIMENSION | COMPARISON/QUANTIZATION METHOD G, th=D(floor(300 × 35.0/100)) |
| 44TH DIMENSION | COMPARISON/QUANTIZATION METHOD G, th=D(floor(300 × 40.0/100)) |
| 45TH DIMENSION | COMPARISON/QUANTIZATION METHOD B, th=3.0 |
| 46TH DIMENSION | COMPARISON/QUANTIZATION METHOD B, th=5.0 |
| 47TH DIMENSION | COMPARISON/QUANTIZATION METHOD B, th=7.0 |
| 48TH DIMENSION | COMPARISON/QUANTIZATION METHOD B, th=10.0 |
| 49TH DIMENSION | COMPARISON/QUANTIZATION METHOD G, th=D(floor(300 × 5.0/100)) |
| 50TH DIMENSION | COMPARISON/QUANTIZATION METHOD G, th=D(floor(300 × 10.0/100)) |
| 51TH DIMENSION | COMPARISON/QUANTIZATION METHOD G, th=D(floor(300 × 15.0/100)) |
| 52TH DIMENSION | COMPARISON/QUANTIZATION METHOD G, th=D(floor(300 × 20.0/100)) |
| 53TH DIMENSION | COMPARISON/QUANTIZATION METHOD G, th=D(floor(300 × 25.0/100)) |
| 54TH DIMENSION | COMPARISON/QUANTIZATION METHOD G, th=D(floor(300 × 30.0/100)) |
| 55TH DIMENSION | COMPARISON/QUANTIZATION METHOD G, th=D(floor(300 × 35.0/100)) |
| 56TH DIMENSION | COMPARISON/QUANTIZATION METHOD G, th=D(floor(300 × 40.0/100)) |
| 57TH DIMENSION | COMPARISON/QUANTIZATION METHOD B, th=3.0 |
| 58TH DIMENSION | COMPARISON/QUANTIZATION METHOD B, th=5.0 |
| 59TH DIMENSION | COMPARISON/QUANTIZATION METHOD B, th=7.0 |
| 60TH DIMENSION | COMPARISON/QUANTIZATION METHOD B, th=10.0 |

FIG. 17-b

| | |
|---|---|
| 61TH DIMENSION | COMPARISON/QUANTIZATION METHOD G, th=D(floor(300×5.0/100)) |
| 62TH DIMENSION | COMPARISON/QUANTIZATION METHOD G, th=D(floor(300×10.0/100)) |
| 63TH DIMENSION | COMPARISON/QUANTIZATION METHOD G, th=D(floor(300×15.0/100)) |
| 64TH DIMENSION | COMPARISON/QUANTIZATION METHOD G, th=D(floor(300×20.0/100)) |
| 65TH DIMENSION | COMPARISON/QUANTIZATION METHOD G, th=D(floor(300×25.0/100)) |
| 66TH DIMENSION | COMPARISON/QUANTIZATION METHOD G, th=D(floor(300×30.0/100)) |
| 67TH DIMENSION | COMPARISON/QUANTIZATION METHOD G, th=D(floor(300×35.0/100)) |
| 68TH DIMENSION | COMPARISON/QUANTIZATION METHOD G, th=D(floor(300×40.0/100)) |
| 69TH DIMENSION | COMPARISON/QUANTIZATION METHOD B, th=3.0 |
| 70TH DIMENSION | COMPARISON/QUANTIZATION METHOD B, th=5.0 |
| 71TH DIMENSION | COMPARISON/QUANTIZATION METHOD B, th=7.0 |
| 72TH DIMENSION | COMPARISON/QUANTIZATION METHOD B, th=10.0 |
| 73TH DIMENSION | COMPARISON/QUANTIZATION METHOD G, th=D(floor(300×5.0/100)) |
| 74TH DIMENSION | COMPARISON/QUANTIZATION METHOD G, th=D(floor(300×10.0/100)) |
| 75TH DIMENSION | COMPARISON/QUANTIZATION METHOD G, th=D(floor(300×15.0/100)) |
| 76TH DIMENSION | COMPARISON/QUANTIZATION METHOD G, th=D(floor(300×20.0/100)) |
| 77TH DIMENSION | COMPARISON/QUANTIZATION METHOD G, th=D(floor(300×25.0/100)) |
| 78TH DIMENSION | COMPARISON/QUANTIZATION METHOD G, th=D(floor(300×30.0/100)) |
| 79TH DIMENSION | COMPARISON/QUANTIZATION METHOD G, th=D(floor(300×35.0/100)) |
| 80TH DIMENSION | COMPARISON/QUANTIZATION METHOD G, th=D(floor(300×40.0/100)) |
| 81TH DIMENSION | COMPARISON/QUANTIZATION METHOD B, th=3.0 |
| 82TH DIMENSION | COMPARISON/QUANTIZATION METHOD B, th=5.0 |
| 83TH DIMENSION | COMPARISON/QUANTIZATION METHOD B, th=7.0 |
| 84TH DIMENSION | COMPARISON/QUANTIZATION METHOD B, th=10.0 |
| 85TH DIMENSION | COMPARISON/QUANTIZATION METHOD G, th=D(floor(300×5.0/100)) |
| 86TH DIMENSION | COMPARISON/QUANTIZATION METHOD G, th=D(floor(300×10.0/100)) |
| 87TH DIMENSION | COMPARISON/QUANTIZATION METHOD G, th=D(floor(300×15.0/100)) |
| 88TH DIMENSION | COMPARISON/QUANTIZATION METHOD G, th=D(floor(300×20.0/100)) |
| 89TH DIMENSION | COMPARISON/QUANTIZATION METHOD G, th=D(floor(300×25.0/100)) |
| 90TH DIMENSION | COMPARISON/QUANTIZATION METHOD G, th=D(floor(300×30.0/100)) |
| 91TH DIMENSION | COMPARISON/QUANTIZATION METHOD G, th=D(floor(300×35.0/100)) |
| 92TH DIMENSION | COMPARISON/QUANTIZATION METHOD G, th=D(floor(300×40.0/100)) |
| 93TH DIMENSION | COMPARISON/QUANTIZATION METHOD B, th=3.0 |
| 94TH DIMENSION | COMPARISON/QUANTIZATION METHOD B, th=5.0 |
| 95TH DIMENSION | COMPARISON/QUANTIZATION METHOD B, th=7.0 |
| 96TH DIMENSION | COMPARISON/QUANTIZATION METHOD B, th=10.0 |
| 97TH DIMENSION | COMPARISON/QUANTIZATION METHOD G, th=D(floor(300×5.0/100)) |
| 98TH DIMENSION | COMPARISON/QUANTIZATION METHOD G, th=D(floor(300×10.0/100)) |
| 99TH DIMENSION | COMPARISON/QUANTIZATION METHOD G, th=D(floor(300×15.0/100)) |
| 100TH DIMENSION | COMPARISON/QUANTIZATION METHOD G, th=D(floor(300×20.0/100)) |
| 101TH DIMENSION | COMPARISON/QUANTIZATION METHOD G, th=D(floor(300×25.0/100)) |
| 102TH DIMENSION | COMPARISON/QUANTIZATION METHOD G, th=D(floor(300×30.0/100)) |
| 103TH DIMENSION | COMPARISON/QUANTIZATION METHOD G, th=D(floor(300×35.0/100)) |
| 104TH DIMENSION | COMPARISON/QUANTIZATION METHOD G, th=D(floor(300×40.0/100)) |
| 105TH DIMENSION | COMPARISON/QUANTIZATION METHOD B, th=3.0 |
| 106TH DIMENSION | COMPARISON/QUANTIZATION METHOD B, th=5.0 |
| 107TH DIMENSION | COMPARISON/QUANTIZATION METHOD B, th=7.0 |
| 108TH DIMENSION | COMPARISON/QUANTIZATION METHOD B, th=10.0 |
| 109TH DIMENSION | COMPARISON/QUANTIZATION METHOD G, th=D(floor(300×5.0/100)) |
| 110TH DIMENSION | COMPARISON/QUANTIZATION METHOD G, th=D(floor(300×10.0/100)) |
| 111TH DIMENSION | COMPARISON/QUANTIZATION METHOD G, th=D(floor(300×15.0/100)) |
| 112TH DIMENSION | COMPARISON/QUANTIZATION METHOD G, th=D(floor(300×20.0/100)) |
| 113TH DIMENSION | COMPARISON/QUANTIZATION METHOD G, th=D(floor(300×25.0/100)) |
| 114TH DIMENSION | COMPARISON/QUANTIZATION METHOD G, th=D(floor(300×30.0/100)) |
| 115TH DIMENSION | COMPARISON/QUANTIZATION METHOD G, th=D(floor(300×35.0/100)) |
| 116TH DIMENSION | COMPARISON/QUANTIZATION METHOD G, th=D(floor(300×40.0/100)) |
| 117TH DIMENSION | COMPARISON/QUANTIZATION METHOD B, th=3.0 |
| 118TH DIMENSION | COMPARISON/QUANTIZATION METHOD B, th=5.0 |
| 119TH DIMENSION | COMPARISON/QUANTIZATION METHOD B, th=7.0 |
| 120TH DIMENSION | COMPARISON/QUANTIZATION METHOD B, th=10.0 |

FIG. 17-c

| | |
|---|---|
| 121TH DIMENSION | COMPARISON/QUANTIZATION METHOD G, th=D(floor(300×5.0/100)) |
| 122TH DIMENSION | COMPARISON/QUANTIZATION METHOD G, th=D(floor(300×10.0/100)) |
| 123TH DIMENSION | COMPARISON/QUANTIZATION METHOD G, th=D(floor(300×15.0/100)) |
| 124TH DIMENSION | COMPARISON/QUANTIZATION METHOD G, th=D(floor(300×20.0/100)) |
| 125TH DIMENSION | COMPARISON/QUANTIZATION METHOD G, th=D(floor(300×25.0/100)) |
| 126TH DIMENSION | COMPARISON/QUANTIZATION METHOD G, th=D(floor(300×30.0/100)) |
| 127TH DIMENSION | COMPARISON/QUANTIZATION METHOD G, th=D(floor(300×35.0/100)) |
| 128TH DIMENSION | COMPARISON/QUANTIZATION METHOD G, th=D(floor(300×40.0/100)) |
| 129TH DIMENSION | COMPARISON/QUANTIZATION METHOD B, th=3.0 |
| 130TH DIMENSION | COMPARISON/QUANTIZATION METHOD B, th=5.0 |
| 131TH DIMENSION | COMPARISON/QUANTIZATION METHOD B, th=7.0 |
| 132TH DIMENSION | COMPARISON/QUANTIZATION METHOD B, th=10.0 |
| 133TH DIMENSION | COMPARISON/QUANTIZATION METHOD G, th=D(floor(300×5.0/100)) |
| 134TH DIMENSION | COMPARISON/QUANTIZATION METHOD G, th=D(floor(300×10.0/100)) |
| 135TH DIMENSION | COMPARISON/QUANTIZATION METHOD G, th=D(floor(300×15.0/100)) |
| 136TH DIMENSION | COMPARISON/QUANTIZATION METHOD G, th=D(floor(300×20.0/100)) |
| 137TH DIMENSION | COMPARISON/QUANTIZATION METHOD G, th=D(floor(300×25.0/100)) |
| 138TH DIMENSION | COMPARISON/QUANTIZATION METHOD G, th=D(floor(300×30.0/100)) |
| 139TH DIMENSION | COMPARISON/QUANTIZATION METHOD G, th=D(floor(300×35.0/100)) |
| 140TH DIMENSION | COMPARISON/QUANTIZATION METHOD G, th=D(floor(300×40.0/100)) |
| 141TH DIMENSION | COMPARISON/QUANTIZATION METHOD B, th=3.0 |
| 142TH DIMENSION | COMPARISON/QUANTIZATION METHOD B, th=5.0 |
| 143TH DIMENSION | COMPARISON/QUANTIZATION METHOD B, th=7.0 |
| 144TH DIMENSION | COMPARISON/QUANTIZATION METHOD B, th=10.0 |
| 145TH DIMENSION | COMPARISON/QUANTIZATION METHOD G, th=D(floor(300×5.0/100)) |
| 146TH DIMENSION | COMPARISON/QUANTIZATION METHOD G, th=D(floor(300×10.0/100)) |
| 147TH DIMENSION | COMPARISON/QUANTIZATION METHOD G, th=D(floor(300×15.0/100)) |
| 148TH DIMENSION | COMPARISON/QUANTIZATION METHOD G, th=D(floor(300×20.0/100)) |
| 149TH DIMENSION | COMPARISON/QUANTIZATION METHOD G, th=D(floor(300×25.0/100)) |
| 150TH DIMENSION | COMPARISON/QUANTIZATION METHOD G, th=D(floor(300×30.0/100)) |
| 151TH DIMENSION | COMPARISON/QUANTIZATION METHOD G, th=D(floor(300×35.0/100)) |
| 152TH DIMENSION | COMPARISON/QUANTIZATION METHOD G, th=D(floor(300×40.0/100)) |
| 153TH DIMENSION | COMPARISON/QUANTIZATION METHOD B, th=3.0 |
| 154TH DIMENSION | COMPARISON/QUANTIZATION METHOD B, th=5.0 |
| 155TH DIMENSION | COMPARISON/QUANTIZATION METHOD B, th=7.0 |
| 156TH DIMENSION | COMPARISON/QUANTIZATION METHOD B, th=10.0 |
| 157TH DIMENSION | COMPARISON/QUANTIZATION METHOD G, th=D(floor(300×5.0/100)) |
| 158TH DIMENSION | COMPARISON/QUANTIZATION METHOD G, th=D(floor(300×10.0/100)) |
| 159TH DIMENSION | COMPARISON/QUANTIZATION METHOD G, th=D(floor(300×15.0/100)) |
| 160TH DIMENSION | COMPARISON/QUANTIZATION METHOD G, th=D(floor(300×20.0/100)) |
| 161TH DIMENSION | COMPARISON/QUANTIZATION METHOD G, th=D(floor(300×25.0/100)) |
| 162TH DIMENSION | COMPARISON/QUANTIZATION METHOD G, th=D(floor(300×30.0/100)) |
| 163TH DIMENSION | COMPARISON/QUANTIZATION METHOD G, th=D(floor(300×35.0/100)) |
| 164TH DIMENSION | COMPARISON/QUANTIZATION METHOD G, th=D(floor(300×40.0/100)) |
| 165TH DIMENSION | COMPARISON/QUANTIZATION METHOD B, th=3.0 |
| 166TH DIMENSION | COMPARISON/QUANTIZATION METHOD B, th=5.0 |
| 167TH DIMENSION | COMPARISON/QUANTIZATION METHOD B, th=7.0 |
| 168TH DIMENSION | COMPARISON/QUANTIZATION METHOD B, th=10.0 |
| 169TH DIMENSION | COMPARISON/QUANTIZATION METHOD G, th=D(floor(300×5.0/100)) |
| 170TH DIMENSION | COMPARISON/QUANTIZATION METHOD G, th=D(floor(300×10.0/100)) |
| 171TH DIMENSION | COMPARISON/QUANTIZATION METHOD G, th=D(floor(300×15.0/100)) |
| 172TH DIMENSION | COMPARISON/QUANTIZATION METHOD G, th=D(floor(300×20.0/100)) |
| 173TH DIMENSION | COMPARISON/QUANTIZATION METHOD G, th=D(floor(300×25.0/100)) |
| 174TH DIMENSION | COMPARISON/QUANTIZATION METHOD G, th=D(floor(300×30.0/100)) |
| 175TH DIMENSION | COMPARISON/QUANTIZATION METHOD G, th=D(floor(300×35.0/100)) |
| 176TH DIMENSION | COMPARISON/QUANTIZATION METHOD G, th=D(floor(300×40.0/100)) |
| 177TH DIMENSION | COMPARISON/QUANTIZATION METHOD B, th=3.0 |
| 178TH DIMENSION | COMPARISON/QUANTIZATION METHOD B, th=5.0 |
| 179TH DIMENSION | COMPARISON/QUANTIZATION METHOD B, th=7.0 |
| 180TH DIMENSION | COMPARISON/QUANTIZATION METHOD B, th=10.0 |

FIG. 17-d

| | |
|---|---|
| 181TH DIMENSION | COMPARISON/QUANTIZATION METHOD G, th=D(floor(300×5.0/100)) |
| 182TH DIMENSION | COMPARISON/QUANTIZATION METHOD G, th=D(floor(300×10.0/100)) |
| 183TH DIMENSION | COMPARISON/QUANTIZATION METHOD G, th=D(floor(300×15.0/100)) |
| 184TH DIMENSION | COMPARISON/QUANTIZATION METHOD G, th=D(floor(300×20.0/100)) |
| 185TH DIMENSION | COMPARISON/QUANTIZATION METHOD G, th=D(floor(300×25.0/100)) |
| 186TH DIMENSION | COMPARISON/QUANTIZATION METHOD G, th=D(floor(300×30.0/100)) |
| 187TH DIMENSION | COMPARISON/QUANTIZATION METHOD G, th=D(floor(300×35.0/100)) |
| 188TH DIMENSION | COMPARISON/QUANTIZATION METHOD G, th=D(floor(300×40.0/100)) |
| 189TH DIMENSION | COMPARISON/QUANTIZATION METHOD B, th=3.0 |
| 190TH DIMENSION | COMPARISON/QUANTIZATION METHOD B, th=5.0 |
| 191TH DIMENSION | COMPARISON/QUANTIZATION METHOD B, th=7.0 |
| 192TH DIMENSION | COMPARISON/QUANTIZATION METHOD B, th=10.0 |
| 193TH DIMENSION | COMPARISON/QUANTIZATION METHOD G, th=D(floor(300×5.0/100)) |
| 194TH DIMENSION | COMPARISON/QUANTIZATION METHOD G, th=D(floor(300×10.0/100)) |
| 195TH DIMENSION | COMPARISON/QUANTIZATION METHOD G, th=D(floor(300×15.0/100)) |
| 196TH DIMENSION | COMPARISON/QUANTIZATION METHOD G, th=D(floor(300×20.0/100)) |
| 197TH DIMENSION | COMPARISON/QUANTIZATION METHOD G, th=D(floor(300×25.0/100)) |
| 198TH DIMENSION | COMPARISON/QUANTIZATION METHOD G, th=D(floor(300×30.0/100)) |
| 199TH DIMENSION | COMPARISON/QUANTIZATION METHOD G, th=D(floor(300×35.0/100)) |
| 200TH DIMENSION | COMPARISON/QUANTIZATION METHOD G, th=D(floor(300×40.0/100)) |
| 201TH DIMENSION | COMPARISON/QUANTIZATION METHOD B, th=3.0 |
| 202TH DIMENSION | COMPARISON/QUANTIZATION METHOD B, th=5.0 |
| 203TH DIMENSION | COMPARISON/QUANTIZATION METHOD B, th=7.0 |
| 204TH DIMENSION | COMPARISON/QUANTIZATION METHOD B, th=10.0 |
| 205TH DIMENSION | COMPARISON/QUANTIZATION METHOD G, th=D(floor(300×5.0/100)) |
| 206TH DIMENSION | COMPARISON/QUANTIZATION METHOD G, th=D(floor(300×10.0/100)) |
| 207TH DIMENSION | COMPARISON/QUANTIZATION METHOD G, th=D(floor(300×15.0/100)) |
| 208TH DIMENSION | COMPARISON/QUANTIZATION METHOD G, th=D(floor(300×20.0/100)) |
| 209TH DIMENSION | COMPARISON/QUANTIZATION METHOD G, th=D(floor(300×25.0/100)) |
| 210TH DIMENSION | COMPARISON/QUANTIZATION METHOD G, th=D(floor(300×30.0/100)) |
| 211TH DIMENSION | COMPARISON/QUANTIZATION METHOD G, th=D(floor(300×35.0/100)) |
| 212TH DIMENSION | COMPARISON/QUANTIZATION METHOD G, th=D(floor(300×40.0/100)) |
| 213TH DIMENSION | COMPARISON/QUANTIZATION METHOD B, th=3.0 |
| 214TH DIMENSION | COMPARISON/QUANTIZATION METHOD B, th=5.0 |
| 215TH DIMENSION | COMPARISON/QUANTIZATION METHOD B, th=7.0 |
| 216TH DIMENSION | COMPARISON/QUANTIZATION METHOD B, th=10.0 |
| 217TH DIMENSION | COMPARISON/QUANTIZATION METHOD G, th=D(floor(300×5.0/100)) |
| 218TH DIMENSION | COMPARISON/QUANTIZATION METHOD G, th=D(floor(300×10.0/100)) |
| 219TH DIMENSION | COMPARISON/QUANTIZATION METHOD G, th=D(floor(300×15.0/100)) |
| 220TH DIMENSION | COMPARISON/QUANTIZATION METHOD G, th=D(floor(300×20.0/100)) |
| 221TH DIMENSION | COMPARISON/QUANTIZATION METHOD G, th=D(floor(300×25.0/100)) |
| 222TH DIMENSION | COMPARISON/QUANTIZATION METHOD G, th=D(floor(300×30.0/100)) |
| 223TH DIMENSION | COMPARISON/QUANTIZATION METHOD G, th=D(floor(300×35.0/100)) |
| 224TH DIMENSION | COMPARISON/QUANTIZATION METHOD G, th=D(floor(300×40.0/100)) |
| 225TH DIMENSION | COMPARISON/QUANTIZATION METHOD B, th=3.0 |
| 226TH DIMENSION | COMPARISON/QUANTIZATION METHOD B, th=5.0 |
| 227TH DIMENSION | COMPARISON/QUANTIZATION METHOD B, th=7.0 |
| 228TH DIMENSION | COMPARISON/QUANTIZATION METHOD B, th=10.0 |
| 229TH DIMENSION | COMPARISON/QUANTIZATION METHOD G, th=D(floor(300×5.0/100)) |
| 230TH DIMENSION | COMPARISON/QUANTIZATION METHOD G, th=D(floor(300×10.0/100)) |
| 231TH DIMENSION | COMPARISON/QUANTIZATION METHOD G, th=D(floor(300×15.0/100)) |
| 232TH DIMENSION | COMPARISON/QUANTIZATION METHOD G, th=D(floor(300×20.0/100)) |
| 233TH DIMENSION | COMPARISON/QUANTIZATION METHOD G, th=D(floor(300×25.0/100)) |
| 234TH DIMENSION | COMPARISON/QUANTIZATION METHOD G, th=D(floor(300×30.0/100)) |
| 235TH DIMENSION | COMPARISON/QUANTIZATION METHOD G, th=D(floor(300×35.0/100)) |
| 236TH DIMENSION | COMPARISON/QUANTIZATION METHOD G, th=D(floor(300×40.0/100)) |
| 237TH DIMENSION | COMPARISON/QUANTIZATION METHOD B, th=3.0 |
| 238TH DIMENSION | COMPARISON/QUANTIZATION METHOD B, th=5.0 |
| 239TH DIMENSION | COMPARISON/QUANTIZATION METHOD B, th=7.0 |
| 240TH DIMENSION | COMPARISON/QUANTIZATION METHOD B, th=10.0 |

FIG. 17-e

| | |
|---|---|
| 241TH DIMENSION | COMPARISON/QUANTIZATION METHOD G, th=D(floor(300×5.0/100)) |
| 242TH DIMENSION | COMPARISON/QUANTIZATION METHOD G, th=D(floor(300×10.0/100)) |
| 243TH DIMENSION | COMPARISON/QUANTIZATION METHOD G, th=D(floor(300×15.0/100)) |
| 244TH DIMENSION | COMPARISON/QUANTIZATION METHOD G, th=D(floor(300×20.0/100)) |
| 245TH DIMENSION | COMPARISON/QUANTIZATION METHOD G, th=D(floor(300×25.0/100)) |
| 246TH DIMENSION | COMPARISON/QUANTIZATION METHOD G, th=D(floor(300×30.0/100)) |
| 247TH DIMENSION | COMPARISON/QUANTIZATION METHOD G, th=D(floor(300×35.0/100)) |
| 248TH DIMENSION | COMPARISON/QUANTIZATION METHOD G, th=D(floor(300×40.0/100)) |
| 249TH DIMENSION | COMPARISON/QUANTIZATION METHOD B, th=3.0 |
| 250TH DIMENSION | COMPARISON/QUANTIZATION METHOD B, th=5.0 |
| 251TH DIMENSION | COMPARISON/QUANTIZATION METHOD B, th=7.0 |
| 252TH DIMENSION | COMPARISON/QUANTIZATION METHOD B, th=10.0 |
| 253TH DIMENSION | COMPARISON/QUANTIZATION METHOD G, th=D(floor(300×5.0/100)) |
| 254TH DIMENSION | COMPARISON/QUANTIZATION METHOD G, th=D(floor(300×10.0/100)) |
| 255TH DIMENSION | COMPARISON/QUANTIZATION METHOD G, th=D(floor(300×15.0/100)) |
| 256TH DIMENSION | COMPARISON/QUANTIZATION METHOD G, th=D(floor(300×20.0/100)) |
| 257TH DIMENSION | COMPARISON/QUANTIZATION METHOD G, th=D(floor(300×25.0/100)) |
| 258TH DIMENSION | COMPARISON/QUANTIZATION METHOD G, th=D(floor(300×30.0/100)) |
| 259TH DIMENSION | COMPARISON/QUANTIZATION METHOD G, th=D(floor(300×35.0/100)) |
| 260TH DIMENSION | COMPARISON/QUANTIZATION METHOD G, th=D(floor(300×40.0/100)) |
| 261TH DIMENSION | COMPARISON/QUANTIZATION METHOD B, th=3.0 |
| 262TH DIMENSION | COMPARISON/QUANTIZATION METHOD B, th=5.0 |
| 263TH DIMENSION | COMPARISON/QUANTIZATION METHOD B, th=7.0 |
| 264TH DIMENSION | COMPARISON/QUANTIZATION METHOD B, th=10.0 |
| 265TH DIMENSION | COMPARISON/QUANTIZATION METHOD G, th=D(floor(300×5.0/100)) |
| 266TH DIMENSION | COMPARISON/QUANTIZATION METHOD G, th=D(floor(300×10.0/100)) |
| 267TH DIMENSION | COMPARISON/QUANTIZATION METHOD G, th=D(floor(300×15.0/100)) |
| 268TH DIMENSION | COMPARISON/QUANTIZATION METHOD G, th=D(floor(300×20.0/100)) |
| 269TH DIMENSION | COMPARISON/QUANTIZATION METHOD G, th=D(floor(300×25.0/100)) |
| 270TH DIMENSION | COMPARISON/QUANTIZATION METHOD G, th=D(floor(300×30.0/100)) |
| 271TH DIMENSION | COMPARISON/QUANTIZATION METHOD G, th=D(floor(300×35.0/100)) |
| 272TH DIMENSION | COMPARISON/QUANTIZATION METHOD G, th=D(floor(300×40.0/100)) |
| 273TH DIMENSION | COMPARISON/QUANTIZATION METHOD B, th=3.0 |
| 274TH DIMENSION | COMPARISON/QUANTIZATION METHOD B, th=5.0 |
| 275TH DIMENSION | COMPARISON/QUANTIZATION METHOD B, th=7.0 |
| 276TH DIMENSION | COMPARISON/QUANTIZATION METHOD B, th=10.0 |
| 277TH DIMENSION | COMPARISON/QUANTIZATION METHOD G, th=D(floor(300×5.0/100)) |
| 278TH DIMENSION | COMPARISON/QUANTIZATION METHOD G, th=D(floor(300×10.0/100)) |
| 279TH DIMENSION | COMPARISON/QUANTIZATION METHOD G, th=D(floor(300×15.0/100)) |
| 280TH DIMENSION | COMPARISON/QUANTIZATION METHOD G, th=D(floor(300×20.0/100)) |
| 281TH DIMENSION | COMPARISON/QUANTIZATION METHOD G, th=D(floor(300×25.0/100)) |
| 282TH DIMENSION | COMPARISON/QUANTIZATION METHOD G, th=D(floor(300×30.0/100)) |
| 283TH DIMENSION | COMPARISON/QUANTIZATION METHOD G, th=D(floor(300×35.0/100)) |
| 284TH DIMENSION | COMPARISON/QUANTIZATION METHOD G, th=D(floor(300×40.0/100)) |
| 285TH DIMENSION | COMPARISON/QUANTIZATION METHOD B, th=3.0 |
| 286TH DIMENSION | COMPARISON/QUANTIZATION METHOD B, th=5.0 |
| 287TH DIMENSION | COMPARISON/QUANTIZATION METHOD B, th=7.0 |
| 288TH DIMENSION | COMPARISON/QUANTIZATION METHOD B, th=10.0 |
| 289TH DIMENSION | COMPARISON/QUANTIZATION METHOD G, th=D(floor(300×5.0/100)) |
| 290TH DIMENSION | COMPARISON/QUANTIZATION METHOD G, th=D(floor(300×10.0/100)) |
| 291TH DIMENSION | COMPARISON/QUANTIZATION METHOD G, th=D(floor(300×15.0/100)) |
| 292TH DIMENSION | COMPARISON/QUANTIZATION METHOD G, th=D(floor(300×20.0/100)) |
| 293TH DIMENSION | COMPARISON/QUANTIZATION METHOD G, th=D(floor(300×25.0/100)) |
| 294TH DIMENSION | COMPARISON/QUANTIZATION METHOD G, th=D(floor(300×30.0/100)) |
| 295TH DIMENSION | COMPARISON/QUANTIZATION METHOD G, th=D(floor(300×35.0/100)) |
| 296TH DIMENSION | COMPARISON/QUANTIZATION METHOD G, th=D(floor(300×40.0/100)) |
| 297TH DIMENSION | COMPARISON/QUANTIZATION METHOD B, th=3.0 |
| 298TH DIMENSION | COMPARISON/QUANTIZATION METHOD B, th=5.0 |
| 299TH DIMENSION | COMPARISON/QUANTIZATION METHOD B, th=7.0 |
| 300TH DIMENSION | COMPARISON/QUANTIZATION METHOD B, th=10.0 |

FIG. 19
(A)
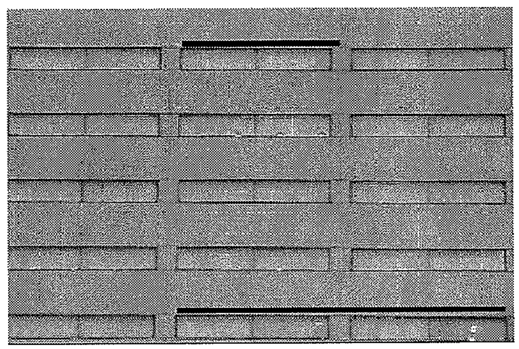
(B)
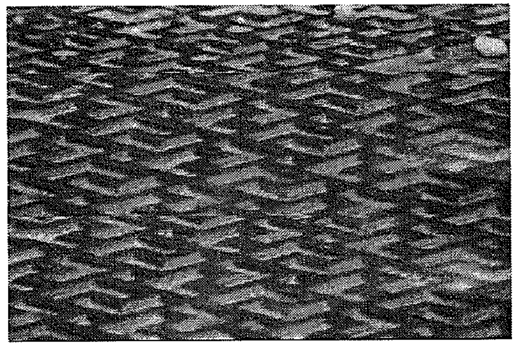

FIG. 27

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
| 64 | 65 | 66 | 67 | 68 | 69 | 70 | 71 | 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 |
| 96 | 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 | 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 | 176 | 177 | 178 | 179 | 180 | 181 | 182 | 183 | 184 | 185 | 186 | 187 | 188 | 189 | 190 | 191 |
| 192 | 193 | 194 | 195 | 196 | 197 | 198 | 199 | 200 | 201 | 202 | 203 | 204 | 205 | 206 | 207 | 208 | 209 | 210 | 211 | 212 | 213 | 214 | 215 | 216 | 217 | 218 | 219 | 220 | 221 | 222 | 223 |
| 224 | 225 | 226 | 227 | 228 | 229 | 230 | 231 | 232 | 233 | 234 | 235 | 236 | 237 | 238 | 239 | 240 | 241 | 242 | 243 | 244 | 245 | 246 | 247 | 248 | 249 | 250 | 251 | 252 | 253 | 254 | 255 |
| 256 | 257 | 258 | 259 | 260 | 261 | 262 | 263 | 264 | 265 | 266 | 267 | 268 | 269 | 270 | 271 | 272 | 273 | 274 | 275 | 276 | 277 | 278 | 279 | 280 | 281 | 282 | 283 | 284 | 285 | 286 | 287 |
| 288 | 289 | 290 | 291 | 292 | 293 | 294 | 295 | 296 | 297 | 298 | 299 | 300 | 301 | 302 | 303 | 304 | 305 | 306 | 307 | 308 | 309 | 310 | 311 | 312 | 313 | 314 | 315 | 316 | 317 | 318 | 319 |
| 320 | 321 | 322 | 323 | 324 | 325 | 326 | 327 | 328 | 329 | 330 | 331 | 332 | 333 | 334 | 335 | 336 | 337 | 338 | 339 | 340 | 341 | 342 | 343 | 344 | 345 | 346 | 347 | 348 | 349 | 350 | 351 |
| 352 | 353 | 354 | 355 | 356 | 357 | 358 | 359 | 360 | 361 | 362 | 363 | 364 | 365 | 366 | 367 | 368 | 369 | 370 | 371 | 372 | 373 | 374 | 375 | 376 | 377 | 378 | 379 | 380 | 381 | 382 | 383 |
| 384 | 385 | 386 | 387 | 388 | 389 | 390 | 391 | 392 | 393 | 394 | 395 | 396 | 397 | 398 | 399 | 400 | 401 | 402 | 403 | 404 | 405 | 406 | 407 | 408 | 409 | 410 | 411 | 412 | 413 | 414 | 415 |
| 416 | 417 | 418 | 419 | 420 | 421 | 422 | 423 | 424 | 425 | 426 | 427 | 428 | 429 | 430 | 431 | 432 | 433 | 434 | 435 | 436 | 437 | 438 | 439 | 440 | 441 | 442 | 443 | 444 | 445 | 446 | 447 |
| 448 | 449 | 450 | 451 | 452 | 453 | 454 | 455 | 456 | 457 | 458 | 459 | 460 | 461 | 462 | 463 | 464 | 465 | 466 | 467 | 468 | 469 | 470 | 471 | 472 | 473 | 474 | 475 | 476 | 477 | 478 | 479 |
| 480 | 481 | 482 | 483 | 484 | 485 | 486 | 487 | 488 | 489 | 490 | 491 | 492 | 493 | 494 | 495 | 496 | 497 | 498 | 499 | 500 | 501 | 502 | 503 | 504 | 505 | 506 | 507 | 508 | 509 | 510 | 511 |
| 512 | 513 | 514 | 515 | 516 | 517 | 518 | 519 | 520 | 521 | 522 | 523 | 524 | 525 | 526 | 527 | 528 | 529 | 530 | 531 | 532 | 533 | 534 | 535 | 536 | 537 | 538 | 539 | 540 | 541 | 542 | 543 |
| 544 | 545 | 546 | 547 | 548 | 549 | 550 | 551 | 552 | 553 | 554 | 555 | 556 | 557 | 558 | 559 | 560 | 561 | 562 | 563 | 564 | 565 | 566 | 567 | 568 | 569 | 570 | 571 | 572 | 573 | 574 | 575 |
| 576 | 577 | 578 | 579 | 580 | 581 | 582 | 583 | 584 | 585 | 586 | 587 | 588 | 589 | 590 | 591 | 592 | 593 | 594 | 595 | 596 | 597 | 598 | 599 | 600 | 601 | 602 | 603 | 604 | 605 | 606 | 607 |
| 608 | 609 | 610 | 611 | 612 | 613 | 614 | 615 | 616 | 617 | 618 | 619 | 620 | 621 | 622 | 623 | 624 | 625 | 626 | 627 | 628 | 629 | 630 | 631 | 632 | 633 | 634 | 635 | 636 | 637 | 638 | 639 |
| 640 | 641 | 642 | 643 | 644 | 645 | 646 | 647 | 648 | 649 | 650 | 651 | 652 | 653 | 654 | 655 | 656 | 657 | 658 | 659 | 660 | 661 | 662 | 663 | 664 | 665 | 666 | 667 | 668 | 669 | 670 | 671 |
| 672 | 673 | 674 | 675 | 676 | 677 | 678 | 679 | 680 | 681 | 682 | 683 | 684 | 685 | 686 | 687 | 688 | 689 | 690 | 691 | 692 | 693 | 694 | 695 | 696 | 697 | 698 | 699 | 700 | 701 | 702 | 703 |
| 704 | 705 | 706 | 707 | 708 | 709 | 710 | 711 | 712 | 713 | 714 | 715 | 716 | 717 | 718 | 719 | 720 | 721 | 722 | 723 | 724 | 725 | 726 | 727 | 728 | 729 | 730 | 731 | 732 | 733 | 734 | 735 |
| 736 | 737 | 738 | 739 | 740 | 741 | 742 | 743 | 744 | 745 | 746 | 747 | 748 | 749 | 750 | 751 | 752 | 753 | 754 | 755 | 756 | 757 | 758 | 759 | 760 | 761 | 762 | 763 | 764 | 765 | 766 | 767 |
| 768 | 769 | 770 | 771 | 772 | 773 | 774 | 775 | 776 | 777 | 778 | 779 | 780 | 781 | 782 | 783 | 784 | 785 | 786 | 787 | 788 | 789 | 790 | 791 | 792 | 793 | 794 | 795 | 796 | 797 | 798 | 799 |
| 800 | 801 | 802 | 803 | 804 | 805 | 806 | 807 | 808 | 809 | 810 | 811 | 812 | 813 | 814 | 815 | 816 | 817 | 818 | 819 | 820 | 821 | 822 | 823 | 824 | 825 | 826 | 827 | 828 | 829 | 830 | 831 |
| 832 | 833 | 834 | 835 | 836 | 837 | 838 | 839 | 840 | 841 | 842 | 843 | 844 | 845 | 846 | 847 | 848 | 849 | 850 | 851 | 852 | 853 | 854 | 855 | 856 | 857 | 858 | 859 | 860 | 861 | 862 | 863 |
| 864 | 865 | 866 | 867 | 868 | 869 | 870 | 871 | 872 | 873 | 874 | 875 | 876 | 877 | 878 | 879 | 880 | 881 | 882 | 883 | 884 | 885 | 886 | 887 | 888 | 889 | 890 | 891 | 892 | 893 | 894 | 895 |
| 896 | 897 | 898 | 899 | 900 | 901 | 902 | 903 | 904 | 905 | 906 | 907 | 908 | 909 | 910 | 911 | 912 | 913 | 914 | 915 | 916 | 917 | 918 | 919 | 920 | 921 | 922 | 923 | 924 | 925 | 926 | 927 |
| 928 | 929 | 930 | 931 | 932 | 933 | 934 | 935 | 936 | 937 | 938 | 939 | 940 | 941 | 942 | 943 | 944 | 945 | 946 | 947 | 948 | 949 | 950 | 951 | 952 | 953 | 954 | 955 | 956 | 957 | 958 | 959 |
| 960 | 961 | 962 | 963 | 964 | 965 | 966 | 967 | 968 | 969 | 970 | 971 | 972 | 973 | 974 | 975 | 976 | 977 | 978 | 979 | 980 | 981 | 982 | 983 | 984 | 985 | 986 | 987 | 988 | 989 | 990 | 991 |
| 992 | 993 | 994 | 995 | 996 | 997 | 998 | 999 | 1000 | 1001 | 1002 | 1003 | 1004 | 1005 | 1006 | 1007 | 1008 | 1009 | 1010 | 1011 | 1012 | 1013 | 1014 | 1015 | 1016 | 1017 | 1018 | 1019 | 1020 | 1021 | 1022 | 1023 |

FIG. 28-a

| | FIRST EXTRACTION REGION | SECOND EXTRACTION REGION |
|---|---|---|
| 1ST DIMENSION | 0—97 | 2—99 |
| 2ND DIMENSION | 4—39 | 68—103 |
| 3RD DIMENSION | 8—105 | 10—107 |
| 4TH DIMENSION | 12—47 | 76—111 |
| 5TH DIMENSION | 128—163 | 192—227 |
| 6TH DIMENSION | 132—229 | 134—231 |
| 7TH DIMENSION | 136—171 | 200—235 |
| 8TH DIMENSION | 140—237 | 142—239 |
| 9TH DIMENSION | 256—353 | 258—355 |
| 10TH DIMENSION | 260—295 | 324—359 |
| 11TH DIMENSION | 264—361 | 266—363 |
| 12TH DIMENSION | 268—303 | 332—367 |
| 13TH DIMENSION | 384—419 | 448—483 |
| 14TH DIMENSION | 388—485 | 390—487 |
| 15TH DIMENSION | 392—427 | 456—491 |
| 16TH DIMENSION | 396—493 | 398—495 |
| 17TH DIMENSION | 16—51 | 80—115 |
| 18TH DIMENSION | 20—117 | 22—119 |
| 19TH DIMENSION | 24—59 | 88—123 |
| 20TH DIMENSION | 28—125 | 30—127 |
| 21TH DIMENSION | 144—241 | 146—243 |
| 22TH DIMENSION | 148—183 | 212—247 |
| 23TH DIMENSION | 152—249 | 154—251 |
| 24TH DIMENSION | 156—191 | 220—255 |
| 25TH DIMENSION | 272—307 | 336—371 |
| 26TH DIMENSION | 276—373 | 278—375 |
| 27TH DIMENSION | 280—315 | 344—379 |
| 28TH DIMENSION | 284—381 | 286—383 |
| 29TH DIMENSION | 400—497 | 402—499 |
| 30TH DIMENSION | 404—439 | 468—503 |
| 31TH DIMENSION | 408—505 | 410—507 |
| 32TH DIMENSION | 412—447 | 476—511 |
| 33TH DIMENSION | 512—547 | 576—611 |
| 34TH DIMENSION | 516—613 | 518—615 |
| 35TH DIMENSION | 520—555 | 584—619 |
| 36TH DIMENSION | 524—621 | 526—623 |
| 37TH DIMENSION | 640—737 | 642—739 |
| 38TH DIMENSION | 644—679 | 708—743 |
| 39TH DIMENSION | 648—745 | 650—747 |
| 40TH DIMENSION | 652—687 | 716—751 |
| 41TH DIMENSION | 768—803 | 832—867 |
| 42TH DIMENSION | 772—869 | 774—871 |
| 43TH DIMENSION | 776—811 | 840—875 |
| 44TH DIMENSION | 780—877 | 782—879 |
| 45TH DIMENSION | 896—993 | 898—995 |
| 46TH DIMENSION | 900—935 | 964—999 |
| 47TH DIMENSION | 904—1001 | 906—1003 |
| 48TH DIMENSION | 908—943 | 972—1007 |
| 49TH DIMENSION | 528—625 | 530—627 |
| 50TH DIMENSION | 532—567 | 596—631 |
| 51TH DIMENSION | 536—633 | 538—635 |
| 52TH DIMENSION | 540—575 | 604—639 |
| 53TH DIMENSION | 656—691 | 720—755 |
| 54TH DIMENSION | 660—757 | 662—759 |
| 55TH DIMENSION | 664—699 | 728—763 |
| 56TH DIMENSION | 668—765 | 670—767 |
| 57TH DIMENSION | 784—881 | 786—883 |

| | FIRST EXTRACTION REGION | SECOND EXTRACTION REGION |
|---|---|---|
| 58TH DIMENSION | 788—823 | 852—887 |
| 59TH DIMENSION | 792—889 | 794—891 |
| 60TH DIMENSION | 796—831 | 860—895 |
| 61TH DIMENSION | 912—947 | 976—1011 |
| 62TH DIMENSION | 916—1013 | 918—1015 |
| 63TH DIMENSION | 920—955 | 984—1019 |
| 64TH DIMENSION | 924—1021 | 926—1023 |
| 65TH DIMENSION | 66—101 | 130—165 |
| 66TH DIMENSION | 70—167 | 72—169 |
| 67TH DIMENSION | 74—109 | 138—173 |
| 68TH DIMENSION | 78—175 | 80—177 |
| 69TH DIMENSION | 82—117 | 146—181 |
| 70TH DIMENSION | 86—183 | 88—185 |
| 71TH DIMENSION | 90—125 | 154—189 |
| 72TH DIMENSION | 194—291 | 196—293 |
| 73TH DIMENSION | 198—233 | 262—297 |
| 74TH DIMENSION | 202—299 | 204—301 |
| 75TH DIMENSION | 206—241 | 270—305 |
| 76TH DIMENSION | 210—307 | 212—309 |
| 77TH DIMENSION | 214—249 | 278—313 |
| 78TH DIMENSION | 218—315 | 220—317 |
| 79TH DIMENSION | 322—357 | 386—421 |
| 80TH DIMENSION | 326—423 | 328—425 |
| 81TH DIMENSION | 330—365 | 394—429 |
| 82TH DIMENSION | 334—431 | 336—433 |
| 83TH DIMENSION | 338—373 | 402—437 |
| 84TH DIMENSION | 342—439 | 344—441 |
| 85TH DIMENSION | 346—381 | 410—455 |
| 86TH DIMENSION | 450—547 | 452—549 |
| 87TH DIMENSION | 454—489 | 518—553 |
| 88TH DIMENSION | 458—555 | 460—557 |
| 89TH DIMENSION | 462—497 | 526—561 |
| 90TH DIMENSION | 466—563 | 468—565 |
| 91TH DIMENSION | 470—505 | 534—569 |
| 92TH DIMENSION | 474—571 | 476—573 |
| 93TH DIMENSION | 578—613 | 642—677 |
| 94TH DIMENSION | 582—679 | 584—681 |
| 95TH DIMENSION | 586—621 | 650—685 |
| 96TH DIMENSION | 590—687 | 592—689 |
| 97TH DIMENSION | 594—629 | 658—693 |
| 98TH DIMENSION | 598—695 | 600—697 |
| 99TH DIMENSION | 602—637 | 666—701 |
| 100TH DIMENSION | 706—803 | 708—805 |
| 101TH DIMENSION | 710—745 | 774—809 |
| 102TH DIMENSION | 714—811 | 716—813 |
| 103TH DIMENSION | 718—753 | 782—817 |
| 104TH DIMENSION | 722—819 | 724—821 |
| 105TH DIMENSION | 726—761 | 790—825 |
| 106TH DIMENSION | 730—827 | 732—829 |
| 107TH DIMENSION | 834—869 | 898—933 |
| 108TH DIMENSION | 838—935 | 840—937 |
| 109TH DIMENSION | 842—877 | 906—941 |
| 110TH DIMENSION | 846—943 | 848—945 |
| 111TH DIMENSION | 850—885 | 914—949 |
| 112TH DIMENSION | 854—951 | 856—953 |
| 113TH DIMENSION | 858—893 | 922—957 |

FIG. 28-b

| | FIRST EXTRACTION REGION | SECOND EXTRACTION REGION |
|---|---|---|
| 114TH DIMENSION | 0—99 \| 132—231 | 4—103 \| 128—227 |
| 115TH DIMENSION | 8—107 \| 140—239 | 12—111 \| 136—235 |
| 116TH DIMENSION | 16—115 \| 148—247 | 20—119 \| 144—243 |
| 117TH DIMENSION | 24—123 \| 156—255 | 28—127 \| 152—251 |
| 118TH DIMENSION | 256—355 \| 388—487 | 260—359 \| 384—483 |
| 119TH DIMENSION | 264—363 \| 396—495 | 268—367 \| 392—491 |
| 120TH DIMENSION | 272—371 \| 404—503 | 276—375 \| 400—499 |
| 121TH DIMENSION | 280—379 \| 412—511 | 284—383 \| 408—507 |
| 122TH DIMENSION | 512—611 \| 644—743 | 516—615 \| 640—739 |
| 123TH DIMENSION | 520—619 \| 652—751 | 524—623 \| 648—747 |
| 124TH DIMENSION | 528—627 \| 660—759 | 532—631 \| 656—755 |
| 125TH DIMENSION | 536—635 \| 668—767 | 540—639 \| 664—763 |
| 126TH DIMENSION | 768—867 \| 900—999 | 772—871 \| 896—995 |
| 127TH DIMENSION | 776—875 \| 908—1007 | 780—879 \| 904—1003 |
| 128TH DIMENSION | 784—883 \| 916—1015 | 788—887 \| 912—1011 |
| 129TH DIMENSION | 792—891 \| 924—1023 | 796—895 \| 920—1019 |
| 130TH DIMENSION | 132—231 \| 264—363 | 136—235 \| 260—359 |
| 131TH DIMENSION | 140—239 \| 272—371 | 144—243 \| 268—367 |
| 132TH DIMENSION | 148—247 \| 280—379 | 152—251 \| 276—375 |
| 133TH DIMENSION | 388—487 \| 520—619 | 392—491 \| 516—615 |
| 134TH DIMENSION | 396—495 \| 528—627 | 400—499 \| 524—623 |
| 135TH DIMENSION | 404—503 \| 536—635 | 408—507 \| 532—631 |
| 136TH DIMENSION | 644—743 \| 776—875 | 648—747 \| 772—871 |
| 137TH DIMENSION | 652—751 \| 784—883 | 656—755 \| 780—879 |
| 138TH DIMENSION | 660—759 \| 792—891 | 664—763 \| 788—887 |

FIG. 28-c

| | FIRST EXTRACTION REGION | SECOND EXTRACTION REGION |
|---|---|---|
| 139TH DIMENSION | 33—330 | 43—340 |
| 140TH DIMENSION | 33—330 | 53—350 |
| 141TH DIMENSION | 33—330 | 353—650 |
| 142TH DIMENSION | 33—330 | 363—660 |
| 143TH DIMENSION | 33—330 | 373—670 |
| 144TH DIMENSION | 33—330 | 673—970 |
| 145TH DIMENSION | 33—330 | 683—980 |
| 146TH DIMENSION | 33—330 | 693—990 |
| 147TH DIMENSION | 43—340 | 53—350 |
| 148TH DIMENSION | 43—340 | 353—650 |
| 149TH DIMENSION | 43—340 | 363—660 |
| 150TH DIMENSION | 43—340 | 373—670 |
| 151TH DIMENSION | 43—340 | 673—970 |
| 152TH DIMENSION | 43—340 | 683—980 |
| 153TH DIMENSION | 43—340 | 693—990 |
| 154TH DIMENSION | 53—350 | 353—650 |
| 155TH DIMENSION | 53—350 | 363—660 |
| 156TH DIMENSION | 53—350 | 373—670 |
| 157TH DIMENSION | 53—350 | 673—970 |
| 158TH DIMENSION | 53—350 | 683—980 |
| 159TH DIMENSION | 53—350 | 693—990 |
| 160TH DIMENSION | 353—650 | 363—660 |
| 161TH DIMENSION | 353—650 | 373—670 |
| 162TH DIMENSION | 353—650 | 673—970 |
| 163TH DIMENSION | 353—650 | 683—980 |
| 164TH DIMENSION | 353—650 | 693—990 |
| 165TH DIMENSION | 363—660 | 373—670 |
| 166TH DIMENSION | 363—660 | 673—970 |
| 167TH DIMENSION | 363—660 | 683—980 |
| 168TH DIMENSION | 363—660 | 693—990 |
| 169TH DIMENSION | 373—670 | 673—970 |
| 170TH DIMENSION | 373—670 | 683—980 |
| 171TH DIMENSION | 373—670 | 693—990 |
| 172TH DIMENSION | 673—970 | 683—980 |
| 173TH DIMENSION | 673—970 | 693—990 |
| 174TH DIMENSION | 683—980 | 693—990 |

FIG. 28-d

| | FIRST EXTRACTION REGION | SECOND EXTRACTION REGION |
|---|---|---|
| 175TH DIMENSION | 423—588 | 435—600 |
| 176TH DIMENSION | 237—402 | 621—786 |
| 177TH DIMENSION | 231—396 | 627—792 |
| 178TH DIMENSION | 243—408 | 615—780 |
| 179TH DIMENSION | 237—402 | 435—600 |
| 180TH DIMENSION | 435—600 | 621—786 |
| 181TH DIMENSION | 621—786 | 423—588 |
| 182TH DIMENSION | 423—588 | 237—402 |
| 183TH DIMENSION | 231—396 | 243—408 |
| 184TH DIMENSION | 243—408 | 627—792 |
| 185TH DIMENSION | 627—732 | 615—780 |
| 186TH DIMENSION | 615—780 | 231—396 |
| 187TH DIMENSION | 429—594 | 45—210 |
| 188TH DIMENSION | 429—594 | 441—606 |
| 189TH DIMENSION | 429—594 | 813—978 |
| 190TH DIMENSION | 429—594 | 417—582 |
| 191TH DIMENSION | 45—210 | 813—978 |
| 192TH DIMENSION | 417—582 | 441—606 |
| 193TH DIMENSION | 39—204 | 51—216 |
| 194TH DIMENSION | 807—972 | 819—984 |
| 195TH DIMENSION | 225—390 | 609—774 |
| 196TH DIMENSION | 249—414 | 633—798 |
| 197TH DIMENSION | 39—204 | 225—390 |
| 198TH DIMENSION | 51—216 | 249—414 |
| 199TH DIMENSION | 633—798 | 819—984 |
| 200TH DIMENSION | 609—774 | 807—972 |
| 201TH DIMENSION | 33—198 | 57—222 |
| 202TH DIMENSION | 57—222 | 825—990 |
| 203TH DIMENSION | 825—990 | 801—966 |
| 204TH DIMENSION | 801—966 | 33—198 |

FIG. 28-e

| | FIRST EXTRACTION REGION | | | | SECOND EXTRACTION REGION |
|---|---|---|---|---|---|
| 205TH DIMENSION | 33—106 | 129—227 | 136—234 | 257—330 | 132—231 |
| 206TH DIMENSION | 43—116 | 139—237 | 146—244 | 267—340 | 142—241 |
| 207TH DIMENSION | 53—126 | 149—247 | 156—254 | 277—350 | 152—251 |
| 208TH DIMENSION | 353—426 | 449—547 | 456—554 | 577—650 | 452—551 |
| 209TH DIMENSION | 363—436 | 459—557 | 466—564 | 587—660 | 462—561 |
| 210TH DIMENSION | 373—446 | 469—567 | 476—574 | 597—670 | 472—571 |
| 211TH DIMENSION | 673—746 | 769—867 | 776—874 | 897—970 | 772—871 |
| 212TH DIMENSION | 683—756 | 779—877 | 786—884 | 907—980 | 782—881 |
| 213TH DIMENSION | 693—766 | 789—887 | 796—894 | 917—990 | 792—891 |
| 214TH DIMENSION | 198—271 | 294—392 | 301—399 | 422—495 | 297—396 |
| 215TH DIMENSION | 208—281 | 304—402 | 311—409 | 432—505 | 307—406 |
| 216TH DIMENSION | 518—591 | 614—712 | 621—719 | 742—815 | 617—716 |
| 217TH DIMENSION | 528—601 | 624—722 | 631—729 | 752—825 | 627—726 |
| 218TH DIMENSION | 38—111 | 134—242 | 141—239 | 262—335 | 137—236 |
| 219TH DIMENSION | 48—121 | 144—242 | 151—249 | 272—345 | 147—246 |
| 220TH DIMENSION | 193—266 | 289—387 | 296—394 | 417—490 | 292—391 |
| 221TH DIMENSION | 203—276 | 299—397 | 306—404 | 427—500 | 302—401 |
| 222TH DIMENSION | 213—286 | 309—407 | 316—414 | 437—510 | 312—411 |
| 223TH DIMENSION | 358—431 | 454—552 | 461—559 | 582—655 | 457—556 |
| 224TH DIMENSION | 368—441 | 464—562 | 471—569 | 592—665 | 467—566 |
| 225TH DIMENSION | 513—586 | 609—707 | 616—714 | 737—810 | 612—711 |
| 226TH DIMENSION | 523—596 | 619—717 | 626—724 | 747—820 | 622—721 |
| 227TH DIMENSION | 533—606 | 629—727 | 636—734 | 757—830 | 632—731 |
| 228TH DIMENSION | 678—751 | 774—872 | 781—879 | 902—975 | 777—876 |
| 229TH DIMENSION | 688—761 | 784—882 | 791—889 | 912—985 | 787—886 |
| 230TH DIMENSION | 66—206 | 226—294 | 234—302 | 322—462 | 231—297 |
| 231TH DIMENSION | 71—211 | 231—299 | 239—307 | 327—467 | 236—302 |
| 232TH DIMENSION | 76—216 | 236—304 | 244—312 | 332—472 | 241—307 |
| 233TH DIMENSION | 81—221 | 241—309 | 249—317 | 337—477 | 246—312 |
| 234TH DIMENSION | 226—366 | 386—454 | 394—462 | 482—622 | 391—457 |
| 235TH DIMENSION | 231—371 | 391—459 | 399—467 | 487—627 | 396—462 |
| 236TH DIMENSION | 236—376 | 396—464 | 404—472 | 492—632 | 401—467 |
| 237TH DIMENSION | 241—381 | 401—469 | 409—477 | 497—637 | 406—472 |
| 238TH DIMENSION | 386—526 | 546—614 | 554—622 | 642—782 | 551—617 |
| 239TH DIMENSION | 391—531 | 551—619 | 559—627 | 647—787 | 556—622 |
| 240TH DIMENSION | 396—536 | 556—624 | 564—632 | 652—792 | 561—627 |
| 241TH DIMENSION | 401—541 | 561—629 | 569—637 | 657—797 | 566—632 |
| 242TH DIMENSION | 546—686 | 706—774 | 714—782 | 802—942 | 711—777 |
| 243TH DIMENSION | 551—691 | 711—779 | 719—787 | 807—947 | 716—782 |
| 244TH DIMENSION | 556—696 | 716—784 | 724—792 | 812—952 | 721—787 |
| 245TH DIMENSION | 561—701 | 721—789 | 729—797 | 817—957 | 726—792 |
| 246TH DIMENSION | 104—141 | 168—201 | 172—205 | 232—269 | 170—203 |
| 247TH DIMENSION | 109—146 | 173—206 | 177—210 | 237—274 | 175—208 |
| 248TH DIMENSION | 114—151 | 178—211 | 182—215 | 242—279 | 180—213 |
| 249TH DIMENSION | 259—296 | 323—356 | 327—360 | 387—424 | 325—358 |
| 250TH DIMENSION | 264—301 | 328—361 | 322—365 | 392—429 | 330—363 |
| 251TH DIMENSION | 269—306 | 333—366 | 337—370 | 397—434 | 335—368 |
| 252TH DIMENSION | 274—311 | 338—371 | 342—375 | 402—439 | 340—373 |
| 253TH DIMENSION | 279—316 | 343—376 | 347—380 | 407—444 | 345—378 |
| 254TH DIMENSION | 419—456 | 483—516 | 487—520 | 547—584 | 485—518 |
| 255TH DIMENSION | 424—461 | 488—521 | 492—525 | 552—589 | 490—523 |
| 256TH DIMENSION | 429—466 | 493—526 | 497—530 | 557—594 | 495—528 |
| 257TH DIMENSION | 434—471 | 498—531 | 502—535 | 562—599 | 500—533 |
| 258TH DIMENSION | 439—476 | 503—536 | 507—540 | 567—604 | 505—538 |
| 259TH DIMENSION | 579—616 | 643—676 | 647—680 | 707—744 | 645—678 |
| 260TH DIMENSION | 584—621 | 648—681 | 652—685 | 712—749 | 650—683 |
| 261TH DIMENSION | 589—626 | 653—686 | 657—690 | 717—754 | 655—688 |
| 262TH DIMENSION | 594—631 | 658—691 | 662—695 | 722—759 | 660—693 |
| 263TH DIMENSION | 599—636 | 663—696 | 667—700 | 727—764 | 665—698 |
| 264TH DIMENSION | 744—781 | 808—841 | 812—845 | 872—909 | 810—843 |
| 265TH DIMENSION | 749—786 | 813—846 | 817—850 | 877—914 | 815—848 |
| 266TH DIMENSION | 754—791 | 818—851 | 822—855 | 882—919 | 820—853 |

FIG. 28-f

| | FIRST EXTRACTION REGION | SECOND EXTRACTION REGION |
|---|---|---|
| 267TH DIMENSION | 163—332 | 101—394 |
| 268TH DIMENSION | 171—340 | 109—402 |
| 269TH DIMENSION | 179—348 | 117—410 |
| 270TH DIMENSION | 419—588 | 357—650 |
| 271TH DIMENSION | 427—596 | 365—658 |
| 272TH DIMENSION | 435—604 | 373—666 |
| 273TH DIMENSION | 675—844 | 613—906 |
| 274TH DIMENSION | 683—852 | 621—914 |
| 275TH DIMENSION | 691—860 | 629—922 |

FIG. 28-g

| | FIRST EXTRACTION REGION | SECOND EXTRACTION REGION |
|---|---|---|
| 276TH DIMENSION | 128—227 \| 136—235 | 132—231 |
| 277TH DIMENSION | 4—103 \| 260—359 | 132—231 |
| 278TH DIMENSION | 133—232 \| 141—240 | 137—236 |
| 279TH DIMENSION | 9—108 \| 265—364 | 137—236 |
| 280TH DIMENSION | 138—237 \| 146—245 | 142—241 |
| 281TH DIMENSION | 14—113 \| 270—369 | 142—241 |
| 282TH DIMENSION | 143—242 \| 151—250 | 147—246 |
| 283TH DIMENSION | 19—118 \| 275—374 | 147—246 |
| 284TH DIMENSION | 148—247 \| 156—255 | 152—251 |
| 285TH DIMENSION | 24—123 \| 280—379 | 152—251 |
| 286TH DIMENSION | 288—387 \| 296—395 | 292—391 |
| 287TH DIMENSION | 164—263 \| 420—519 | 292—391 |
| 288TH DIMENSION | 293—392 \| 301—400 | 297—396 |
| 289TH DIMENSION | 169—268 \| 425—524 | 297—396 |
| 290TH DIMENSION | 298—397 \| 306—405 | 302—401 |
| 291TH DIMENSION | 174—273 \| 430—529 | 302—401 |
| 292TH DIMENSION | 303—402 \| 311—410 | 307—406 |
| 293TH DIMENSION | 179—278 \| 435—534 | 307—406 |
| 294TH DIMENSION | 308—407 \| 316—415 | 312—411 |
| 295TH DIMENSION | 184—283 \| 440—539 | 312—411 |
| 296TH DIMENSION | 448—547 \| 456—555 | 452—551 |
| 297TH DIMENSION | 324—423 \| 580—679 | 452—551 |
| 298TH DIMENSION | 453—552 \| 461—560 | 457—556 |
| 299TH DIMENSION | 329—428 \| 585—684 | 457—556 |
| 300TH DIMENSION | 458—557 \| 466—565 | 462—561 |
| 301TH DIMENSION | 334—433 \| 590—689 | 462—561 |
| 302TH DIMENSION | 463—562 \| 471—570 | 467—566 |
| 303TH DIMENSION | 339—438 \| 595—694 | 467—566 |
| 304TH DIMENSION | 468—567 \| 476—575 | 472—571 |
| 305TH DIMENSION | 344—433 \| 600—699 | 472—571 |
| 306TH DIMENSION | 608—707 \| 616—715 | 612—711 |
| 307TH DIMENSION | 484—583 \| 740—839 | 612—711 |
| 308TH DIMENSION | 613—712 \| 621—720 | 617—716 |
| 309TH DIMENSION | 489—588 \| 745—844 | 617—716 |
| 310TH DIMENSION | 618—717 \| 626—725 | 622—721 |
| 311TH DIMENSION | 494—593 \| 750—849 | 622—721 |
| 312TH DIMENSION | 623—722 \| 631—730 | 627—726 |
| 313TH DIMENSION | 499—598 \| 755—854 | 627—726 |
| 314TH DIMENSION | 628—727 \| 636—735 | 632—731 |
| 315TH DIMENSION | 504—603 \| 760—859 | 632—731 |
| 316TH DIMENSION | 768—867 \| 776—875 | 772—871 |
| 317TH DIMENSION | 644—743 \| 900—999 | 772—871 |
| 318TH DIMENSION | 773—872 \| 781—880 | 777—876 |
| 319TH DIMENSION | 649—748 \| 905—1004 | 777—876 |
| 320TH DIMENSION | 778—877 \| 786—885 | 782—881 |
| 321TH DIMENSION | 654—753 \| 910—1009 | 782—881 |
| 322TH DIMENSION | 783—882 \| 791—890 | 787—886 |
| 323TH DIMENSION | 659—758 \| 915—1014 | 787—886 |
| 324TH DIMENSION | 788—887 \| 796—895 | 792—891 |
| 325TH DIMENSION | 664—763 \| 920—1019 | 792—891 |

FIG. 29

| REGION TYPE | NUMBER OF DIMENSIONS | INDEX CORRESPONDING TO THRESHOLD |
|---|---|---|
| REGION TYPE a | 113 | 37 |
| REGION TYPE b | 25 | 8 |
| REGION TYPE c | 36 | 11 |
| REGION TYPE d | 30 | 9 |
| REGION TYPE e | 62 | 20 |
| REGION TYPE f | 9 | 2 |
| REGION TYPE g | 50 | 16 |

FIG. 30-a
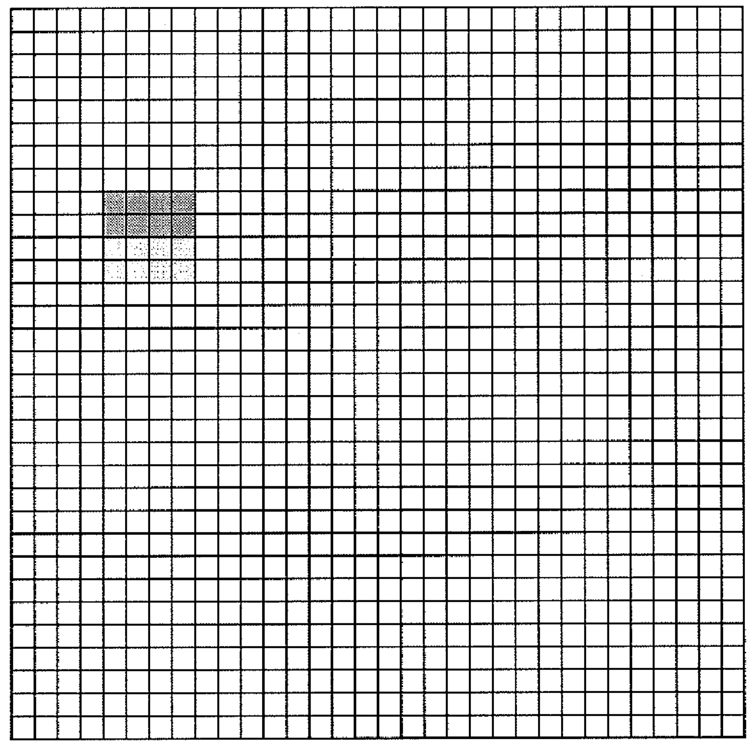

FIG. 30-b
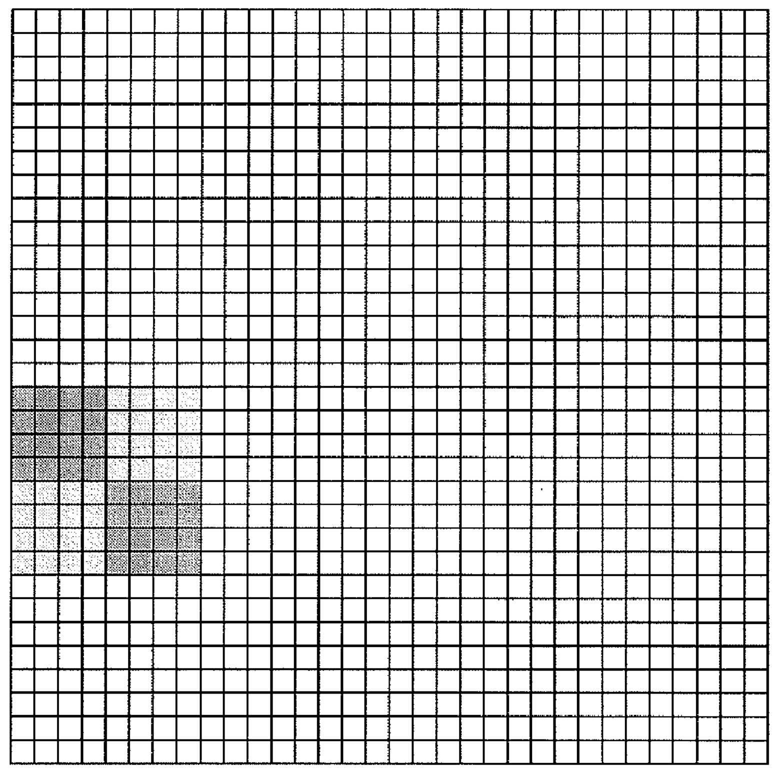

FIG. 30-c
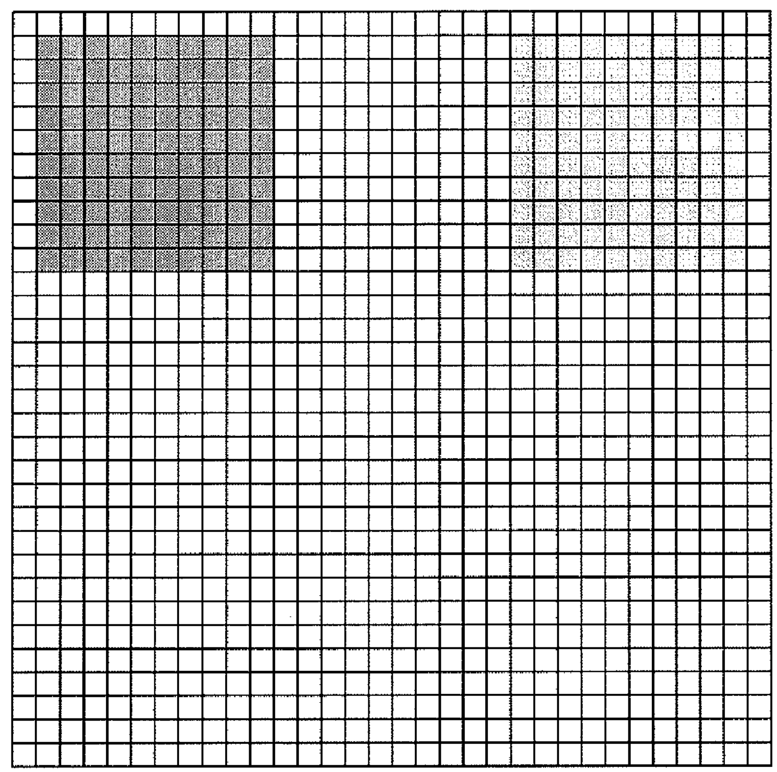

FIG. 30-d
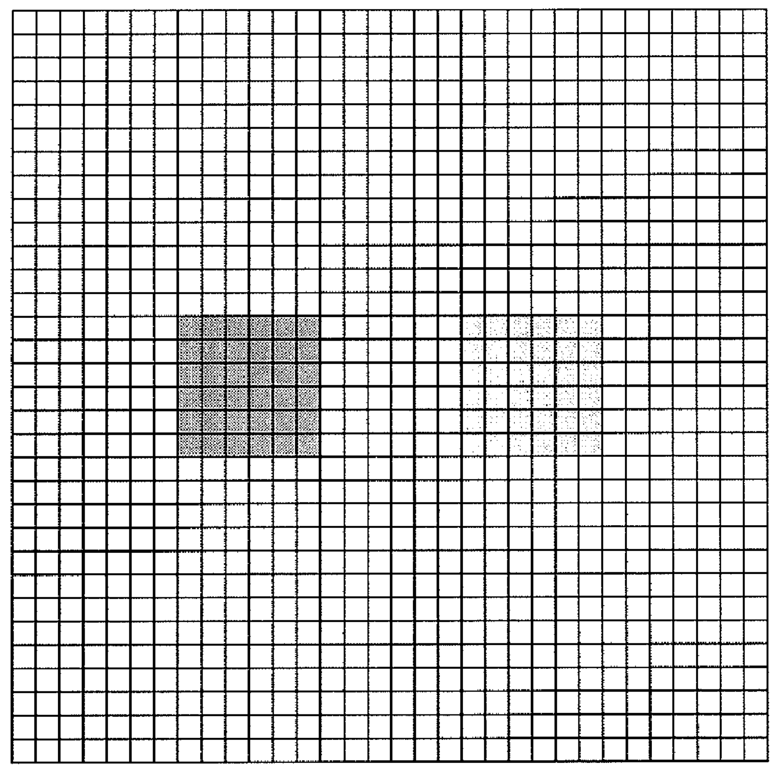

FIG. 30-e
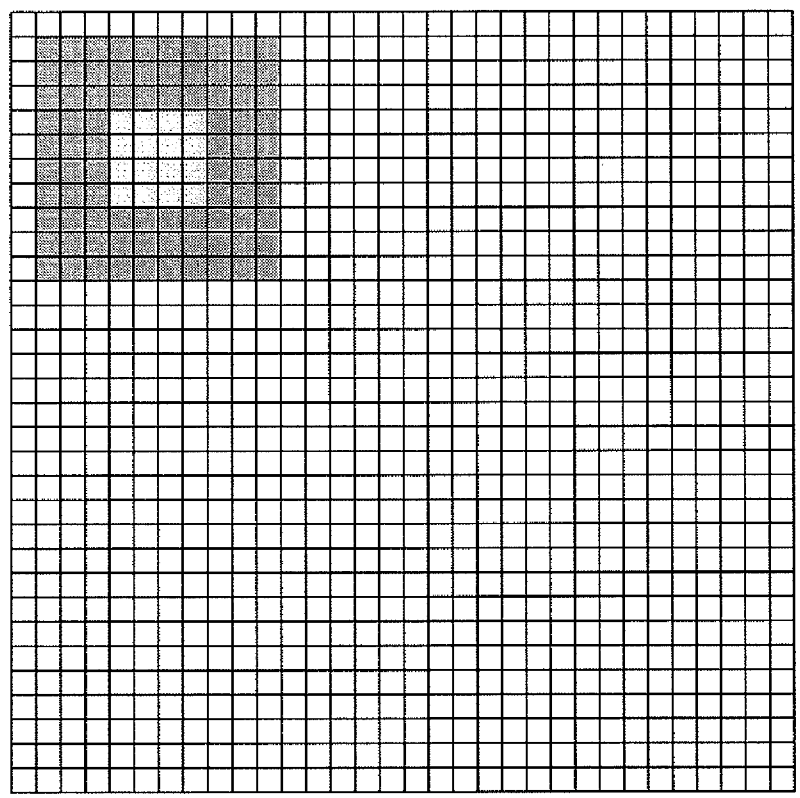

FIG. 30-f
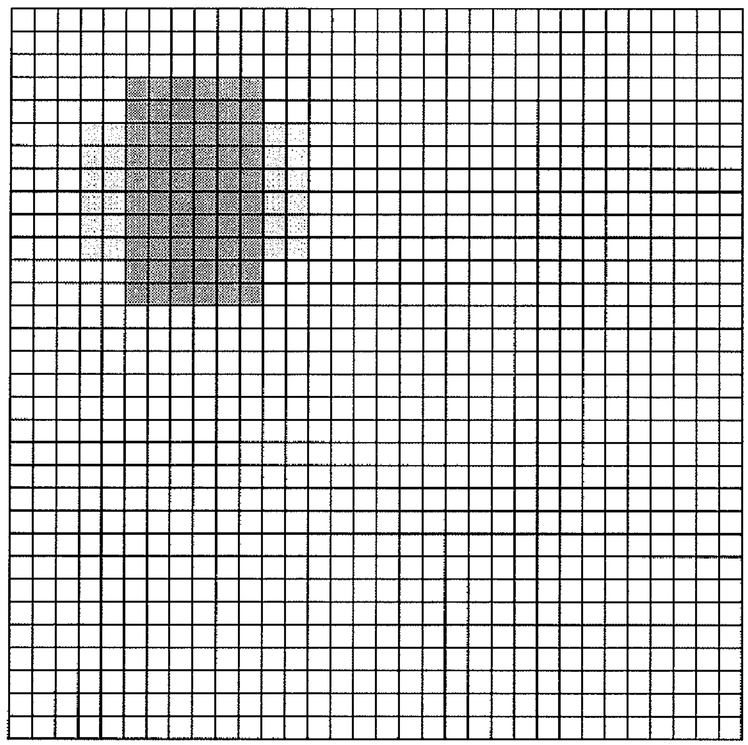

FIG. 30-g
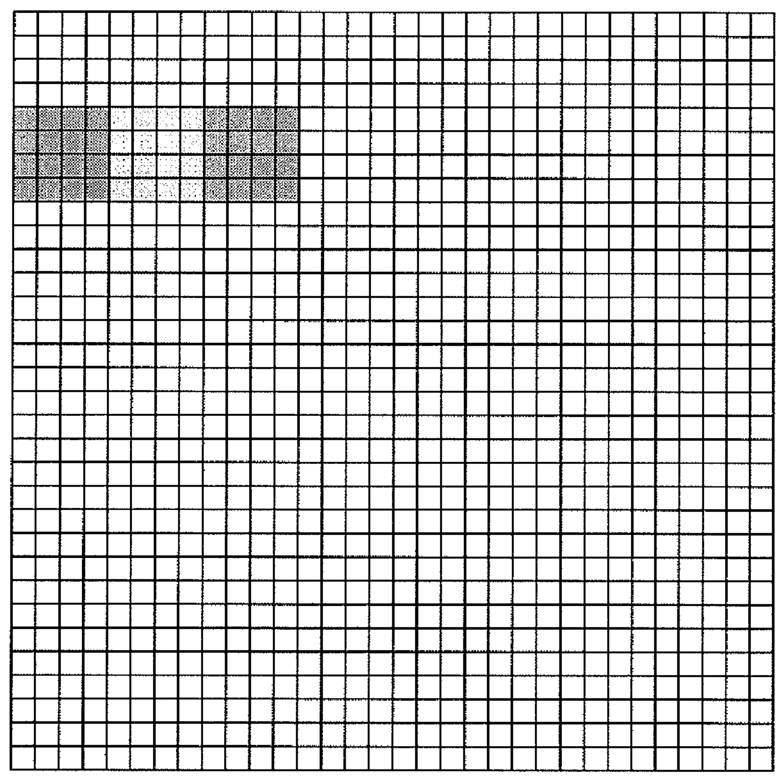

IMAGE SIGNATURE MATCHING DEVICE

CROSS REFERENCE TO RELATED APPLICATIONS

This application is a National Stage of International Application No. PCT/JP2010/001768 filed Mar. 12, 2010, claiming priority based on Japanese Patent Application Nos. 2009-061021 filed Mar. 13, 2009 and JP 2009-097863 filed Apr. 14, 2009, the contents of all of which are incorporated herein by reference in their entirety.

TECHNICAL FIELD

The present invention relates to devices for matching images using image signatures which are features for discriminating (determining the identity of) images.

BACKGROUND ART

Image signatures are image features for discriminating (determining the identity of) images. By comparing an image signature extracted from an image with an image signature extracted from another image, an identity scale (in general, referred to as similarity or distance) indicating a degree of the two images being identical can be calculated from a comparison result. Further, by comparing the calculated identity scale with a threshold, it is possible to determine whether or not the two images are identical. In this context, the meaning of "two images being identical" includes not only the case where the two images are identical at the level of image signals (pixel values of the pixels constituting the images), but also the case where one image is a duplicate image of the other by means of various alteration processes such as conversion of compression format of an image, conversion of size/aspect ratio of an image, adjustment of color tone of an image, various filtering processes (sharpening, smoothing, and the like) applied to an image, local processing (caption superimposition, cutout, and the like) applied to an image, and recapturing of an image. By using image signatures, as it is possible to detect duplication of an image or a moving image which is a collection of images, for example, image signatures are applicable to an illegal copy detection system for images or moving images.

Patent Document 1 describes an example of an image signature. FIG. 18 is an illustration showing a method of extracting an image signature described in Patent Document 1. This image signature is a feature vector in multiple dimensions (sixteen dimensions in FIG. 18). The method includes respectively calculating mean luminance values from thirty two pieces of rectangle regions 244 (among them, sixteen pieces of rectangle regions are shown in FIG. 18) at predetermined positions in an image 240, and calculating differences in mean luminance value between rectangle regions forming pairs (the paired rectangle regions are linked to each other with dotted lines 248 in FIG. 18), to thereby obtain a difference vector 250 in sixteen dimensions. With respect to the difference vector 250, a composite vector is generated by means of vector transformation, and a quantization index vector in sixteen dimensions, acquired by quantizing the respective dimensions of the composite vector, is used as an image signature.

PRIOR ART DOCUMENT

Patent Document

Patent Document 1: Japanese Unexamined Patent Publication No. 8-500471

SUMMARY OF THE INVENTION

Problems to be Solved by the Invention

In an image signature formed of a feature vector in a plurality of dimensions, as the amount of information held by the feature vector is larger (redundancy is smaller) as correlation between dimensions are smaller, such an image signature has high discrimination capability which is a degree of discriminating different images. In contrast, if correlation between dimensions in a feature vector is large, as the amount of information held by the feature vector is small (redundancy is large), the discrimination capability is low. It should be noted that correlation between dimensions is a degree of similarity occurring from the features of the dimensions, and mathematically, it is a value calculated as, if occurrence of a feature of each dimension is set as a probability variable, a correlation coefficient between probability variables or a mutual information amount, for example. As such, it is desirable that an image signature formed of a feature vector in a plurality of dimensions should be designed such that correlation between dimensions is small.

Image signals (pixel values of the pixels constituting an image) have correlation between local regions in the image. Generally, as the distance between local regions is shorter, the correlation is larger. In particular, in an image in which a specific image pattern appears repeatedly (particularly, in the case where the image pattern repeatedly appears in regular cycles) (for example, an image of windows of a building arranged in a grid pattern, see FIG. 19(A)) or in an image formed of a particular texture (see FIG. 19(B)), for example, correlation between local regions of the image is large.

[First Problem]

Regarding an image signature formed of a feature vector including features extracted from a plurality of local regions of the image, as described in Patent Document 1, as the shapes of the local regions for extracting the features are the same in each dimension (in the example of Patent Document 1, rectangle regions in the same shape) with respect to an image in which correlation between local regions in the image is large, correlation between the dimensions of the extracted features is large. As such, there is a first problem that discrimination capability of the image signature (feature vector) is low. It should be noted that the shapes are identical means that the regions are identical including their size and angle (tilt or orientation).

For example, the image signature as described in Patent Document 1 has low discrimination capability with respect to an image in which a specific image pattern appears repeatedly (see FIG. 19(A)) or in an image formed of a particular texture (see FIG. 19(B)).

[Second Problem]

A second problem of the image signature described in Patent Document 1 is that as the shapes of the regions of respective dimensions for calculating features (feature vector) are in the identical rectangle shape (including size and angle), there is a blind spot on frequencies where it is impossible to detect frequency components having a cycle which is the same as the length of a side of the rectangle or which is a fraction of the integer thereof This is because that if an average is calculated within a region for a signal component of such a particular frequency, the value becomes 0 regardless of the magnitude of the signal component, so that signals of such frequency component cannot be detected at all. More specifically, assuming that a frequency having the same cycle as the length of a side of the rectangle is $f_0$, components of a frequency $nf_0$ ($n=1, 2, 3, \ldots$) cannot be detected. As such, with respect to an image in which signals concentrate on direct current components and such frequency components, a mean value of the pixel values becomes the same as the direct current component, whereby there is no difference in values between regions. Consequently, the value of every feature extracted as a difference in mean pixel values between regions becomes 0, so that discrimination cannot be performed (discrimination capability is significantly lowered). Practically, as it is difficult to detect not only the components of the frequency $nf_0$ (n=1, 2, 3, . . . ) but also a certain nearby frequency regions, even if signals do not concentrate on the above-described particular frequency, signal components of such a frequency band cannot be used, whereby the discrimination capability is lowered. In order to alleviate this problem, it may be possible to increase the value of the frequency $f_0$ so as to decrease the signal electricity fallen into the frequency band which is difficult to be detected. However, increasing the value of the frequency $f_0$ means reducing the size of the region, leading to lowering of the robustness (a degree that a feature does not vary due to various alteration processes or noise) of the frequency. For example, if a region becomes smaller, the value of the feature largely varies with respect to minor positional shift, whereby the robustness of the feature is lowered. As described above, when using the identical rectangle regions, it is extremely difficult to secure the robustness while increasing the discrimination capability.

[Object Of The Invention]

An object of the present invention is to provide an image signature matching device capable of solving the above described problem, that is, a problem that matching accuracy is lowered in matching using image signatures having low discrimination capability which is a degree of discriminating different images.

Means for Solving the Problems

According to an aspect to the present invention, an image signature matching device includes a matching unit for matching an image signature of a first image and an image signature of a second image. The image signature of the first image and the image signature of the second image are generated by a generation method including, extracting region features from respective sub-regions of a plurality of pairs of sub-regions in an image, and for each of the pairs of sub-regions, quantizing a difference value between the region features of two sub-regions forming a pair, wherein when performing the quantization, the difference value is quantized to the particular quantization value if an absolute value of the difference value is smaller than a predetermined value, and using a collection of elements which are quantization values calculated for the respective pairs of sub-regions as an image signature to be used for discriminating the image. The matching unit matches the image signature of the first image and the image signature of the second image in such a manner that a weight of an element having the particular quantization value is reduced.

Effects of the Invention

As the present invention is configured as described above, matching between a first image and a second image can be performed with high accuracy using image signatures having high discrimination capability which is a degree of discriminating different images. In particular, this advantageous effect is significantly achieved with respect to an image in which correlation between local regions thereof is high.

Further, according to the present invention, matching can be performed using image signatures in which the discrimination capability is not lowered with respect to an image having signals concentrating on a particular frequency.

BRIEF DESCRIPTION OF THE DRAWINGS

FIG. 1 is a block diagram showing a first embodiment of the present invention.

FIG. 7 is a flowchart showing a flow of the processing in the second embodiment of the present invention.

FIG. 9 is a table showing examples of region feature calculation methods for respective dimensions.

FIG. 11 is a block diagram showing a fourth embodiment of the present invention.

FIG. 12 is a table showing examples of comparison and quantization methods for respective dimensions.

FIG. 14-*a* is a table showing each-dimension extraction region information used in a fifth embodiment and a sixth embodiment of the present invention.

FIG. 14-*b* is a table showing each-dimension extraction region information used in the fifth embodiment and the sixth embodiment of the present invention.

FIG. 14-*c* is a table showing each-dimension extraction region information used in the fifth embodiment and the sixth embodiment of the present invention.

FIG. 14-*d* is a table showing each-dimension extraction region information used in the fifth embodiment and the sixth embodiment of the present invention.

FIG. 14-*e* is a table showing each-dimension extraction region information used in the fifth embodiment and the sixth embodiment of the present invention.

FIG. 14-*f* is a table showing each-dimension extraction region information used in the fifth embodiment and the sixth embodiment of the present invention.

FIG. 14-*g* is a table showing each-dimension extraction region information used in the fifth embodiment and the sixth embodiment of the present invention.

FIG. 14-*h* is a table showing each-dimension extraction region information used in the fifth embodiment and the sixth embodiment of the present invention.

FIG. 14-*i* is a table showing each-dimension extraction region information used in the fifth embodiment and the sixth embodiment of the present invention.

FIG. 14-*j* is a table showing each-dimension extraction region information used in the fifth embodiment and the sixth embodiment of the present invention.

FIG. 15-*a* is a table showing each-dimension region feature calculation method information used in the fifth embodiment of the present invention.

FIG. 15-*b* is a table showing each-dimension region feature calculation method information used in the fifth embodiment of the present invention.

FIG. 15-*c* is a table showing each-dimension region feature calculation method information used in the fifth embodiment of the present invention.

FIG. 15-*d* is a table showing each-dimension region feature calculation method information used in the fifth embodiment of the present invention.

FIG. 15-*e* is a table showing each-dimension region feature calculation method information used in the fifth embodiment of the present invention.

FIG. 16-*a* is a table showing each-dimension region feature calculation method information used in the sixth embodiment of the present invention.

FIG. 16-*b* is a table showing each-dimension region feature calculation method information used in the sixth embodiment of the present invention.

FIG. 16-*c* is a table showing each-dimension region feature calculation method information used in the sixth embodiment of the present invention.

FIG. 16-*d* is a table showing each-dimension region feature calculation method information used in the sixth embodiment of the present invention.

FIG. 16-*e* is a table showing each-dimension region feature calculation method information used in the sixth embodiment of the present invention.

FIG. 17-*a* is a table showing each-dimension comparison and quantization method information used in the fifth embodiment and the sixth embodiment of the present invention.

FIG. 17-*b* is a table showing each-dimension comparison and quantization method information used in the fifth embodiment and the sixth embodiment of the present invention.

FIG. 17-*c* is a table showing each-dimension comparison and quantization method information used in the fifth embodiment and the sixth embodiment of the present invention.

FIG. 17-*d* is a table showing each-dimension comparison and quantization method information used in the fifth embodiment and the sixth embodiment of the present invention.

FIG. 17-*e* is a table showing each-dimension comparison and quantization method information used in the fifth embodiment and the sixth embodiment of the present invention.

FIG. 19 is an illustration showing examples of images in which correlation between local regions is large.

FIG. 27 is a table showing examples of indexes applied to 1024 pieces of blocks formed by dividing an image into 32 in a vertical direction and 32 in a horizontal direction.

FIG. 28-*a* is a table showing regions belonging to one type, among regions corresponding to the respective dimensions in a seventh embodiment of the present invention.

FIG. 28-*b* is a table showing regions belonging to one type, among regions corresponding to the respective dimensions in the seventh embodiment of the present invention.

FIG. 28-*c* is a table showing regions belonging to one type, among regions corresponding to the respective dimensions in the seventh embodiment of the present invention.

FIG. 28-*d* is a table showing regions belonging to one type, among regions corresponding to the respective dimensions in the seventh embodiment of the present invention.

FIG. 28-*e* is a table showing regions belonging to one type, among regions corresponding to the respective dimensions in the seventh embodiment of the present invention.

FIG. 28-*f* is a table showing regions belonging to one type, among regions corresponding to the respective dimensions in the seventh embodiment of the present invention.

FIG. 28-*g* is a table showing regions belonging to one type, among regions corresponding to the respective dimensions in the seventh embodiment of the present invention.

FIG. 29 is a table showing a relation among a region type of each dimension, a dimension number, and an index corresponding to a threshold.

FIG. 30-*a* is an illustration showing an example of first and second extraction regions of a dimension of a region type a.

FIG. 30-*b* is an illustration showing an example of first and second extraction regions of a dimension of a region type b.

FIG. 30-*c* is an illustration showing an example of first and second extraction regions of a dimension of a region type c.

FIG. 30-*d* is an illustration showing an example of first and second extraction regions of a dimension of a region type d.

FIG. 30-*e* is an illustration showing an example of first and second extraction regions of a dimension of a region type e.

FIG. 30-*f* is an illustration showing an example of first and second extraction regions of a dimension of a region type f.

FIG. 30-*g* is an illustration showing an example of first and second extraction regions of a dimension of a region type g.

DESCRIPTION OF EMBODIMENTS

[First Embodiment]

[Configuration of First Embodiment]

Next, a first embodiment of the present invention will be described in detail with reference to the drawings.

Referring to FIG. 1, an image signature extraction device according to the first embodiment of the present invention is a system for outputting, with respect to an input image, a feature vector (more specifically, a quantization index vector) formed of a plurality of dimensions, as an image signature. The image signature extraction device includes a dimension determination unit 1, an extraction region acquisition unit 2, a region feature calculation unit 3, and a comparison unit 4.

The dimension determination unit 1 determines a dimension of a feature vector to be extracted next, and supplies it to the extraction region acquisition unit 2. The dimension determination unit 1 sequentially supplies dimensions of the feature vector to be extracted, and the constituent elements after the extraction region acquisition unit 2 extract features corresponding to the supplied dimensions. For example, if a feature vector is formed of N dimensions, the dimension determination unit 1 may sequentially supply the $1^{st}$ dimension to the $N^{th}$ dimension to the extraction region acquisition unit 2. The dimensions may be supplied in any order if all of the dimensions of the feature vector are supplied finally. It is also possible to supply a plurality of dimensions in parallel.

To the extraction region acquisition unit 2, each-dimension extraction region information is supplied as an input, besides the dimensions supplied from the dimension determination unit 1.

The each-dimension extraction region information is information indicating a predetermined pair of a first extraction region and a second extraction region for extracting the feature of a dimension, which is associated with each dimension of a feature vector. The first and second extraction regions have the following features as prerequisites.

[Prerequisites of First and Second Extraction Regions]

Prerequisites of the first and second extraction regions are that relative positions of a pair of extraction regions are different among the dimensions, and combinations of the shapes of the pair of extraction regions are different among the dimensions.

Figure 2:
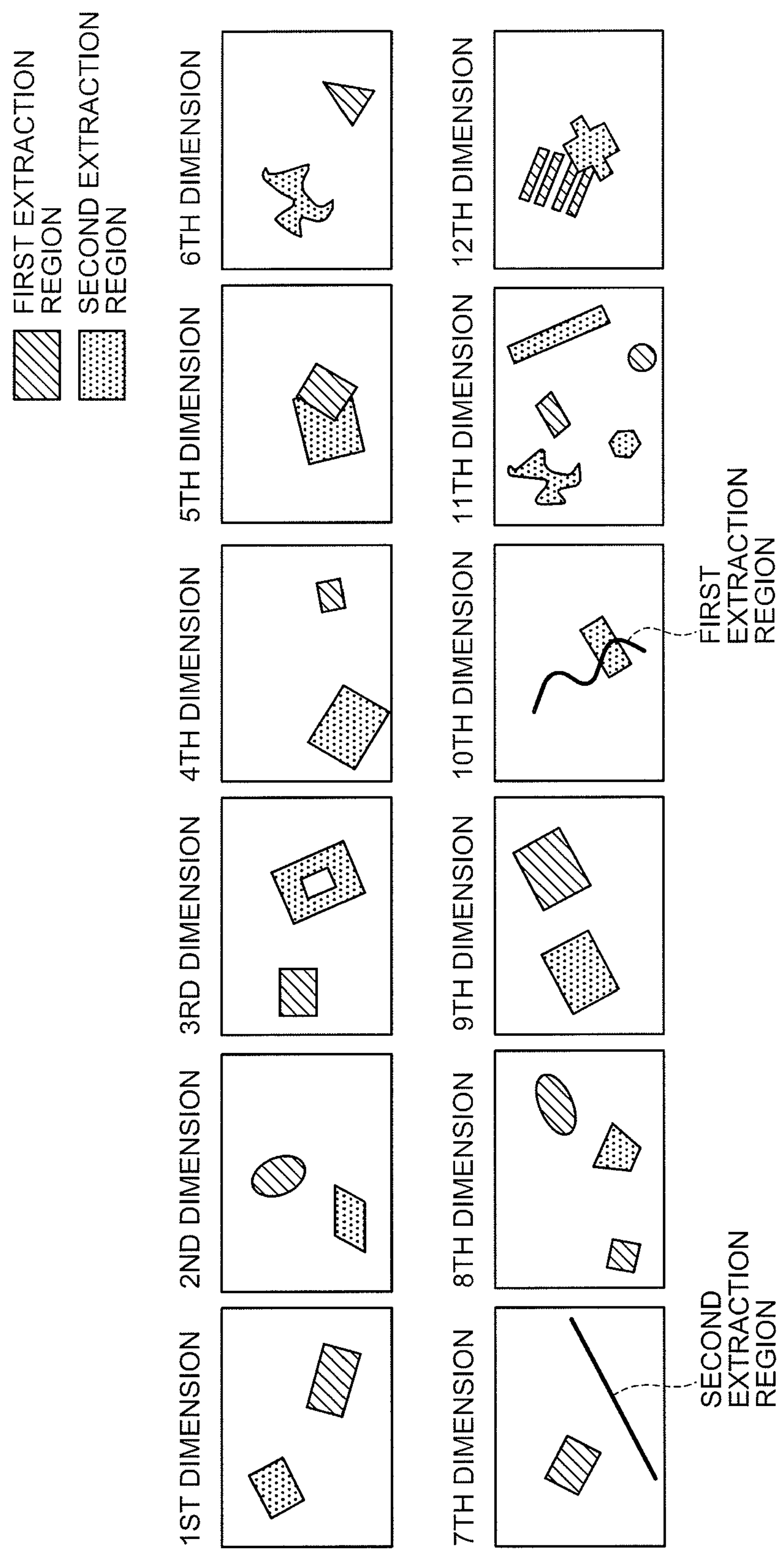
FIG. 2 is an illustration showing exemplary pairs of extraction regions for respective dimensions shown by each-dimension extraction information.

FIG. 2 shows an exemplary pair of extraction regions, satisfying the prerequisites, for each of the dimensions indicated by the each-dimension extraction information. Different from the extraction regions for an image signature shown in FIG. 18, combinations of the shapes of the pairs of extraction regions are different among the respective dimensions. Different in shape includes the same shapes of different angles (e.g., the second extraction region of the $1^{st}$ dimension and the first extraction region of the $7^{th}$ dimension in FIG. 2), and similar shapes of different sizes (e.g., the second extraction region of the $1^{st}$ dimension and the second extraction region of the $9^{th}$ dimension in FIG. 2). It should be noted that a minimum condition is that at least one dimension, in which a pair of extraction regions have a combination of different shapes, is included in all of the dimensions of a feature vector. It is desirable that a feature vector includes a larger number of dimensions having pairs of extraction regions in (a combination of) different shapes from each other. This is because as a feature vector includes a larger number of pairs of extraction regions in (a combination of) different shapes from each other, a larger number of correlations between dimensions become smaller in the feature vector, whereby the discrimination capability becomes higher. For example, the shapes of a pair extraction regions may be different from each other in every dimensions in a feature vector.

A first extraction region and a second extraction region in a dimension are not necessarily in the same shape as shown in the $9^{th}$ dimension of FIG. 2, but may be in different shapes as shown in other dimensions of FIG. 2. If the shapes of a first extraction region and a second extraction in each dimension are different, the correlation between the features extracted from the first extraction region and the second extraction region becomes smaller, whereby the discrimination capability becomes higher. As such, it is desirable. Further, in that case, as a possibility that the first extraction region and the second extraction region become blind spots for the same frequency at the same time is low, the discrimination capability becomes high.

The respective extraction regions may take any shapes. For example, any complicated shapes, such as the second extraction region of the $6^{th}$ dimension in FIG. 2, are also acceptable. If extraction regions are formed of a plurality of pixels of an image, a line segment and a curved line are also acceptable as show in the $7^{th}$ dimension and the $10^{th}$ dimensions in FIG. 2. Further, an extraction region may consist of a plurality of discontinuous small regions, as the first extraction region of the $8^{th}$ dimension, the first and second extraction regions of the $11^{th}$ dimension, and the first extraction region of the $12^{th}$ dimension. As described above, if a feature vector includes extraction regions in complicated shapes, correlation between the dimensions of the features extracted therefrom can be lowered, whereby the discrimination capability can be higher.

Further, it is also possible that portions of a first extraction region and a second extraction region overlap each other, as in the $5^{th}$ dimension of FIG. 2. Further, either one of a pair of extraction regions may be included in the other one. As described above, by allowing overlapping of a pair of extraction regions, as a larger number of patterns (relative position, distance) can be taken for pairs of extraction regions, patterns enabling to reduce the correlation between dimensions can be increased, whereby the possibility of improving the discrimination capability is increased.

Figure 18:
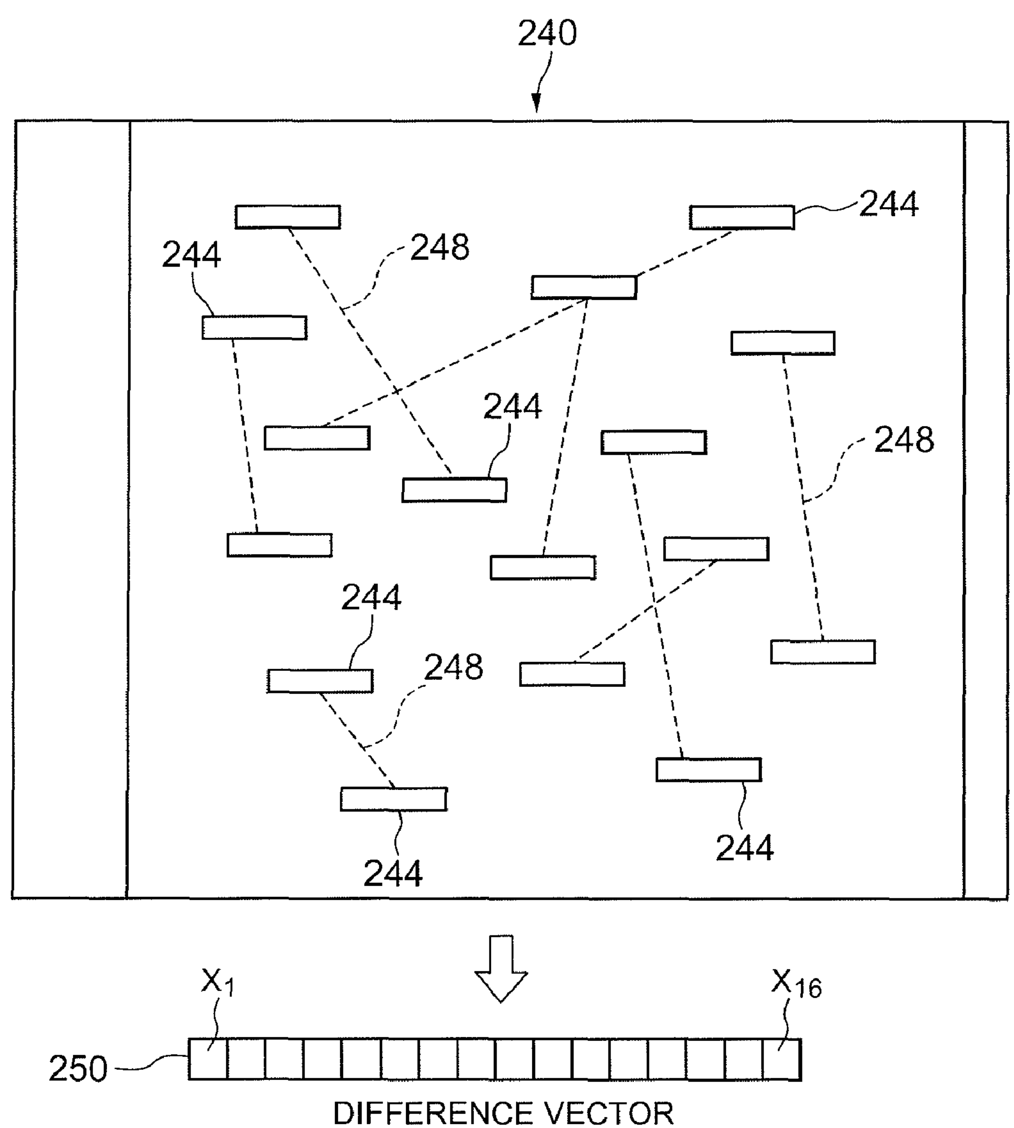
FIG. 18 is an illustration showing a method of extracting an image signature described in Patent Document 1.

Further, portions of extraction regions may overlap each other between dimensions as the respective dimensions shown in FIG. 2, different from the extraction regions for the image signature shown in FIG. 18. If extraction regions are taken exclusively between dimensions as shown in the extraction regions for the image signature shown in FIG. 18, possible patterns of pairs of extraction regions are limited. By allowing overlapping of extraction regions between dimensions as shown in FIG. 2, it is possible to increase patterns enabling to reduce the correlation between dimensions, whereby the possibility of improving the discrimination capability is increased. However, if there are too many overlapped portions of extract regions between dimensions, correlation between dimensions becomes large so that the discrimination capability becomes low. As such, it is not desirable.

Further, it is desirable that extraction regions are taken such that the region from which features are not extracted is small (which means almost all of the screen image can be covered) when the extraction regions for all dimensions are combined. If the region from which features are not extracted is large as in the case of FIG. 18, a large portion of the information included in the image signal (pixel values of the pixels constituting the image) is not used, so that the discrimination capability is not high. By taking extraction regions such that the region from which features are not extracted is small (which means almost all of the screen image can be covered) when the extraction regions for all dimensions are combined, a larger portion of the information included in the image signal can be reflected on the features, whereby the discrimination capability can be high. Further, it is desirable that extraction features are not biased but obtained uniformly from the entire image, when the extraction regions for all dimensions are combined. However, if the probability of performing local processing such as caption superimposition on a specific region is high, it is desirable to obtain extraction regions while avoiding such a region. Further, generally, as regions around the edge of an image often do not include feature portions of the image, it is desirable to obtain extraction regions while avoiding such surrounding regions.

Furthermore, it is desirable that the size and the relative position (distance, direction) of the extraction regions follow certain distribution (uniform distribution, for example), because if the relative position (distance, direction) follows the uniform distribution, the extraction region are not biased with respect to the distance or direction whereby the extraction regions do not concentrate on a particular distance or direction, whereby a wider variety can be achieved. Further, as the correlation between regions is larger as the relative positions are close, in order to offset such an effect, it is desirable that the difference in shape is larger as the relative positions are closer.

The each-dimension extraction region information may be in any form if a first extraction region and a second extraction region for each dimension can be uniquely specified with the information. Further, as an extraction region must always be the same region with respect to an image of any size or aspect ratio, the each-dimension extraction region information should be in a form which can obtain the same extraction region with respect to an image of any size or aspect ratio. For example, the each-region extraction region may describe the position and the shape of an extraction region with respect to an image having a predetermined size and aspect ratio (for example, an image having a horizontal width of 320 pixels×a vertical width of 240 pixels). In that case, with respect to an image input with an arbitrary size and aspect ratio, resizing the image first to have the predetermined size and aspect ratio and then specifying the extraction region in accordance with the position and the shape of the extraction region described in the each-dimension extraction region information. In contrast, it is also possible to convert the position and the shape of the extraction region described in the each-dimension extraction region information corresponding to the image of any size and aspect ratio of the input image to thereby specify the extraction region.

The information indicating each extraction region included in the each-dimension extraction region information may be information describing a collection of coordinate values of all pixels constituting the extraction region with respect to an image of a predetermined size and aspect ratio (for example, an image having a horizontal width of 320 pixels×a vertical width of 240 pixels). Further, the information indicating each extraction region included in the each-dimension extraction region information may be information describing, with parameters, the position and the shape of the extraction region with respect to an image of a predetermined size and aspect ratio. For example, if the shape of the extraction region is a quadrangle, the information may describe the coordinate values of the four corners of the quadrangle. Further, if the shape of the extraction region is a circle, the information may describe the coordinate values of the center and the radius value of the circle.

Further, it is also possible to adopt a method of generating, with use of a seed of pseudo random numbers as an each-dimension extraction region information, pseudo random numbers by starting from the seed inside the extraction region acquisition unit 2 to thereby generate extraction regions in different shapes according to the random numbers (for example, the four corners of a quadrangle are determined according to the random numbers). Specifically, an each-dimension extraction region can be acquired according to the following procedure.

(1) A seed of pseudo random numbers is supplied as each-dimension extraction region information.

(2) A dimension n is set to be n=1

(3) Pseudo random numbers are generated, and the four corners of a quadrangle of a first extraction region for the dimension n are determined.

(4) Pseudo random numbers are generated, and the four corners of a quadrangle of a second extraction region for the dimension n are determined.

(5) A dimension n is set to be n+1, and the procedure returns to (3).

As the extraction regions are determined based on the random numbers, the generated extraction regions are different from each other for respective dimensions. Further, if the seed of the pseudo random numbers is the same, as the same random numbers are generated each time (with respect to any images), the same extraction regions are reproduced for different images.

The extraction region acquisition unit 2 acquires, from the each-dimension extraction region information supplied as an input, information indicating the first extraction region and the second extraction region corresponding to the dimension supplied from the dimension determination unit 1, and outputs the information to the extraction region representative value calculation unit 3.

To the region feature calculation unit 3, an image which is an extraction target for an image signature is supplied as an input, besides the input from the extraction region acquisition unit 2 (information indicating the first extraction region and the second extraction region). The region feature calculation unit 3 includes a first region feature calculation unit 31 and a second region feature calculation unit 32. With use of the first region feature calculation unit 31, the region feature calculation unit 3 calculates, from the image supplied as an input, a feature of the first extraction region as a first region feature for each dimension based on the information indicating the first extraction region supplied from the extraction region acquisition unit 2, and supplies the feature to the comparison unit 4. Further, with use of the second region feature calculation unit 32, the region feature calculation unit 3 calculates, from the image supplied as an input, a feature of the second extraction region as a second region feature for each dimension based on the information indicating the second extraction region supplied from the extraction region acquisition unit 2, and supplies the feature to the comparison unit 4.

It should be noted that in order to specify the respective extraction regions with respect to the input image based on the information indicating the first extraction region and the second extraction region, the region feature calculation unit 2 resizes the image to have a predetermined size and aspect ratio in the each-dimension extraction region information, if necessary.

The region feature calculation unit 3 calculates region features of the respective extraction regions using the pixel values of a group of pixels included in the respective extraction regions. In this embodiment, a pixel value is a value of a signal held by each pixel of the image, which is a scalar quantity or a vector quantity. For example, if the image is a luminance image, a pixel value is a luminance value (scalar quantity), and if the image is a color image, a pixel value is a vector quantity indicating a color component. If the color image is an RGB image, a pixel value is a three-dimensional vector quantity of an R component, a G component, and a B component. Further, if the color image is a YCbCr image, a pixel value is a three-dimensional vector quantity of a Y component, a Cb component, and a Cr component.

For calculating the region features of the extraction regions, any methods can be used if a method of calculating the extraction regions (first extraction region and the second extraction region) of the dimension is constant (the same calculation method is used for any input images).

Further, the region feature to be calculated may be a scalar quantity or a vector quantity. For example, if a pixel value is a scalar quantity such as a luminance value, the region feature may be calculated as a mean value, a median value, a mode value, a maximum value, a minimum value, or the like (each of them is a scalar quantity). Further, it is also possible to sort pixel values included in an extraction region, and obtain a pixel value at a predetermined proportional position from the top or the bottom of the distribution (sorted order) as a region feature (which is also a scalar quantity), for example. More specifically, explanation will be given for the case where P % of the percentage (e.g., P=25%) is the predetermined proportion. Pixel values (luminance values) of the total N pieces of pixels included in an extraction region are sorted in ascending order, and a collection of the pixel values (luminance values) sorted in ascending order is indicated as Y(i)={Y(0), Y(1), Y(2), . . . , Y(N−1)}. In this example, a pixel value at a position of P % from the bottom of the permutation sorted in ascending order is Y(floor(N*P/100)) for example, so this value is obtained as a region feature of the extraction region. It should be noted that floor( )is a function in which after the decimal point is truncated. In this example, a region feature calculated by applying this formula (Y(floor(N*P/100))) with respect to the luminance value of the pixel included in the extraction region is referred to as a "percentile luminance value feature".

Further, if the pixel value is a vector quantity such as a color component, it is possible to first convert the value into a scalar quantity by means of any method, and then calculate a region feature by the above-described method. For example, if the pixel value is a three-dimensional vector quantity of RGB components, it is possible to first convert the value into a luminance value which is a scalar quantity, and then calculate a region feature by the above-described method. Further, if the pixel value is a vector quantity, it is also possible to use a mean vector of the pixel values included in the extraction region as a region feature.

Further, it is also possible to perform any operation (differential operation, filtering operation) such as edge detection or template matching with respect to an extraction region, and use the operation result as a region feature. For example, it may be a two-dimensional vector quantity indicating the edge direction (gradient direction), or a scalar quantity indicating the similarity with a template.

Further, a histogram showing the color distribution, edge direction distribution, or edge intensity distribution, included in the extraction region, may be obtained as a region feature (each of them is a vector quantity).

Further, any of the various types of features defined in ISO/IEC 15938-3 may be used, which include dominant color, color layout, scalable color, color structure, edge histogram, homogeneous texture, texture browsing, region shape, contour shape, shape 3D, parametric motion, and motion activity.

The comparison unit 4 compares the first region feature with the second region feature supplied from the region feature calculation unit 3 for each dimension, and quantizes the comparison result to output the acquired quantization index. As the comparison unit 4 outputs quantization indexes for the respective dimensions, a quantization index vector consisting of the quantization indexes of a plurality of dimensions is finally output.

The comparison unit 4 may use any methods to compare a first region feature with a second region feature and perform quantization. Also, the number of quantization indexes for each dimension is also arbitrary.

If the region features are scalar quantities (e.g., mean values of luminance values) for example, the comparison unit 4 may compare their magnitudes, and if the first region feature is larger, set the quantization index to be +1, and in other cases, sets the quantization index to be −1, so as to quantize the comparison result into two values of quantization indexes of +1 and −1. In should be noted that regarding a dimension n, if the first region feature is Vn1 and the second region feature is Vn2, a quantization index Qn of the dimension n can be calculated by the following expression.

$$Qn = +1(\text{if } Vn1 > Vn2) \quad -1(\text{if } Vn1 \leq Vn2) \qquad \text{[Expression 1]}$$

Figure 3:
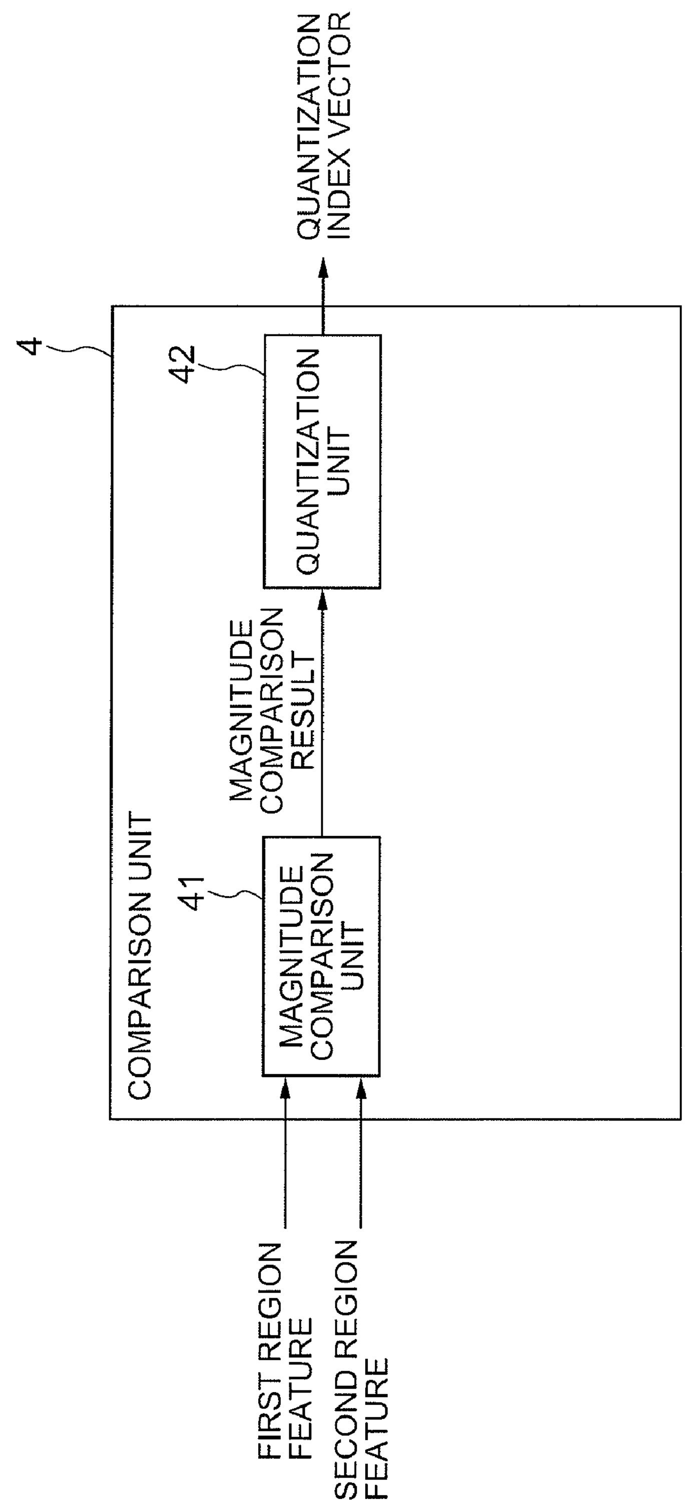
FIG. 3 is a block diagram showing an example of a comparison unit in the first embodiment of the present invention.

FIG. 3 shows a more detailed configuration diagram of the comparison unit 4 when the comparison unit 4 performs comparison and quantization based on the above Expression 1.

Referring to FIG. 3, the comparison unit 4 includes a magnitude comparison unit 41 and a quantization unit 42.

When the first region feature and the second region features are supplied, the magnitude comparison unit 41 compares the value of a first region feature with the value of the second region feature, and supplies the comparison result to the quantization unit 42. This means that the magnitude comparison unit 41 compares the magnitude of Vn1 with that of Vn2, and supplies information indicating whether the comparison result is Vn1>Vn2 or Vn1≦Vn2 to the quantization unit 42 as a magnitude comparison result.

Based on the magnitude comparison result supplied from the magnitude comparison unit 41, the quantization unit 42 performs quantization according to Expression 1, and outputs a quantization index. As such, the quantization unit 42 outputs a quantization index in such a manner that if information indicating that the comparison result is Vn1>Vn2 is supplied, a quantization index is +1, while if information indicating that the comparison result is Vn1≦Vn2 is supplied, an quantization index is −1.

It should be noted that the comparison and quantization method according to Expression 1 is hereinafter referred to as a comparison and quantization method A.

Further, if the region feature is a scalar volume (e.g., a mean value of luminance values), the comparison unit 4 may perform quantization in such a manner that if the absolute value of the difference value is smaller than or equal to a predetermined threshold, it is determined that there is no difference between the first region feature and the second region feature so that a quantization index 0 indicating no difference is set, and in other cases, the comparison unit 4 compares their magnitude and if the first region feature is larger, a quantization index +1 is set, while in other cases, a quantization index −1 is set, whereby the quantization index is in any of three values of +1, 0, and −1. Assuming that the first region feature of a dimension n is Vn1 and the second region feature thereof is Vn2 and a predetermined threshold is th, a quantization index Qn of the dimension n can be calculated from the following expression.

$$Qn = +1(\text{if } |Vn1 - Vn2| > th \text{ and } Vn1 > Vn2) \quad 0(\text{if } |Vn1 - Vn2| \leq th) \quad -1(\text{if } |Vn1 - Vn2| > th \text{ and } Vn1 \leq Vn2) \qquad \text{[Expression 2]}$$

Figure 4:
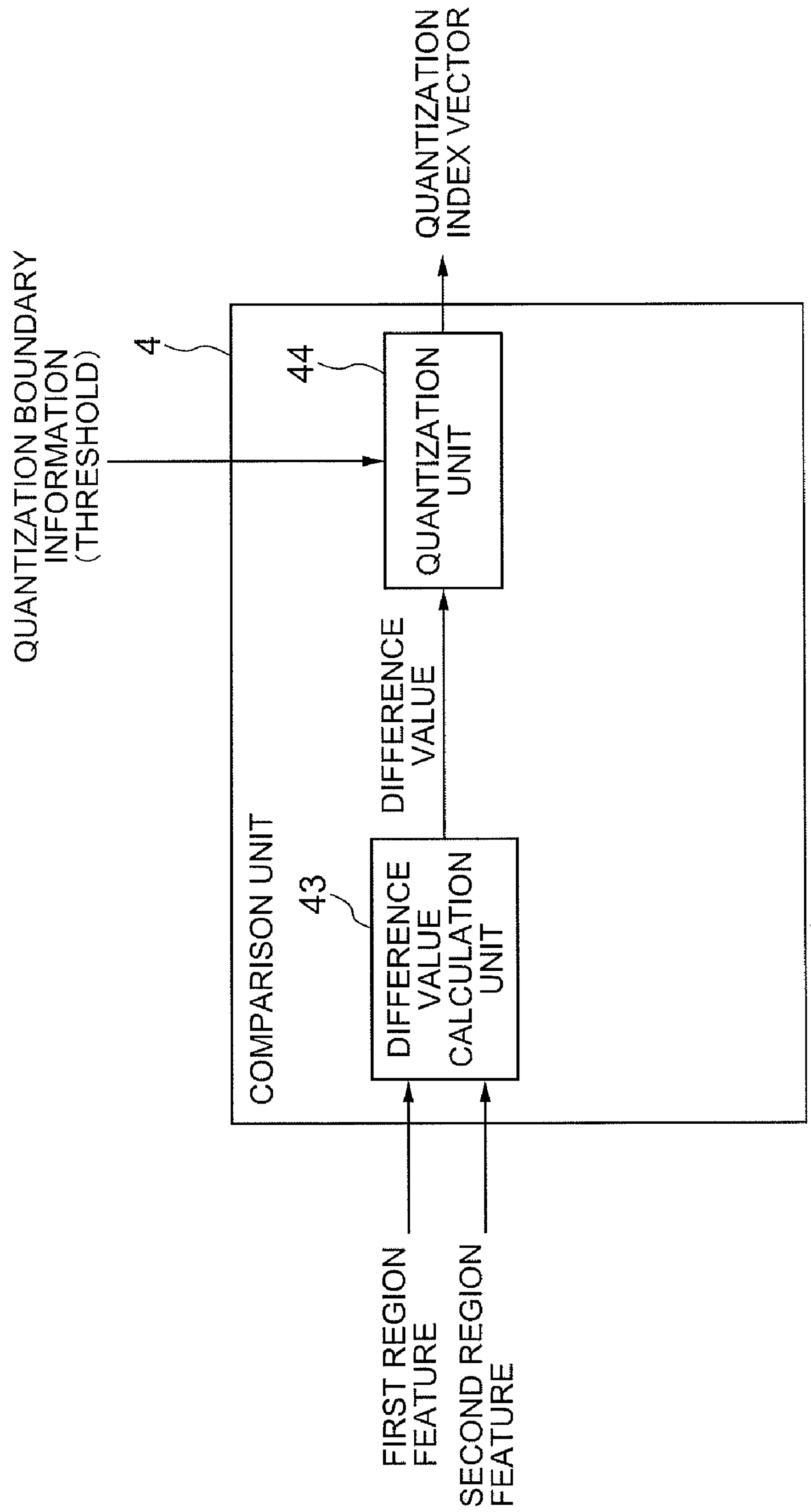
FIG. 4 is a block diagram showing another example of a comparison unit in the first embodiment of the present invention.

FIG. 4 shows a more detailed configuration diagram of the comparison unit 4 when the comparison unit 4 performs comparison and quantization according to Expression 2.

Referring to FIG. 4, the comparison unit 4 includes a difference value calculation unit 43 and a quantization unit 44. To the quantization unit 44, a threshold which is predetermined information indicating the boundary of quantization (quantization boundary information) is supplied beforehand as an input.

When the first region feature and the second region feature are supplied, the difference value calculation unit 43 calculates a difference value between the value of the first region feature and the value of the second region feature, and supplies the calculated difference value to the quantization unit 44. This means that the difference value calculation unit 43 calculates Vn1−Vn2, and supplies the resultant value to the quantization unit 44.

The quantization unit 44 performs quantization according to Expression 2 based on the difference value supplied from the difference value calculation unit 43 and a threshold which is information indicating the predetermined boundary of quantization (quantization boundary information) supplied as an input, and outputs a quantization index. This means that the quantization unit 42 outputs a quantization index based on the value of Vn1−Vn2 supplied from the difference value calculation unit 41 and the threshold th supplied as an index, in such a manner that if |Vn1−Vn2|>th and Vn1−Vn2>0, the quantization index is +1, if |Vn1−Vn2|>th and Vn1−Vn2≦0, the quantization value is −1, and if |Vn1−Vn2|≦th, the quantization index is 0.

The comparison and quantization method based on Expression 2 is hereinafter referred to as a comparison and quantization method B.

Although quantization is performed in three values based on the difference value in this example, it is possible to perform quantization in a larger number of (levels of) quantization indexes according to the magnitude of the difference value. Even in that case, the comparison unit 4 has the configuration as shown in FIG. 4, and to the quantization unit 44, a plurality of thresholds as information indicating the predetermined boundaries of quantization for respective levels (quantization boundary information) are supplied as inputs. A comparison and quantization method for quantization into four or more levels, based on this difference value and the thresholds supplied as inputs, is hereinafter referred to as a comparison and quantization method C.

As described above, by introducing a quantization index indicating there is no difference for the case where the difference between the first region feature and the second region feature is small (smaller than or equal to a predetermined threshold) so that it is determined that no difference exists, it is possible to make the feature (quantization index) in a dimension of a pair of extraction regions having a small difference between the region features more stable, that is, more robust with respect to various alteration process and noise, compared with the method according to Expression 1. As such, it is possible to output an image signature (quantization index vector) which is stable with respect to an image having less difference between local regions in whole, that is, an flat image having less variations in whole (e.g., an image of blue sky), and is robust with respect to various alteration processes and noise.

Further, if the region feature is a vector quantity, for example, the comparison unit 4 may first convert the vector quantity into a scalar quantity by means of any arbitrary method, and then perform quantization by the above-described method (this comparison and quantization method is hereinafter referred to as a comparison and quantization method D). It is also possible to calculate a difference vector, which is a difference from the vector of a second extraction region, from the vector of a first extraction region, and quantize the difference vector to thereby obtain a quantization index, for example. In that case, representative vectors (center of gravity vectors, etc) predetermined for respective quantization indexes are supplied, and are classified into quantization indexes having the largest similarity (smallest distance) between the representative vectors and the difference vectors (this comparison and quantization method is hereinafter referred to as a comparison and quantization method E). Further, similar to the quantization of a scalar quantity according to the above-described Expression 2, if a norm of the difference vector is smaller than or equal to a predetermined threshold, it is possible to determine that there is no difference between the first region feature and the second region feature to thereby introduce a quantization index indicating no difference as a quantization index 0 which indicates no difference.

It should be noted that when matching quantization index vectors output in the present invention (when comparing a quantization index vector extracted from an image with a quantization index vector extracted from another image to determine whether or not they are identical), the number of dimensions in which quantization indexes conform (similarity) or the number of dimensions in which quantization indexes do not conform (Hamming distance) may be calculated as an identity scale, which is compared with a threshold, whereby the identity of the images can be determined.

Further, if the quantization indexes are calculated based on Expression 2 in the comparison unit 4, an identity scale (similarity) can be calculated as follows. First, quantization index vectors of two images are compared with each other between corresponding dimensions, and the number of dimensions in which not "both quantization indexes are 0" is calculated (this value is set to be A). Next, in the dimensions in which not "both quantization indexes are 0", the number of dimensions in which the quantization indexes conform is calculated (this value is set to be B). Then, a similarity is calculated as B/A. If A=0 (that is if both quantization indexes are 0 in every dimensions), the similarity is set to be a predetermined numerical value (e.g., 0.5).

It is also possible to calculate the number of dimensions (this value is set to be C) in which quantization indexes do not conform in the dimensions in which not "both quantization indexes are 0", to thereby calculate the identity scale (distance) as C/A. If A=0 (that is if both quantization indexes are 0 in every dimension), the identity scale (distance) is set to be a predetermined numerical value (e.g., 0.5). An advantageous effect of the method of calculating the identity scale as C/A is shown below, compared with the method of calculating the identity scale as B/A. As B+C=A, there is no difference in the accuracy of identity determination of images between the case of calculating B (the number of dimensions in which quantization indexes conform) to obtain B/A and the case of calculating C (the number of dimensions in which quantization indexes do not conform) to obtain C/A (because B/A=1−C/A and C/A=1−B/A, so the only difference between them is that B/A calculates the identity scale as "similarity" while C/A calculates the identity scale as "distance). However, when determining identity by comparing the calculated identity scale with a threshold which has been given beforehand, a difference in calculation cost is generated between the two methods if calculation of a similarity scale is terminated in order to reduce the calculation costs. Calculation of a similarity scale is terminated as follows. A threshold for identity determination has been given beforehand. For respective dimensions, it is sequentially determined whether quantization indexes {conform·do not conform} with each other, and the value of the number of dimensions in which the quantization indexes {conform·do not conform} with each other is calculated (incremented), and the value is sequentially compared with the threshold. As the point when the number of dimensions in which the quantization indexes {conform·do not conform} with each other exceeds the threshold, calculation may be terminated (because it is obvious that the value exceeds the threshold even if the calculation are continued). It should be noted that in general, a threshold for identity determination is set to be a value larger than 0.5 (a half) if the identity scale (similarity) is calculated as B/A, or set to be a value smaller than 0.5 (a half) if the identity scale (distance) is calculated as C/A (in the former case, the images are determined to be identical if the calculated value is larger than the threshold, while in the latter case, the images are determined to be identical if the calculated value is smaller than the threshold). For example, a threshold is set to be 0.8 when B/A is calculated, and a threshold is set to be 0.2 when C/A is calculated. If A=100, in the case of calculating B/A, the value of B is sequentially calculated and when the value of B exceeds 80, calculation may be terminated. In the case of calculating C/A, the value of C is sequentially calculated and when the value of C exceeds 20, calculation may be terminated. This means that while calculation cannot be terminated until the value exceeds 80 in the case of calculating B, calculation can be terminated when the value exceeds 20 in the case of calculating C. As such, as calculation can be terminated at a earlier point when calculating an identity scale as C/A rather than calculating it as B/A, calculating an identity scale as C/A has an advantageous effect of reducing the calculation cost.

Figure 20:
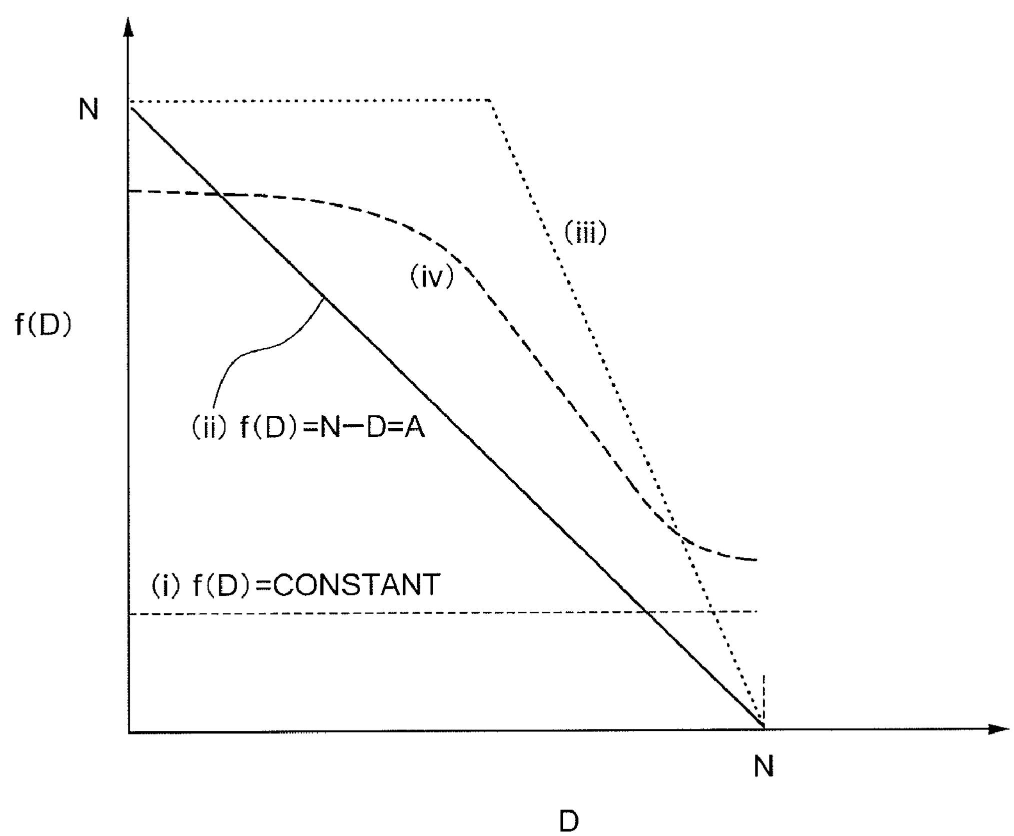
FIG. 20 is a graph showing an example of a monotone nonincreasing function f(D).

Further, it is also possible to calculate the number of dimensions in which "both quantization indexes are 0" as D (if the total number of dimensions is N, A+D=N) to thereby calculate the identity scale as B/f(D) or C/f(D) using any monotone nonincreasing function f(D) of D. A monotone nonincreasing function f(D) of D is a function in which f(D1) ≧f(D2) is satisfied with respect to D1<D2. FIG. 20 is a graph showing an example of f(D) with respect to D (horizontal axis indicates D and vertical axis indicates f(D)). In FIG. 20, the function (i), where f(D)=constant, delivers an identity scale having the same value as that simply calculated as B or C, and the function (ii), where f(D)=N−D=A, delivers an identity scale having the same value as that calculated as B/A or C/A. It should be noted that f(D) is not necessarily in a linear shape with respect to D as the function (i) or the function (ii), and as long as it is a monotone nonincreasing function of D, it may be a function in a non-linear shape as the function (iii) or the function (iv). Advantageous effects of calculating an identity scale as B/f(D) or C/f(D) using any monotone nonincreasing function of D, as described above, will be provided below. Referring to Expression 2, the quantization index 0 indicates that there is no difference between the values of region features of two extraction regions (smaller than or equal to the threshold). In a flat image region in which variations are small as a whole, that is, a difference between features of local regions is small (a sky region, a white wall region, or the like), the number of quantization indexes 0 is likely to be large (for example, in an image of a blue sky which is flat as a whole, quantization index will be 0 in almost all dimensions), and further, as such a flat image region is included in many images, it appears that dimensions in which the quantization index is 0 have low effectiveness in determining identity by comparing quantization index vectors of two images. In the quantization index vectors of the two compared images, it is considered that the dimensions where "both quantization indexes are 0" are dimensions which are less effective in determining the identity by comparing the quantization index vectors of the two images. In B and C, dimensions of low effectiveness in which "both quantization indexes are 0" are eliminated so as to limit to dimensions of high effectiveness in which not "both quantization indexes are 0" to thereby calculate the number of dimensions in which quantization indexes conform (B) or the number of dimensions in which quantization indexes do not conform (C). By eliminating dimensions of low effectiveness so as to limit to dimensions of high effectiveness to thereby calculate an identity scale, it is possible to realize highly accurate matching for determining identity of the images. Further, f(D) normalizes the value of B or C according to the number of dimensions in which "both quantization indexes are 0", that is, the number of dimensions of low effectiveness (as D is larger, A is smaller, so that the value of B or C becomes smaller, whereby normalization is performed with respect to D by a monotone nonincreasing function). It should be noted that as any monotone nonincreasing function is used as a function for normalization, it is possible to adjust (control) behavior of the identity scale, providing an advantageous effect that optimization can be achieved according to the image databases or applications on which identity determination is performed.

In the method of calculating an identity scale described in the previous paragraph (paragraph 0064), eliminating dimensions of low effectiveness in which "both quantization indexes are 0" and limiting to dimensions of high effectiveness in which not "both quantization indexes are 0" to thereby calculate an identity scale. However, it is also possible not to completely eliminate dimensions of low effectiveness in which "both quantization indexes are 0" but use monotone nondecreasing function g(D) with respect to D which is the number of dimensions in which "both quantization indexes are 0" so as to calculate the identity scale as (B/f(D))+g(D). It should be noted that the first term B/f(D) is an identity scale calculated from the dimensions of high effectiveness in which not "both quantization indexes are 0" and the latter term g(D) is an identity scale calculated from the dimensions of low effectiveness in which "both quantization indexes are 0", and the entire identity scale is defined as the sum thereof By designing the monotone nondecreasing function g(D) such that the effect (weight) of the latter term g(D) becomes smaller than that of the first term B/f(D), an identity scale can be calculated such that the weight of the first term B/f(D) having high effectiveness is large. For example, it is possible to use a small weighting value β to calculate an identity scale as (B/f(D))+β*D. Further, when f(D)=constant, if 1/f(D)=α, an identity scale may be calculated as α*B+β*D. As described above, by calculating an identity scale by separating dimensions of high effectiveness in which not "both quantization indexes are 0" and dimensions of low effectiveness in which "both quantization indexes are 0", it is possible to adjust (control) the relative weights of the dimensions of high effectiveness and the dimensions of low effectiveness (for example, increasing the weight of the dimensions of high effectiveness) while considering the entire dimensions. This provides an advantageous effect such that optimization can be performed according to the image databases or applications on which identity determination is performed.

It should be noted that in paragraphs 0062 to 0065, although the method of calculating an identity scale has been described based on the (number of) dimensions in which "both quantization indexes are 0" and the (number of) dimensions in which not "both quantization indexes are 0" in the two quantization index vectors to be compared, it is possible to calculate an identity scale by means of a similar calculation method based on the (number of) dimensions in which "either one of quantization indexes is 0" and the (number of) dimensions in which "either one of quantization indexes is not 0". This means that the (number of) dimensions in which "both quantization indexes are 0" and the (number of) dimensions in which not "both quantization indexes are 0" in paragraphs 0062 to 0065 may be replaced with the (number of) dimensions in which "either one of quantization indexes is 0" and the (number of) dimensions in which "either one of quantization indexes is not 0", respectively.

Although the matching method (identity scale calculation method), described in paragraphs 0062 to 0066, has been described based on the premise that the quantization indexes are calculated based on Expression 2, the matching method is not limited to the case where the quantization indexes are calculated based on Expression 2. If a quantization method of introducing quantization indexes indicating that there is no difference (difference is small, that is, smaller than or equal to a predetermined threshold) between a first region feature and a second region feature which are features of the two extraction regions (first extraction region and second extraction region) in the comparison unit 4, such a matching method may be applicable. As such, the quantization index 0 in paragraphs 0062 to 0066 should be understood as a "quantization index indicating that there is no difference (difference is small, that is, smaller than or equal to a predetermined threshold) between a first region feature and a second region feature.

If a means for calculating an identity scale by a method of matching quantization indexes extracted from two images, described in paragraphs 0061 to 0067, is a matching means, it is possible to configure an image signature matching device including the matching means as a constituent element. The matching unit compares a quantization index vector of a first image with a quantization index vector of a second image, output from the comparison unit 4, and calculates the identity scale and outputs it. Further, the image signature matching device may include an identity determination unit in addition to the matching unit. The identity determination unit compares the magnitude of the identity scale supplied from the matching unit with a given threshold, determines whether or not the first image and the second image are identical, and outputs the determination result.

It should be noted that the method of matching quantization index vectors, described in paragraphs 0061 to 0068, may be applicable to all of the embodiments (second embodiment, third embodiment, fourth embodiment, and other embodiments) described below.

[Operation of First Embodiment]

Figure 5:
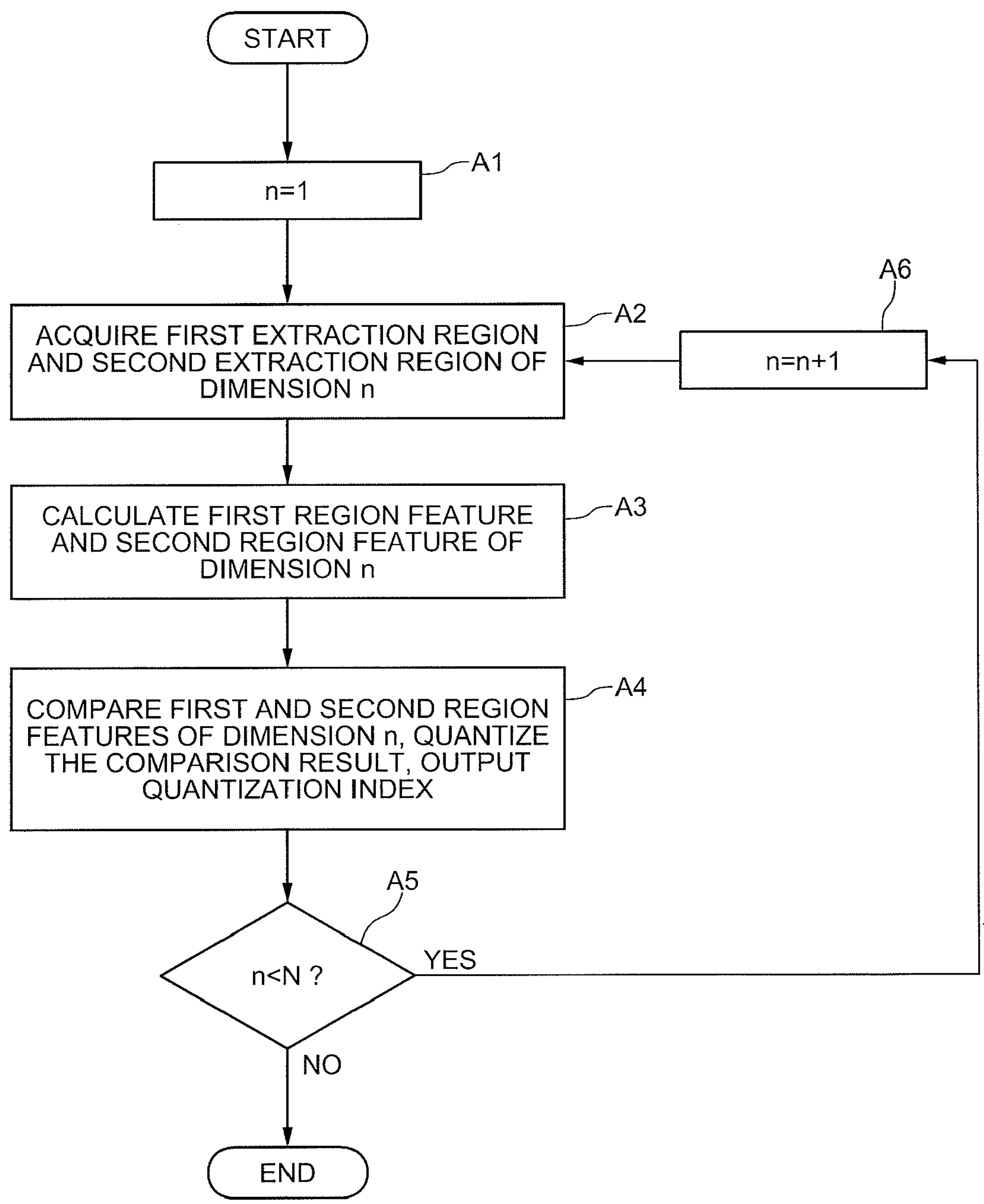
FIG. 5 is a flowchart showing a flow of the processing in the first embodiment of the present invention.

Next, operation of the image signature extraction device according to the first embodiment will be described with reference to the flowchart of FIG. 5. In the flowchart of FIG. 5, a dimension (number) of a feature vector is indicated by "n", and there are N dimensions in total from 1 to N.

First, the dimension determination unit 1 determines a dimension 1 as the first dimension (n=1) for extracting a feature vector, and supplies it to the extraction region acquisition unit 2 (step A1).

Next, the extraction region acquisition unit 2 acquires information indicating a first extraction region and a second extraction region of the dimension n from each-dimension extraction region information supplied as an input, and supplies it to the region feature calculation unit 3 (step A2).

Then, the region feature calculation unit 3 calculates a first region feature and a second region feature of the dimension n from the image supplied as an input, and supplies the features to the comparison unit 4 (step A3).

Then, the comparison unit 4 compares the first region feature with the second region feature of the dimension n, quantizes the comparison result, and outputs a quantization index (step A4).

Then, it is determined whether or not output of quantization indexes for all dimensions has been completed (that is, it is determined whether n<N is true or false) (step A5). If output of quantization indexes for all dimensions has been completed (that is, if n<N is false), the processing ends. If output of quantization indexes for all dimensions has not been completed (that is, if n<N is true), the processing proceeds to step A6. At step A6, the dimension determination unit 1 determines the next dimension for extracting a feature vector (n=n+1), and supplies it to the extraction region acquisition unit 2. Then, the processing returns to step A2.

It should be noted that although the extraction processing is performed in order from the dimension 1 to the dimension N, any order may be taken without being limited to this order. Further, it is also possible to perform the extraction processing for a plurality of dimensions in parallel, without limiting to the above processing procedure.

[Effects of First Embodiment]

Next, advantageous effects of the first embodiment of the present invention will be described.

A first advantageous effect is that the discrimination capability, which is a degree of discriminating different images, of an image signature constituted of feature vectors of a plurality of dimensions can be improved. In particular, this effect is significant with respect to an image having large correlation between local regions of the image.

This is because as the shapes of the regions for extracting the features are different among the dimensions (the shapes of the regions are variable), correlation among the dimensions can be reduced.

A second advantageous effect is that a discrimination capability will not be degraded with respect to an image in which signals concentrate on a particular frequency.

This is because as the shapes of the regions for extracting the features are different among the dimensions (the shapes of the regions are variable), even with respect to an image in which signals concentrate on a particular frequency, a case where there is no difference between features of all (many) pairs of extraction regions (dimensions) at the same time so that the discrimination capability is deteriorated, is less caused.

[Second Embodiment]

[Configuration of Second Embodiment]

Next, a second embodiment of the present invention will be described in detail with reference to the drawings.

Figure 6:
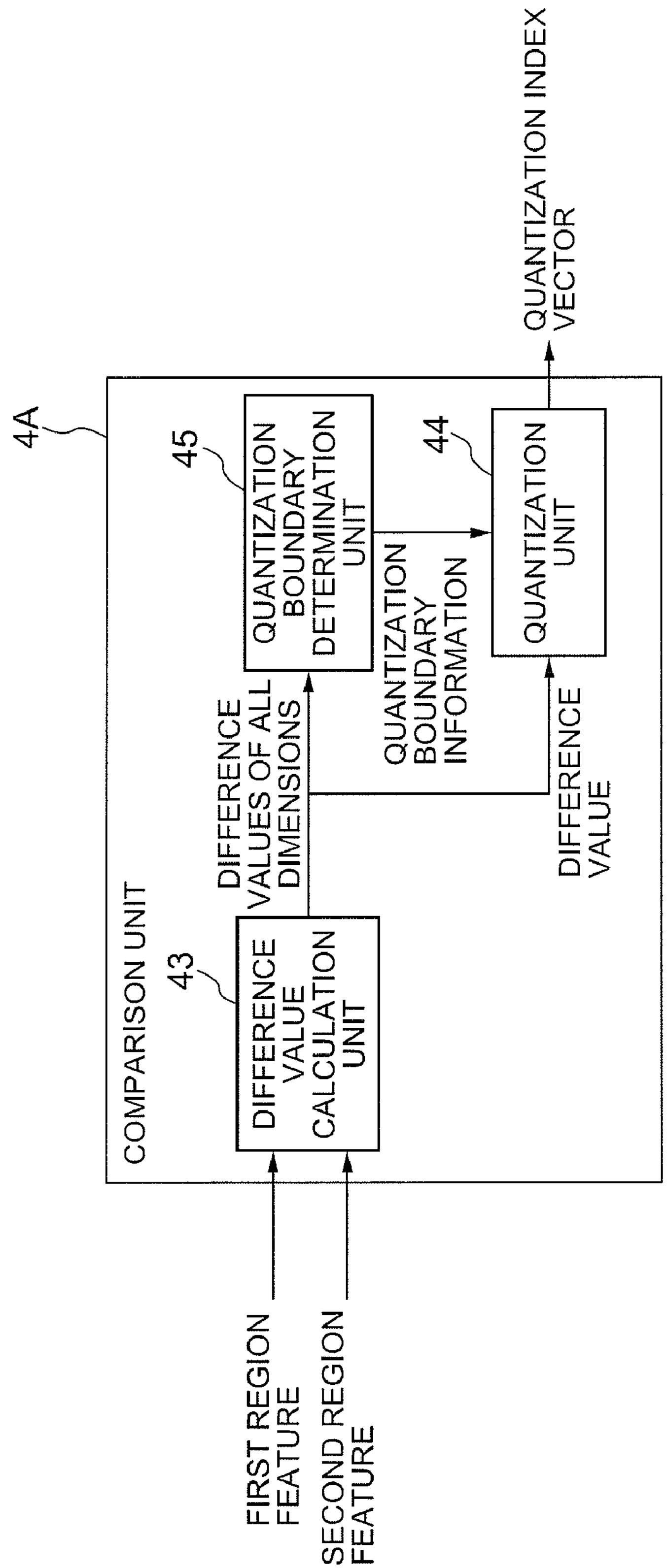
FIG. 6 is a block diagram showing the main part of a second embodiment of the present invention.

The second embodiment of the present invention differs from the first embodiment in that the comparison unit 4 of the first embodiment shown in FIG. 1 is replaced with a comparison unit 4A shown in FIG. 6 in detail. As the components other than the comparison unit 4A are the same as those of the first embodiment, the description of those components is omitted in this embodiment.

Referring to FIG. 6, the comparison unit 4A includes a difference value calculation unit 43, a quantization boundary determination unit 45, and a quantization unit 44.

The difference value calculation unit calculates a difference value between a first region feature and a second region feature supplied from the region feature calculation unit 3 for each dimension, and supplies the difference value to the quantization boundary determination unit 45 and the quantization unit 44.

If the region features are scalar quantities (e.g., a mean value of luminance values), the difference value is a scalar quantity obtained by subtracting the second region feature from the first region feature (or vice versa), for example. If the region features are vector quantities, it is also possible to obtain a difference value of scalar quantities after converting the respective vectors into scalar quantities by means of an arbitrary method. Further, if the region features are vector quantities, it is possible to use a difference vector between the first region feature and the second region feature as a difference value (vector quantity).

When the difference values for all dimensions of the feature vector, supplied from the difference value calculation unit 43, are supplied to the quantization boundary determination unit 45, the quantization boundary determination unit 45 determines the boundary of quantization based on the distribution of the difference values of all dimensions, and supplies information regarding the determined quantization boundary to the quantization unit 44. It should be noted that distribution of the difference values of all dimensions means frequency (probability) of occurrence with respect to the difference values (or the difference vector).

Further, determination of the boundary of quantization means determination of parameters to be assigned to the quantization indexes exclusively without fail, when quantizing the difference values. If the difference value is a scalar quantity, a value range (that is, a threshold) with respect to each quantization index (quantization level) is determined, and such a value range (threshold) is supplied to the quantization unit 43 as information of the quantization boundary, for example. Alternatively, if the difference value is a vector quantity, a parameter for performing vector quantization for example, that is, a representative vector of the respective quantization indexes, for example, is determined and supplied to the quantization unit 44 as information of the quantization boundary.

If the difference value is a scalar quantity and quantization of M value (M=2, 3, . . . etc.) is to be performed, the quantization boundary determination unit 45 may determine the value range (threshold) for quantization based on the distribution of the difference values of all dimensions such that the proportions of the respective quantization indexes, with respect to all dimension, become equal.

For example, as a variation of Expression 1, in the case of performing quantization in 2 values (M=2) using a constant a where the quantization index is +1 if $Vn\mathbf{1}+\alpha>Vn\mathbf{2}$ while the quantization index is −1 if $Vn\mathbf{1}+\alpha\leqq Vn$, the center point of the distribution of the difference values (the point where the integral values of left and right distributions become equal) may be determined to be a threshold a of the quantization such that the proportions of quantization indexes +1 and quantization indexes −1 become equal. Similarly, when performing quantization in M values if the difference values are vector quantities, it is possible to determine regions of the vector space assigned to the respective quantization indexes or determine a representative vector (e.g., center of gravity vector)of the respective quantization indexes when performing vector quantization, such that the proportions of the respective quantization indexes with respect to all dimensions become equal, based on the distribution of the difference vectors of all dimensions. As described above, by allowing the proportions of quantization indexes with respect to all dimensions to be equal (that is, eliminating bias of quantization indexes), the entropy can be increased, so that the identification capability can be improved.

A comparison and quantization method, in which the quantization boundary determination unit 45 determines the boundary of quantization such that the proportions of the quantization indexes with respect to all dimensions become equal and the quantization unit 44 performs quantization based on the determined boundary, is hereinafter referred to as a comparison and quantization method F.

Further, if the difference value is a scalar quantity and quantization is performed in three values (quantization indexes are +1, 0, −1) by means of Expression 2, for example, the quantization boundary determination unit 45 may determine a threshold th used for quantization to an quantization index 0 indicating no difference (quantization index is set to be 0 if smaller than or equal to this threshold) based on the distribution of difference values of all dimension, and supply the determined threshold th to the quantization unit 44 (in the comparison unit 4 shown in FIG. 4 of the first embodiment, the threshold th has been set beforehand). For example, the quantization boundary determination unit 45 may calculate absolute values of the difference values of all dimensions, sort the calculated values, and set a point at a predetermined proportion from the top or the bottom (such a predetermined proportion is supplied as an input, for example) to be the threshold th (this comparison and quantization method is hereinafter referred to as a comparison and quantization method G). Further, it is also possible to determine the threshold th not by a predetermined proportion but by a manner by which the proportions of quantization indexes of +1, 0, −1 become close to equal (this comparison and quantization method is hereinafter referred to as a comparison and quantization method H). The comparison and quantization method H corresponds to a specific example of the comparison and quantization method F performed in accordance with Expression 2.

A more specific method of the comparison and quantization method G will be explained with an example where the predetermined percentage is P % (e.g., P=25%). The absolute values of the difference values of all dimensions (the number of dimensions=N) are sorted in ascending order, and a collection of the absolute values, sorted in ascending order, of the difference values is indicated as $D(i)=\{D(\mathbf{0}), D(\mathbf{1}), D(\mathbf{2}), \ldots D(N-1)\}$. In this example, the value at a position of P % from the bottom of the order sorted in an ascending manner is D(floor(N*P/100)) for example, and the threshold th=D(floor (N*P/100)). It should be noted that floor( )is a function in which the places after the decimal point are truncated.

The method in the present embodiment can be compared with the case where the comparison unit 4 takes the configuration shown in FIG. 4, as in the first embodiment. While a predetermined threshold th is supplied as an input in the configuration shown in FIG. 4 of the first embodiment, in the above-described method of the second embodiment, the quantization boundary determination unit 45 calculates a threshold th adaptively with respect to the image, based on the distribution of the difference values of all dimensions. As described above, while the threshold th is fixed in the first embodiment, the threshold th is calculated adaptively with respect to the image in the second embodiment. As the threshold th is calculated adaptively with respect to the image, it is possible to prevent the values of the dimensions of a feature vector from being biased to particular quantization indexes (probability of appearance of particular quantization indexes is high) compared with the case where the threshold th is fixed (particularly with respect to an image having less relief), the discrimination capability can be higher. For example, in the case of using a fixed threshold th as in the first embodiment, quantization indexes become 0 in most of the dimensions (or all of the dimensions) of a feature vector in the image of less relief. However, if an adaptive threshold th of the second embodiment is used, as the threshold is automatically adjusted to a small value with respect to an image having less relief, the case where quantization indexes become 0 in most of the dimensions of the feature vector will not be caused.

The quantization unit 44 performs quantization based on the difference values of the respective dimensions supplied from the difference value calculation unit 43 and the information of the quantization boundary supplied from the quantization boundary determination unit 45, and outputs quantization indexes.

It should be noted that the quantization unit 44 must follow the quantization method which has been expected when the quantization boundary determination unit 45 determined the quantization boundary, because there is no point if the quantization unit 44 performs quantization without taking into account the quantization boundary information output from the quantization boundary determination unit 45.

Operation of Second Embodiment

Next, operation of the image signature extraction device according to the second embodiment will be described with reference to the flowchart of FIG. 7. In the flowchart of FIG. 7, a dimension (number) of a feature vector is indicated by "n", and there are N dimensions in total from 1 to N.

First, the dimension determination unit 1 determines a dimension 1 as the first dimension (n=1) for extracting a feature vector, and supplies it to the extraction region acquisition unit 2 (step B1).

Next, the extraction region acquisition unit 2 acquires information indicating a first extraction region and a second extraction region of the dimension n from each-dimension extraction region information supplied as an input, and supplies the information to the region feature representative value calculation unit 3 (step B2).

Then, the region feature representative value calculation unit 3 calculates a first region feature and a second region feature of the dimension n from the image supplied as an input, and supplies the features to the difference value calculation unit 43 (step B3).

Then, the difference value calculation unit 43 calculates a difference value between the first region feature and the second region feature of the dimension n, and supplies the difference value to the quantization boundary determination unit 45 and the quantization unit 44 (step B4).

Then, it is determined whether or not the processing up to calculation of the difference values for all dimensions has been completed (that is, it is determined whether n<N is true or false) (step B5). If the processing up to calculation of the difference values for all dimensions has been completed (that is, if n<N is false), the processing proceeds to step B7. If the processing up to calculation of the difference values for all dimensions has not been completed (that is, if n<N is true), the processing proceeds to step B6. At step B6, the dimension determination unit 1 determines the next dimension for extracting a feature vector (n=n+1), and supplies it to the extraction region acquisition unit 2. Then, the processing returns to step B2.

It should be noted that although the extraction processing is performed in order from the dimension 1 to the dimension N in this embodiment, any order may be taken without being limited to this order.

Then, when the difference values for all dimensions of the feature vector supplied from the difference value calculation unit 43 have been supplied, the quantization boundary determination unit 45 determines the boundary of quantization based on the distribution of the difference values of the all dimensions, and supplies the determined quantization boundary information to the quantization unit 44 (step B7).

Then, at step B8, dimension 1 is set (n=1) as the first dimension for performing quantization (quantization indexes are calculated).

Then, the quantization unit 44 performs quantization based on the difference value of the dimension n and the quantization boundary supplied from the quantization boundary determination unit 45, and outputs a quantization index (step B9).

Then, it is determined whether or not output of the quantization indexes for all dimensions has been completed (that is, it is determined whether n<N is true or false) (step B10). If output of the quantization indexes for all dimensions has been completed (that is, if n<N is false), the processing ends. If output of the quantization indexes for all dimensions has not been completed (that is, if n<N is true), the processing proceeds to step B11. At step B11, as a dimension of a feature vector for performing quantization, the next dimension is set (n=n+1). Then, the processing returns to step B9.

It should be noted that although the extraction processing is performed in order from the dimension 1 to the dimension N in this embodiment, any order may be taken without being limited to this order.

[Effects of Second Embodiment]

Compares with the first embodiment in which the boundary of quantization is fixed, the second embodiment is different in that the boundary of quantization is calculated adaptively (dynamically) with respect to an image. If the boundary of quantization is fixed as in the first embodiment, there is a case where the values of the dimensions of a feature vector are biased to particular quantization indexes (probability of appearance of particular quantization indexes is high) with respect to a particular image (e.g., a flat image having less relief) (entropy is low), causing a problem that the discrimination capability is deteriorated with respect to such an image. On the other hand, if the boundary of quantization is adaptively (dynamically) calculated with respect to an image as in the second embodiment, as it is possible to prevent the case where the values of the dimensions of a feature vector is biased to particular quantization indexes (probability of appearance of particular quantization indexes is high) with respect to any images, the discrimination capability can be improved.

[Third Embodiment]

[Configuration of Third Embodiment]

Next, a third embodiment of the present invention will be described in detail with reference to the drawings.

Figure 8:
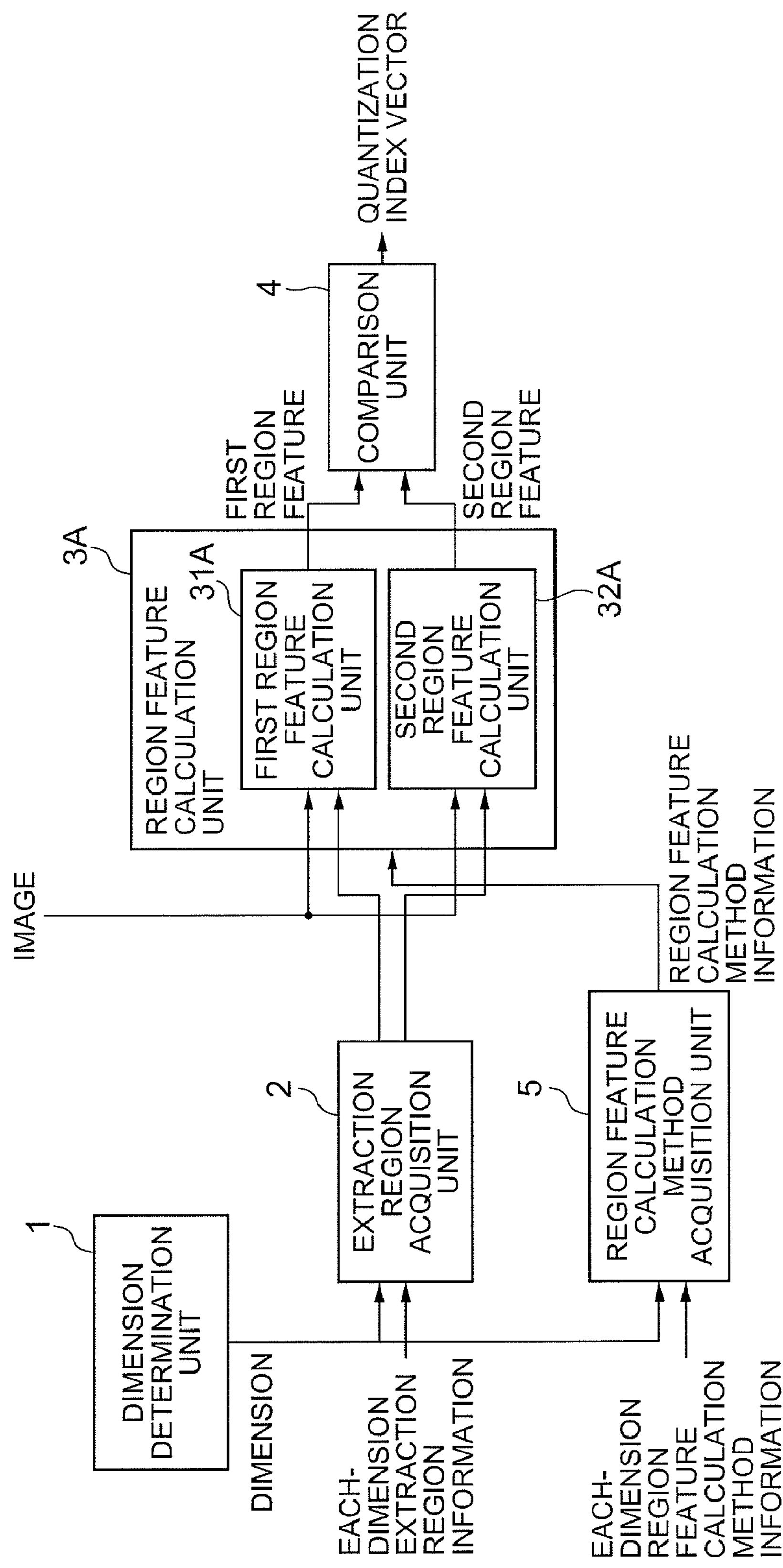
FIG. 8 is a block diagram showing a third embodiment of the present invention.

Referring to FIG. 8, the configuration of the third embodiment of the present invention is different from that of the first embodiment shown in FIG. 1 in that a region feature calculation method acquisition unit 5 is added, and the region feature calculation unit 3 is replaced with a region feature calculation unit 3A including a first region feature calculation unit 31A and a second region feature calculation unit 32A. As the other components are the same as those of the first embodiment, the explanation thereof is omitted in this embodiment. It should be noted that although a combination with the first embodiment is described in this embodiment, a combination with the second embodiment is also acceptable.

To the region feature calculation method acquisition unit 5, a dimension from the dimension determination unit 1 and each-dimension region feature calculation method information are supplied.

The each-dimension region feature calculation method information is information indicating a method of calculating a region feature in a dimension, which is associated with each dimension of a feature vector, and a prerequisite is that region feature calculation methods must be different among the dimensions. It should be noted that region feature calculation methods being different includes applying different parameters (threshold or the like) to the identical procedure.

In this embodiment, region feature calculation methods include various types of methods described in the explanation of the region feature calculation unit 3 of the first embodiment, and the parameters associated thereto.

It should be noted that the region feature calculation method for each dimension indicated by the each-dimension region feature calculation method information has a minimum condition such that at least one pair of dimensions in which the region feature calculation methods are different should be included in the all dimensions of the feature vector. It is desirable that the number of dimensions in which region feature calculation methods are different is larger, because as the number of such dimensions is larger, the number of dimensions having small correlation between them is smaller in the feature vector, whereby the discrimination capability is higher. For example, the region feature calculation methods may be different in all dimensions in the feature vector.

It should be noted that the information showing the region feature calculation method for each dimension may take any form, if the method of calculating the region feature is uniquely specified.

FIG. 9 shows examples of the region feature calculation methods for respective dimensions. As shown in FIG. 9, the region feature calculation methods are different among the dimensions. Further, as shown in the examples of FIG. 9, features of scalar quantities and vector quantities may be mixed (the $1^{st}$, $3^{th}$, $5^{th}$, $6^{th}$, $8^{th}$, $9^{th}$, $10^{th}$, and $12^{th}$ dimensions are scalar quantities and $2^{nd}$, $4^{th}$, $7^{th}$, and the $11^{th}$ dimensions are vector quantities).

The region feature calculation method acquisition unit 5 acquires, from the each-dimension region feature calculation method information supplied as an input, information indicating the region feature calculation method associated with the dimension supplied from the dimension determination unit 1, and supplies the information to the region feature calculation unit 3A.

The region feature calculation unit 3A calculates, based on information indicating a first extraction region and a second extraction region supplied from the extraction region acquisition unit for each dimension, a feature of the first extraction region and a feature of the second extraction region as a first region feature and a second region feature, respectively, from the image supplied as an input, according to the information indicating the region feature calculation method supplied from the region feature calculation method acquisition unit 5, and supplies the features to the comparison unit 4.

In the region feature calculation unit 3A, it is necessary that the dimension of the information indicating the extraction region to be supplied and the dimension of the information indicating the region feature calculation method are synchronized.

[Operation of Third Embodiment]

Figure 10:
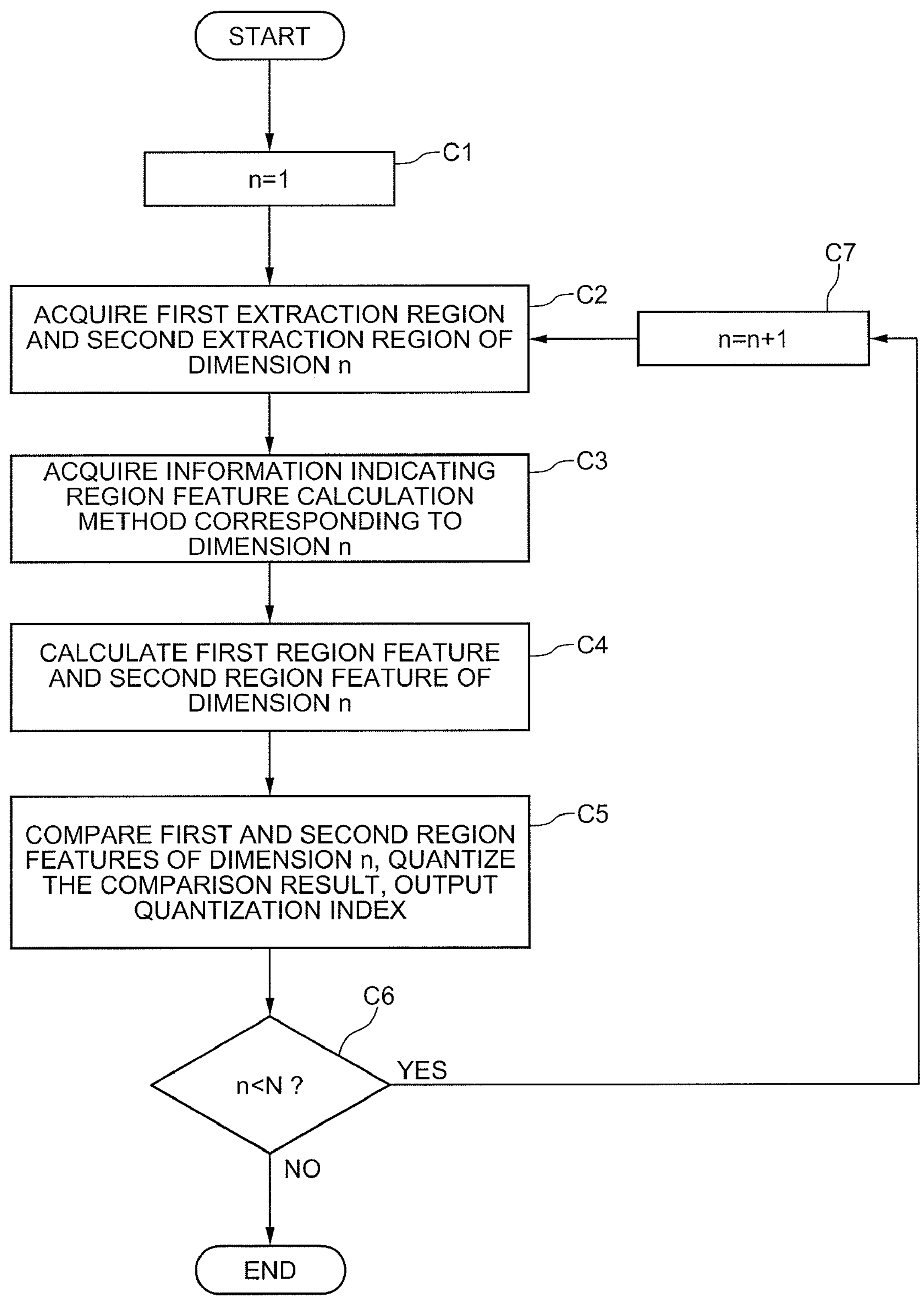
FIG. 10 is a flowchart showing a flow of the processing in the third embodiment of the present invention.

Next, with reference to the flowchart of FIG. 10, operation of the image signature extraction device according to the third embodiment will be described. In the flowchart of FIG. 10, a dimension (number) of a feature vector is indicated by "n", and there are N dimensions in total from 1 to N.

First, the dimension determination unit 1 determines a dimension 1 as the first dimension (n=1) for extracting a feature vector, and supplies it to the extraction region acquisition unit 2 and the region feature calculation method acquisition unit 5 (step C1). Next, the extraction region acquisition unit 2 acquires information indicating a first extraction region and a second extraction region of the dimension n from each-dimension extraction region information supplied as an input, and supplies the information to the region feature calculation unit 3A (step C2).

Then, the region feature calculation method acquisition unit 5 acquires information indicating the region feature calculation method corresponding to the dimension n from the each-dimension region feature calculation method information supplied as an input, and supplies the information to the region feature calculation unit 3A (step C3).

Then, the region feature calculation unit 3A calculates a first region feature and a second region feature of the dimension n from the image supplied as an input, and supplies the features to the comparison unit 4 (step C4). Then, the comparison unit 4 compares the first region feature with the second region feature of the dimension n, quantizes the comparison result, and outputs a quantization index (step C5). Then, it is determined whether or not output of the quantization indexes for all dimensions has been completed (step C6). If output of the quantization indexes for all dimensions has been completed, the processing ends. If output of the quantization indexes for all dimensions has not been completed, the processing proceeds to step C7. At step C7, the dimension determination unit 1 determines the next dimension for extracting a feature vector (n=n+1), and supplies it to the extraction region acquisition unit 2 and the region feature calculation method acquisition unit 5. Then, the processing returns to step C2.

It should be noted that although the extraction processing is performed in order from the dimension 1 to the dimension N in this embodiment, any order may be taken without being limited to this order. Further, it is also possible to perform the extraction processing for a plurality of dimensions in parallel, without limiting to such processing procedures. Further, step C2 and step C3 may be in reverse order.

[Effect of Third Embodiment]

In addition to the advantageous effects of the first embodiment, the third embodiment has an advantageous effect that the discrimination capability which is a degree of discriminating different images can be further improved.

This is because as the region feature calculation methods are different among the dimensions (variable region feature calculation methods are used), correlation among dimensions can be small.

[Fourth Embodiment]

[Configuration of Fourth Embodiment]

Next, a fourth embodiment of the present invention will be described in detail with reference to the drawings.

Referring to FIG. 11, the configuration of the fourth embodiment of the present invention is different from that of the first embodiment shown in FIG. 1 in that a comparison method acquisition unit 6 is added, and the comparison unit 4 is replaced with a comparison unit 4B. As the other components are the same as those of the first embodiment, the explanation thereof is omitted in this embodiment. It should be noted that although a combination with the first embodiment is described in this embodiment, a combination with the second embodiment and a combination with the third embodiment are also acceptable.

To the comparison unit acquisition unit 6, a dimension from the dimension determination unit 1 and each-dimension comparison method information are supplied.

The each-dimension comparison and quantization method information is information indicating a method of comparing region features in a dimension which is associated with each dimension of a feature vector and performing quantization, and a prerequisite is that comparison and quantization methods must be different among the dimensions. It should be noted that comparison and quantization methods being different includes applying different parameters (threshold, quantization index number, or the like) to the identical procedure.

In this embodiment, comparison and quantization methods include various types of comparison and quantization methods described in the explanation of the comparison unit 4 of the first embodiment, and the parameters associated thereto (threshold, the number of quantization indexes, or the like), and various types of comparison and quantization methods described in the explanation of the comparison unit 4A of the second embodiment, and the parameters associated thereto (threshold, the number of quantization indexes, or the like).

It should be noted that the comparison and quantization method for each dimension indicated by the each-dimension comparison and quantization method information has a minimum condition that at least one pair of dimensions in which the comparison and quantization method is different should be included in the all dimensions of the feature vector. It is desirable that the number of dimensions in which comparison and quantization methods are different is larger, because as the number of such dimensions is larger, the number of dimensions having small correlation between them is larger in the feature vector, whereby the discrimination capability becomes higher. For example, the comparison and quantization methods may be different in all dimensions in the feature vector.

It should be noted that the information showing the comparison and quantization method for each dimension may take any form if the method of comparing and quantizing the region feature is uniquely specified.

FIG. 12 shows examples of the comparison and quantization methods for respective dimensions. As shown in FIG. 12, comparison and quantization methods are different among the dimensions. Further, different parameters (thresholds th) may be set in the same comparison and quantization methods as in the $3^{rd}$, $5^{th}$, and $12^{th}$ dimensions. It should be noted that the examples of comparison and quantization methods for the respective dimensions shown in FIG. 12 are associated with the region feature calculation methods for the respective dimensions shown in FIG. 9. As such, comparison and quantization methods for scalar quantities are shown as examples for the region features of scalar quantities, and comparison and quantization methods for vector quantities are shown as examples for the region features of vector quantities.

The comparison method acquisition unit 6 acquires, from the each-dimension comparison and quantization method information supplied as an input, information indicating the comparison and quantization method corresponding to the dimension supplied from the dimension determination unit 1, and supplies the information to the comparison unit 4B.

The comparison unit 4B compares a first region feature with a second region feature supplied from the region feature calculation unit 3 for each dimension and quantizes, according to the information indicating the comparison and quantization method supplied from the comparison method acquisition unit 6, and outputs a quantization index. The comparison unit 4B may have a configuration including both the comparison unit 4 of the first embodiment and the comparison unit 4B of the second embodiment if necessary, depending on the comparison and quantization method.

In the comparison unit 4B, it is necessary that the dimension of the region feature to be supplied and the dimension of the information indicating the comparison and quantization method are synchronized.

[Operation of Fourth Embodiment]

Figure 13:
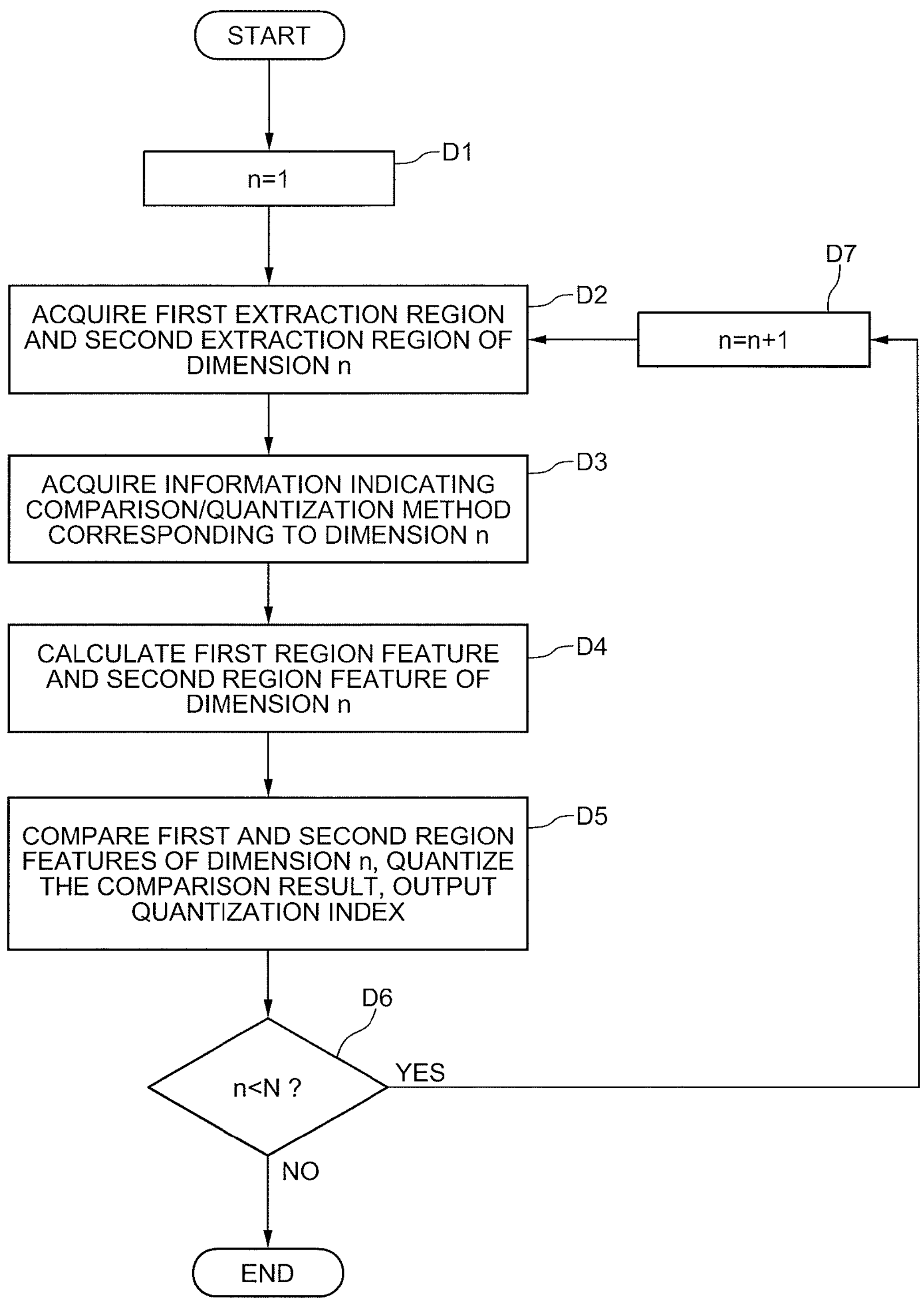
FIG. 13 is a flowchart showing a flow of the processing in the fourth embodiment of the present invention.

Next, with reference to the flowchart of FIG. 13, operation of the image signature extraction device according to the fourth embodiment will be described. In the flowchart of FIG. 13, a dimension (number) of a feature vector is indicated by "n", and there are N dimensions in total from 1 to N.

First, the dimension determination unit 1 determines a dimension 1 as the first dimension (n=1) for extracting a feature vector, and supplies it to the extraction region acquisition unit 2 and the comparison method acquisition unit 6 (step D1). Next, the extraction region acquisition unit 2 acquires information indicating a first extraction region and a second extraction region of the dimension n from each-dimension extraction region information supplied as an input, and supplies it to the region feature calculation unit 3 (step D2).

Then, the comparison method acquisition unit 6 acquires information indicating the comparison and quantization method corresponding to the dimension n from the each-dimension comparison and quantization method information supplied as an input, and supplies it to the comparison unit 4B (step D3).

Then, the region feature calculation unit 3 calculates a first region feature and a second region feature of the dimension n from the image supplied as an input, and supplies the features to the comparison unit 4B (step D4). Then, the comparison unit 4B compares the first region feature with the second region feature of the dimension n, quantizes the comparison result, and outputs a quantization index (step D5). Then, it is determined whether or not output of the quantization indexes for all dimensions has been completed (step D6). If output of the quantization indexes for all dimensions has been completed, the processing ends. If output of the quantization indexes for all dimensions has not been completed, the processing proceeds to step D7. At step D7, the dimension determination unit 1 determines the next dimension for extracting a feature vector (n=n+1), and supplies it to the extraction region acquisition unit 2 and the comparison method acquisition unit 6. Then, the processing returns to step D2.

It should be noted that although the extraction processing is performed in order from the dimension 1 to the dimension N in this embodiment, any order may be taken without being limited to this order. Further, it is also possible to perform the extraction processing for a plurality of dimensions in parallel, without limiting to such processing procedures. Further, step D2 and step D3 may be in reverse order, and step D3 may be performed immediately before step D5.

[Effect of Fourth Embodiment]

In addition to the advantageous effects of the first embodiment, the fourth embodiment has an advantageous effect that the discrimination capability which is a degree of discriminating different images can be further improved.

This is because as the comparison and quantization methods are different among the dimensions (variable comparison and quantization methods are used), correlation between dimensions can be small.

[Other Embodiments]

While the embodiments of the present invention have been described above, the present invention is not limited to these examples, and various additions and modifications may be made therein. Further, the image signature extraction device of the present invention is adapted such that the functions thereof can be realized by computers and programs, as well as hardware. Such a program is provided in the form of being written on a computer readable recording medium such as a magnetic disk, a semiconductor memory, or the like, is read by a computer when the computer is started for example, and controls operation of the computer, to thereby allow the computer to function as the dimension determination unit, the extraction region acquisition unit, the region feature calculation unit, the comparison unit, the region feature calculation method acquisition unit, and the comparison method acquisition unit, of the above-described embodiments.

Next, other embodiment of the present invention will be shown.

[Fifth Embodiment]

In a fifth embodiment, the number of dimensions of a feature vector to be extracted is 300 dimensions (from $1^{st}$ dimension to $300^{th}$ dimension).

In the fifth embodiment, the extraction regions (first extraction regions and second extraction regions) for respective dimensions are formed of quadrangles in various shapes. FIG. 14 shows each-dimension extraction region information to be supplied to the extraction region acquisition unit 2 as an input in the fifth embodiment. FIG. 14 shows XY coordinate values of the four corners of the quadrangles of the extraction regions (first extraction regions and second extraction regions) for the respective dimensions, with respect to the image size of 320 pixel wide and 240 pixel long, which is a predetermined image size. For example, the extraction regions for a $1^{st}$ dimension is formed of a first extraction region consisting of a quadrangle with four corners having a coordinate value (262.000, 163.000), a coordinate value (178.068, 230.967), a coordinate value (184.594, 67.411), and a coordinate value (100.662, 135.378), and a first extraction region consisting of a quadrangle with four corners having a coordinate value (161.000, 133.000), a coordinate value (156.027, 132.477), a coordinate value (164.240, 102.170), and a coordinate value (159.268, 101.647).

The extraction regions (first extraction region and second extraction region) for each dimension is a collection of pixels having coordinate values of integer values included in a region defined by these coordinate values of the four corners, with respect to the image normalized to an image size of 320 pixel wide and 240 pixel long. However, negative coordinate values included in the region defined by the four corners are not included in the extraction region.

FIG. 15 shows each-dimension region feature calculation method information supplied to the region feature calculation method acquisition unit 5 as an input, in the fifth embodiment. In the fifth embodiment, a mean value of the luminance values of a group of pixels included in each of the extraction region (first extraction region and second extraction region) serves as a region feature of each of the extraction regions, for every dimension.

FIG. 17 shows each-dimension comparison and quantization method information supplied to the comparison method acquisition unit 6 as an input, in the fifth embodiment. In the fifth embodiment, the comparison and quantization method B or the comparison and quantization method G is used for each dimension, and the value of the parameter is also different for each dimension. For example, in the $1^{st}$ dimension, the comparison and quantization method G is used, and the threshold th is D(floor(300*5.0/100)). In the $2^{nd}$ dimension, the comparison and quantization method G is used, and the threshold th is D(floor(300*10.0/100)). Further, in the $9^{th}$ dimension, for example, the comparison and quantization method B is used, and the threshold th is 3.0.

[Sixth Embodiment]

In a sixth embodiment, the number of dimensions of a feature vector to be extracted is 300 dimensions (from $1^{st}$ dimension to $300^{th}$ dimension), as in the fifth embodiment. In the sixth embodiment, as each-dimension extraction region information supplied to the extraction region acquisition unit 2 as an input, the information shown in FIG. 14 is used, as in the fifth embodiment. Further, in the sixth embodiment, as each-dimension comparison and quantization method information supplied to the comparison method acquisition unit 6 as an input, the information shown in FIG. 17 is used, as in the fifth embodiment.

FIG. 16 shows each-dimension region feature calculation method information supplied to the region feature calculation method acquisition unit 5 as an input, in the sixth embodiment. In the sixth embodiment, for each dimension, a mean value of luminance values of a group of pixels included in the extraction regions (first extraction region and second extraction region) or a percentile luminance value feature is used, and the feature is different for each dimension even if the same percentile luminance value feature is used. For example, in the $1^{st}$ dimension, a mean value of luminance values of the pixels included in the extraction regions is used. In the $4^{th}$ dimension, for example, a percentile luminance value feature is used, and the value is Y(floor(N*20.0/100)). Further, in the $8^{th}$ dimension, a percentile luminance value feature is used, and the value is Y(floor(N*80.0/100)).

[Seventh Embodiment]

In a seventh embodiment, the number of dimensions of a feature vector to be extracted is 325 dimensions ($1^{st}$ dimension to $325^{th}$ dimension). In the seventh embodiment, each region consists of a combination of blocks among 1024 pieces of blocks formed by dividing an image into 32 pieces vertically and 32 pieces horizontally. To the respective blocks, indexes starting from 0 are assigned from the upper left part as shown in FIG. 27, and the regions are described using those indexes. Specifically, a rectangle region is indicated using an index “a” of the upper left block and an index “b” of the lower right block in a manner of “a-b”. For example, a rectangle, formed of four blocks having indexes of 0, 1, 32, and 33, is described as 0-33. Further, if rectangles formed in this manner are linked using a sign “1”, they represent a region formed by linking the rectangles before and after the sign. For example, 0-33|2-67indicates a region formed by linking a rectangle defined by 0-33 and a rectangle defined by 2-67, that is, a region formed by the block numbers 0, 1, 2, 3, 32, 33, 34, 35, 66, and 67.

FIG. 28 shows the regions, described in this manner, corresponding to the respective dimensions of the seventh embodiment. In FIG. 28, the 325 dimensions are described by classifying them by the type in FIG. 28-*a*, FIG. 28-*b*, FIG. 28-*c*, FIG. 28-*d*, FIG. 28-*e*, FIG. 28-*f*, and FIG. 28-*g*. In these figures, the type of a region means a group consisting of the dimensions having similar region patterns determined by the combinations of relative positions or shapes between the first and second extraction regions.

Specifically, FIG. 28-*a* corresponds to the case where two regions, formed by dividing a square defined by four blocks vertically and four blocks horizontally into two in a vertical or horizontal direction, are used as first and second extraction regions, an example of which is shown in FIG. 30-*a*. As such, the shape of both the first and second extraction regions is a rectangle defined by four blocks vertically and two blocks horizontally or a rectangle defined by two blocks vertically and four blocks horizontally. Further, regarding the relative positional relation between the first and second extraction regions, they are present at positions adjacent to each other such that the longitudinal sides of the rectangles overlap each other.

FIG. 28-*b* corresponds to the case where two regions, formed by equally dividing a square defined by eight blocks vertically and eight blocks horizontally in vertical and horizontal directions into four squares and combining the upper left and lower right squares and combining the upper right and lower left squares, respectively, are used as a first and second extraction regions, an example of which is shown in FIG. 30-*b*. As such, the shape of both the first and second extraction regions is that two squares, defined by two blocks vertically and two blocks horizontally, are arranged on a diagonal line at an angle of 45 degrees or 135 degrees so as to share one vertex. Further, regarding the relative positional relation between the regions, the two squares constituting the second region are present at a position adjacent to the left and below of the upper left square of the first region.

In the case of FIG. 28-*c*, the shape of both the first and second extraction regions is a square defined by 10 blocks vertically and 10 blocks horizontally, an example of which is shown in FIG. 30-*c*. Regarding the relative positional relation between the first and second extraction regions, they are present at positions distant by the integral multiple of 10 blocks vertically and horizontally from each other.

In the case of FIG. 28-*d*, the shape of both the first and second extraction regions is a square defined by 8 blocks vertically and 8 blocks horizontally, an example of which is shown in FIG. 30-*d*. Regarding the relative positional relation between the first and second extraction regions, they are present at positions distant by the integral multiple of 6 blocks vertically and horizontally from each other.

FIG. 28-*e* corresponds to the case where two regions, formed by dividing a square region into a center portion and an outside portion, are used as a first and second extraction regions, an example of which is shown in FIG. 30-*e*. As such, the shape of the second extraction region is a square of the center portion, and the shape of the first extraction region is a square in which the second extraction region is cut out from the whole square. Further, regarding the relative positional relation between the regions, the second region is present at the center hole of the first region.

In the case of FIG. 28-*f*, the shape of the first extraction region is a rectangle defined by 6 blocks vertically and 10 blocks horizontally, and the shape of the second extraction region is a rectangle defined by 10 blocks vertically and 6 blocks horizontally, an example of which is shown in FIG. 30-E Regarding the relative positional relation between the first and second extraction regions, they are arranged such that the center positions thereof coincide.

FIG. 28-*g* corresponds to the case where two regions, formed by dividing a rectangle defined by 4 blocks vertically and 12 blocks horizontally or a rectangle defined by 12 blocks vertically and 4 blocks horizontally into a center square region formed by trisecting the longitudinal side and the other region, are used as a first and second extraction regions, an example of which is shown in FIG. 30-*g*. As such, the shape of the first region is in two squares defined by four blocks vertically and four blocks horizontally separated from each other by four blocks vertically or horizontally, and the shape of the second extraction region is a square defined by four blocks vertically and four blocks horizontally. Further, regarding the relative positional relation between the regions, the second region is present between the squares of the first region.

Hereinafter, the region types of FIG. 28-*a*, FIG. 28-*b*, FIG. 28-*c*, FIG. 28-*d*, FIG. 28-*e*, FIG. 28-*f*, and FIG. 28-*g* are respectively referred to as a region type a, a region type b, a region type c, a region type d, a region type e, a region type f, and a region type g.

In the seventh embodiment, a mean value of the luminance values is calculated as a region feature in each region shown in FIG. 28 and a feature of each dimension is calculated. Of course, it is possible to obtain a value extracted by the previously-described various extraction methods, such as a median or a maximum value, instead of the mean value of the luminance values as a region feature.

For quantizing the feature of each dimension, a threshold is set for each of the types of the regions to perform quantization. For example, when quantizing a feature to three values according to Expression 2, a threshold th for quantization is determined such that the proportion of occurrence of 0, 1, and −1 becomes equal for each of the types of regions, and quantization is performed. Specifically, a threshold th is obtained by applying the method described in paragraph 0093 for each type of region, in which P=33.333% and N represents the number of dimensions for each type of region. For example, as N=113 in the region type a, a threshold is calculated by th=D(floor(113*33.333/100))=D(37). It should be noted that D(i) (i=0, 1, . . . , N−1) is a collection in which the absolute values of the difference values of the 1$^{st}$ dimension to the 113$^{th}$ dimension are sorted in ascending order. In this case, an index corresponding to the threshold is 37. Similarly, an index corresponding to a threshold can be obtained for another region type, as shown in FIG. 29. By obtaining a threshold for each region type, it is possible to uniform the occurrence probability of 0, 1, and −1 in each dimension, compared with the case of determining a threshold collectively, whereby the discrimination capability is improved. Of course, it is possible to performed quantization by the other various quantization methods which have been described above.

It should be noted that in the case of the seventh embodiment, it is also possible to first calculate a representative value for each block (e.g., a mean value of luminance values of pixels within a block) shown in FIG. 27, and then extract a region feature. Thereby, extraction can be performed at a higher speed than the case of directly extracting a region feature from all pixels within the region. Further, extraction regions of each region type have a symmetric property as a whole. As such, even in the cases where right and left or up and down of images are inverted, by changing the correspondence relation and signs of the dimensions appropriately, it is possible to restore the features of the original image from the features extracted from the image in which right and left or up and down are inverted. As such, matching can also be performed on an image in which right and left or up and down are inverted.

[Embodiment of Matching Unit]

Next, a matching unit for matching quantization index vectors output in the present invention will be described using a block diagram.

Figure 21:
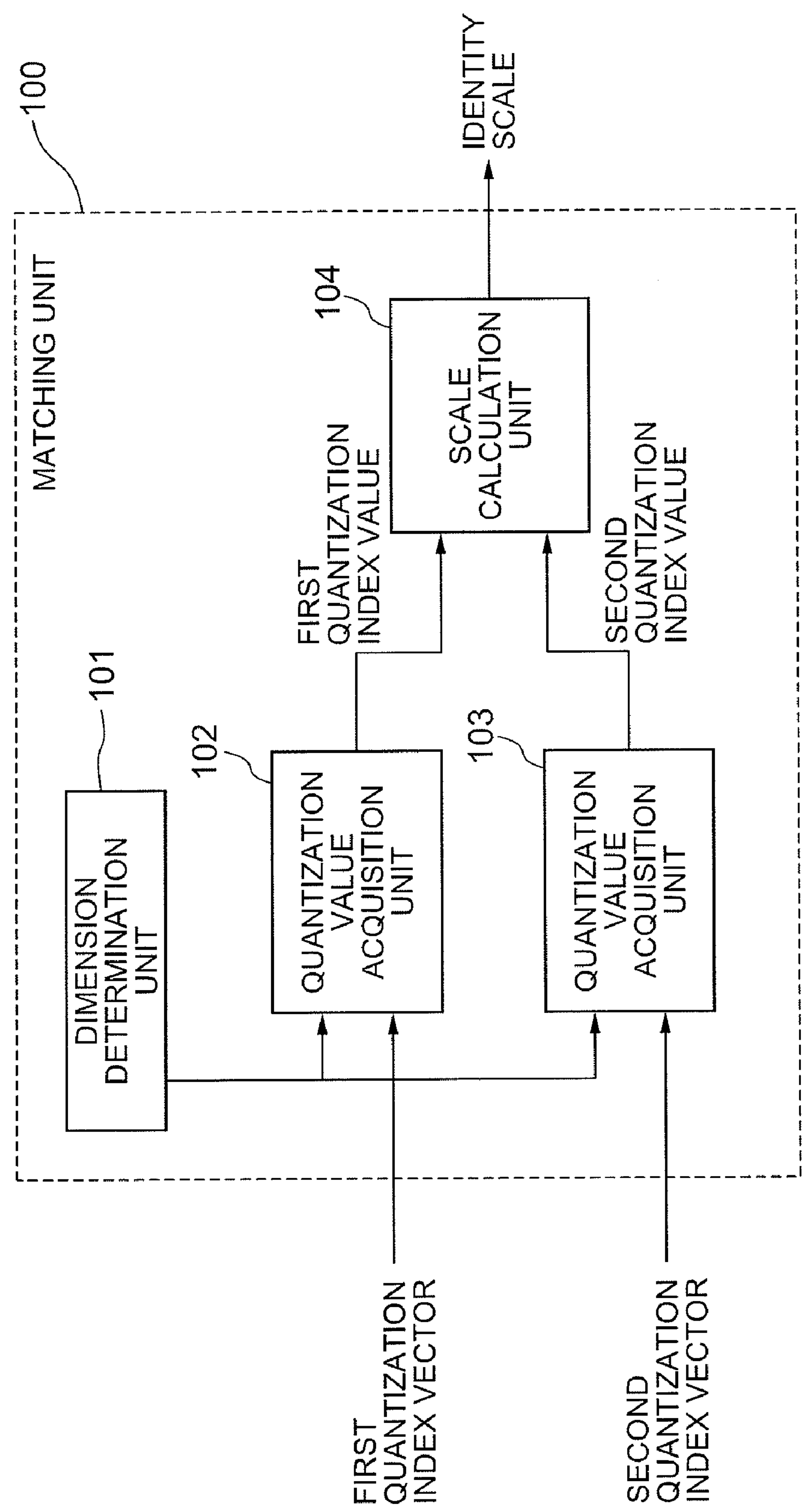
FIG. 21 is a block diagram showing a matching unit for matching quantization index vectors.

Referring to FIG. 21 showing a block diagram of a matching unit 100 for matching quantization index vectors output in the present invention, the matching unit 100 includes a dimension determination unit 101, quantization value acquisition units 102 and 103, and a scale calculation unit 104.

The dimension determination unit 101 is connected to the quantization value acquisition units 102 and 103, and outputs determined dimension information. The quantization value acquisition unit 102 acquires, from a first quantization index vector, a quantization index value of the dimension input from the dimension determination unit 101, and outputs the value to the scale calculation unit 104 as a first quantization index value. The quantization value acquisition unit 103 acquires, from a second quantization index vector, a quantization index value of the dimension input from the dimension determination unit 101, and outputs the value to the scale calculation unit 104 as a second quantization index value. The scale calculation unit 104 calculates a scale indicating the identity from the first and second quantization index values output from the quantization value acquisition units 102 and 103, and outputs it.

Next, operation of the matching unit 100 shown in FIG. 21 will be described.

First, to the matching unit 100, the first quantization index vector which is a quantization index vector extracted from a first image, and a second quantization index vector which is a quantization index vector extracted from a second image, are input. The input first and second quantization index vectors are respectively input to the quantization value acquisition units 102 and 103.

To the quantization value acquisition units 102 and 103, dimension information output from the dimension determination unit 101 is also input. The dimension determination unit 101 sequentially outputs information designating respective dimensions of the quantization index vectors which are N dimension vectors. The output order is not necessary incremented by one from 1 to N, and may be in any order if all dimensions from 1 to N are designated without deficiency and excess.

The quantization value acquisition units 102 and 103 acquire, from the input quantization index vectors, quantization index values of the dimension designated in the dimension information output from the dimension determination unit 101, and output the acquired quantization index values to the scale calculation unit 104.

The scale calculation unit 104 compares the first quantization index value output from the quantization value acquisition unit 102 with the second quantization index value. This comparison is performed on the respective dimensions, and a similarity scale (or distance scale) between the first and second quantization index vectors is calculated as an identity scale.

The acquired identity scale is compared with a predetermined threshold to determine the identity. If the identity scale is a scale indicating the similarity, they are determined to be identical if the scale value is equal to or larger than the threshold. On the other hand, if the identity scale is a scale indicating the distance, they are determined to be identical if the scale value is smaller than or equal to the threshold.

Next, operation of the matching unit 100 shown in FIG. 21 will be described using a flowchart. First, operation in the case of using a similarity as an identity scale will be described.

Figure 22:
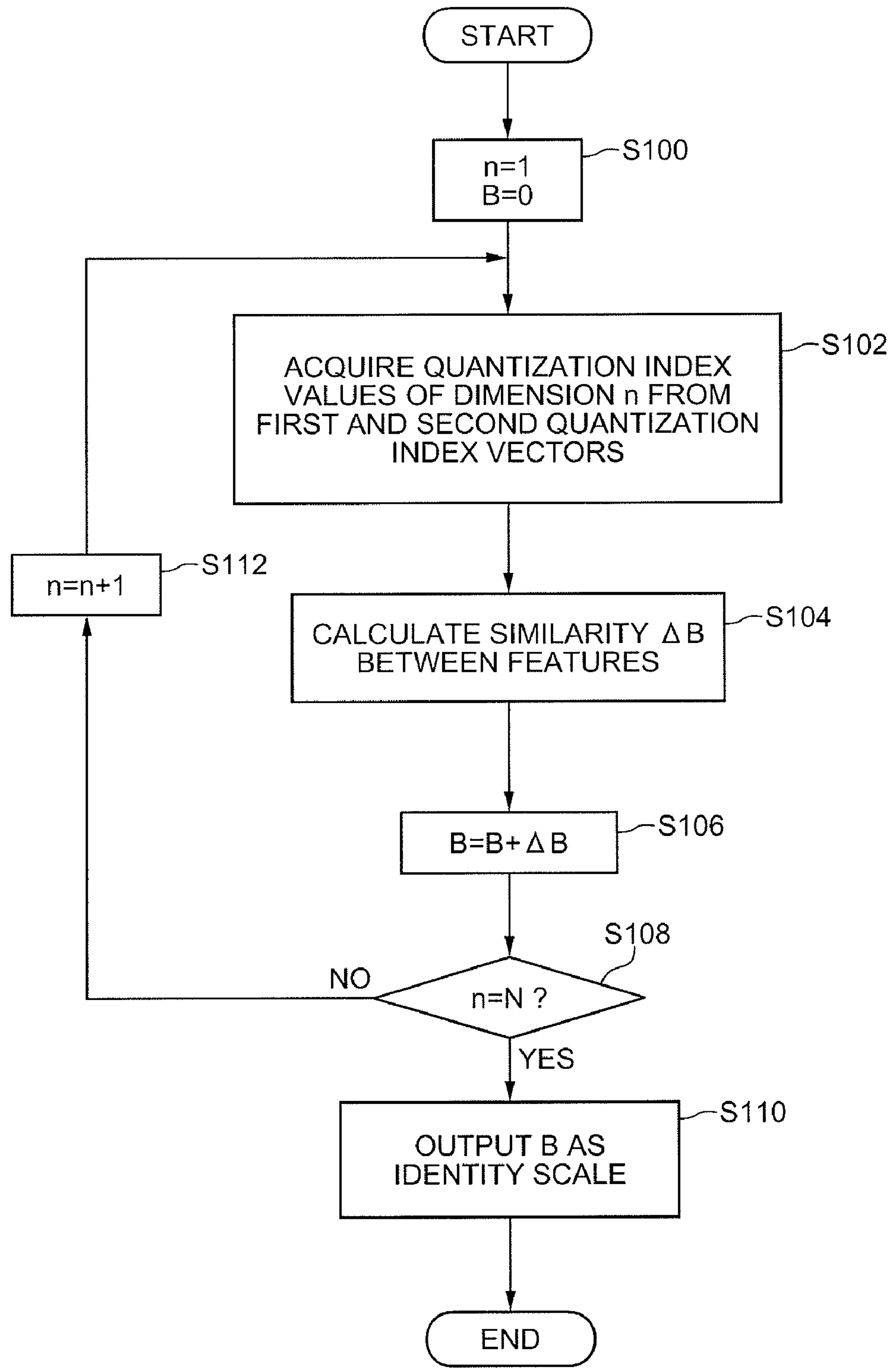
FIG. 22 is a flowchart showing an exemplary process performed by the matching unit for matching quantization index vectors.

FIG. 22 is a flowchart showing the operation of the matching unit 100. In the flowchart of FIG. 22, a dimension (number) of a feature vector is indicated by "n", and there are N dimensions in total from 1 to N. Further, a variable for calculating the similarity is indicated by B.

First, the dimension determination unit 101 determines a dimension 1 as the first dimension (n=1) for matching a quantization index vector, and supplies it to the quantization acquisition units 102 and 103 and sets the variable B to be 0 in the scale calculation unit 104 (step S100).

Then, the quantization acquisition units 102 and 103 acquire a first quantization index value and a second quantization index value of the dimension n from the first quantization index vector and the second quantization index vector, and supply them to the scale calculation unit 104 (step S102).

Then, the scale calculation unit 104 calculates, from the first quantization index value and the second quantization index value, a similarity ΔB between the features corresponding to the respective quantization indexes (step S104). For example, ΔB=1 when the quantization indexes conform to each other, and ΔB=0 in other cases. Alternatively, it is also possible to calculate representative values of the features before quantization from the quantization indexes and use a value, which is increased as the difference between the representative values is smaller, as ΔB. In that case, instead of obtaining a difference by calculating the representative values of the features, it is possible to hold a table in which the value of ΔB is acquired from a combination of quantization index values, and directly obtain the value of ΔB using the table from the combination of the quantization index values.

Next, the value of ΔB is added to the variable B (step S106). At this point, if the value of ΔB is 0, it is possible to control not to add, rather than adding 0 to the variable B.

Next, it is checked whether the dimension number n reaches the number of dimension N (step S108), and if the number does not reach, the processing moves to step S112, while if the number reached, the value of the variable B at that point is output as an identity scale (scale indicating similarity) (step S110) and the processing ends.

At step 112, the dimension determination unit 101 determines the next dimension from n=n+1 as the dimension for acquiring quantization indexes, and supplies it to the quantization value acquisition units 102 and 103. Then, the processing returns to step S102.

It should be noted that although the extraction processing is performed in order from the dimension 1 to the dimension N, any order may be taken without being limited to this order.

Next, operation in the case of using a distance as an identity scale will be described.

Figure 23:
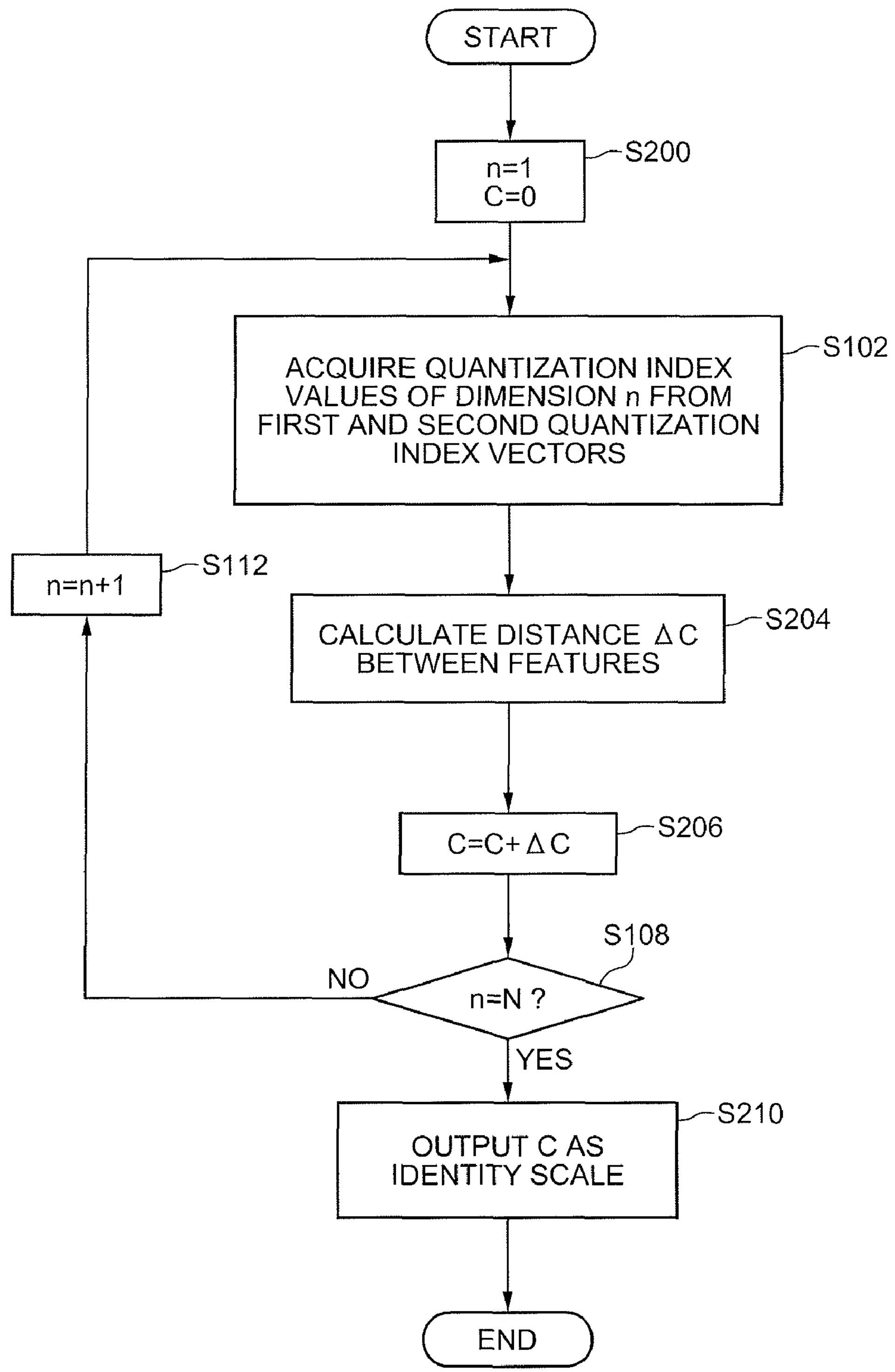
FIG. 23 is a flowchart showing another exemplary process performed by the matching unit for matching quantization index vectors.

FIG. 23 is another flowchart showing the operation of the matching unit 100. Also in the flowchart of FIG. 23, a dimension (number) of a feature vector is indicated by "n", and there are N dimensions in total from 1 to N. Further, a variable for calculating a distance scale is indicated by C.

While the basic flow is similar to that of FIG. 22, FIG. 23 is different in that steps S100, S104, S106, and S110 are respectively replaced with steps S200, S204, S206, and S210.

First, at step S200, the dimension determination unit 101 determines a dimension 1 as the first dimension (n=1) for matching a quantization index vector, and supplies it to the quantization acquisition units 102 and 103 and sets the variable C to be 0 in the scale calculation unit 104.

At step S204, the scale calculation unit 104 calculates, from the first quantization index value and the second quantization index value, a distance ΔC between the features corresponding to the respective quantization indexes. For example, ΔC=0 when the quantization indexes conform to each other, and ΔC=1 in other cases. Alternatively, it is also possible to calculate representative values of the features before quantization from the quantization indexes, and use a value, which is decreased as the difference between the representative values is smaller, as ΔC. In that case, instead of obtaining a difference by calculating the representative values of the features, it is possible to hold a table in which the value of ΔC is acquired from a combination of quantization index values, and directly obtain the value of ΔC using the table from the combination of the quantization index values.

At step S206, the value of ΔC is added to the variable C. At this point, if the value of ΔC is 0, it is possible to control not to add, rather than adding 0 to the variable C.

At step S210, the value of the variable C at that point is output as an identity scale (scale indicating distance) and the processing ends.

The other steps are the same as those in the case of FIG. 22. However, if the dimension number n reached the number of dimensions N at step S108, the processing moves to step S210.

It should be noted that although the extraction processing is performed in order from the dimension 1 to the dimension N, any order may be taken without being limited to this order.

Next, description will be given for the operation in the case where a dimension in which "both quantization indexes are 0" for the first quantization index value and the second quantization index value is eliminated, and a similarity is used as an identity scale.

Figure 24:
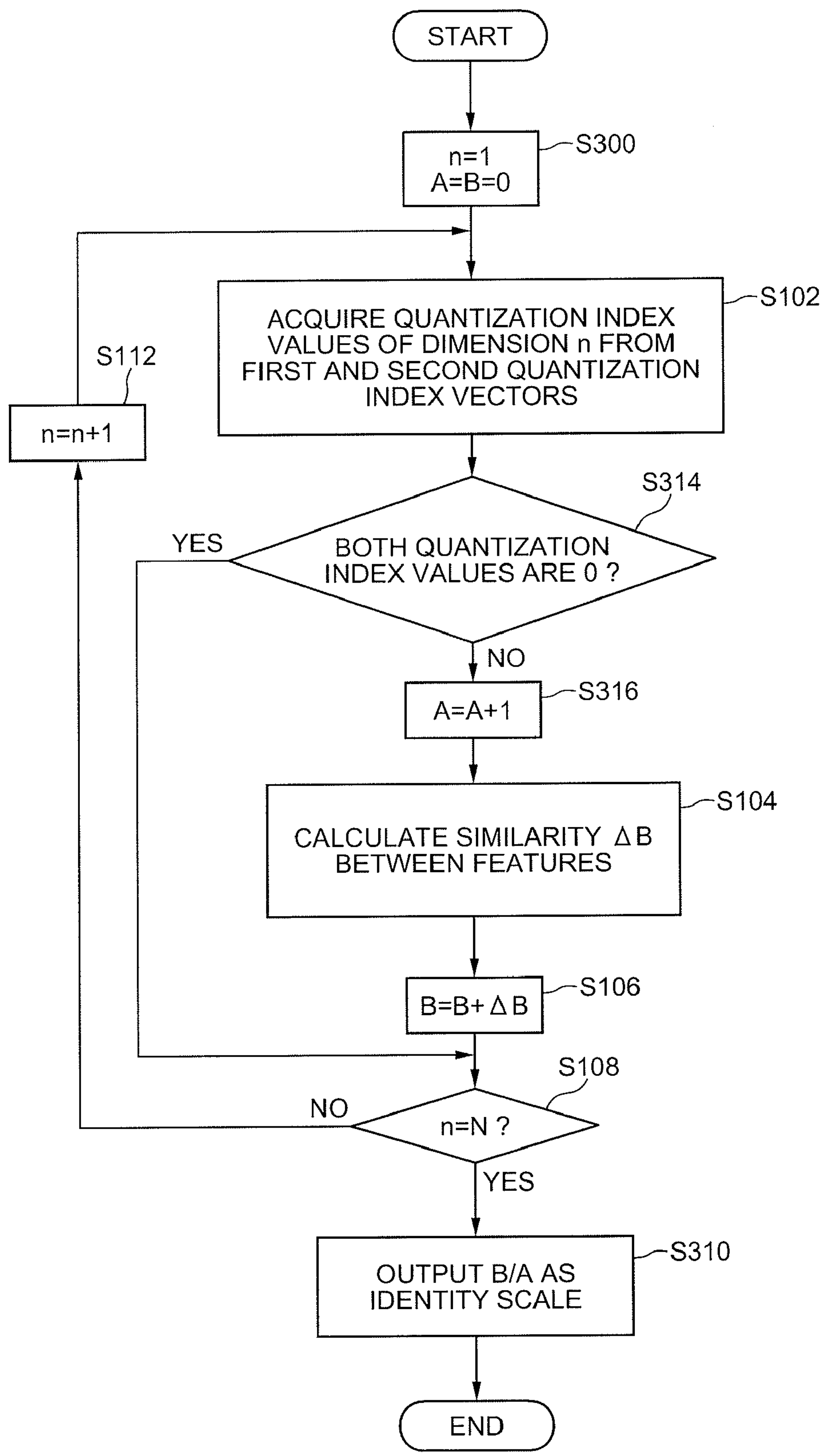
FIG. 24 is a flowchart showing still another exemplary process performed by the matching unit for matching quantization index vectors.

FIG. 24 is another flowchart showing the operation of the matching unit 100. Also in the flowchart of FIG. 24, a dimension (number) of a feature vector is indicated by "n", and there are N dimensions in total from 1 to N. Further, a variable for calculating the similarity is indicated by B, and a variable for counting the dimensions in which not "both quantization indexes are 0" is indicated by A.

First, the dimension determination unit 101 determines a dimension 1 as the first dimension (n=1) for matching a quantization index vector, and supplies it to the quantization acquisition units 102 and 103, and sets the variables A and B to be 0 in the scale calculation unit 104 (step S300), and then moves to step S102.

Step S102 is the same as the case of FIG. 22, and when step S102 ends, the processing moves to step S314.

At step S314, the scale calculation unit 104 checks whether or not both the first quantization index value and the second quantization index value are 0. If both values are 0, the processing moves to step S108, while if either of them is not 0, the value of the variable A is incremented by one (step S316), and the processing moves to step S104.

The processing at steps S104, S106, S108, and S112 is the same as that in the case of FIG. 22. If the dimension number n reached the number of dimensions N at step S108, the processing moves to step S310.

At step S310, the scale calculation unit 104 calculates the value of B/A and outputs it as an identity scale, and ends the processing. However, if A=0, the scale calculation unit 104 outputs a predetermined value (e.g., 0.5).

It should be noted that although the extraction processing is performed in order from the dimension 1 to the dimension N, any order may be taken without being limited to this order. Further, as described in paragraph 0064, at step S310, it is possible to calculate D=N−A and calculates an identity scale by B/f(D) (f(D) is a monotone nonincreasing function), rather than calculating B/A. Alternatively, as described in paragraph 0065, an identity scale may be calculated as (B/f(D))+g(D).

Figure 26:
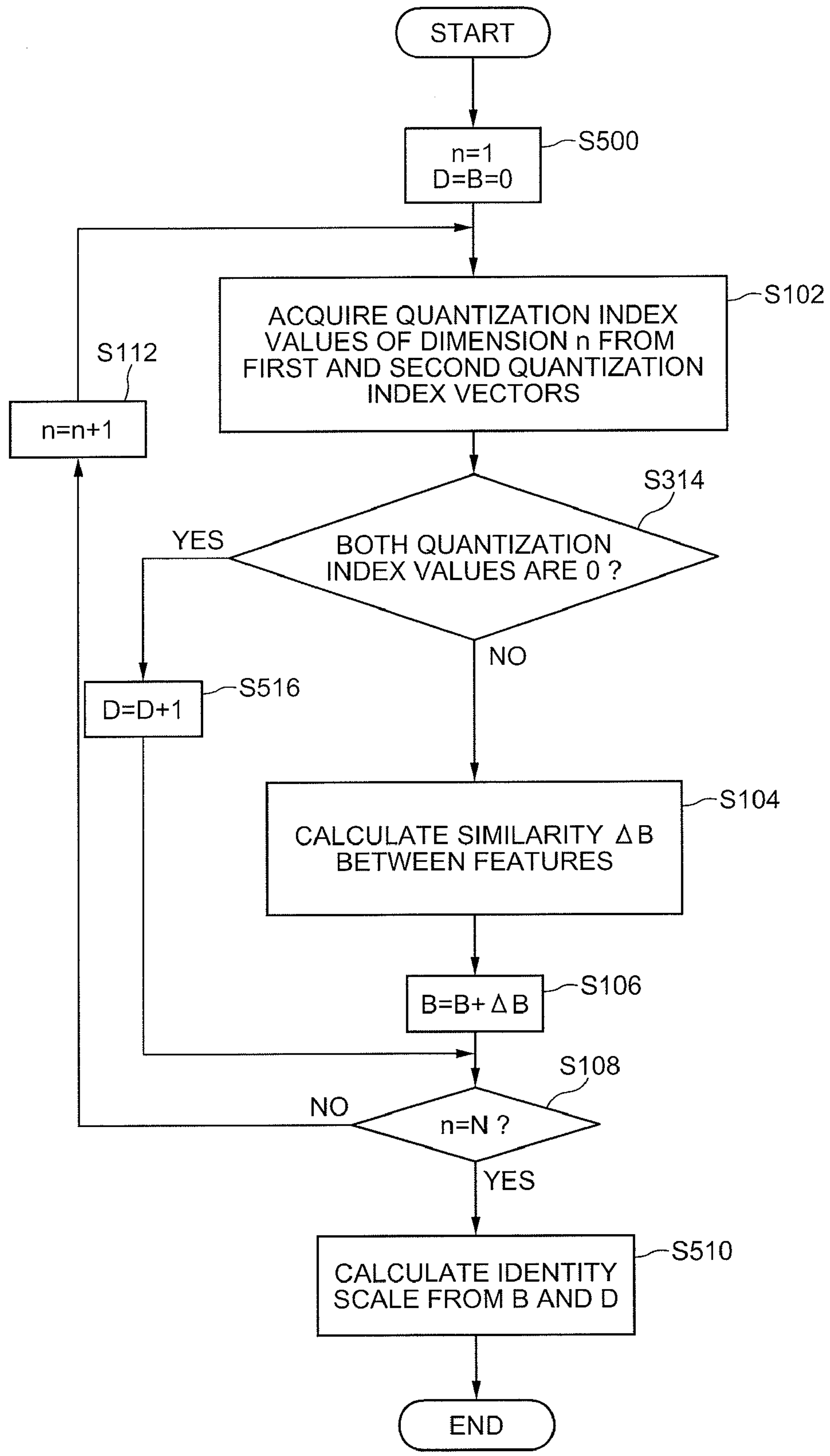
FIG. 26 is a flowchart showing still another exemplary process performed by the matching unit for matching quantization index vectors.

Further, it is also possible to directly calculate the value of D without calculating the value of A. FIG. 26 shows the flow of this case. Although it is basically the same as that of FIG. 24, the flow differs from that of FIG. 24 in that 0 is set to the variable D, rather than A, at step S500, the variable D is incremented by one at step S516 if both quantization indexes are 0 at step S314 and the processing moves to step S108, while either one of the quantization indexes is not 0, the processing moves to step S104 and an identity scale is calculated from B and D by means of the above-described method at step S510.

Next, description will be given for the operation in the case where a dimension in which "both quantization indexes are 0" for the first quantization index value and the second quantization index value is eliminated, and a distance is used as an identity scale.

Figure 25:
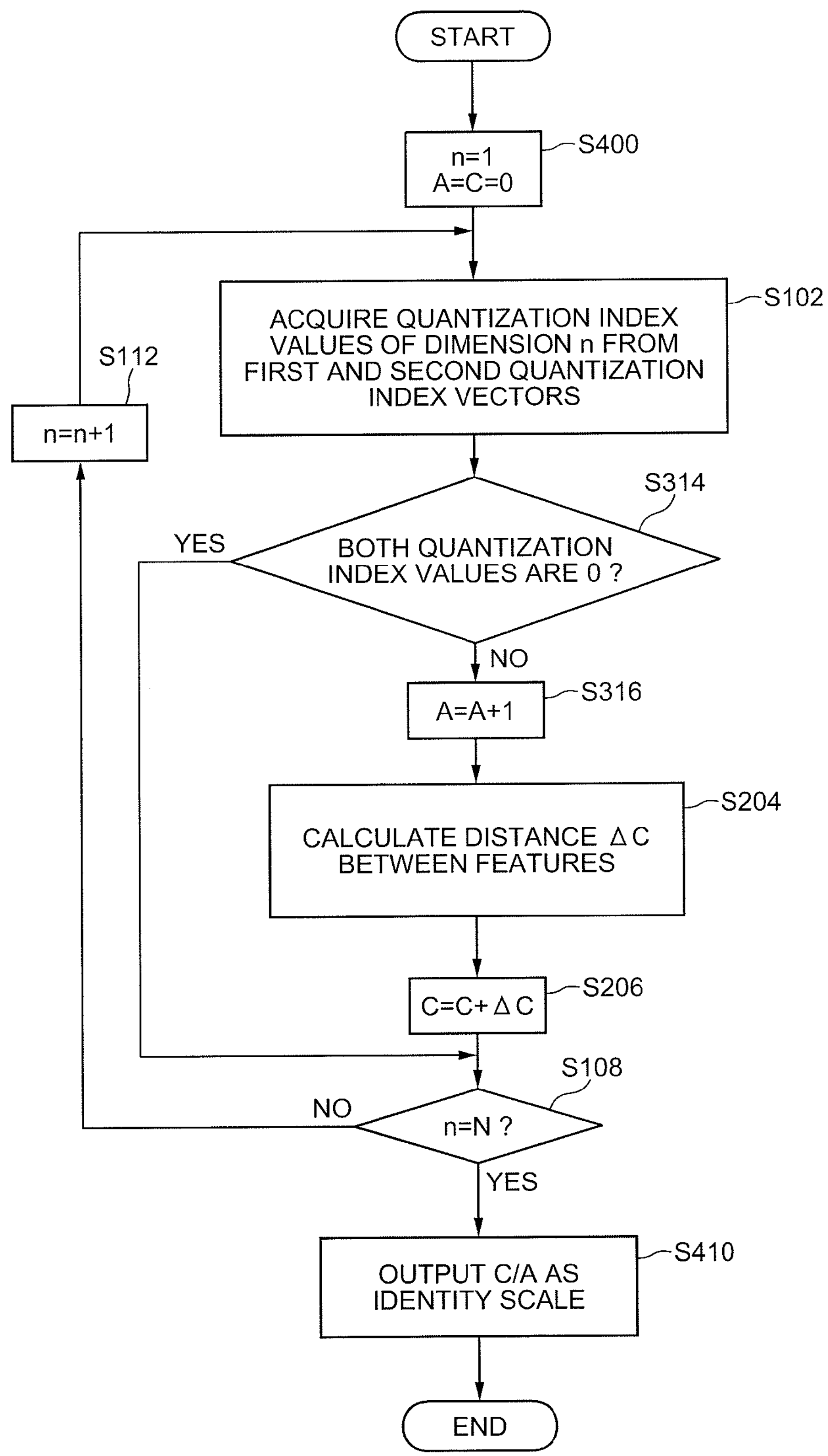
FIG. 25 is a flowchart showing still another exemplary process performed by the matching unit for matching quantization index vectors.

FIG. 25 is another flowchart showing the operation of the matching unit 100. Also in the flowchart of FIG. 25, a dimension (number) of a feature vector is indicated by "n", and there are N dimensions in total from 1 to N. Further, a variable for calculating a distance scale is indicated by C, and a variable for counting the dimensions in which not "both quantization indexes are 0" is indicated by A.

While the basic flow is similar to that of FIG. 24, FIG. 25 is different in that steps S300, S104, S106, and S310 are respectively replaced with steps S400, S204, S206, and S410.

First, at step S400, the dimension determination unit 101 determines a dimension 1 as the first dimension (n=1) for matching a quantization index vector, and supplies it to the quantization acquisition units 102 and 103 and sets the variables A and C to be 0 in the scale calculation unit 104.

Steps S204 and S206 are the same as those in the case of FIG. 23.

At step S410, the scale calculation unit 104 calculates the value of C/A and outputs it as an identity scale, and ends the processing. However, if A=0, the scale calculation unit 104 outputs a predetermined value (e.g., 0.5).

The other steps are the same as those in the case of FIG. 24. However, if the dimension number n reached the number of dimensions N at step S108, the processing moves to step S410.

It should be noted that although the extraction processing is performed in order from the dimension 1 to the dimension N, any order may be taken without being limited to this order. Further, similar to the case of step S310, it is possible to calculate D=N−A and calculates an identity scale by C/f(D) or the like, rather than calculating C/A. Alternatively, it is also possible to directly calculate the value of D without calculating the value of A, as in FIG. 26.

While the embodiments of the present invention have been described above, the present invention is not limited to these examples. It will be understood by those of ordinary skill in the art that various changes in form and details may be made therein without departing from the scope of the present invention.

This application is based upon and claims the benefit of priority from Japanese patent applications No. 2009-61021, filed on Mar. 13, 2009, and No. 2009-97863, filed on Apr. 14, 2009, the disclosures of which are incorporated herein in their entirety by reference.

REFERENCE NUMERALS

1 dimension determination unit
2 extraction region acquisition unit
3, 3A region feature calculation unit
31, 31A first region feature calculation unit
32, 32A second region feature calculation unit
4, 4B comparison unit
41 magnitude comparison unit
42, 44 quantization unit
43 difference value calculation unit
45 quantization boundary determination unit
5 region feature calculation method acquisition unit
6 comparison method acquisition unit

The invention claimed is:

1. An image signature matching device, comprising:

a matching unit for matching an image signature of a first image and an image signature of a second image which are generated by a generation method including:

extracting region features from respective sub-regions of a plurality of pairs of sub-regions in an image; for each of the pairs of sub-regions, quantizing a difference value between the region features of two sub-regions forming a pair, wherein when performing quantization, the difference value is quantized to a particular quantization value if an absolute value of the difference value is smaller than a predetermined value; and using a collection of elements which are quantization values calculated for the respective pairs of sub-regions as an image signature to be used for discriminating the image, wherein the matching unit matches the image signature of the first image and the image signature of the second image in such a manner that a weight of an element having the particular quantization value is reduced.

2. The image signature matching device, according to claim 1, wherein the matching unit compares corresponding elements of the image signature of the first image and the image signature of the second image, and calculates an identity scale indicating a degree that the first image and the second image are identical.

3. The image signature matching device, according to claim 2, wherein as a method of calculating the identity scale, a calculation method, in which a weight of a comparison result between elements that both quantization values are the particular quantization value is reduced, is used.

4. The image signature matching device, according to claim 3, wherein the matching unit calculates the identity scale from a calculation result of B/A or C/A, where A represents the number of elements in which at least one of quantization values is not the particular quantization value, and among the elements in which at least one of the quantization values is not the particular quantization value, B represents the number of elements in which the quantization values coincide, and C represents the number of elements in which the quantization values do not coincide.

5. The image signature matching device, according to claim 3, wherein the matching unit calculates the identity scale from a value of B/f(D) or C/f(D), where D represents the number of elements in which both quantization values are the particular quantization value, and among elements in which at least one of quantization values are not the particular quantization value, B represents the number of elements in which the quantization values coincide, and C represents the number of elements in which the quantization values do not coincide, and f(D) represents a monotone nonincreasing function with respect to arbitrary D.

6. The image signature matching device, according to claim 3, wherein the matching unit calculates the identity scale from a total value of D and B calculated by weighting in which a weight of D is smaller than a weight of B, where D represents the number of elements in which both quantization values are the particular quantization value, and among elements in which at least one of quantization values is not the particular quantization value, B represents the number of elements in which the quantization values coincide.

7. The image signature matching device, according to claim 2, wherein as a method of calculating the identity scale, a calculation method, in which a weight of a comparison result between elements that at least one of quantization values is the particular quantization value is reduced, is used.

8. The image signature matching device, according to claim 7, wherein the matching unit calculates the identity scale from a calculation result of B/A or C/A, where A represents the number of elements in which both quantization values are not the particular quantization value, and among the elements in which both quantization values are not the particular quantization value, B represents the number of elements in which the quantization values coincide, and C represents the number of elements in which the quantization values do not coincide.

9. The image signature matching device, according to claim 7, wherein the matching unit calculates the identity scale from a value of B/f(D) or C/f(D), where D represents the number of elements in which at least one of quantization values is the particular quantization value, and among elements in which both quantization values are not the particular quantization value, B represents the number of elements in which the quantization values coincide, and C represents the number of elements in which quantization values do not coincide, and f(D) represents a monotone nonincreasing function with respect to arbitrary D.

10. The image signature matching device, according to claim 7, wherein the matching unit calculates the identity scale from a total value of D and B calculated by weighting in which a weight of D is smaller than a weight of B, where D represents the number of elements in which at least one of quantization values are the particular quantization value, and among elements in which both quantization values are not the particular quantization value, B represents the number of elements in which the quantization values coincide.

11. The image signature matching device, according to claim 1, wherein the plurality of pairs of sub-regions include at least one pair of sub-regions in which both a combination of shapes of two sub-regions of the pair and a relative positional relation between the two sub-regions of the pair differ from those of at least one of other pairs of sub-regions.

12. An image signature matching method, comprising:

matching an image signature of a first image and an image signature of a second image which are generated by a generation method including: extracting region features from respective sub-regions of a plurality of pairs of sub-regions in an image; for each of the pairs of sub-regions, quantizing a difference value between the region features of two sub-regions forming a pair, wherein when performing quantization, the difference value is quantized to a particular quantization value if an absolute value of the difference value is smaller than a predetermined value; and using a collection of elements which are quantization values calculated for the respective pairs of sub-regions as an image signature to be used for discriminating the image, wherein the matching the image signature of the first image and the image signature of the second image is performed in such a manner that a weight of an element having the particular quantization value is reduced.

13. The image signature matching method, according to claim 12, further comprising:

comparing corresponding elements of the image signature of the first image and the image signature of the second image, and calculating an identity scale indicating a degree that the first image and the second image are identical.

14. The image signature matching method, according to claim 13, wherein as a method of calculating the identity scale, a calculation method, in which a weight of a comparison result between elements that both quantization values are the particular quantization value is reduced, is used.

15. The image signature matching method, according to claim 14, wherein the identity scale is calculated from a calculation result of B/A or C/A, where A represents the number of elements in which at least one of quantization values is not the particular quantization value, and among the elements in which at least one of the quantization values is not the particular quantization value, B represents the number of elements in which the quantization values coincide, and C represents the number of elements in which the quantization values do not coincide.

16. The image signature matching method, according to claim 14, wherein the identity scale is calculated from a value of B/f(D) or C/f(D), where D represents the number of elements in which both quantization values are the particular quantization value, and among elements in which at least one of quantization values are not the particular quantization value, B represents the number of elements in which the quantization values coincide, and C represents the number of elements in which the quantization values do not coincide, and f(D) represents a monotone nonincreasing function with respect to arbitrary D.

17. The image signature matching method, according to claim 14, wherein the identity scale is calculated from a total value of D and B calculated by weighting in which a weight of D is smaller than a weight of B, where D represents the number of elements in which both quantization values are the particular quantization value, and among elements in which at least one of quantization values is not the particular quantization value, B represents the number of elements in which the quantization values coincide.

18. The image signature matching method, according to claim 13, wherein as a method of calculating the identity scale, a calculation method, in which a weight of a comparison result between elements that at least one of quantization values is the particular quantization value is reduced, is used.

19. The image signature matching method, according to claim 18, wherein the identity scale is calculated from a calculation result of B/A or C/A, where A represents the number of elements in which both quantization values are not the particular quantization value, and among the elements in which both quantization values are not the particular quantization value, B represents the number of elements in which the quantization values coincide, and C represents the number of elements in which the quantization values do not coincide.

20. The image signature matching method, according to claim 18, wherein the identity scale is calculated from a value of B/f(D) or C/f(D), where D represents the number of elements in which at least one of quantization values is the particular quantization value, and among elements in which both quantization values are not the particular quantization value, B represents the number of elements in which the quantization values coincide, and C represents the number of elements in which quantization values do not coincide, and f(D) represents a monotone nonincreasing function with respect to arbitrary D.

21. The image signature matching method, according to claim 18, wherein the identity scale is calculated from a total value of D and B calculated by weighting in which a weight of D is smaller than a weight of B, where D represents the number of elements in which at least one of quantization values are the particular quantization value, and among elements in which both quantization values are not the particular quantization value, B represents the number of elements in which the quantization values coincide.

22. The image signature matching method, according to claim 12, wherein the plurality of pairs of sub-regions include at least one pair of sub-regions in which both a combination of shapes of two sub-regions of the pair and a relative positional relation between the two sub-regions of the pair differ from those of at least one of other pairs of sub-regions.

23. A computer-readable memory storing a program for causing a computer to function as, a matching unit for matching an image signature of a first image and an image signature of a second image which are generated by a generation method including:

extracting region features from respective sub-regions of a plurality of pairs of sub-regions in an image; for each of the pairs of sub-regions, quantizing a difference value between the region features of two sub-regions forming a pair, wherein when performing quantization, the difference value is quantized to a particular quantization value if an absolute value of the difference value is smaller than a predetermined value; and using a collection of elements which are quantization values calculated for the respective pairs of sub-regions as an image signature to be used for discriminating the image, wherein the matching unit matches the image signature of the first image and the image signature of the second image in such a manner that a weight of an element having the particular quantization value is reduced.

* * * * *